United States Patent
Wilcox et al.

(10) Patent No.: US 11,675,120 B2
(45) Date of Patent: *Jun. 13, 2023

(54) OPTICAL WAVEGUIDES FOR LIGHT FIXTURES AND LUMINAIRES

(71) Applicant: IDEAL Industries Lighting LLC, Racine, WI (US)

(72) Inventors: Kurt S. Wilcox, Libertyville, IL (US); Christopher D. Strom, Racine, WI (US); Jin Hong Lim, Cary, NC (US); Zongjie Yuan, Libertyville, IL (US); Mark Boomgaarden, Cary, NC (US); Randall Levy Bernard, Durham, NC (US); John W. Durkee, Raleigh, NC (US); Craig D. Raleigh, Burlington, WI (US); Joseph P. Chobot, State College, PA (US)

(73) Assignee: IDEAL Industries Lighting LLC, Sycamore, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/346,700

(22) Filed: Jun. 14, 2021

(65) Prior Publication Data

US 2021/0311246 A1    Oct. 7, 2021

Related U.S. Application Data

(60) Continuation of application No. 16/937,026, filed on Jul. 23, 2020, now Pat. No. 11,079,079, and a
(Continued)

(51) Int. Cl.
*G02B 6/00* (2006.01)
*F21V 8/00* (2006.01)
(Continued)

(52) U.S. Cl.
CPC .............. *G02B 6/0076* (2013.01); *F21K 9/61* (2016.08); *F21S 8/026* (2013.01); *F21V 7/0091* (2013.01);
(Continued)

(58) Field of Classification Search
None
See application file for complete search history.

(56) References Cited

U.S. PATENT DOCUMENTS

| 3,372,740 A | 3/1968 | Kastovich et al. |
| 3,532,871 A | 10/1970 | Shipman |

(Continued)

FOREIGN PATENT DOCUMENTS

| DE | 3812764 A1 | 10/1989 |
| EP | 1503026 A2 | 2/2005 |

(Continued)

OTHER PUBLICATIONS

International Search Report and Written Opinion for International Application No. PCT/US15/32011, dated Oct. 23, 2015, 9 pages.
(Continued)

*Primary Examiner* — Michelle R Connelly
(74) *Attorney, Agent, or Firm* — Withrow & Terranova, P.L.L.C.

(57) ABSTRACT

Embodiments of the present disclosure generally relate to light fixtures and luminaires configured to emit light. According to one aspect, an optical waveguide includes a first waveguide portion and a second waveguide portion adjacent to and separate from the first waveguide portion. The waveguide portions include light coupling portions that are at least partially aligned and adapted to receive light developed by a light source. The first waveguide portion further has a first major surface with light direction features and a second major surface opposite the first major surface.

(Continued)

The second waveguide portion further has a third major surface proximate the second major surface with an air gap disposed therebetween and a fourth major surface opposite the third major surface wherein the fourth major surface includes a cavity extending therein.

18 Claims, 71 Drawing Sheets

Related U.S. Application Data continuation of application No. 16/937,096, filed on Jul. 23, 2020, now Pat. No. 11,035,527, said application No. 16/937,026 is a continuation-in-part of application No. 16/692,130, filed on Nov. 22, 2019, and a continuation of application No. 16/539,163, filed on Aug. 13, 2019, now Pat. No. 11,099,317, and a continuation of application No. 15/710,913, filed on Sep. 21, 2017, now Pat. No. 10,508,794, said application No. 17/346,700 is a continuation of application No. 15/376,257, filed on Dec. 12, 2016, now abandoned, said application No. 16/539,163 is a division of application No. 14/726,152, filed on May 29, 2015, now Pat. No. 10,422,944, which is a continuation-in-part of application No. 13/839,949, filed on Mar. 15, 2013, now Pat. No. 9,581,751, said application No. 15/376,257 is a division of application No. 13/842,521, filed on Mar. 15, 2013, now Pat. No. 9,519,095, said application No. 14/726,152 is a continuation-in-part of application No. 13/840,563, filed on Mar. 15, 2013, now Pat. No. 10,436,969.

(60) Provisional application No. 61/758,660, filed on Jan. 30, 2013.

(51) Int. Cl.
  F21K 9/61     (2016.01)
  F21S 8/02     (2006.01)
  F21V 7/00     (2006.01)
  G02B 6/24     (2006.01)
  G02B 6/26     (2006.01)
  G02B 6/30     (2006.01)
  G02B 6/32     (2006.01)
  G02B 6/34     (2006.01)

(52) U.S. Cl.
  CPC ......... *G02B 6/0018* (2013.01); *G02B 6/0021* (2013.01); *G02B 6/0031* (2013.01); *G02B 6/0035* (2013.01); *G02B 6/0036* (2013.01); *G02B 6/0038* (2013.01); *G02B 6/0046* (2013.01); *G02B 6/24* (2013.01); *G02B 6/262* (2013.01); *G02B 6/305* (2013.01); *G02B 6/32* (2013.01); *G02B 6/34* (2013.01)

(56) References Cited

U.S. PATENT DOCUMENTS

| | | |
|---|---|---|
| 5,398,179 A | 3/1995 | Pacheco |
| 5,537,304 A | 7/1996 | Klaus |
| 5,613,751 A | 3/1997 | Parker et al. |
| 5,613,770 A | 3/1997 | Chin, Jr. et al. |
| 5,676,457 A | 10/1997 | Simon |
| 5,685,634 A | 11/1997 | Mulligan |
| 5,719,619 A | 2/1998 | Hattori et al. |
| 5,719,649 A | 2/1998 | Shono et al. |
| 5,806,955 A | 9/1998 | Parkyn, Jr. et al. |
| 5,812,714 A | 9/1998 | Hulse |
| 5,839,823 A | 11/1998 | Hou et al. |
| 5,863,113 A | 1/1999 | Oe et al. |
| 5,897,201 A | 4/1999 | Simon |
| 6,097,549 A | 8/2000 | Jenkins et al. |
| 6,193,383 B1 | 2/2001 | Onikiri et al. |
| 6,257,737 B1 | 7/2001 | Marshall et al. |
| 6,443,594 B1 | 9/2002 | Marshall et al. |
| 6,517,222 B1 | 2/2003 | Orlov |
| 6,554,451 B1 | 4/2003 | Keuper |
| 7,008,097 B1 | 3/2006 | Hulse |
| 7,083,313 B2 | 8/2006 | Smith |
| 7,090,370 B2 | 8/2006 | Clark et al. |
| 7,111,969 B2* | 9/2006 | Bottesch ............ B60Q 1/0058 362/309 |
| 7,393,124 B1 | 7/2008 | Williams |
| 7,488,093 B1 | 2/2009 | Huang et al. |
| 7,520,650 B2 | 4/2009 | Smith |
| 7,534,013 B1 | 5/2009 | Simon |
| 7,566,159 B2 | 7/2009 | Oon et al. |
| 7,587,117 B2 | 9/2009 | Winston et al. |
| 7,593,615 B2 | 9/2009 | Chakmakjian et al. |
| 7,628,508 B2 | 12/2009 | Kita et al. |
| 7,635,205 B2 | 12/2009 | Yu et al. |
| 7,641,363 B1 | 1/2010 | Chang et al. |
| 7,736,019 B2 | 6/2010 | Shimada et al. |
| 7,810,960 B1 | 10/2010 | Soderman et al. |
| 7,914,193 B2 | 3/2011 | Peifer et al. |
| 7,967,477 B2 | 6/2011 | Bloemen et al. |
| 8,087,807 B2 | 1/2012 | Liu et al. |
| 8,096,671 B1 | 1/2012 | Cronk et al. |
| 8,096,681 B2 | 1/2012 | Fang et al. |
| 8,272,756 B1 | 9/2012 | Patrick |
| 8,277,106 B2 | 10/2012 | Van Gorkom et al. |
| 8,287,152 B2 | 10/2012 | Gill |
| 8,317,366 B2 | 11/2012 | Dalton et al. |
| 8,353,606 B2 | 1/2013 | Jeong |
| 8,382,387 B1 | 2/2013 | Sandoval |
| 8,393,774 B2 | 3/2013 | Krijn et al. |
| 8,408,737 B2 | 4/2013 | Wright et al. |
| 8,414,155 B2 | 4/2013 | Catone et al. |
| 8,419,224 B2 | 4/2013 | Wan-Chih et al. |
| 8,425,071 B2 | 4/2013 | Ruud et al. |
| 8,430,548 B1 | 4/2013 | Kelly et al. |
| 8,434,892 B2 | 5/2013 | Zwak et al. |
| 8,434,893 B2 | 5/2013 | Boyer et al. |
| 8,434,913 B2 | 5/2013 | Vissenberg |
| 8,449,128 B2 | 5/2013 | Ko et al. |
| 8,449,142 B1 | 5/2013 | Martin et al. |
| 8,469,559 B2 | 6/2013 | Williams |
| 8,475,010 B2 | 7/2013 | Vissenberg et al. |
| 8,485,684 B2 | 7/2013 | Lou et al. |
| 8,506,112 B1 | 8/2013 | Dau et al. |
| 8,541,795 B2 | 9/2013 | Keller et al. |
| 8,547,022 B2 | 10/2013 | Summerford et al. |
| 8,567,983 B2 | 10/2013 | Boyer et al. |
| 8,573,823 B2 | 11/2013 | Dau et al. |
| 8,585,253 B2 | 11/2013 | Duong et al. |
| 8,593,070 B2 | 11/2013 | Wang et al. |
| 8,608,351 B2 | 12/2013 | Peifer |
| 8,905,595 B2 | 12/2014 | Shastry et al. |
| 8,975,827 B2 | 3/2015 | Chobot et al. |
| 9,099,592 B2 | 8/2015 | Derryberry et al. |
| 9,256,018 B2 | 2/2016 | Morgan et al. |
| 9,303,823 B2 | 4/2016 | Hu et al. |
| 9,305,470 B2 | 4/2016 | Miki et al. |
| 9,442,243 B2 | 9/2016 | Tarsa |
| 9,581,751 B2 | 2/2017 | Yuan et al. |
| 9,690,029 B2 | 6/2017 | Keller et al. |
| 9,706,617 B2 | 7/2017 | Carrigan et al. |
| 9,791,110 B2 | 10/2017 | Hu et al. |
| 9,818,919 B2 | 11/2017 | Lowes et al. |
| 9,869,432 B2 | 1/2018 | Keller et al. |
| 10,180,529 B2 | 1/2019 | Ohno et al. |
| 10,278,250 B2 | 4/2019 | McBryde et al. |
| 10,422,944 B2* | 9/2019 | Yuan .................... G02B 6/0046 |
| 10,436,969 B2 | 10/2019 | Yuan et al. |
| 11,099,317 B2* | 8/2021 | Yuan .................... G02B 6/305 |
| 2002/0018350 A1 | 2/2002 | Lepley et al. |
| 2002/0025129 A1 | 2/2002 | Biscardi et al. |
| 2004/0114361 A1 | 6/2004 | Severtson et al. |

(56) References Cited

U.S. PATENT DOCUMENTS

| | | |
|---|---|---|
| 2004/0146241 A1 | 7/2004 | Deladurantaye et al. |
| 2005/0073857 A1 | 4/2005 | Kuo |
| 2007/0059359 A1 | 3/2007 | Backensfeld et al. |
| 2007/0115569 A1 | 5/2007 | Tang et al. |
| 2008/0002399 A1 | 1/2008 | Mllard et al. |
| 2008/0232133 A1 | 9/2008 | Segawa |
| 2009/0103293 A1 | 4/2009 | Harbers et al. |
| 2009/0185389 A1 | 7/2009 | Tessnow et al. |
| 2010/0110673 A1 | 5/2010 | Bergman et al. |
| 2010/0124074 A1 | 5/2010 | Brychell |
| 2010/0202142 A1 | 8/2010 | Morgan |
| 2010/0238671 A1 | 9/2010 | Catone et al. |
| 2010/0301360 A1 | 12/2010 | Van De Ven et al. |
| 2010/0302783 A1 | 12/2010 | Shastry et al. |
| 2010/0315833 A1 | 12/2010 | Holman et al. |
| 2011/0044022 A1 | 2/2011 | Ko et al. |
| 2011/0187273 A1 | 8/2011 | Summerford et al. |
| 2011/0233568 A1 | 9/2011 | An et al. |
| 2011/0305027 A1 | 12/2011 | Ham |
| 2011/0317436 A1 | 12/2011 | Kuan |
| 2012/0019942 A1 | 1/2012 | Morgan |
| 2012/0026728 A1 | 2/2012 | Lou et al. |
| 2012/0152490 A1 | 6/2012 | Wen et al. |
| 2012/0212957 A1 | 8/2012 | Hyun et al. |
| 2012/0287654 A1 | 11/2012 | He et al. |
| 2012/0287677 A1 | 11/2012 | Wheatley et al. |
| 2012/0307496 A1 | 12/2012 | Phillips, III et al. |
| 2013/0003363 A1 | 1/2013 | Lu et al. |
| 2013/0003409 A1 | 1/2013 | Vissenberg et al. |
| 2013/0044497 A1 | 2/2013 | Sakamoto et al. |
| 2013/0088890 A1 | 4/2013 | Knapp et al. |
| 2013/0107528 A1 | 5/2013 | Boyer et al. |
| 2013/0128593 A1 | 5/2013 | Luo |
| 2013/0170210 A1 | 7/2013 | Athalye |
| 2013/0201715 A1 | 8/2013 | Dau et al. |
| 2013/0215612 A1 | 8/2013 | Garcia |
| 2013/0229804 A1 | 9/2013 | Holder et al. |
| 2013/0250584 A1 | 9/2013 | Wang et al. |
| 2013/0265761 A1 | 10/2013 | Kinnune et al. |
| 2013/0294063 A1 | 11/2013 | Lou et al. |
| 2013/0300310 A1 | 11/2013 | Hu |
| 2013/0343045 A1 | 12/2013 | Lodhie et al. |
| 2013/0343055 A1 | 12/2013 | Eckert et al. |
| 2013/0343079 A1 | 12/2013 | Unger et al. |
| 2014/0029257 A1 | 1/2014 | Boyer et al. |
| 2014/0226361 A1 | 8/2014 | Vasylyev |
| 2014/0313765 A1 | 10/2014 | Nelson et al. |
| 2015/0055369 A1 | 2/2015 | Tarsa et al. |
| 2015/0055371 A1 | 2/2015 | Van De Ven et al. |
| 2015/0160396 A1 | 6/2015 | Wilcox et al. |
| 2015/0253488 A1 | 9/2015 | Wilcox et al. |
| 2015/0260905 A1 | 9/2015 | Yuan et al. |
| 2015/0285461 A1 | 10/2015 | Chen |
| 2015/0285980 A1 | 10/2015 | Preston et al. |
| 2015/0323142 A1 | 11/2015 | Shigematsu |
| 2016/0047969 A1 | 2/2016 | Lim et al. |
| 2020/0003947 A1 | 1/2020 | Yuan et al. |

FOREIGN PATENT DOCUMENTS

| | | |
|---|---|---|
| EP | 2354640 | 8/2011 |
| JP | 3161425 U | 7/2010 |
| WO | 2008047278 A2 | 4/2008 |
| WO | 2008126011 A1 | 10/2008 |
| WO | 2009130653 A1 | 10/2009 |
| WO | 2009141778 A1 | 11/2009 |
| WO | 2009144638 A1 | 12/2009 |

OTHER PUBLICATIONS

International Search Report and Written Opinion for International Patent Application No. PCT/US15/32210, dated Oct. 26, 2015, 13 pages.
Non-Final Office Action for U.S. Appl. No. 14/726,152, dated Mar. 21, 2017, 16 pages.
Final Office Action for U.S. Appl. No. 14/726,152, dated Oct. 6, 2017, 15 pages.
Non-Final Office Action for U.S. Appl. No. 14/726,152, dated May 3, 2018, 14 pages.
Final Office Action for U.S. Appl. No. 14/726,152, dated Feb. 6, 2019, 12 pages.
Notice of Allowance for U.S. Appl. No. 14/726,152, dated May 13, 2019, 10 pages.
Non-Final Office Action for U.S. Appl. No. 16/539,163, dated Jan. 14, 2020, 13 pages.
Notice of Allowance for U.S. Appl. No. 16/539,163, dated Apr. 9, 2021, 9 pages.
Corrected Notice of Allowability for U.S. Appl. No. 16/539,163, dated Apr. 29, 2021, 5 pages.
Examination Report for European Patent Application No. 14745897.0, dated Aug. 10, 2020, 5 pages.
Examination Report for European Patent Application No. 17779482.3, dated Jun. 16, 2020, 5 pages.
Extended European Search Report for European Patent Application No. 17816329.1, dated Oct. 22, 2019, 9 pages.
Extended European Search Report for European Patent Application No. 17779482.3, dated Sep. 17, 2019, 6 pages.
Examination Report for European Patent Application No. 17779482.3, dated Apr. 23, 2021, 5 pages.
Examination Report for European Patent Application No. 17816329.1, dated Nov. 19, 2020, 4 pages.
Extended European Search Report for European Patent Application No. 14745897.0, dated Oct. 14, 2016, 11 pages.
Examination Report for European Patent Application No. 14745897.0, dated May 3, 2018, 4 pages.
Notice of Allowance for U.S. Appl. No. 16/539,163, dated Jun. 30, 2021, 8 pages.

* cited by examiner

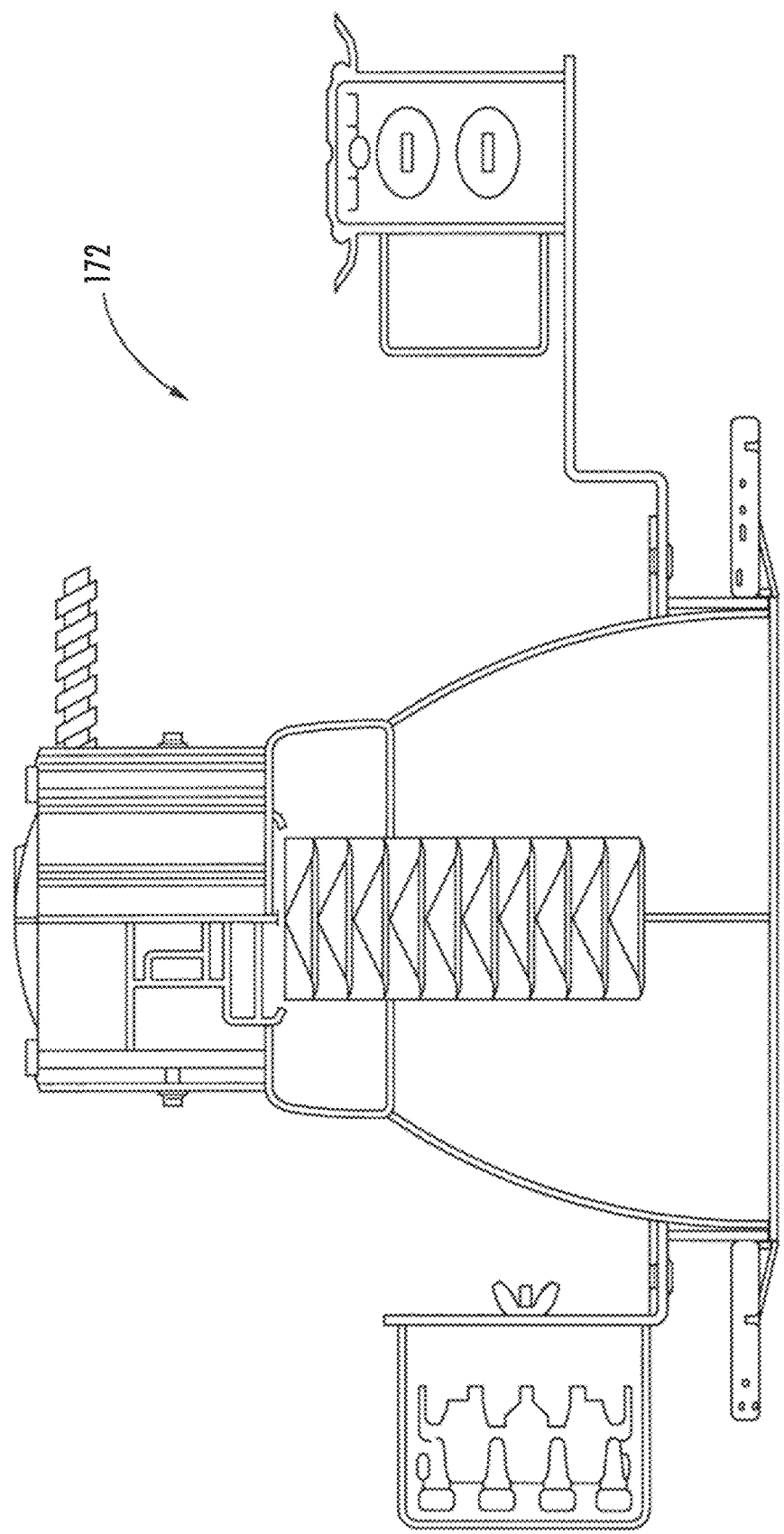

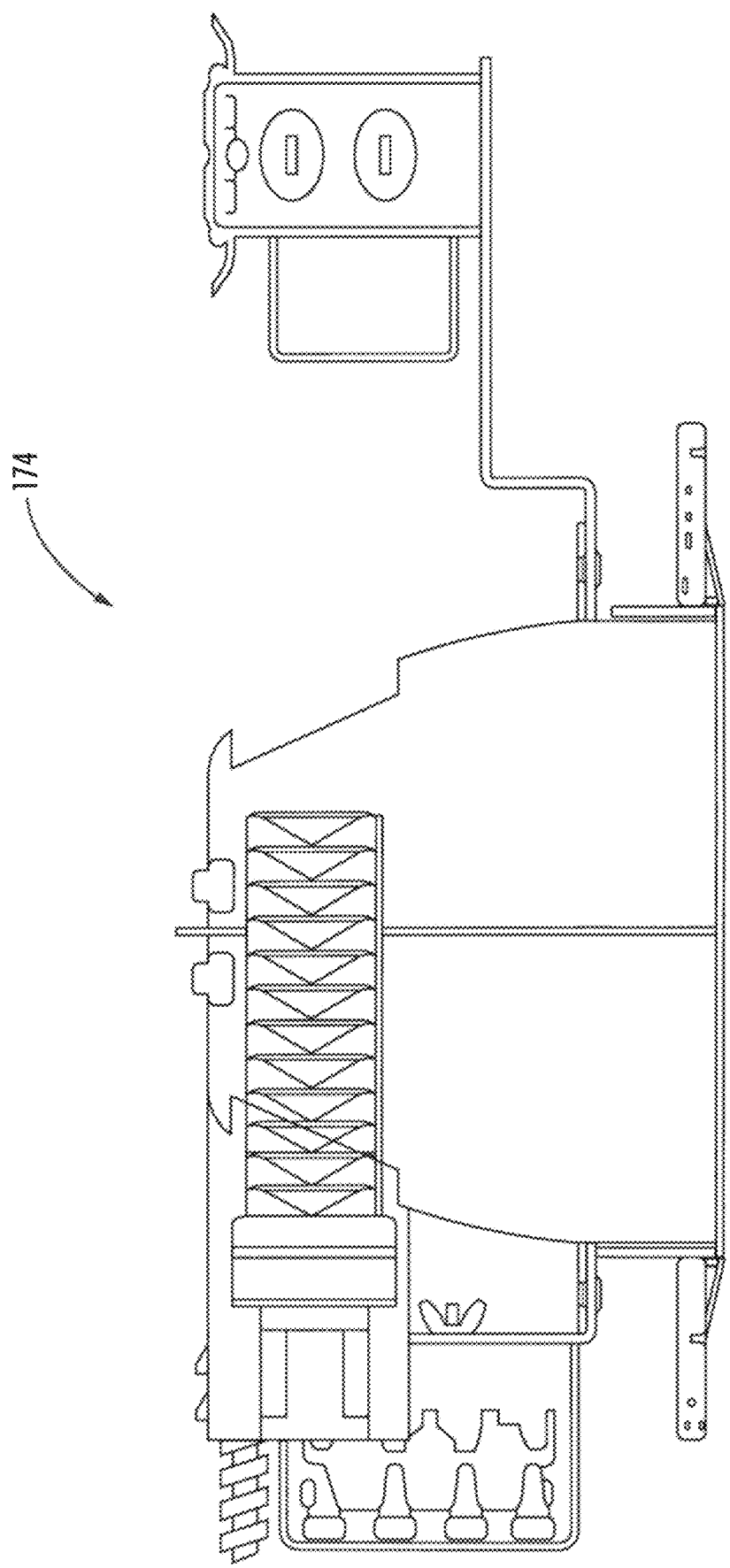

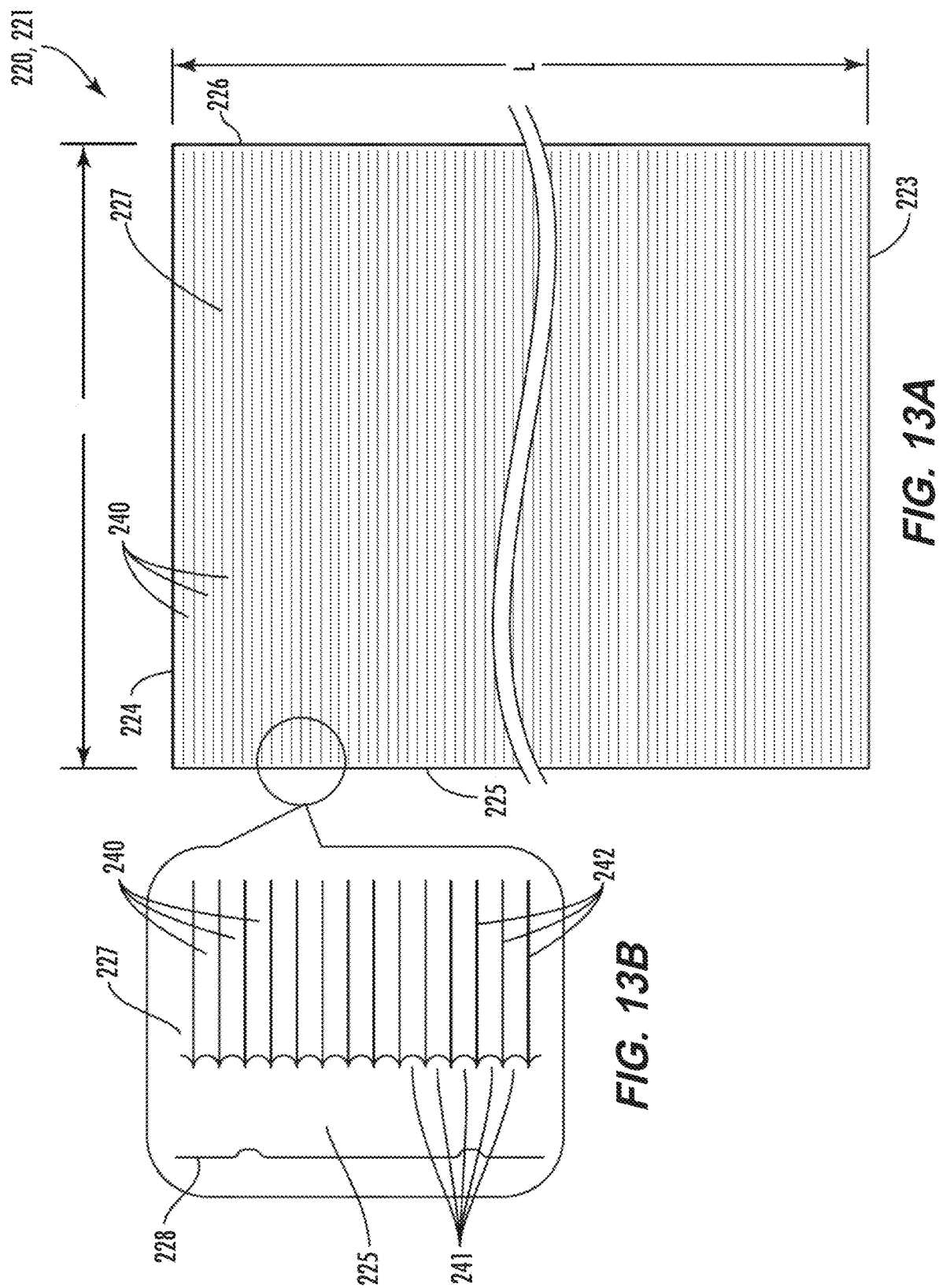

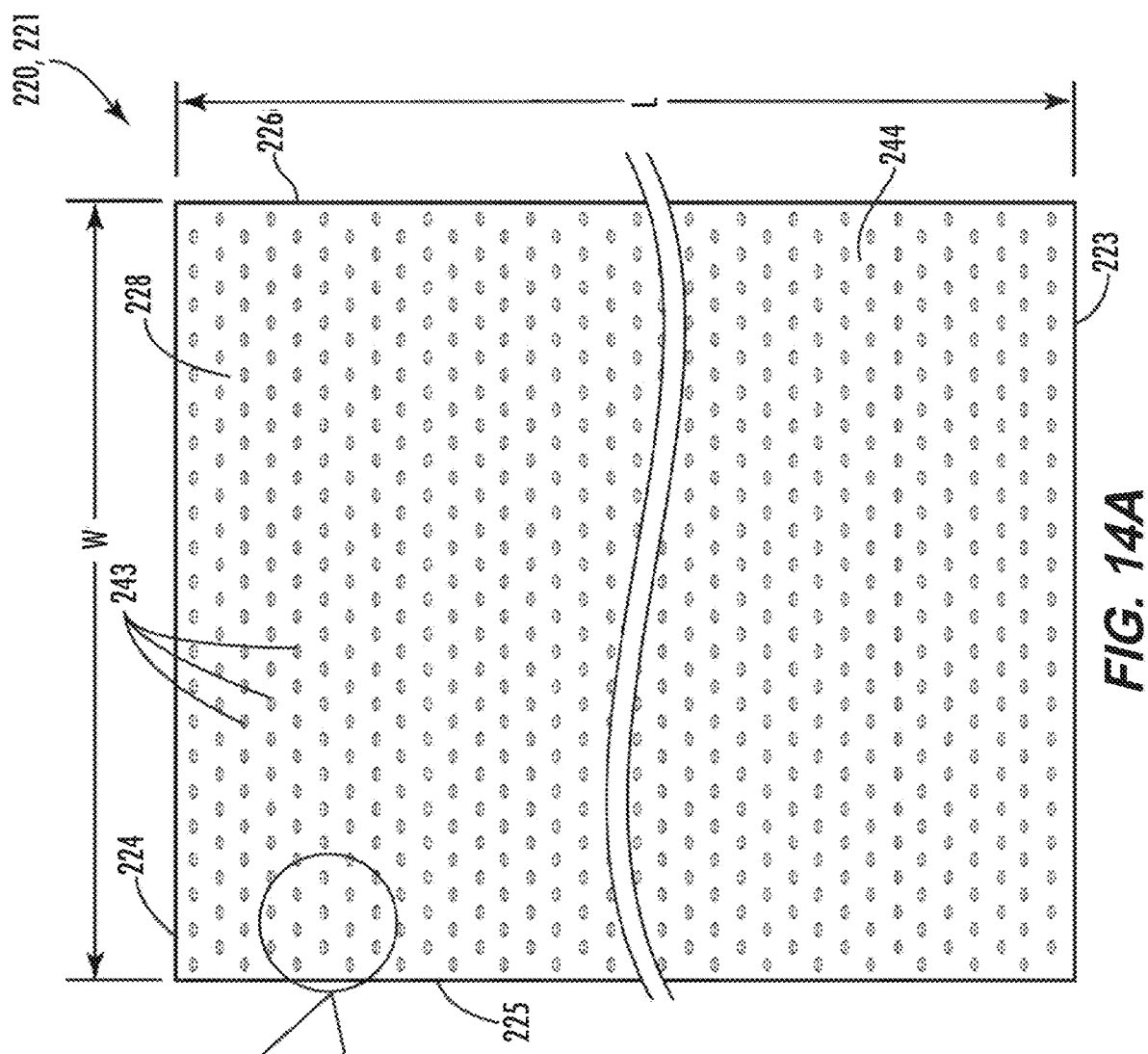
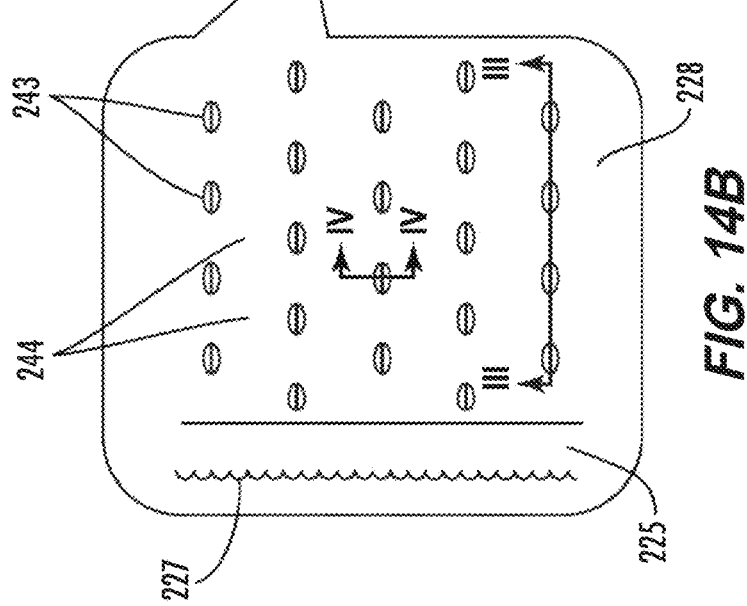
FIG. 14A
FIG. 14B

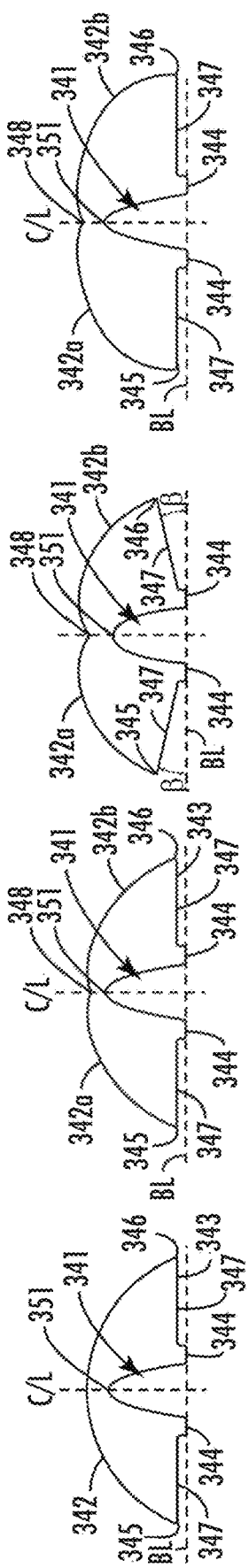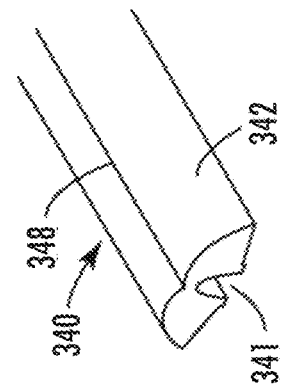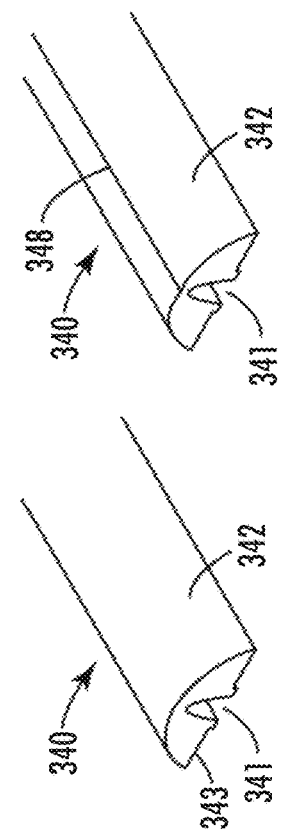
FIG. 34A, FIG. 35A, FIG. 36A, FIG. 37A, FIG. 34B, FIG. 35B, FIG. 36B, FIG. 37B

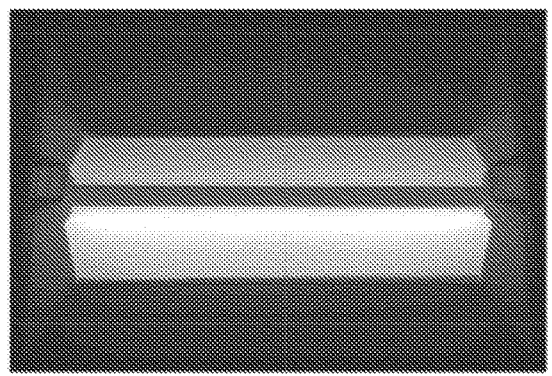
*FIG. 46A*
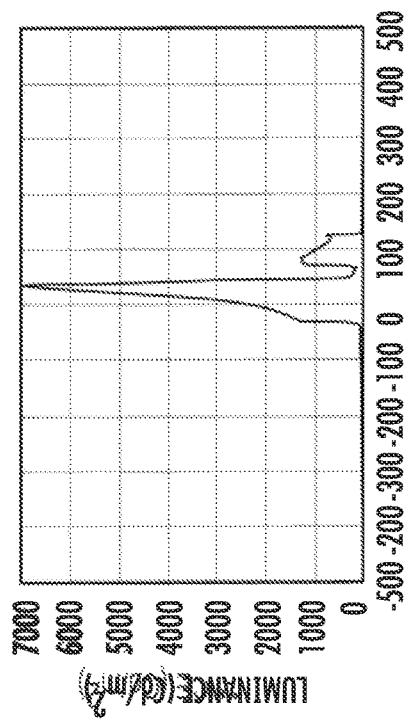
*FIG. 46C*
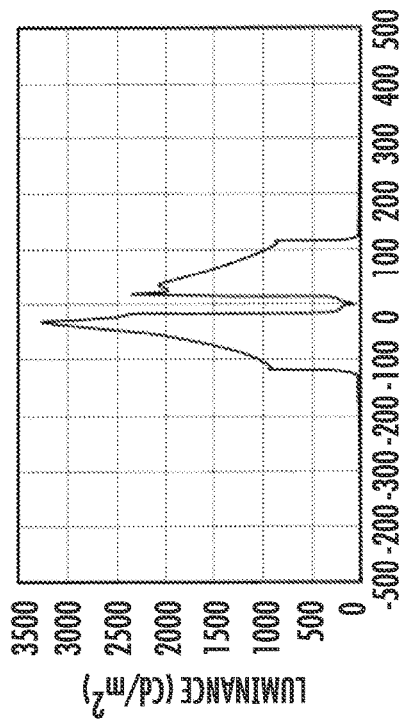
*FIG. 46B*
*FIG. 46D*

| CCX | CCY |
|---|---|
| 0.29 | 0.32 |
| 0.35 | 0.38 |
| 0.40 | 0.42 |
| 0.48 | 0.44 |
| 0.48 | 0.39 |
| 0.40 | 0.36 |
| 0.32 | 0.30 |
| 0.29 | 0.32 |

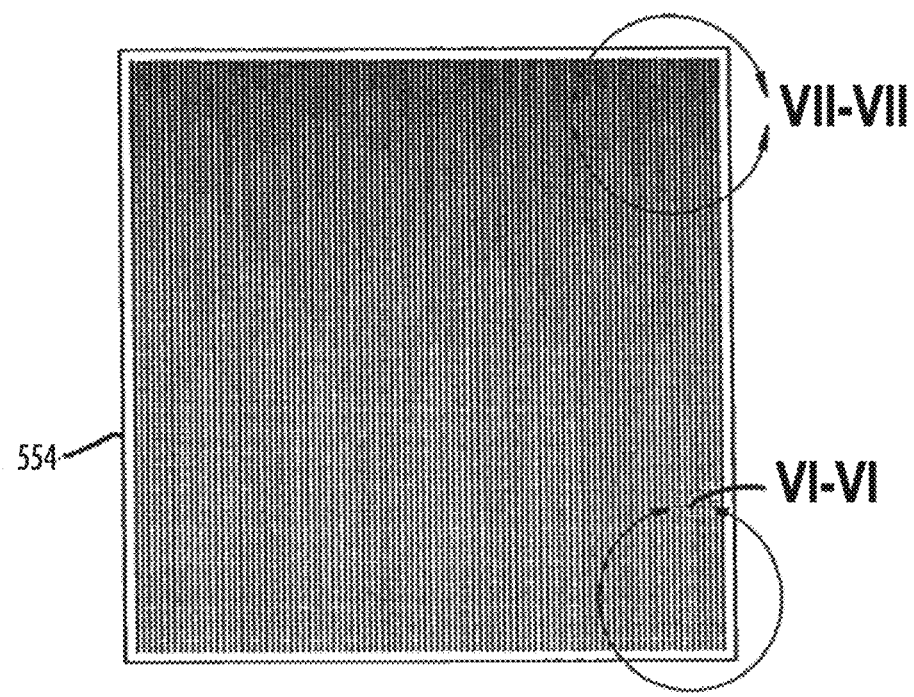
*FIG. 59A*
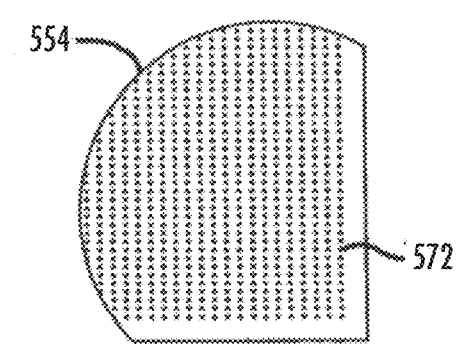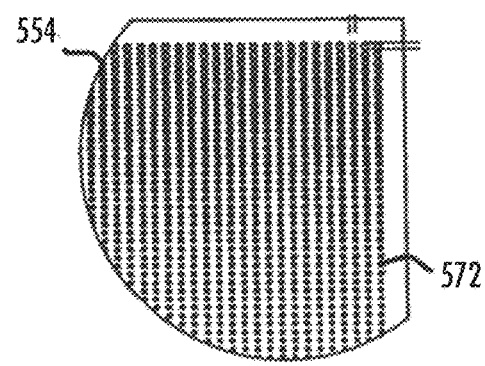
*FIG. 59B*  *FIG. 59C*

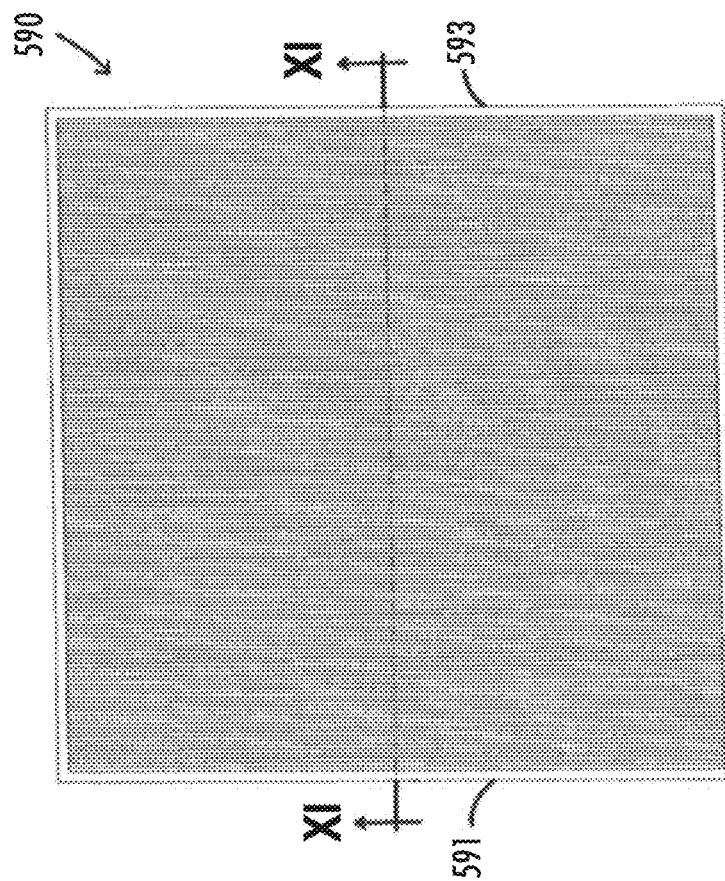
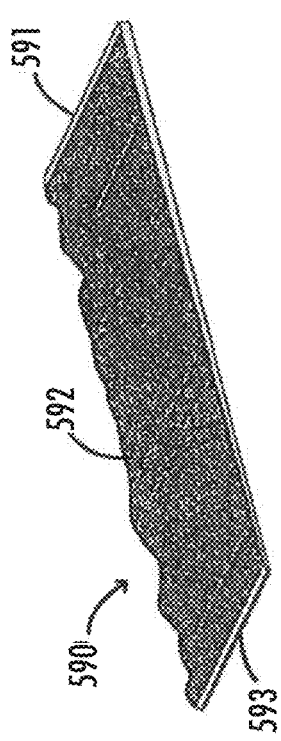
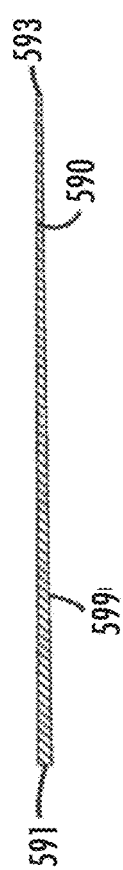
FIG. 62A
FIG. 62B
FIG. 62C

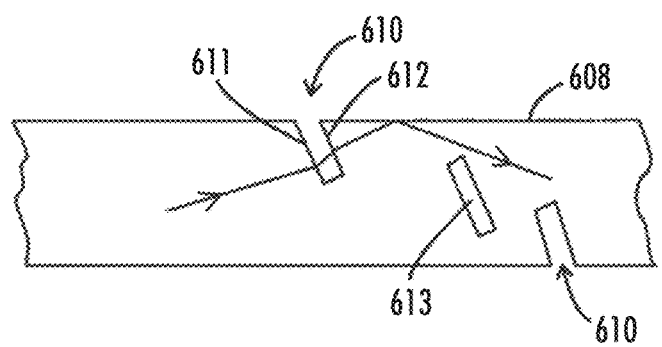
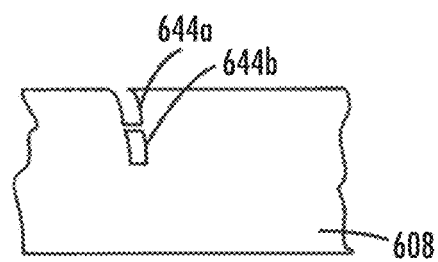
*FIG. 65A*  *FIG. 65B*
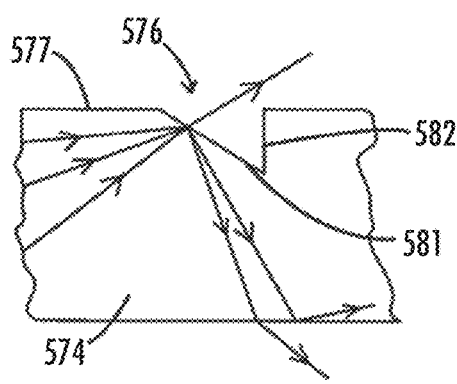
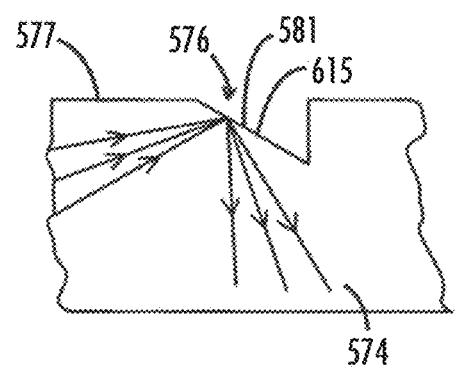
*FIG. 66A*  *FIG. 66B*
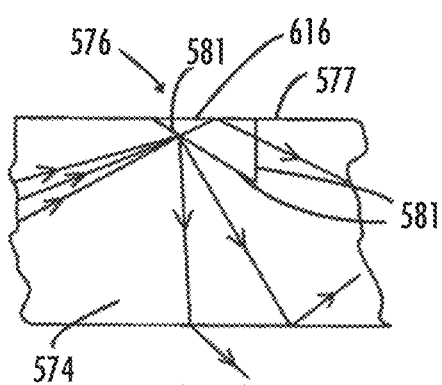
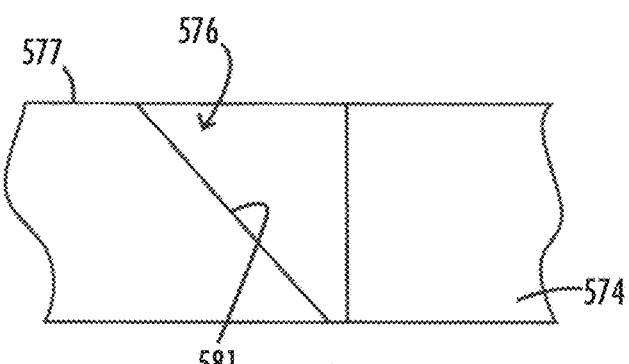
*FIG. 66C*  *FIG. 66D*

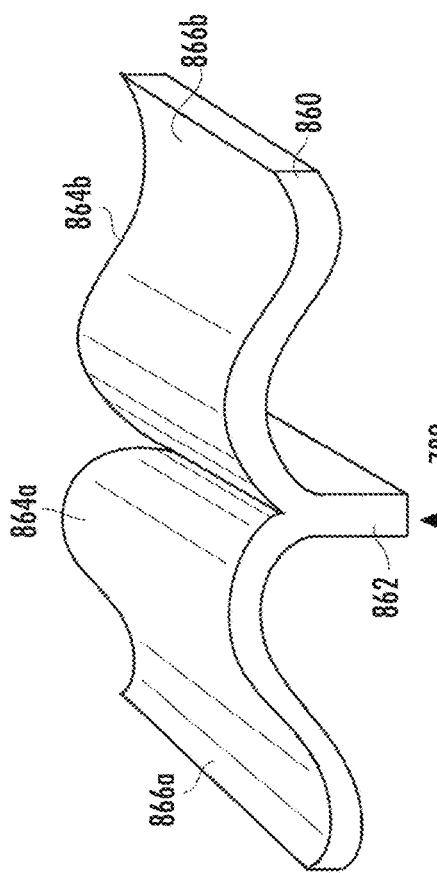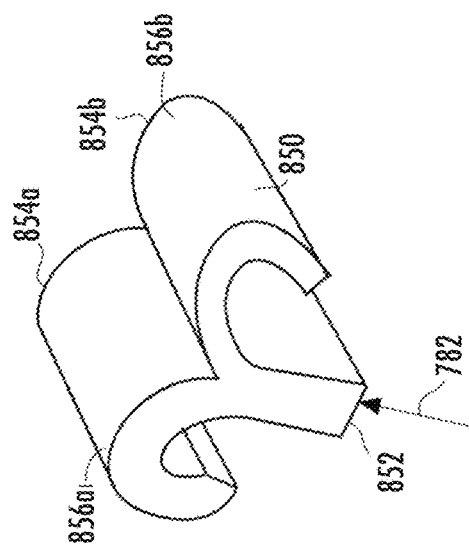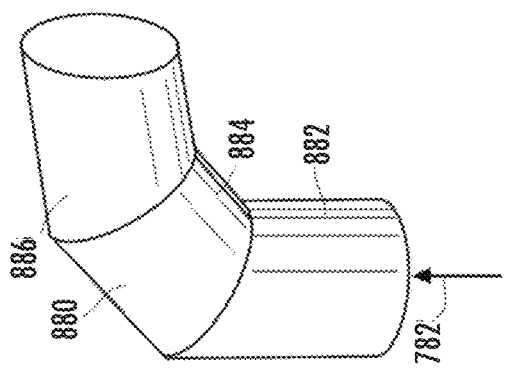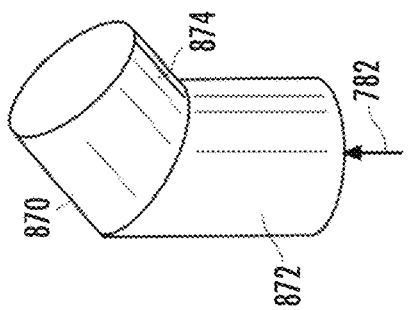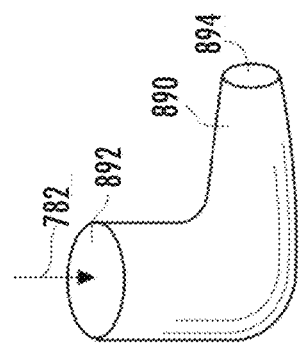
FIG. 81
FIG. 84
FIG. 83
FIG. 80
FIG. 82

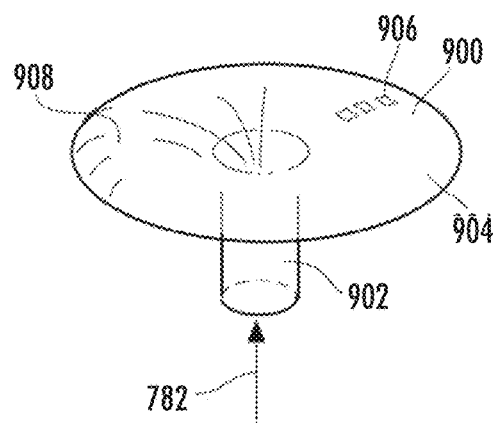
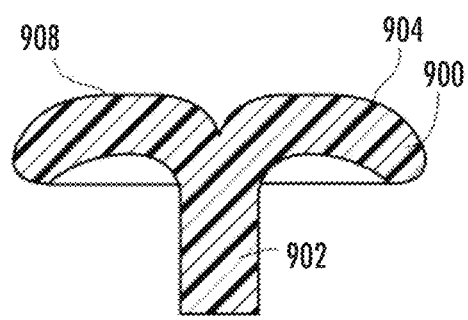
FIG. 85A      FIG. 85B
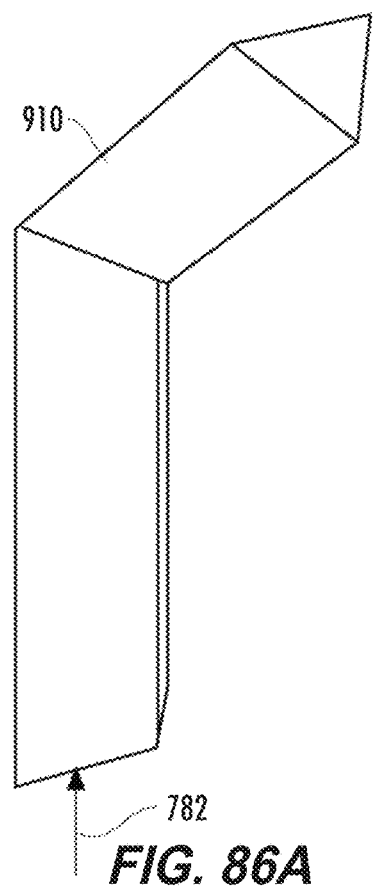
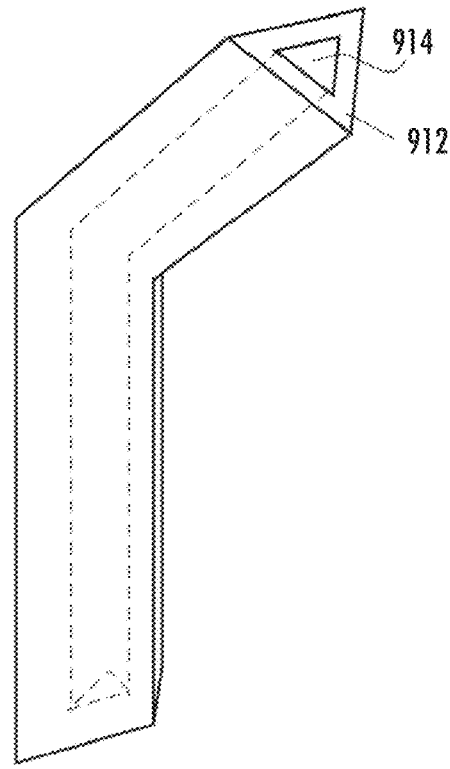
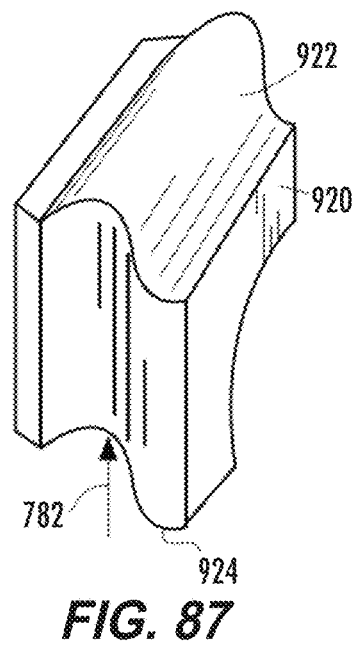
FIG. 86A      FIG. 86B      FIG. 87

OPTICAL WAVEGUIDES FOR LIGHT FIXTURES AND LUMINAIRES

CROSS REFERENCE TO RELATED APPLICATIONS

The present application is a continuation of U.S. patent application Ser. No. 16/539,163, filed Aug. 13, 2019, now U.S. Pat. No. 11,099,317, which is a divisional of U.S. patent application Ser. No. 14/726,152, filed May 29, 2015, now U.S. Pat. No. 10,422,944, which is a continuation-in-part of U.S. patent application Ser. No. 13/840,563, filed Mar. 15, 2013, now U.S. Pat. No. 10,436,969, and also a continuation-in-part of U.S. patent application Ser. No. 13/839,949, filed Mar. 15, 2013, now U.S. Pat. No. 9,581,751, both of which claim benefit of U.S. Provisional patent application Ser. No. 61/758,660, filed Jan. 30, 2013.

The present application is also a continuation of U.S. patent application Ser. No. 16/937,026, filed Jul. 23, 2020, now U.S. Pat. No. 11,079,079, a continuation of U.S. patent application Ser. No. 16/937,096, filed Jul. 23, 2020, now U.S. Pat. No. 11,035,527, and a continuation of U.S. patent application Ser. No. 15/376,257, filed Dec. 12, 2016. U.S. patent application Ser. No. 15/376,257 is a divisional of U.S. patent application Ser. No. 13/842,521, filed Mar. 15, 2013, now U.S. Pat. No. 9,519,095, which claims the benefit of U.S. Provisional Patent Application Ser. No. 61/758,660, filed Jan. 30, 2013. U.S. patent application Ser. No. 16/937,026 is a continuation-in-part of U.S. patent application Ser. No. 16/692,130, filed Nov. 22, 2019, now U.S. Pat. No. 10,794,572, which is a continuation of U.S. patent application Ser. No. 15/710,913, filed Sep. 21, 2017, now U.S. Pat. No. 10,508,794.

The entire contents of each of the above-listed applications are incorporated herein by reference.

FIELD OF THE DISCLOSURE

The present disclosure relates to light fixtures, and more particularly to light fixtures incorporating an optical waveguide.

BACKGROUND

An optical waveguide mixes and directs light emitted by one or more light sources, such as one or more light emitting diodes (LEDs). A typical optical waveguide includes three main components: one or more coupling elements, one or more distribution elements, and one or more extraction elements. The coupling component(s) direct light into the distribution element(s), and condition the light to interact with the subsequent components. The one or more distribution elements control how light flows through the waveguide and is dependent on the waveguide geometry and material. The extraction element(s) determine how light is removed by controlling where and in what direction the light exits the waveguide.

When designing a coupling optic, the primary considerations are: maximizing the efficiency of light transfer from the source into the waveguide; controlling the location of light injected into the waveguide; and controlling the angular distribution of the light in the coupling optic. One way of controlling the spatial and angular spread of injected light is by fitting each source with a dedicated lens. These lenses can be disposed with an air gap between the lens and the coupling optic, or may be manufactured from the same piece of material that defines the waveguide's distribution element(s). Discrete coupling optics allow numerous advantages such as higher efficiency coupling, controlled overlap of light flux from the sources, and angular control of how the injected light interacts with the remaining elements of the waveguide. Discrete coupling optics use refraction, total internal reflection, and surface or volume scattering to control the distribution of light injected into the waveguide.

After light has been coupled into the waveguide, it must be guided and conditioned to the locations of extraction. The simplest example is a fiber-optic cable, which is designed to transport light from one end of the cable to another with minimal loss in between. To achieve this, fiber optic cables are only gradually curved and sharp bends in the waveguide are avoided. In accordance with well-known principles of total internal reflectance light traveling through a waveguide is reflected back into the waveguide from an outer surface thereof, provided that the incident light does not exceed a critical angle with respect to the surface.

In order for an extraction element to remove light from the waveguide, the light must first contact the feature comprising the element. By appropriately shaping the waveguide surfaces, one can control the flow of light across the extraction feature(s). Specifically, selecting the spacing, shape, and other characteristic(s) of the extraction features affects the appearance of the waveguide, its resulting distribution, and efficiency.

SUMMARY

Embodiments of the present disclosure generally relate to light fixtures and luminaires configured to emit light. According to one aspect, an optical waveguide includes a first waveguide portion and a second waveguide portion adjacent to and separate from the first waveguide portion. The waveguide portions include light coupling portions that are at least partially aligned and adapted to receive light developed by a light source. The first waveguide portion further has a first major surface with light direction features and a second major surface opposite the first major surface. The second waveguide portion further has a third major surface proximate the second major surface with an air gap disposed therebetween and a fourth major surface opposite the third major surface wherein the fourth major surface includes a cavity extending therein.

According to another aspect, an optical waveguide comprises first and second waveguide stages having first and second at least partially aligned interior light coupling cavities, respectively, first and second light transmission portions, respectively, separated from one another by an air gap, and first and second light extraction portions, respectively. The light transmission portion of each of the first and second waveguide stages is disposed between the interior light coupling cavity and the light extraction portion of such stage along a lateral dimension thereof. The light extraction portion of the first stage is disposed outside of the light extraction portion of the second stage along the lateral dimension of the second stage.

According to yet another aspect, a luminaire includes a housing and an optical waveguide disposed in the housing. The optical waveguide includes first and second stages each having a light coupling portion and a light extraction portion. A light source is also disposed in the housing and is adapted to develop light that is directly incident on both of the light coupling portions of the first and second stages. Light incident on the light coupling portions travels through the first and second stages and the light extraction portions direct light out of the stages.

According to still another aspect, an optical waveguide comprises a plurality of waveguide portions arranged in a stack with each waveguide portion having a coupling surface and a surface opposite the coupling surface. The coupling surface of a first waveguide portion is aligned with a light source and adapted to receive light developed by the light source and each next waveguide is aligned with each previous waveguide such that light escaping through the surface opposite the coupling surface of each previous waveguide is received by the coupling surface of the next waveguide.

Other aspects and advantages will become apparent upon consideration of the following detailed description and the attached drawings wherein like numerals designate like structures throughout the specification.

BRIEF DESCRIPTION OF THE DRAWING FIGURES

FIGS. 8A and 8B are sectional views of alternate embodiments of luminaires incorporating the multi-stage waveguide of FIG. 7A.

FIG. 13A is a top view of a light guide plate.

FIG. 13B is a schematic view of the light guide plate of FIG. 13A.

FIG. 14A is a bottom view of a light guide plate.

FIG. 14B is a schematic view of the light guide plate of FIG. 14A.

FIG. 34A is a partial perspective view of an inner lens.

FIG. 34B is an end view of the inner lens of FIG. 34A.

FIG. 35A is a partial perspective view of an inner lens.

FIG. 35B is an end view of the inner lens of FIG. 35A.

FIG. 36A is a partial perspective view of an inner lens.

FIG. 36B is an end view of the inner lens of FIG. 36A.

FIG. 37A is a partial perspective view of an inner lens.

FIG. 37B is an end view of the inner lens of FIG. 37A.

FIGS. 46A and 46B are luminance appearance and luminance uniformity from the front view of a dimmed light fixture with the fifth inner lens.

FIGS. 46C and 46D are luminance appearance and luminance uniformity from a 45° angle of a dimmed light fixture with the fifth inner lens.

FIG. 51B illustrates luminous flux distribution patterns for a light fixture with a fourth inner lens as in FIG. 37A over the spectrum at CCT 6500K.

FIG. 59A is a front elevational view of the waveguide body of FIG. 57A shown flattened to illustrate the extraction features.

FIG. 59B is an enlarged fragmentary view of an area VI-VI of FIG. 59A.

FIG. 59C is an enlarged fragmentary view of an area VII-VII of FIG. 59A.

FIG. 62A is an isometric fragmentary view of a third embodiment of a waveguide body having a stepped profile.

FIG. 62B is a plan view of the waveguide body of FIG. 62A.

FIG. 62C is a sectional view taken generally along the lines XI-XI of FIG. 62B.

FIG. 65A is a cross sectional view of a waveguide body having slotted extraction features.

FIG. 65B is a view similar to FIG. 65A showing a segmented slotted extraction feature.

FIGS. 66A-66D are cross sectional views of uncoated, coated, and covered extraction features, respectively.

FIGS. 72-84, 85A, 86A, and 87 are isometric views of still further waveguides.

FIG. 85B is a sectional view of the waveguide body of FIG. 85A.

FIG. 86B is an isometric view of a hollow waveguide body.

Figure 88A:
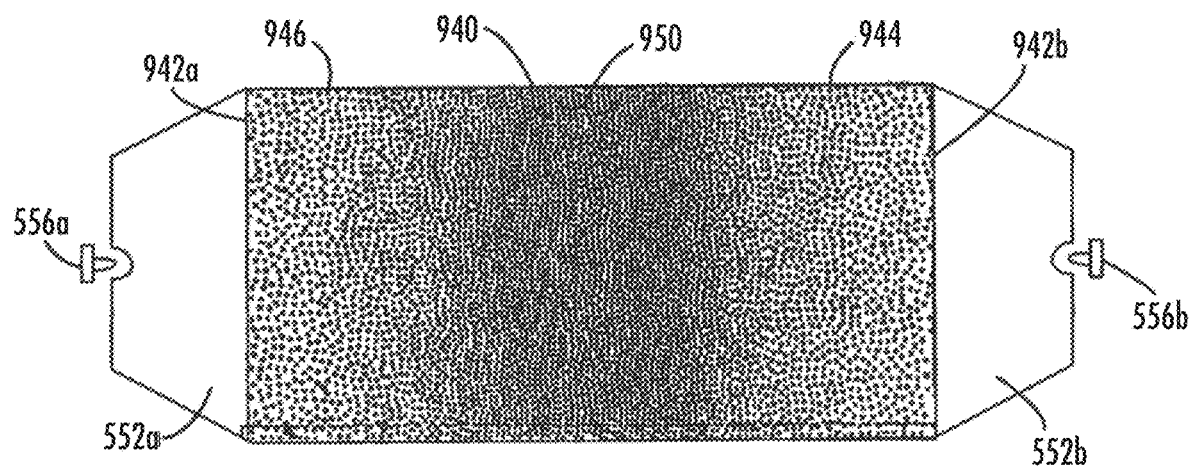
Figure 88B:
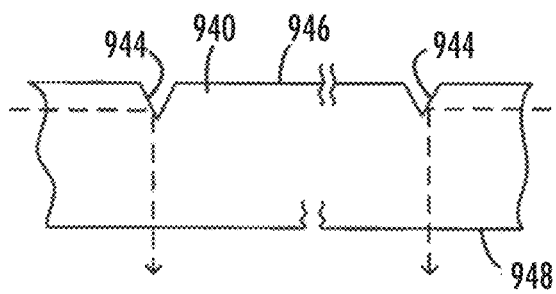

FIGS. 88A and 88B are plan and fragmentary sectional views of yet another waveguide body.

Figure 89:
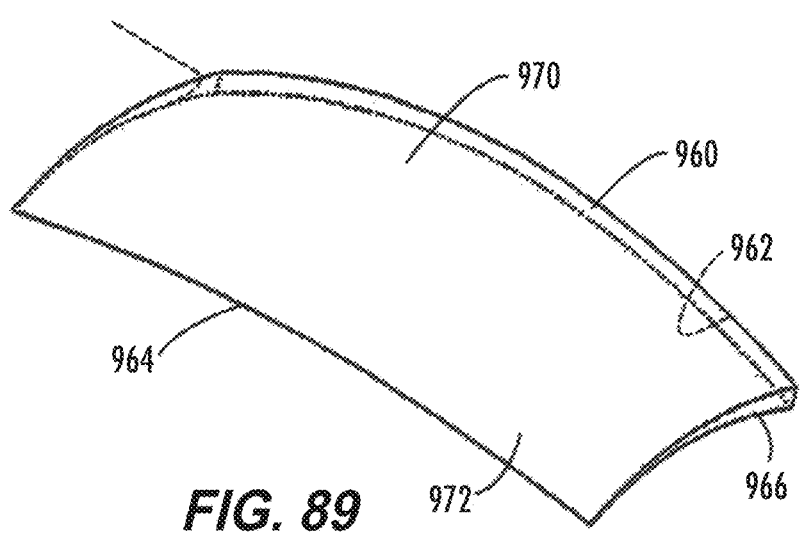

FIG. 89 is an isometric view of another waveguide body that is curved in two dimensions.

Figure 90B:
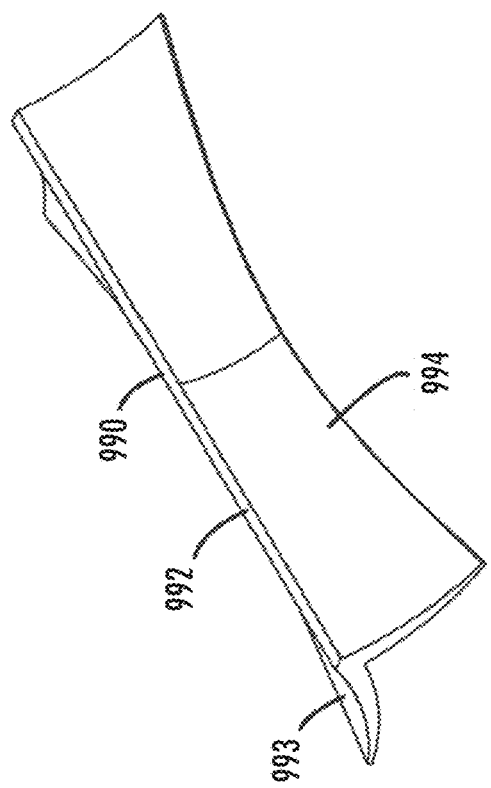
Figure 90A:
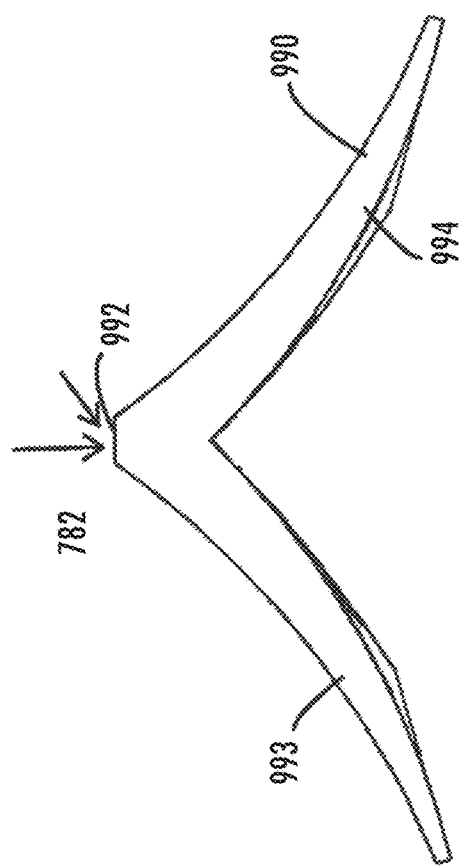
Figure 90C:
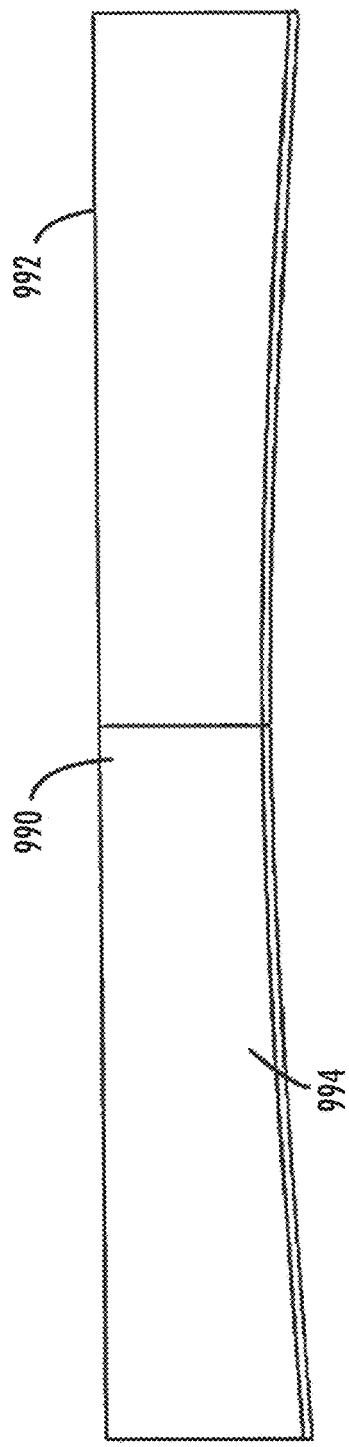

FIGS. 90A-90C are front, side, and bottom elevational views of another waveguide body.

Figure 91A:
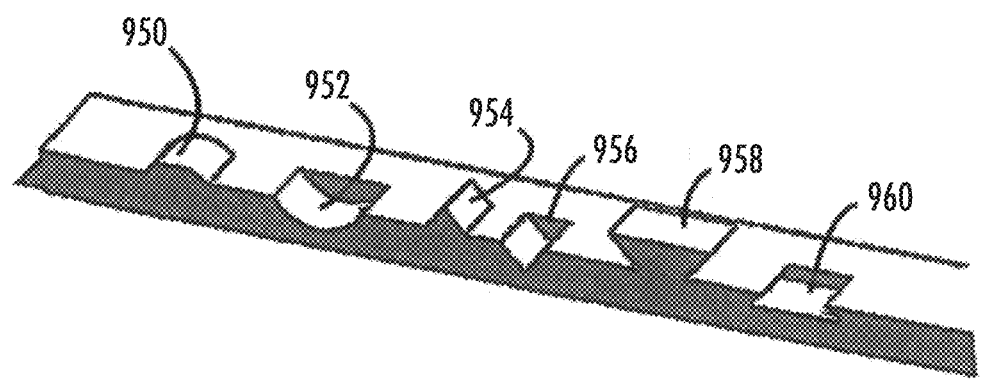

FIG. 91A is an isometric view of alternative extraction features.

Figure 91B:
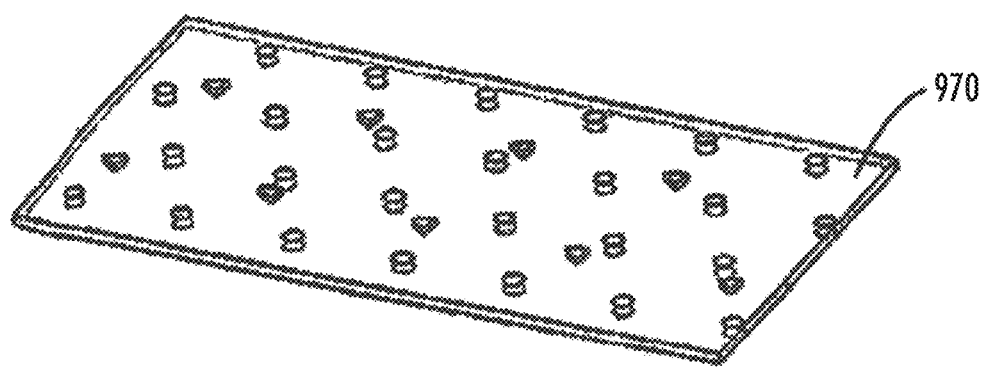

FIG. 91B is an isometric view of a waveguide body utilizing at least some of the extraction features of FIG. 91A.

Figure 92A:
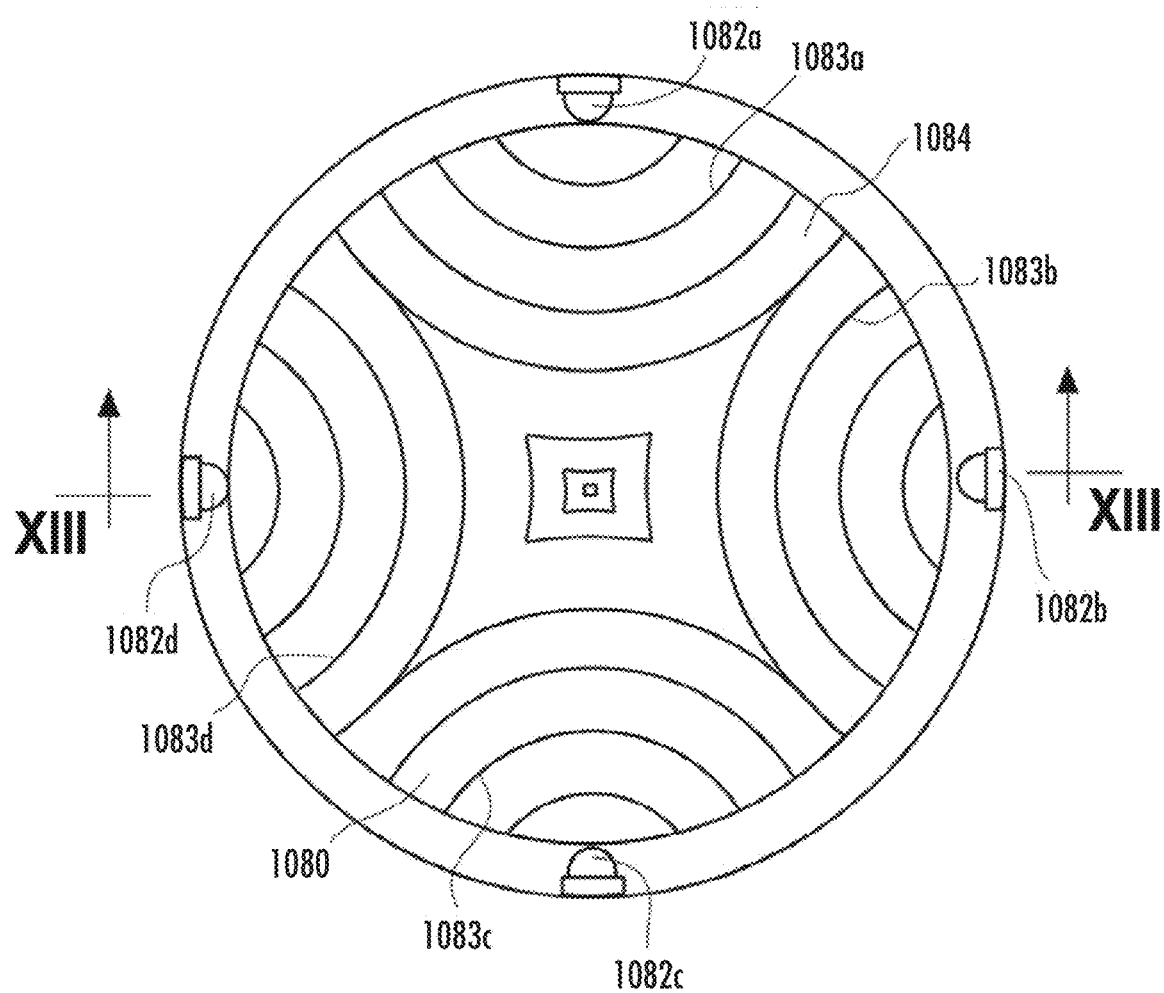

FIG. 92A is a diagrammatic plan view of another waveguide body.

Figure 92B:
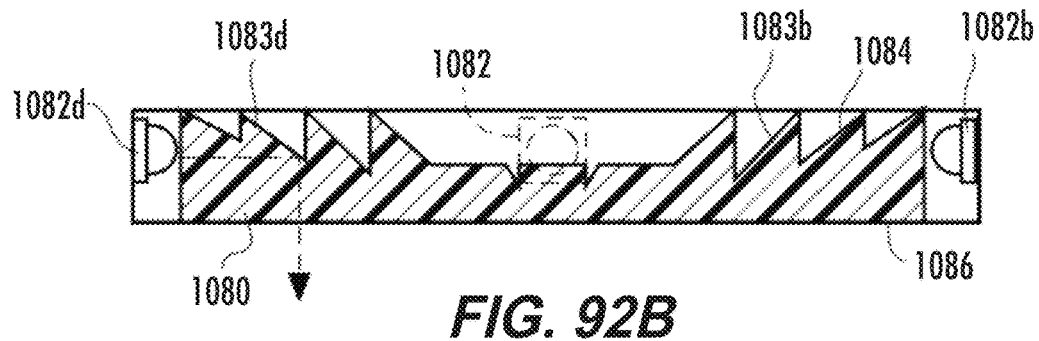

FIG. 92B is a sectional view taken generally along the lines XIII-XIII of FIG. 92A.

Figure 93A:
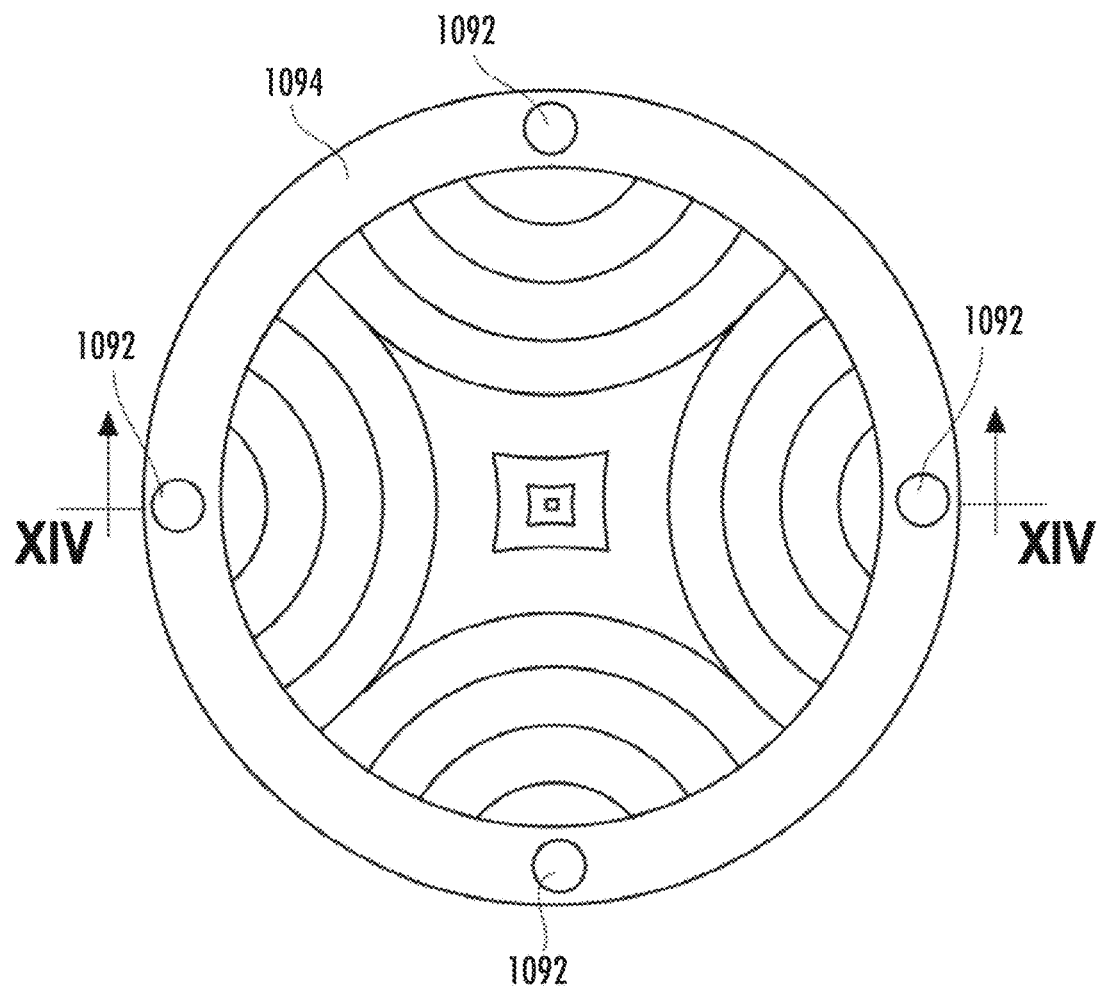

FIG. 93A is a diagrammatic plan view of a still further waveguide body.

Figure 93B:
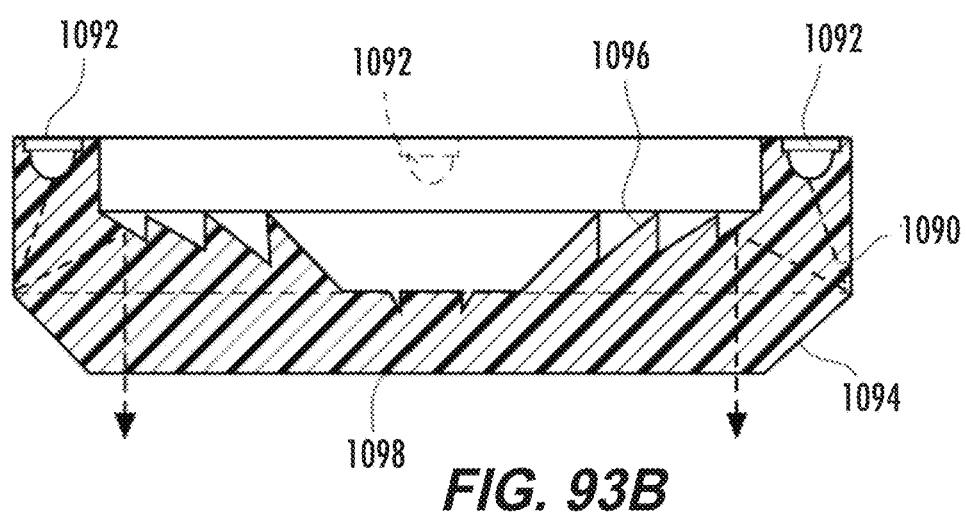

FIG. 93B is a sectional view taken generally along the lines XIV-XIV of FIG. 93A.

Figure 94A:
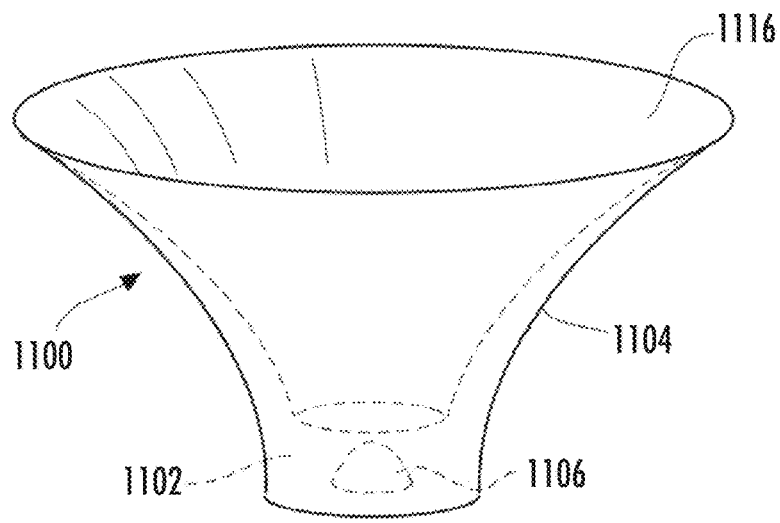

FIG. 94A is an isometric view of yet another waveguide body.

Figure 94B:
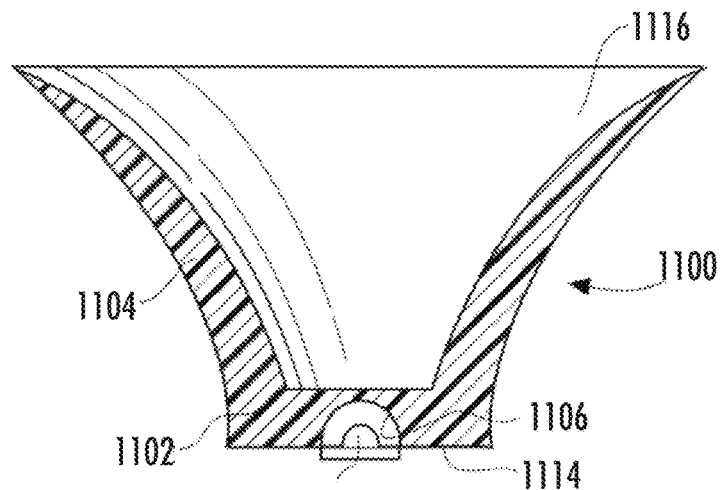

FIG. 94B is a cross sectional view of the waveguide body of FIG. 94A.

Figure 94C:
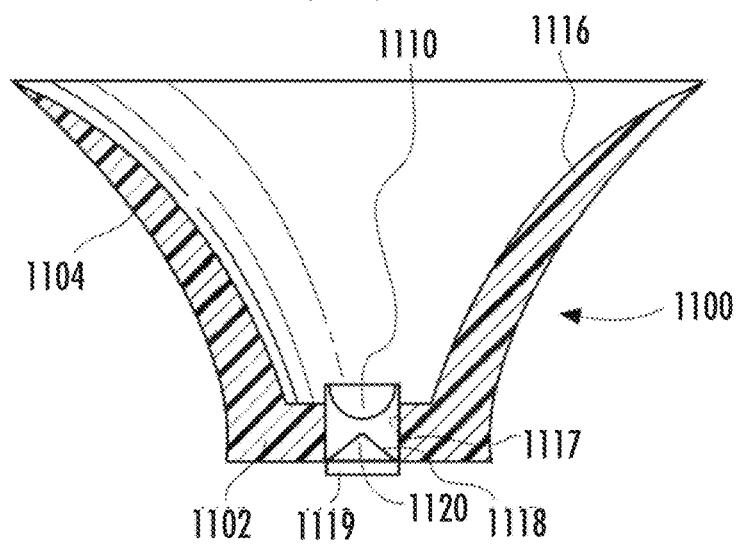

FIG. 94C is a cross sectional view of a still further waveguide body.

Figure 95A:
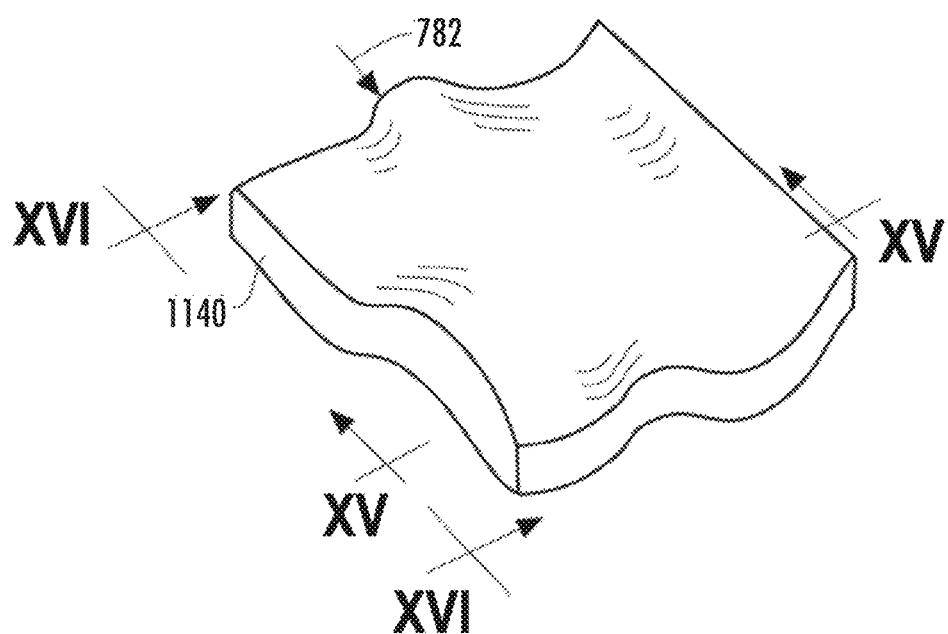

FIG. 95A is an isometric view of yet another waveguide body having inflection points along the path of light therethrough.

Figure 95B:

FIG. 95B is a cross sectional view taken generally along the lines XV-XV of FIG. 95A.

Figure 95C:
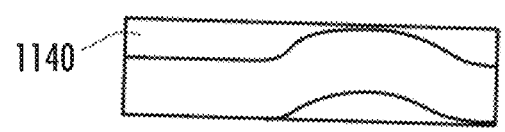

FIG. 95C is a side elevational view taken generally along the view lines XVI-XVI of FIG. 95A.

Figure 96A:
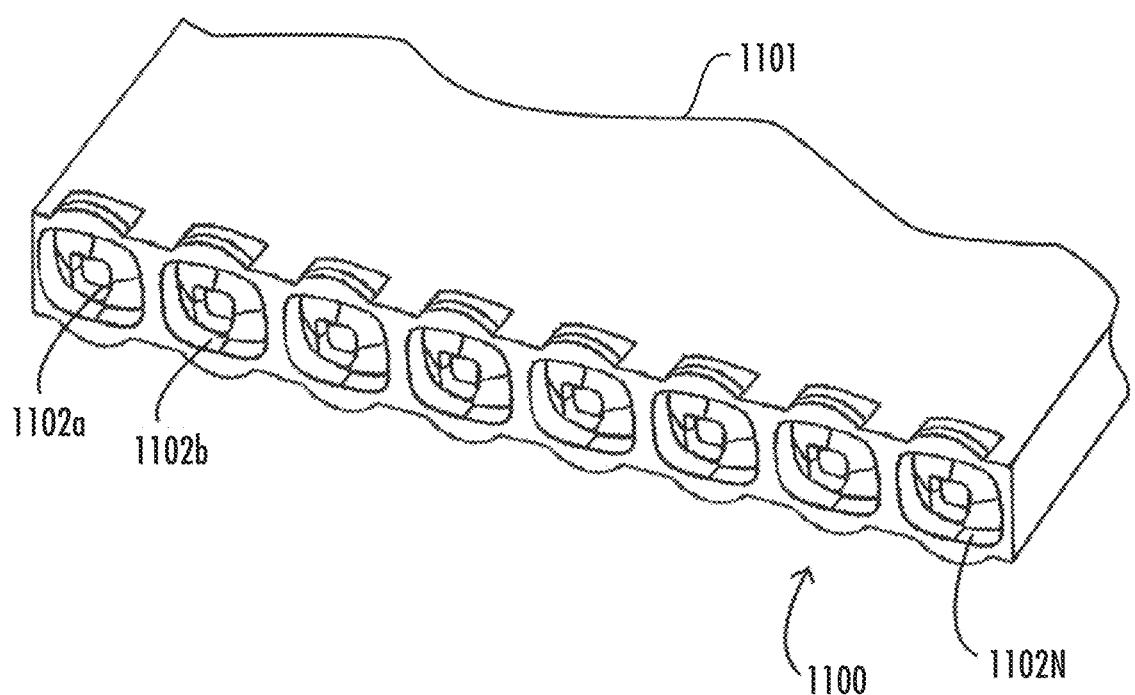

FIG. 96A is a fragmentary isometric view of a coupling optic.

Figure 96B:
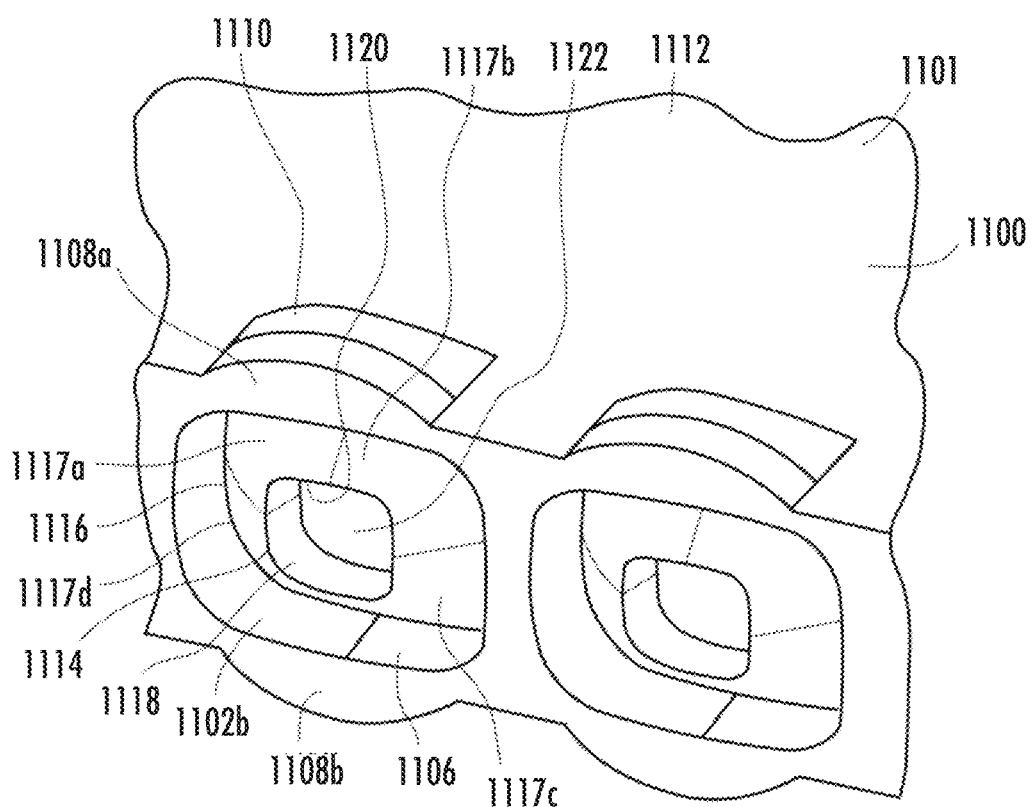

FIG. 96B is a fragmentary enlarged isometric view of the coupling optic of FIG. 58.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Unless otherwise expressly stated, comparative, quantitative terms such as "less" and "greater", are intended to encompass the concept of equality. As an example, "less" can mean not only "less" in the strictest mathematical sense, but also, "less than or equal to."

The expression "correlated color temperature" ("CCT") is used according to its well-known meaning to refer to the temperature of a blackbody that is nearest in color, in a well-defined sense (i.e., can be readily and precisely determined by those skilled in the art). Persons of skill in the art are familiar with correlated color temperatures, and with Chromaticity diagrams that show color points to correspond to specific correlated color temperatures and areas on the diagrams that correspond to specific ranges of correlated color temperatures. Light can be referred to as having a correlated color temperature even if the color point of the light is on the blackbody locus (i.e., its correlated color temperature would be equal to its color temperature); that is, reference herein to light as having a correlated color temperature does not exclude light having a color point on the blackbody locus.

The terms "LED" and "LED device" as used herein may refer to any solid-state light emitter. The terms "solid state light emitter" or "solid state emitter" may include a light emitting diode, laser diode, organic light emitting diode, and/or other semiconductor device which includes one or more semiconductor layers, which may include silicon, silicon carbide, gallium nitride and/or other semiconductor materials, a substrate which may include sapphire, silicon, silicon carbide and/or other microelectronic substrates, and one or more contact layers which may include metal and/or other conductive materials. A solid-state lighting device produces light (ultraviolet, visible, or infrared) by exciting electrons across the band gap between a conduction band and a valence band of a semiconductor active (light-emitting) layer, with the electron transition generating light at a wavelength that depends on the band gap. Thus, the color (wavelength) of the light emitted by a solid-state emitter depends on the materials of the active layers thereof. In various embodiments, solid-state light emitters may have peak wavelengths in the visible range and/or be used in combination with lumiphoric materials having peak wavelengths in the visible range. Multiple solid state light emitters and/or multiple lumiphoric materials (i.e., in combination with at least one solid state light emitter) may be used in a single device, such as to produce light perceived as white or near white in character. In certain embodiments, the aggregated output of multiple solid-state light emitters and/or lumiphoric materials may generate warm white light output.

Solid state light emitters may be used individually or in combination with one or more lumiphoric materials (e.g., phosphors, scintillators, lumiphoric inks) and/or optical elements to generate light at a peak wavelength, or of at least one desired perceived color (including combinations of colors that may be perceived as white). Inclusion of lumiphoric (also called 'luminescent') materials in lighting devices as described herein may be accomplished by direct coating on solid state light emitter, adding such materials to encapsulants, adding such materials to lenses, by embedding or dispersing such materials within lumiphor support elements, and/or coating such materials on lumiphor support elements. Other materials, such as light scattering elements (e.g., particles) and/or index matching materials, may be associated with a lumiphor, a lumiphor binding medium, or a lumiphor support element that may be spatially segregated from a solid state emitter.

I. Exemplary Luminaires/Fixtures with Optical Light Guides

A. Downlight-Style Luminaires

Figure 1:
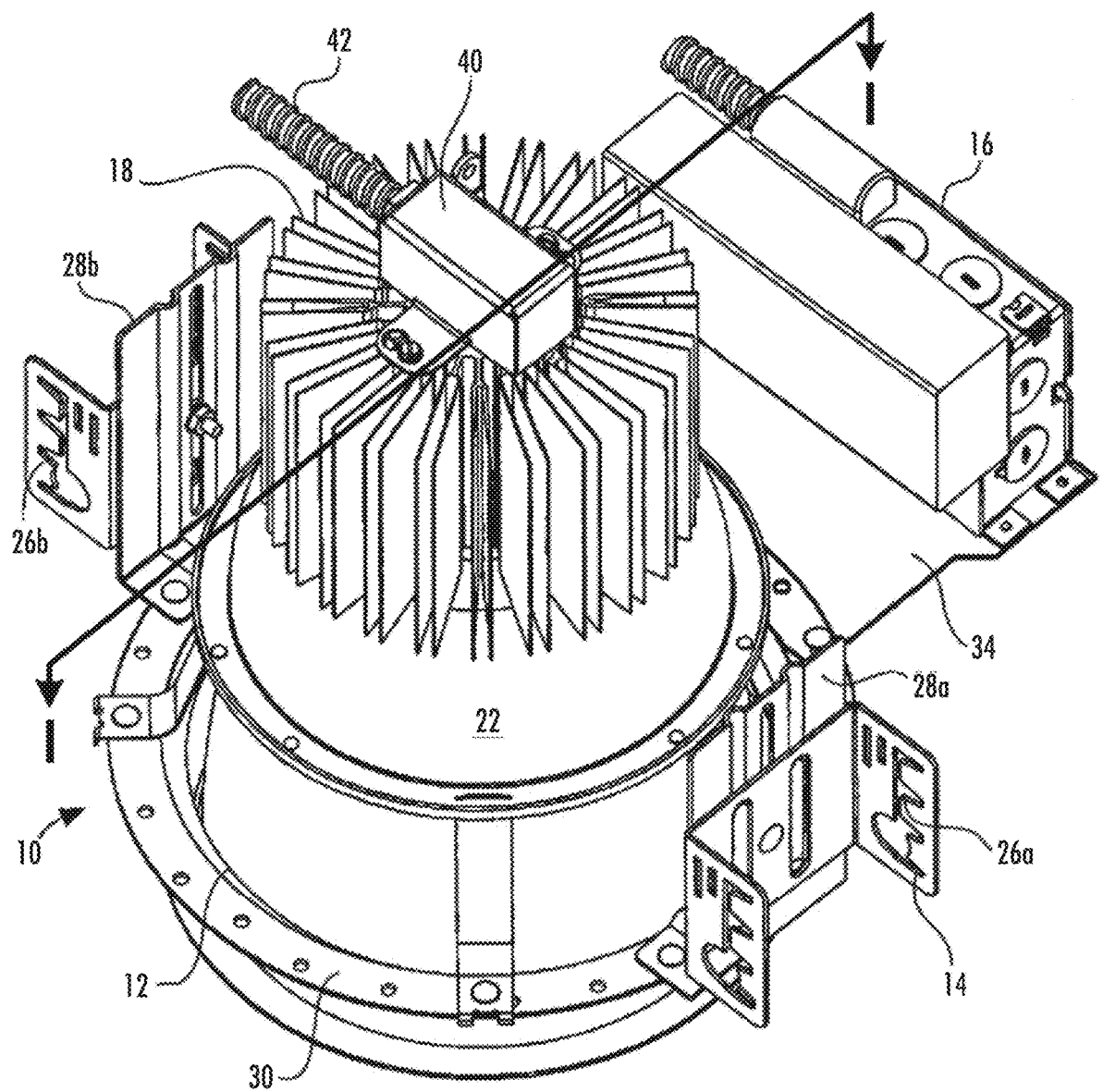
FIG. 1 is an isometric view of a luminaire incorporating an optical waveguide.
Figure 2:
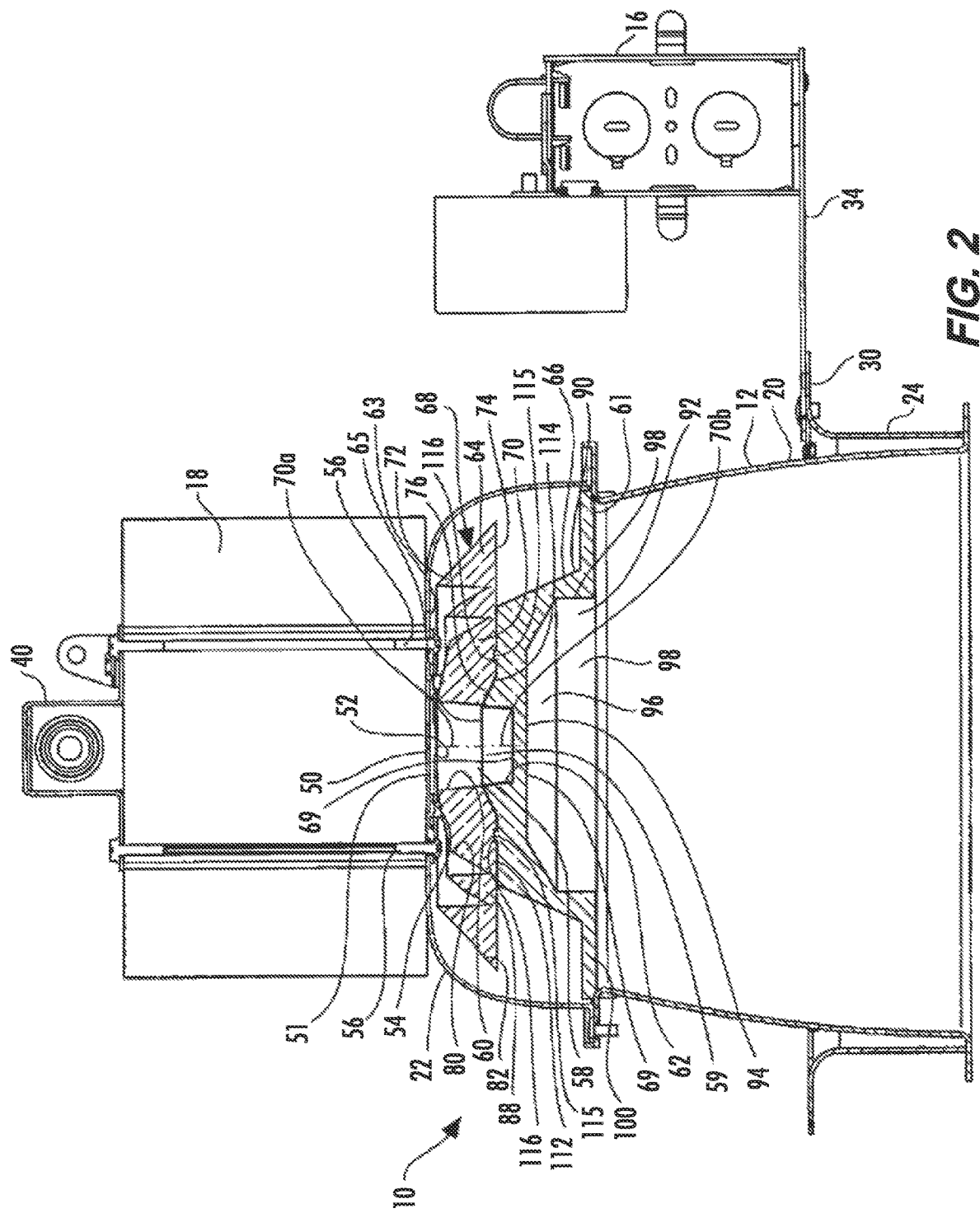
FIG. 2 is a sectional view taken generally along the lines H of FIG. 1.
Figure 3:
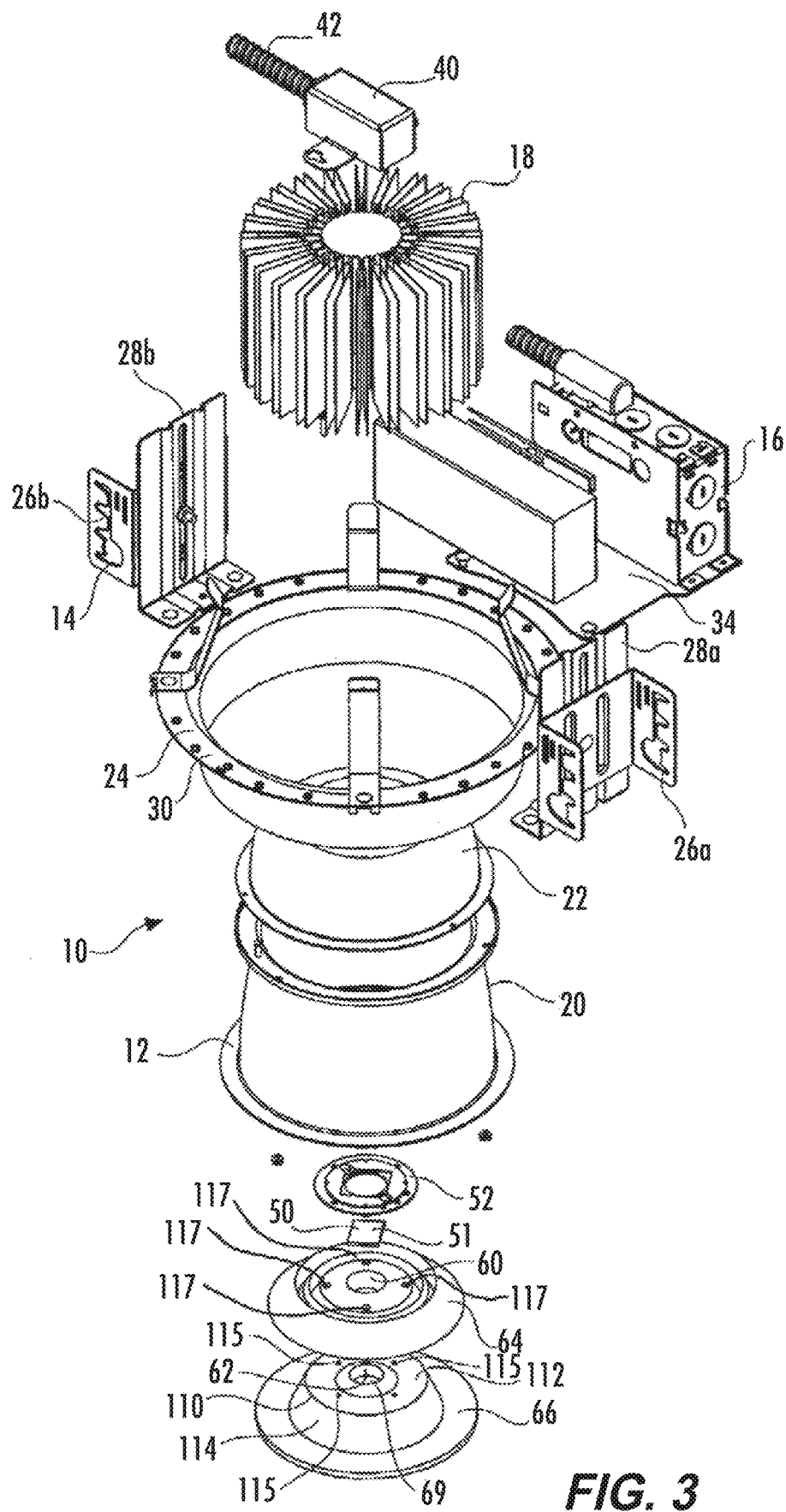
FIG. 3 is an exploded isometric view from above of the luminaire of FIGS. 1 and 2.

Referring to FIGS. 1-3, a luminaire 10 includes a housing 12, a mounting device 14 secured to the housing 12, a junction box 16, and a heat sink 18. The housing 12 comprises a reflector 20, a shield 22, and an extension ring 24 that are secured together in any suitable fashion, such as by fasteners (not shown), welds, brackets, or the like. The mounting device 14 may include conventional joist hangers 26a, 26b secured to two brackets 28a, 28b, respectively. The brackets 28a, 28b are, in turn, secured in any suitable fashion, such as by fasteners (not shown) to a flange 30 of the extension ring 24. The luminaire 10 may be suspended by fasteners extending through the joist hangers 26 into a structural member, such as one or more joists (not shown). Any other suitable support structure(s) could instead be used, including device(s) that allow the luminaire to be used in new construction or in retrofit applications.

The junction box 16 is mounted on a plate 34 that is, in turn, secured in any suitable fashion (again, e.g., by fasteners, not shown) to the flange 30. The heat sink 18 is mounted atop the shield 22. A light source junction box 40 is disposed on the heat sink 18 and is mounted thereon in any suitable fashion. A conduit 42 houses electrical conductors that interconnect component(s) in the light source junction box 40 with power supplied to the junction box 16.

A light source 50 comprising at least one light emitting diode (LED) element is firmly captured by a retention ring 52 and fasteners 56 (FIG. 2) and/or another fastening element(s), such as adhesive, against an undersurface 54 of the heat sink 18. The light source 50 may be a single white or other color LED chip or other bare component, or each may comprise multiple LEDs either mounted separately or together on a single substrate or package to form a module 51. One or more primary optics, such as one or more lenses, may be disposed over each LED or group of LEDs. Light developed by the light source 50 is directed downwardly as seen in FIGS. 2 and 3 and either travels directly through interior bores 58, 59 (FIGS. 2, 4A, 4B, and 4C) or is directly incident on coupling surfaces 60, 62 of first and second optical waveguide stages or portions 64, 66, respectively, of an optical waveguide 68. The waveguide stages 64, 66 are secured to the heat exchanger 18 in any convenient fashion, such as by fasteners, adhesive, brackets, or the like, or is simply sandwiched together and firmly captured between a shouldered surface 61 and a base surface 63 of the shield 22.

As seen in FIGS. 2-4C, the coupling surface 60 extends entirely through an interior portion of the first stage 64 (i.e., the coupling surface defines a through-bore) and comprises a frustoconical surface. Further in the illustrated embodiment, and as seen in FIGS. 2-4C, the coupling surface 62 comprises a blind bore having a frustoconical shape and defined in part by a planar base portion 69 that also directly receives light from the light source 50. The coupling surfaces 60, 62 are preferably at least partially aligned, and in the illustrated embodiment, are fully aligned in the sense that such surfaces have coincident longitudinal axes 70a, 70b, respectively, (FIG. 2). Also preferably, the surfaces 60, 62 together form a combined frustoconical shape without substantial discontinuity at the interface therebetween, with the exception of an air gap 65 at an axial plane between the stages 64, 66. Alignment holes 117 may be provided to aid in alignment of the light source 50 with the first stage 64. Alignment holes 117 may contact or be attached to the retention ring 52 that captures the light source 50. An embodiment may provide protrusions on the retention ring 52 that are received by the alignment holes 117. Alternative embodiments may attach the retention ring 52 to the first stage 64 by way of a screw, bolt, fastener, or the like.

Figure 5:
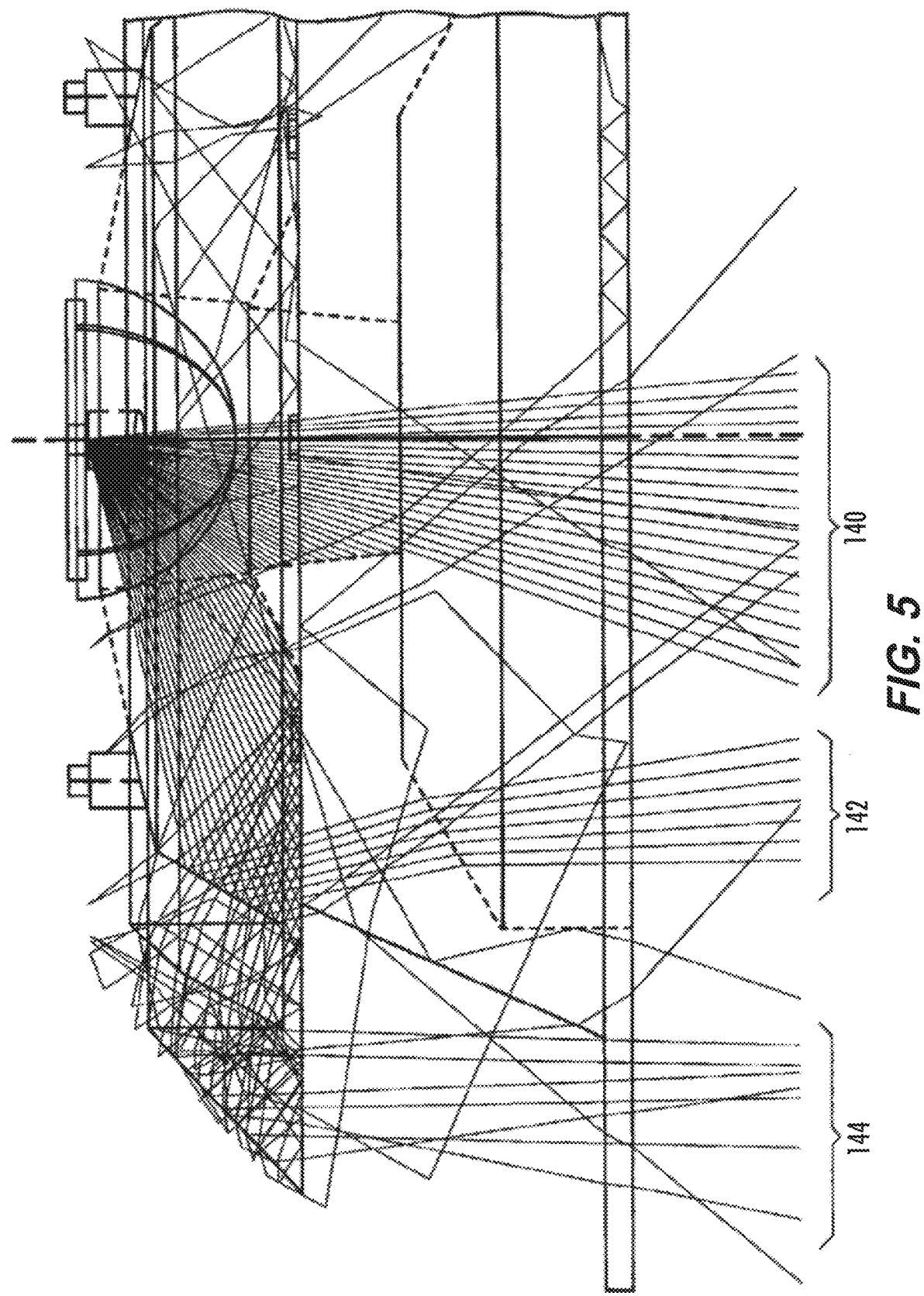
FIGS. 5 and 6 are ray trace diagrams simulating light passage through the waveguide stages of FIG. 2.
Figure 6:
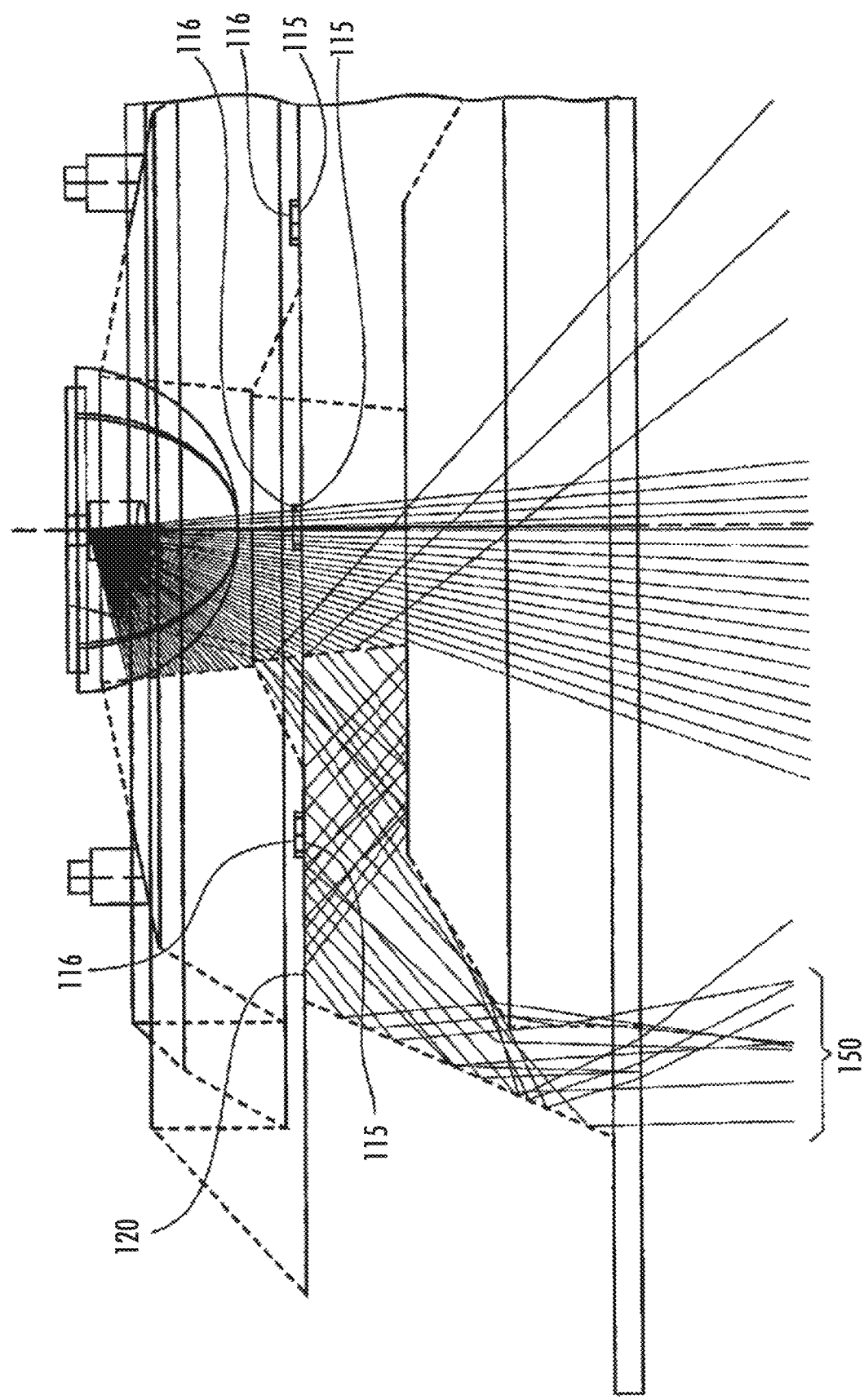

If desired, the coupling surface 62 may comprise a through-bore rather than a blind bore (such an arrangement is shown in FIGS. 5 and 6), although the latter has the advantage of providing an enclosed space to house and protect the light source 50.

Figure 4A:
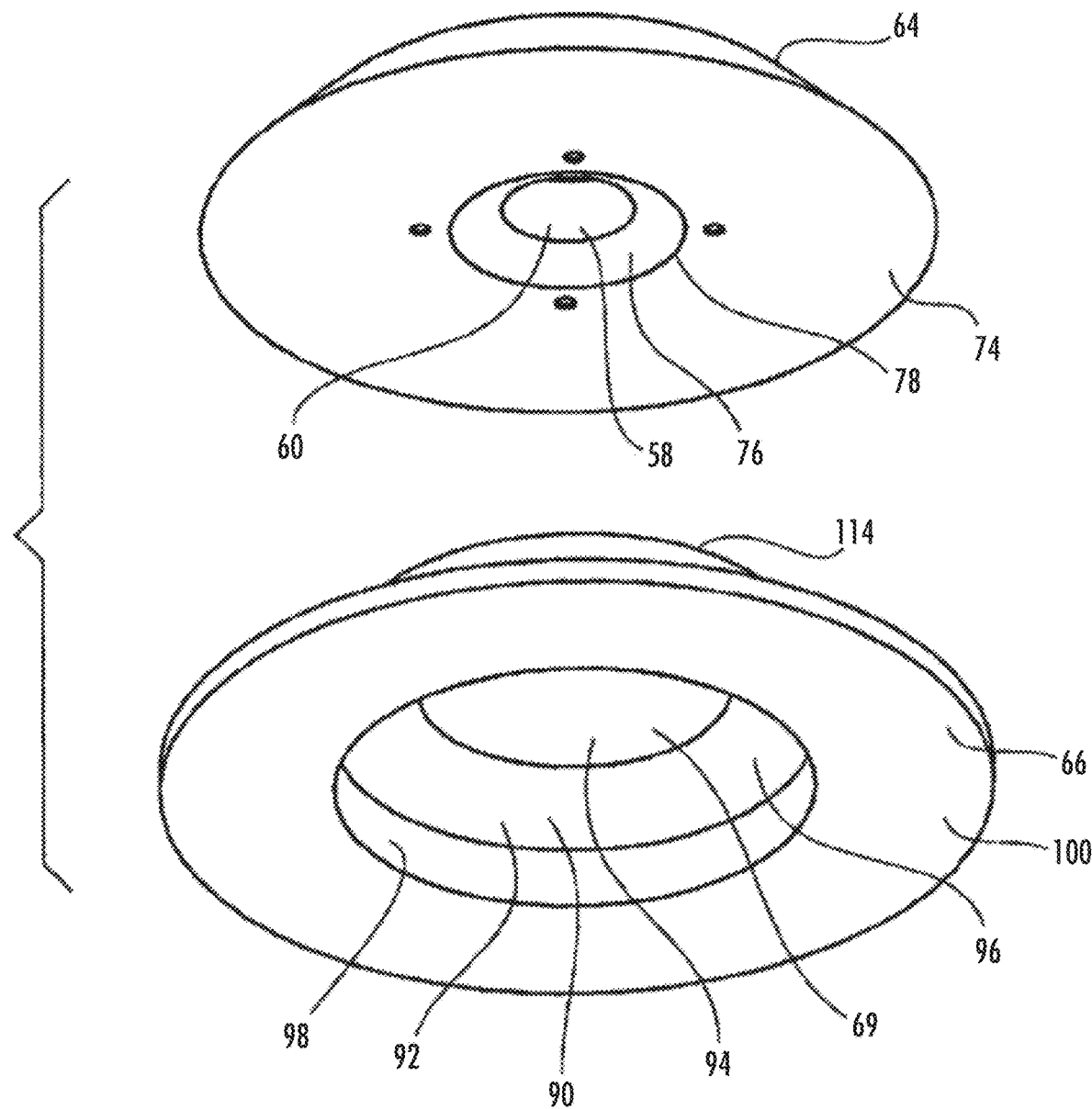
FIG. 4A is a fragmentary exploded isometric view from below of the waveguide stages of FIG. 3.
Figure 4B:
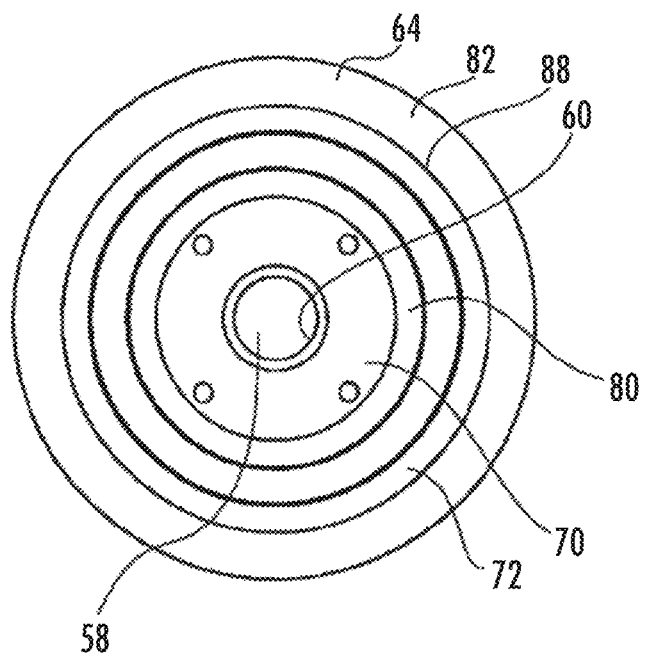
FIG. 4B is a plan view of the first waveguide stage of FIG. 4A.

Referring next to FIG. 4B, the first and second stages 64, 66 are preferably circular in plan view and nested together. The first stage 64 further includes a light transmission portion 70 and a light extraction portion 72. The light transmission portion 70 is disposed laterally between the coupling surface 60 and the light extraction portion 72. As seen in FIG. 4A, the first stage 64 further includes a substantially planar lower surface 74 and a tapered lower surface 76 that meet at an interface surface 78. Referring again to FIGS. 2 and 4B, the light extraction portion 72 includes light extraction or direction features 80, 82 and a light recycling portion or redirection feature 88 intermediate the light extraction features 80, 82.

Figure 4C:
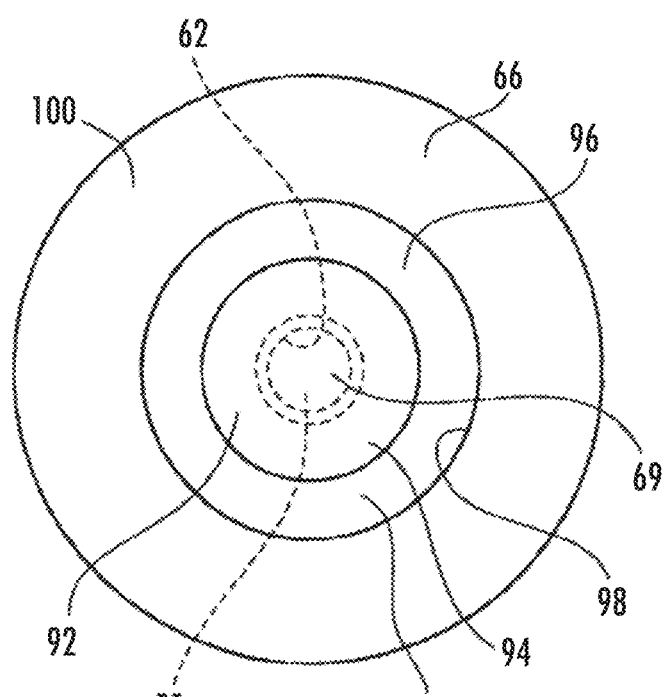
FIG. 4C is a bottom elevational view of the second waveguide stage of FIG. 4A.

As seen in FIGS. 2, 4A, and 4C, the second stage 66 includes a light extraction feature or portion 90 and a central cavity 92 defined by a lower planar base surface 94, a lower tapered surface 96, and a cylindrical surface 98. A planar circumferential flange 100 surrounds the light extraction feature 90 and the central cavity 92. The flange 100 facilitates retention of the stages 64, 66 in the luminaire and may enclose and protect the various components thereof. The flange 100 may not serve an optical function, although this need not be the case. In some embodiments, the first and second stages 64, 66 are disposed such that the light extraction portion 72 of the first stage 64 is disposed outside of the light extraction portion 90 of the second stage 66.

In one embodiment, the first stage 64 may include a first major surface with light extraction features 80, 82 and a second major surface opposite the first major surface. The second stage 66 may include a third major surface proximate the second major surface of the first stage 64 and a fourth major surface opposite the third major surface. The second and third major surfaces of the first and second stages 64, 66, respectively, may be disposed such that an air gap is disposed therebetween as described below. The central cavity 92 may extend into the fourth major surface of the second stage 66.

The light source 50 may include, for example, at least one phosphor-coated LED either alone or in combination with at least one color LED, such as a green LED, a yellow LED, a red LED, etc. In those cases where a soft white illumination with improved color rendering is to be produced, each LED module 51 or a plurality of such elements or modules may include one or more blue shifted yellow LEDs and one or more red LEDs. The LEDs may be disposed in different configurations and/or layouts on the module as desired. Different color temperatures and appearances could be produced using other LED combinations, as is known in the art. In one embodiment, the light source 50 comprises any LED, for example, an MT-G LED incorporating TrueWhite® LED technology or as disclosed in U.S. patent application Ser. No. 13/649,067, filed Oct. 10, 2012, now U.S. Pat. No. 9,818,919, entitled "LED Package with Multiple Element Light Source and Encapsulant Having Planar Surfaces" by Lowes et al., the disclosure of which is hereby incorporated by reference herein, as developed and manufactured by Cree, Inc., the assignee of the present application. If desirable, a side emitting LED disclosed in U.S. Pat. No. 8,541,795, the disclosure of which is incorporated by reference herein, may be utilized. In some embodiments, each LED element or module 51 may comprise one or more LEDs disposed within a coupling cavity with an air gap being disposed between the LED element or module 51 and a light input surface. In any of the embodiments disclosed herein each of the LED element(s) or module(s) 51 preferably has a lambertian or near-lambertian light distribution, although each may have a directional emission distribution (e.g., a side emitting distribution), as necessary or desirable. More generally, any lambertian, symmetric, wide angle, preferential-sided, or asymmetric beam pattern LED element(s) or module(s) may be used as the light source.

Still further, the material(s) of the waveguide stages 64, 66 are the same as one another or different, and/or one or both may comprise composite materials. In any event, the material(s) are of optical grade, exhibit TIR characteristics, and comprise, but are not limited to, one or more of acrylic, air, polycarbonate, molded silicone, glass, and/or cyclic olefin copolymers, and combinations thereof, possibly in a layered or other arrangement, to achieve a desired effect and/or appearance. Preferably, although not necessarily, the waveguide stages 64, 66 are both solid and/or one or both have one or more voids or discrete bodies of differing materials therein. The waveguide stages 64, 66 may be fabricated using any suitable manufacturing processes such as hot embossing or molding, including injection/compression molding. Other manufacturing methods may be used as desired.

Each of the extraction features 80, 82 may be generally of the shape disclosed in co-owned U.S. Pat. No. 9,581,751, filed Mar. 15, 2013, entitled "Optical Waveguide and Lamp Including Same", the disclosure of which is incorporated by reference herein.

The first stage 64 is disposed atop the second stage 66 such that the substantially planar lower surface 74 and the tapered lower surface 76 of the first stage 64 are disposed adjacent an upper planar base surface 112 (FIGS. 2, 3, and 4A) and an upper tapered surface 114 comprising a portion of the light extraction feature 90 of the second stage 66. Disposed at a location adjacent an interface 110 between the upper planar base surface 112 and the upper tapered surface 114 (FIG. 3) or at one or more points or areas where the first and second stages 64, 66 are adjacent one another is at least one protrusion that may be continuous or discontinuous and which may have an annular or other shape. In the illustrated embodiment of FIGS. 2, 3, 4A, and 6 four protrusions 115 (seen in FIGS. 2, 3, and 6) extend from the upper planar base surface 112 of the second stage 66 and are received by four cavities 116 (two of which are seen in FIG. 3 and three of which are visible in FIG. 6), formed at least in the planar lower surface 74 of the first stage 64. A first height of each protrusion is slightly greater than a second height of each cavity such that an air gap 120 (FIG. 6) is maintained between the stages 64, 66. The air gap 120 may be of either constant thickness or varying thickness in alternative embodiments.

In general, the luminaire 10 develops a beam spread or beam angle of between about 10 degrees and about 60 degrees, and more preferably between about 10 degrees and about 45 degrees, and most preferably between about 15 degrees and about 40 degrees. The luminaire is further capable of developing a light intensity of at least about 2000 lumens, and more preferably a light intensity of about 4000 to about 15,000 lumens, and more preferably a light output of about 6000 lumens to about 10,000 lumens or higher. In the case of higher output luminaires, thermal issues may require additional features to be employed. The multi-stage nested waveguide optics separated by an air gap are employed to achieve high lumen output with low perceived glare and to allow a narrow luminaire spacing to luminaire height ratio to be realized. The luminaire 10 uses as little as a single light source and multiple optics. The luminaire 10 is particularly suited for use in applications where ceiling heights are relatively great, and where luminaires are to be spread relatively far apart, although the embodiments disclosed herein are not limited to such applications.

Figure 4D:
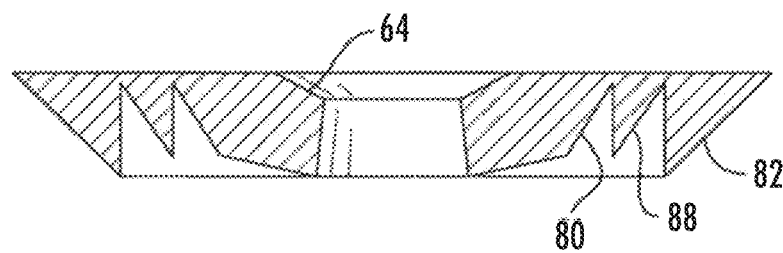
FIGS. 4D and 4E are cross-sectional views of alternative embodiments of the first waveguide stage of FIG. 4A.
Figure 4E:
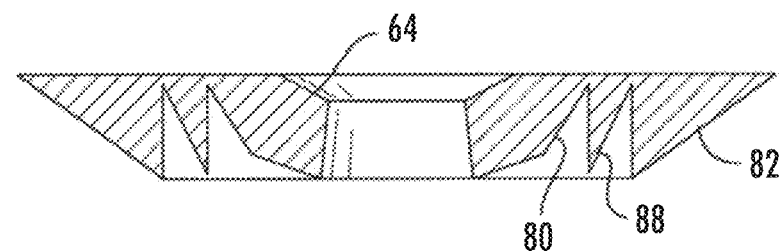

In the illustrated embodiments the shape and manufacture of each stage may contribute to the achievement of a desired beam angle. Desirable beam angles may include 15 degrees, 25 degrees, and 40 degrees. The first stage 64 may be machined with light extraction features 80, 82 and/or one or more light redirection features 88 having slightly different sizes and angles as seen in FIGS. 4D and 4E. Further, the first stage 64 and/or second stage 66 may be positioned in a selected relative alignment with respect to the light source 50 in order to obtain a desired beam angle. Varying the relative alignment of the first stage 64 and/or the second stage 66 with respect to the light source 50 allows more or less light to couple directly with the first stage 64 and/or the second stage 66. The variation in relative alignment may be in the transverse direction, the circumferential direction, or both.

Figure 4F:
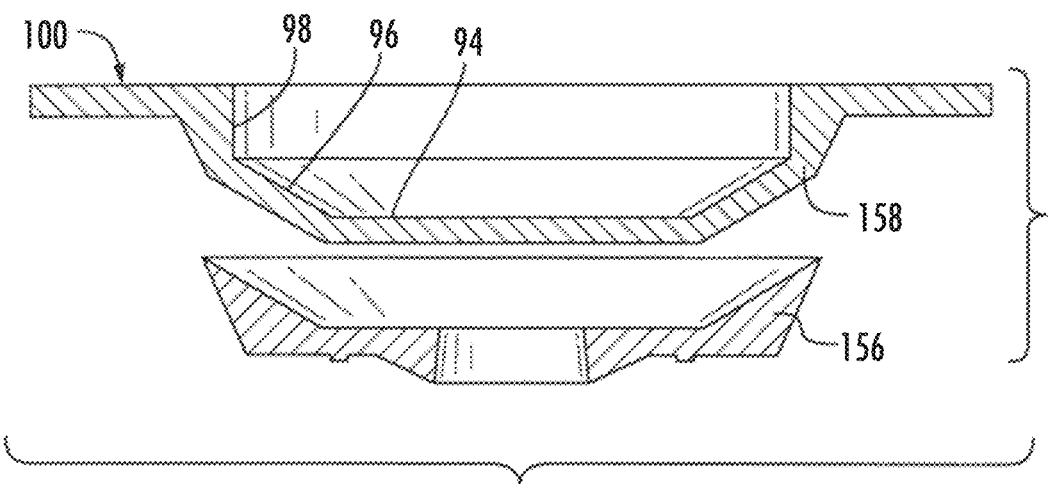
FIG. 4F is a cross-sectional view of an alternative embodiment of the second waveguide stage of FIG. 4A.

Although all of the light transmission surfaces of both waveguide stages 64, 66 are polished in many embodiments, in alternate embodiments selected surfaces of the second stage 66 may be machined with texturing, for example, on the light output surfaces 94, 96, 98, 100. Such texturing may aid in diffusion of output light. One optional texturing is specified by Mold-Tech of Standex Engraving Group, located in Illinois and other locations in the U.S. and around the world, under specification number 11040. In order to apply the texturing to the light output surfaces 94, 96, 98, 100 of the second stage 66, the second stage 66 may be machined, molded, or otherwise formed as two pieces 156, 158. When formed as two pieces as shown in FIG. 4F, the first portion 156 may be polished and the second portion 158 may have the texturing applied to the respective surfaces. After the machine finish is completed for each piece, the second stage 66 may be assembled from the two pieces 156, 158 using acrylic glue or another suitable adhesive.

The waveguide configurations for obtaining 15, 25, and 40-degree beam angles may be created with different combinations of the above-described embodiments for the first and second stages 64, 66. Specifically, a 15 degree beam angle may be achieved by combining a polished second stage 66 with the first stage having the pattern of extraction and redirection features 80, 82, and 88, respectively, shown in FIG. 4D. A 25 degree beam angle may be achieved by combining the textured second stage 66, shown prior to final assembly in FIG. 4F, with the same first stage 64 feature pattern used in the 15 degree beam angle configuration. A 40-degree beam angle may be achieved by combining the textured second stage 66 with the first stage 64 having the extraction feature pattern shown in FIG. 4E.

FIGS. 5 and 6 are ray trace diagrams simulating the passage of light through the first and second stages 64, 66, respectively. Referring first to FIG. 5 the first stage 64 splits the light incident on the coupling surface 60 and/or traveling through the into groups of light rays. A first group 140 of such light rays travels through the interior bores 58, 59 and the planar base portion 69 and out the luminaire 10 with a minimal spread to develop a collimated central illumination distribution portion. A second group of light rays 142 is incident on the coupling surface 60, enters the first stage 64, strikes the first extraction feature 80, exits the first stage 64 in a collimated fashion, and is directed through the air gap 120 into the second stage 66. The second group of light rays 142 is refracted at the tapered surface 96 and exits the luminaire 10 to produce a collimated first intermediate annular illumination portion. A third group of light rays 144 originally incident on the coupling surface 60 totally internally reflects off surfaces of the first stage 64 comprising the substantially planar lower surface 74 at the index interface defining the air gap 120, and travels through the light recycling portion 88 where the light rays are refracted. The refracted light totally internally reflects off the light extraction feature 82 and travels out of the first waveguide stage 64. The lateral dimension of the first waveguide stage 64 is larger than a lateral dimension of the second stage 66 such that at least some of the light reflected off the light extraction feature 82 exits the first stage 64, passes through the planar circumferential flange 100 of the second stage 66 and out of the luminaire 10 to produce a collimated outer annular illumination portion. The first stage 64 thus splits a portion of the light developed by the light source 50 and collimates the light.

In the illustrated embodiment, the second stage 66 receives about 40%-50% of the light developed by the light source 50. Referring next to FIG. 6, a portion of the light developed by the light source 50 that is incident on the coupling surface 62 is refracted upon entering the stage 66 and totally internally reflects off surfaces of the second stage 66 including the planar lower base surface 94, the planar upper base surface 112, and/or the tapered lower surface 76, and is directed out the second stage 66 by the surface 114 of the extraction feature 90 to develop a collimated second intermediate annular illumination distribution portion 150.

The light extraction features 80, 82, and 90 are preferably (although not necessarily) annular in overall shape. Further, the outer surfaces thereof are preferably frustoconical in shape, although this also need not be the case. For example, any or all of the features 80, 82, 90 may have a curved outer surface, or a surface comprising a piecewise linear approximation of a curve, or another shape. Still further, the features 80, 82, 90 may overall be continuous or discontinuous, the features 80, 82, 90 may have a cross-sectional shape that varies or does not vary with length, etc.

The illumination distribution portions 140, 142, 144, and 150 together form an overall illumination distribution that is substantially uniform, both in terms of color and intensity, and has a beam spread as noted above. If desired, light diffusing features such as texturing, lenticular features, or radial bumps can be applied onto one or more corresponding optical features to reduce or eliminate imaging of the light produced by the individual LEDs. Still further, the surfaces of the reflector 20 may be shaped and coated or otherwise formed with a specular or other reflective material so that stray light beams are emitted downwardly together with the light beams forming the illumination distribution portions 140, 142, 144, and 150.

If desired one or both of the stages 64, 66 may be modified or omitted, and/or one or more additional stages may be added to obtain other illumination patterns, if desired.

Figure 7A:
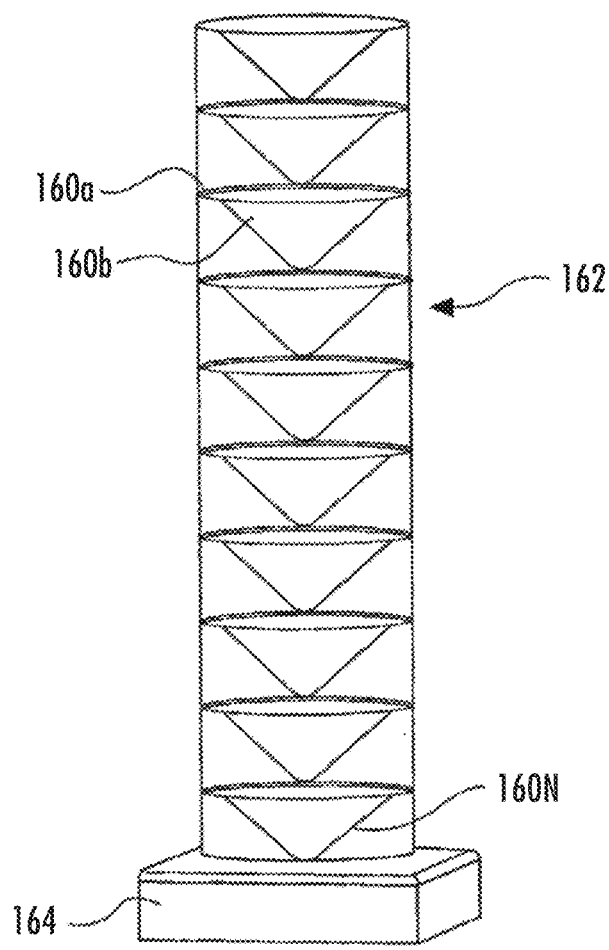
FIG. 7A is a side elevational view of another embodiment of a multi-stage waveguide.
Figure 7B:
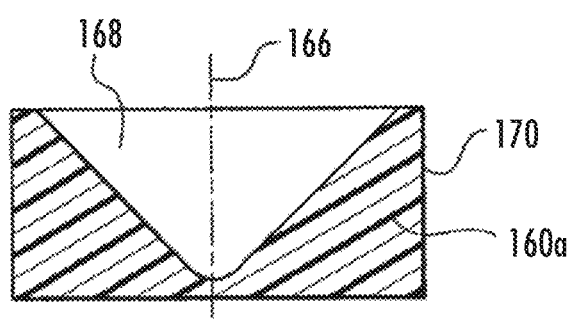
FIG. 7B is a sectional view of the stage of FIG. 7A.

Still further, referring to FIGS. 7A and 7B, one could stack identical or different waveguide stages 160*a*, 160*b*, . . . , 160N atop one another to obtain a waveguide 162 that receives light from a light source, such as one or more LED elements or modules (not shown) disposed in a base 164 to obtain a light engine that develops an illumination distribution, for example, closely resembling or identical to a compact fluorescent lamp. In the illustrated embodiment, the stages 160 are substantially, if not completely identical to one another, and hence only the waveguide stage 160*a* will be described in detail herein. The stages 160 are maintained in assembled relationship by any suitable means such as acrylic glue, another adhesive, a bracket, one or more rods that are anchored in end plates, fasteners, etc., or a combination thereof.

The stage 160*a* is circular cylindrical in shape and has a central axis of symmetry 166. An internal cavity 168 is V-shaped in cross section and the stage is made of any of the optical materials disclosed herein. The internal cavity 168 may have an alternate cross-sectional shape, such as a parabola, a frustum, a conical shape, an elliptic paraboloid shape, a frustoconical shape, or a combination of shapes. The surface defining the internal cavity 168 may act as a light redirection feature. The internal cavity 168 forms an air gap within the waveguide. The air gap enables the surface defining the internal cavity 168 to re-direct light toward the exterior surface 170 of waveguide stage 160*a*. At least some of the redirected light may further be collimated upon said redirection.

The stage 160*a* may be a machined waveguide having all surfaces polished. Alternately, the exterior cylindrical surface 170 may be slightly diffused by roughening or scatter coating or texturing, potentially leading to a more uniform luminance appearance.

The base 164 may consist of a housing cap and a machined heatsink. The housing cap may optionally be made of plastic, such as the plastic varieties used in fused deposition modeling (FDM) or other suitable manufacturing processes. The light engine obtained from combining the base 164 and stacked waveguide stages 160*a*, 160*b*, . . . , 160N may be part of an arrangement within a downlight such as luminaires 172, 174 shown in FIGS. 8A and 8B. A luminaire 172 having a vertical lamping position, as seen in FIG. 8A, provides an intensity distribution resembling that of a similarly situated compact florescent lamp. A luminaire 174 having a horizontal lamping position, as seen in FIG. 8B, provides a relatively wider intensity distribution, again resembling that of a similarly situated compact florescent lamp. However, in both lamping positions, luminaires 172, 174 described herein may provide better efficiency than a luminaire containing a comparable compact florescent lamp.

Any of the embodiments disclosed herein may include a power circuit for operating the LEDs having a buck regulator, a boost regulator, a buck-boost regulator, a SEPIC power supply, or the like, and may comprise a driver circuit as disclosed in U.S. patent application Ser. No. 14/291,829, filed May 30, 2014, now U.S. Pat. No. 9,791,110, entitled "High Efficiency Driver Circuit with Fast Response" by Hu et al. or U.S. patent application Ser. No. 14/292,001, filed May 30, 2014, now U.S. Pat. No. 9,303,823, entitled "SEPIC Driver Circuit with Low Input Current Ripple" by Hu et al. incorporated by reference herein. The circuit may further be used with light control circuitry that controls color temperature of any of the embodiments disclosed herein in accordance with viewer input such as disclosed in U.S. patent application Ser. No. 14/292,286, filed May 30, 2014, now U.S. Pat. No. 10,278,250, entitled "Lighting Fixture Providing Variable CCT" by Pope et al. incorporated by reference herein.

Further, any of the embodiments disclosed herein may be used in a luminaire having one or more communication components forming a part of the light control circuitry, such as an RF antenna that senses RF energy. The communication components may be included, for example, to allow the luminaire to communicate with other luminaires and/or with an external wireless controller, such as disclosed in U.S. patent application Ser. No. 13/782,040, filed Mar. 1, 2013, now U.S. Pat. No. 8,975,827, entitled "Lighting Fixture for Distributed Control" or U.S. Provisional Application No. 61/932,058, filed Jan. 27, 2014, entitled "Enhanced Network Lighting" both owned by the assignee of the present application and the disclosures of which are incorporated by reference herein. More generally, the light control circuitry includes at least one of a network component, an RF component, a control component, and a sensor. The sensor may provide an indication of ambient lighting levels thereto and/or occupancy within the room or illuminated area. Such sensor may be integrated into the light control circuitry.

B. Troffer-Style Fixtures

1. Troffer-Style with a Light Guide Assembly

Figure 9:
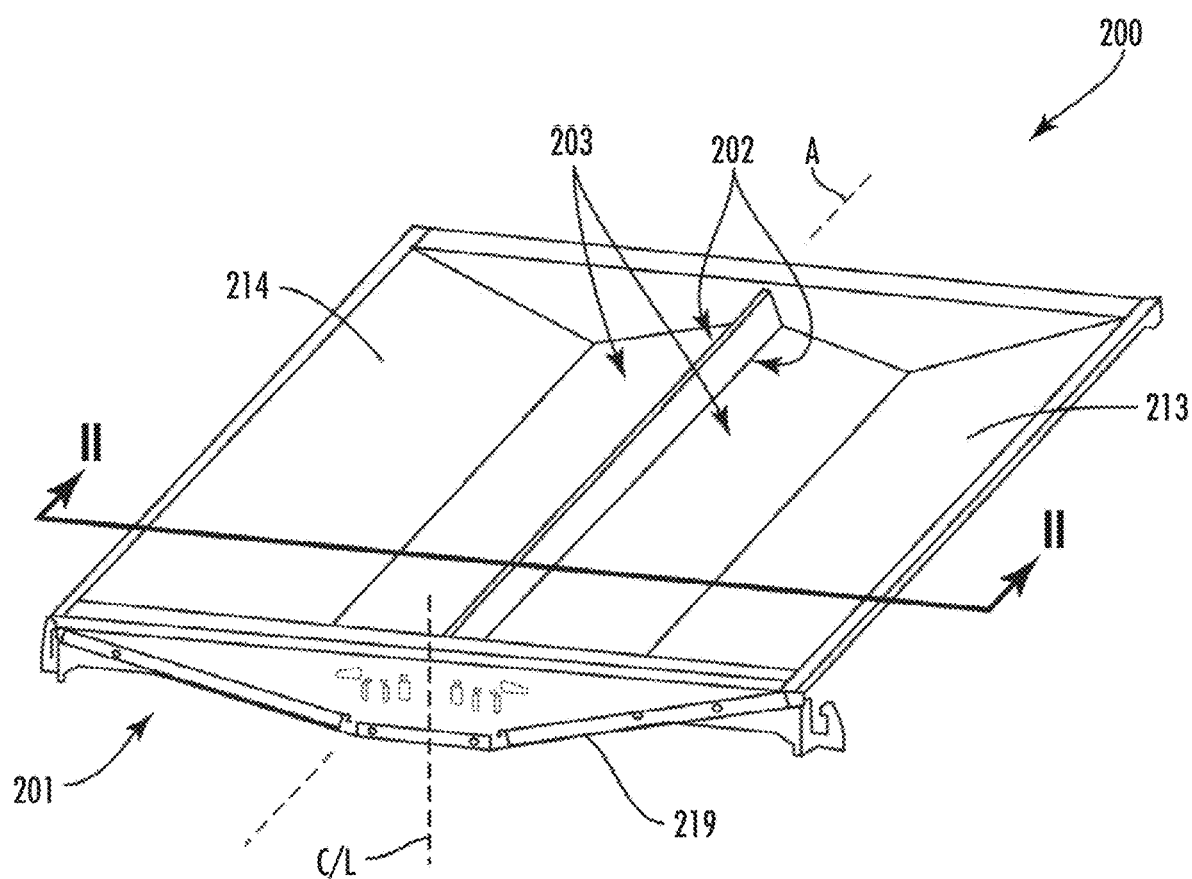
FIG. 9 is a perspective view of a light fixture.
Figure 10A:
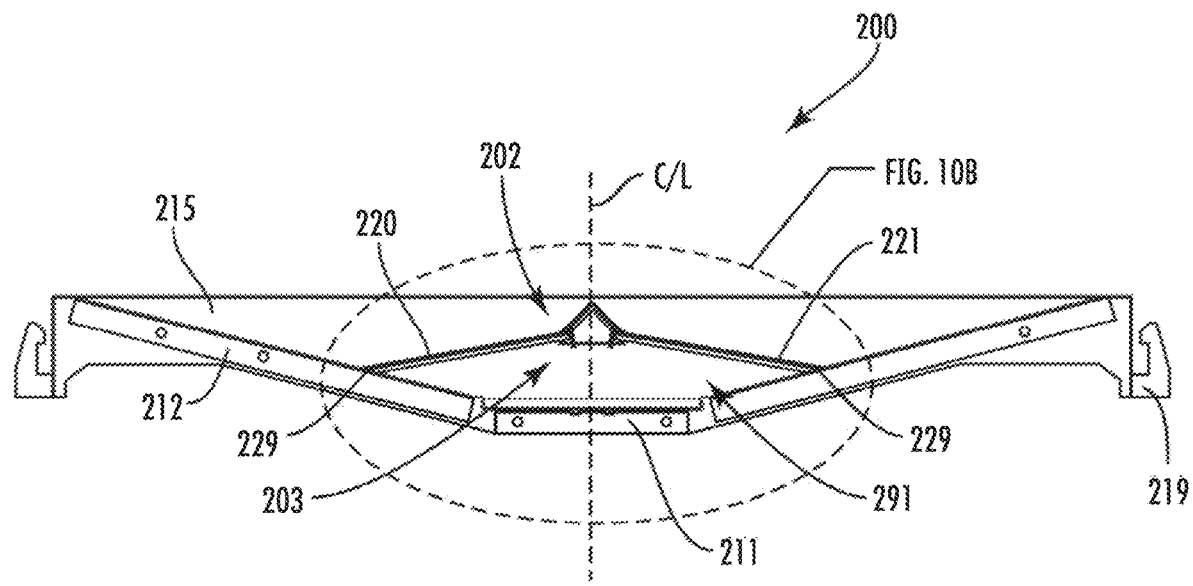
FIG. 10A is a side schematic view of a light fixture having a housing, LED assembly, and light guide assembly.
Figure 10B:
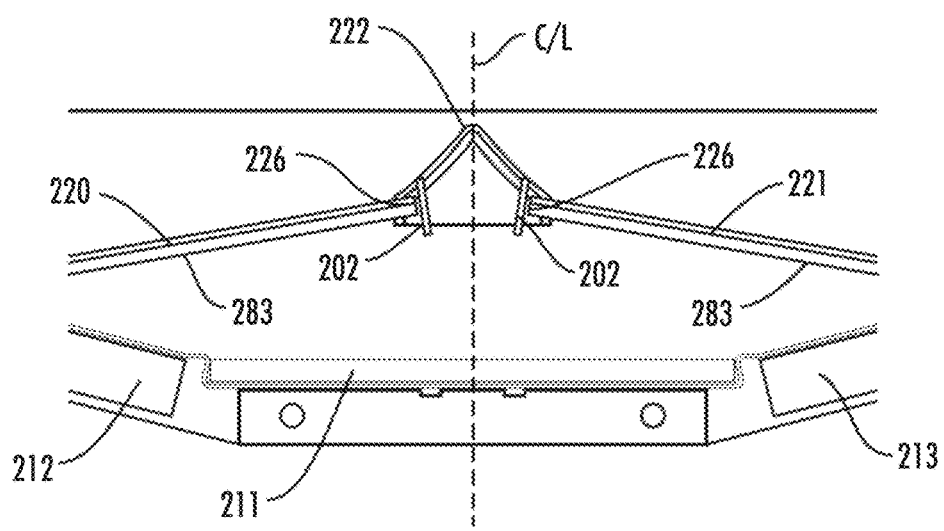
FIG. 10B is an enlarged view of the area marked in FIG. 10A.

FIGS. 9-10B illustrate a troffer light fixture 200 (hereinafter light fixture). The light fixture 200 generally includes a housing 201, a LED assembly 202, and a light guide assembly 203.

The housing 201 extends around the exterior of the light fixture 200 and is configured to mount of otherwise be attached to a support. The light fixture 200 includes a longitudinal axis A that extends along the length. A width is measured perpendicular to the longitudinal axis A. A centerline C/L extends through the light fixture 200. The light fixture may be provided in many sizes, including standard troffer fixture sizes, such as but not limited to 2 feet by 4 feet (2'×4'), 1 foot by 4 feet (1'×4'), or 2 feet by 2 feet (2'×2'). However, it is understood that the elements of the light fixture 200 may have different dimensions and can be customized to fit most any desired fixture dimension.

FIG. 9 illustrates the light fixture 200 in an inverted configuration. In some examples, the light fixture 200 is mounted on a ceiling or other elevated position to direct light vertically downward onto the target area. The light fixture 200 may be mounted within a T grid by being placed on the supports of the T grid. In other examples, additional attachments, such as tethers, may be included to stabilize the fixture in case of earthquakes or other disturbances. In other embodiments, the light fixture 200 may be suspended by cables, recessed into a ceiling or mounted on another support structure.

Figure 11:
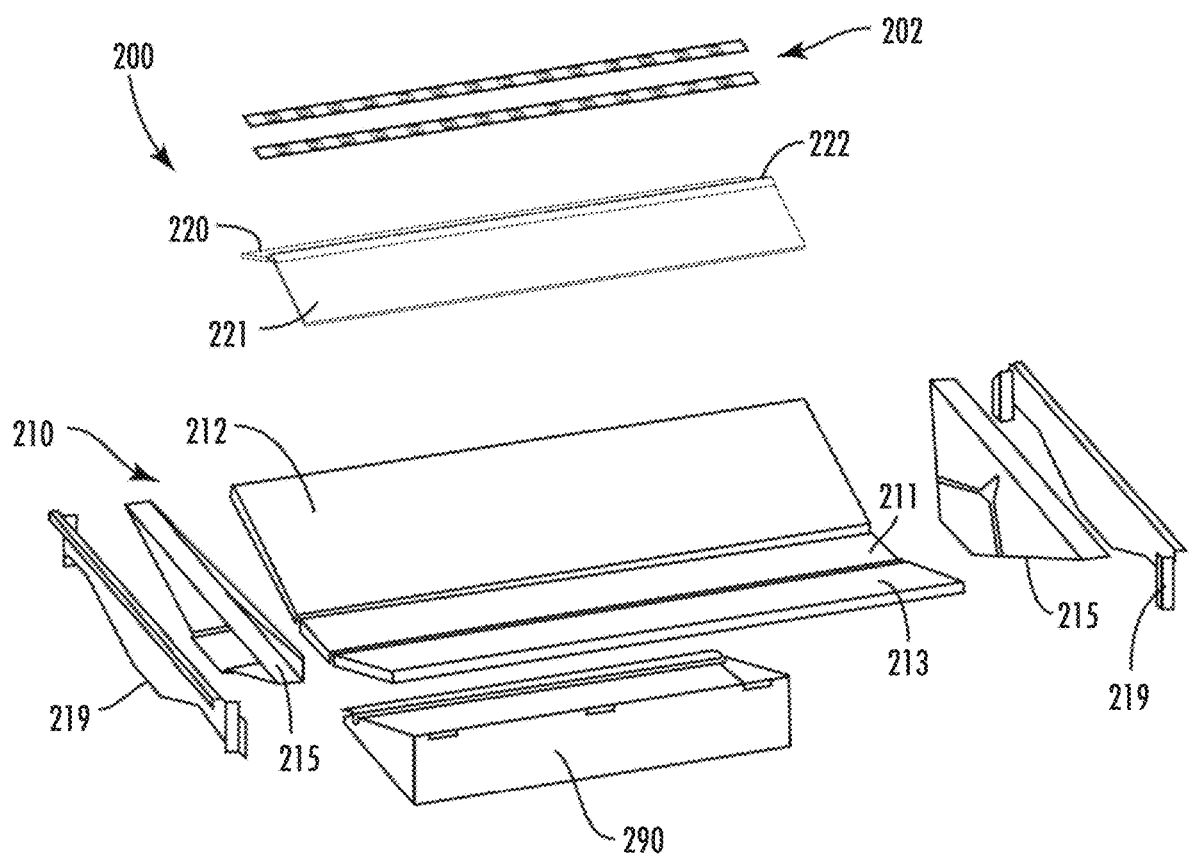
FIG. 11 is an exploded view of a light fixture.

As illustrated in FIG. 11, the housing 201 includes a back pan 210 with end caps 215 secured at each end. The back pan 210 and end caps 215 form a recessed pan style troffer housing. In one example, the back pan 210 includes three separate sections including a center section 211, a first wing 212, and a second wing 213. The back pan 210 includes a generally concave shape that opens outward towards the LED assembly 202. In one example, each of the center section 211, first wing 212, second wing 213, and end caps 215 are made of multiple sheet metal components secured together. In another example, the back pan 210 is made of a single piece of sheet material that is attached to the end caps 215. In another example, the back pan 210 and end caps 215 are made from a single piece of sheet metal formed into the desired shape. In examples with multiple pieces, the pieces are connected together in various manners, including but not limited to mechanical fasteners and welding. As illustrated in FIG. 11, outer support members 219 can extend over and are connected to the outer sides of the end caps 215. In another example, the housing 201 includes the back pan 210, but does not include end caps 215.

The exposed surfaces of the back pan 210 and end caps 215 may be made of or coated with a reflective metal, plastic, or white material. One suitable metal material to be used for the reflective surfaces of the panels is aluminum (Al). The reflective surfaces may also include diffusing components if desired. The reflective surfaces of the panels may comprise many different materials. For many indoor lighting applications, it is desirable to present a uniform, soft light source without unpleasant glare, color striping, or hot spots. Thus, the panels may comprise a diffuse white reflector, such as a microcellular polyethylene terephthalate (MC-PET) material or a DuPont/WhiteOptics material, for example. Other white diffuse reflective materials can also be used. The reflectors may also be aluminum with a diffuse white coating.

The light guide assembly 203 extends over the central longitudinal section of the housing 201. The light guide assembly 203 includes a pair of light guide plates 220, 221. The light guide plates 220, 221 are connected together along the centerline C/L by a connector 222. The connector 222 can also support the LED assembly 202 to position LED elements 233 along the sides of the light guide plates 220, 221.

Figure 12A:
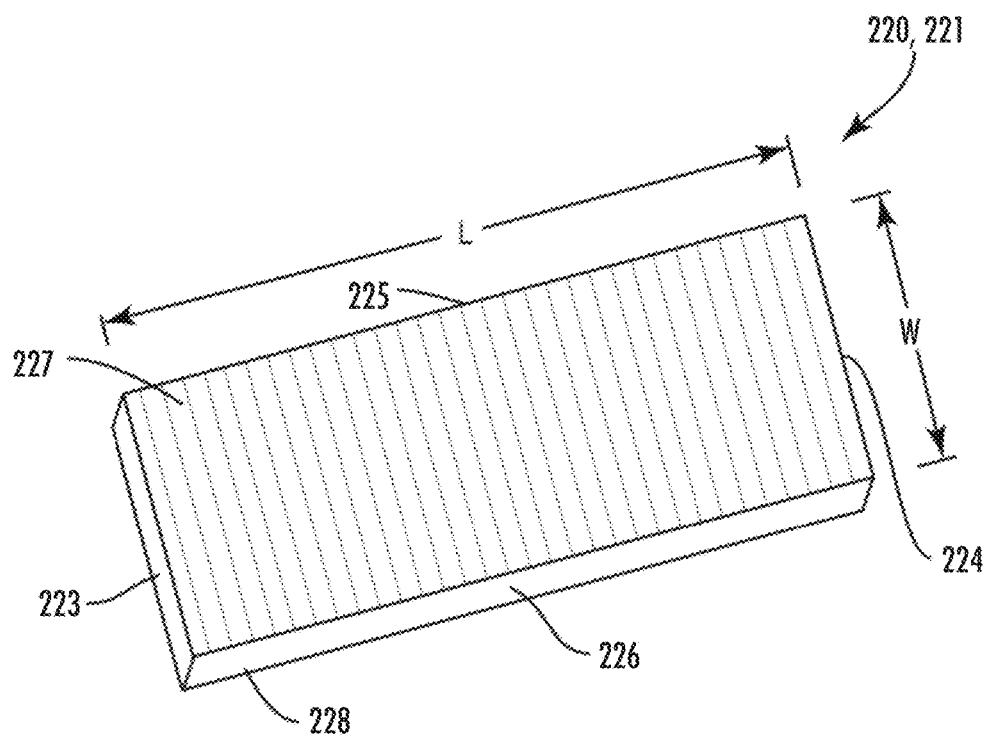
FIG. 12A is a schematic perspective view of a light guide plate.

As illustrated in FIG. 12A, the light guide plates 220, 221 generally include outer edges that form a rectangular shape with opposing ends 223, 224, and opposing sides 225, 226. The light guide plates 220, 221 include a length L measured between the ends 223, 224. The length L can be substantially equal to the back pan 210 such that the ends 223, 224 abut against the end caps 215. In another example, the length L is less than the back pan 210 and one or both ends 223, 224 are spaced inward from the respective end caps 215. The sides 226 can be aligned towards the centerline C/L. As illustrated in FIG. 10B the sides 226 are attached to the connector 222. In one example, the sides 226 are positioned in slots 229 in the connector 222. In one example, the opposing sides 225 abut against the back pan 210, and specifically against the first and second wings 212, 213 respectively. The sides 223,224 can be attached to the back pan 210, such as with mechanical connectors and/or adhesives. In another example, the sides 225 are spaced away from the back pan 210.

The light guide plates 220, 221 extend outward above the central section of the back pan 210. An enclosed interior space 291 is formed between the light guide plates 220, 221 and the housing 201. The ends of the interior space 291 can be enclosed by the end caps 215.

The light guide plates 220, 221 further include an outer surface 227 that faces away from the back pan 210, and an inner surface 228 that faces towards the back pan 210. The outer surface 227 and the inner surface 228 have different features to direct the light from the light fixture 200. A thickness of the light guide plates 220, 221 is measured between the outer surface 227 and the inner surface 228. The thickness can be consistent throughout, and in one example the thickness is about 3.0 mm. The thickness can also vary depending upon features on one or both of the outer face 227 and the inner face 228.

Figure 12B:
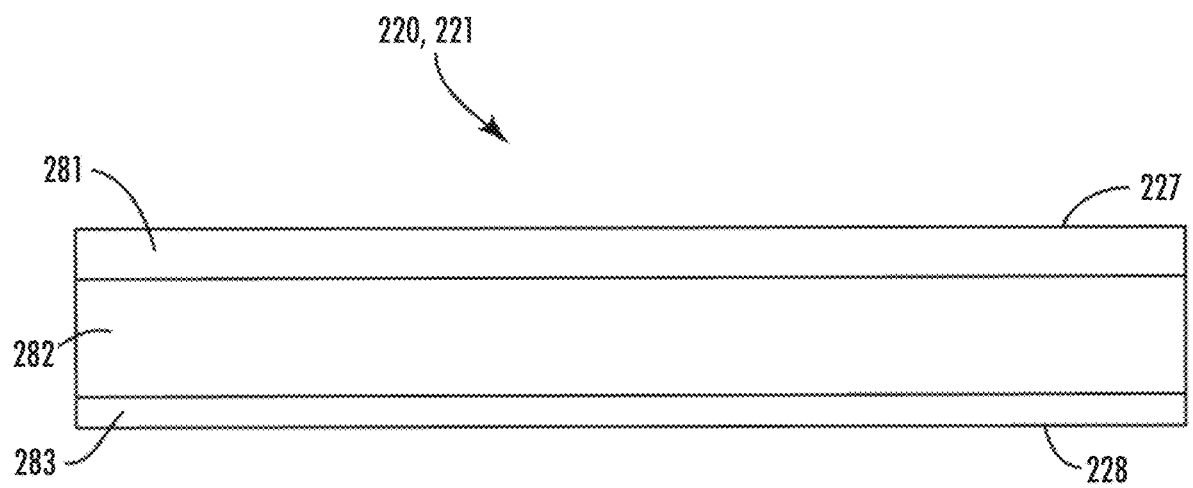
FIG. 12B is a side schematic view of a light guide plate that includes a diffuser layer, a plate layer, and a reflector layer.

FIG. 12B illustrates the details of the light guide plates 220, 221. The light guide plates 220, 221 are composed of three layers in the order: a diffuser 281 at the upper face 227, a plate 282, and a diffuse reflector 283 at the inner surface 228. In one example, the diffuser 281 is a diffuser film 281. The diffuser 281 softens and uniformly distributes light that is emitted from the light guide plate 220, 221. The plate collects light from one or more LED elements 233 that are positioned along one or more sides and redistributes the light through the upper surface 227 or outer surface. The diffuse reflector 283 reflects and recycles light that escapes from bottom surface of the plate 282 thus increasing the optical efficiency.

The light guide plates 220, 221 provides for scattered or reflected light to exit through the outer surface 227 or to reflect and propagate within the plate 282. The outgoing light extracts within a range of angles. This enables light to pass directionally through the wave guide plates 220, 221 thus contributing to uniform illumination.

FIGS. 13A and 13B illustrate one light guide plate 220, 221. LED assemblies 202 are positioned along one or both of sides 225, 226. The light guide plates 220, 221 include a series of elongated features 240 that extend the width W between the sides 225, 226. In one example as illustrated in FIG. 13A, the features 240 have a uniform distribution with constant spacing across the outer surface 227. In one example, the features 240 are parallel with the ends 223, 224, and perpendicular to the sides 225, 226. FIG. 13B includes that each of the features 240 has a semi-circular ridge 241 that are separated by intervening valleys 242. The ridges 241 include a uniform shape with a fixed radius. In one example, each of the ridges 241 includes the same radius. In one example, each ridge 241 is a semicircle.

In one example, the features 240 are formed in the plate 282 and the diffuser 281 simply extends over the upper surface of the plate 282 where the plate 282 and the diffuser 281 are stacked. In one example, air gaps are formed at the cylindrical ridges of the features 240. In another example, both the plate 282 and diffuser 281 form the features 240. In another example, the features 240 are formed by the diffuser 281 with the upper surface of the plate 282 being substantially flat.

FIGS. 14A and 14B illustrate a light guide plate 220, 221. Features 243 are formed in the planar lower surface 244 lower surface of the plate 282. The features 243 are configured for light to have total internal reflection (TIR) or be refracted. The light is directed towards the outer surface 227 in varied directions which provides for uniform light distribution. In one example, each of the features 243 includes the same shape and size. In another example, the features 243 include two or more different shapes and/or sizes.

Figure 15:
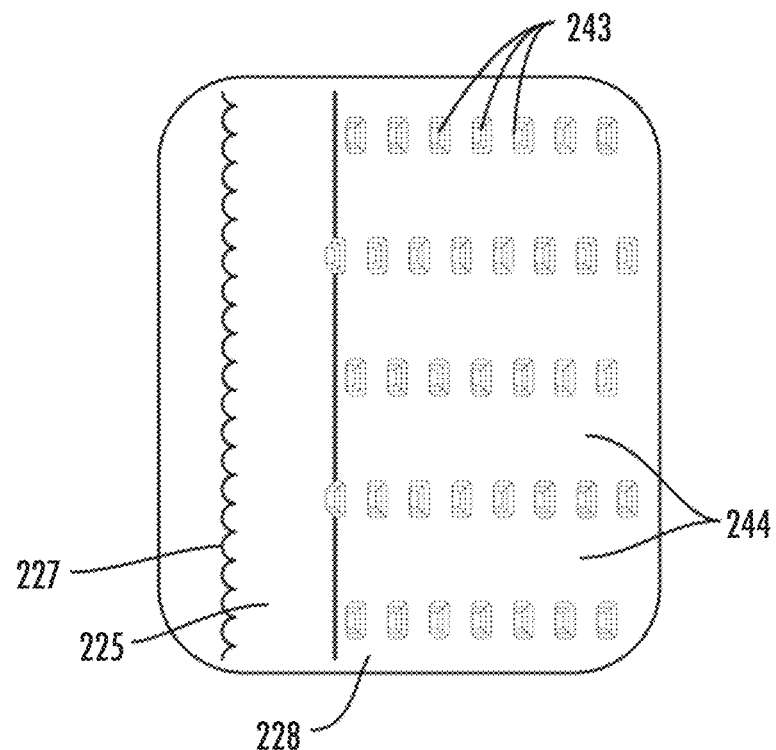
FIG. 15 is a schematic view of a bottom of a light guide plate.

In one example, the features 243 are aligned in a regular pattern with constant spacing. FIG. 14A includes a regular pattern with the features 243 aligned in rows across the width W with gaps positioned between each feature 243. Adjacent rows are offset with the features of one row aligned with the gaps of the adjacent rows. In another example as illustrated in FIG. 15, the features 243 are aligned in uniform rows and also aligned across the width. The features 243 can also be aligned in other regular patterns. In another example, the features 243 are arranged in an irregular pattern. In one example, the features 243 are arranged with a weighted factor for spacing. This includes the spacing gradually increasing or decreasing from a particular point or outer edge while being arranged regularly.

Figure 16A:
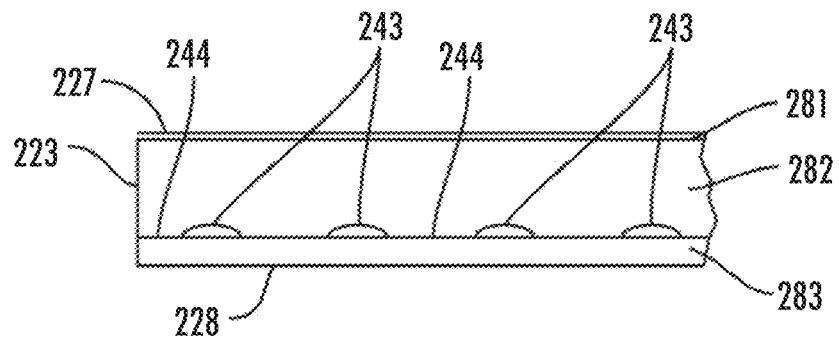
FIG. 16A is a schematic section view cut along line III-III of FIG. 14B.
Figure 16B:
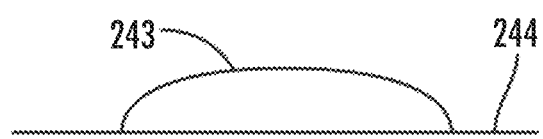
FIG. 16B is a schematic section view of a dip taken along an elongated axis cut along line III-III of FIG. 14B.
Figure 16C:
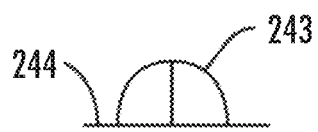
FIG. 16C is a schematic section view of the dip of FIG. 16B taken along a perpendicular axis cut along line IV-IV of FIG. 14B.

The features 243 include dips that extend into the lower surface 244 of the plate 282. The dips include an ellipsoidal shape in a first plane as illustrated in FIGS. 16A and 16B and a freeform shape in the crossed plane as illustrated in FIG. 16C. In one example as specifically included in FIG. 16C, the crossed plane includes a scooped shape. The dips include a major axis with the ellipsoidal shape and a minor axis with the freeform shape. The dips are arranged with the major axis of the ellipsoidal shape being perpendicular to the plane of the LED assembly 202. Using the example of FIG. 14A, the major axis is perpendicular to one or both sides 225, 226 and the LED assembly 202 would be positioned along one or both of the sides 225, 226.

In another example, the features 243 include other shapes that are trapezoidal shape or other freeform shape in an axis either parallel or perpendicular to an LED assembly 202.

Figure 17A:
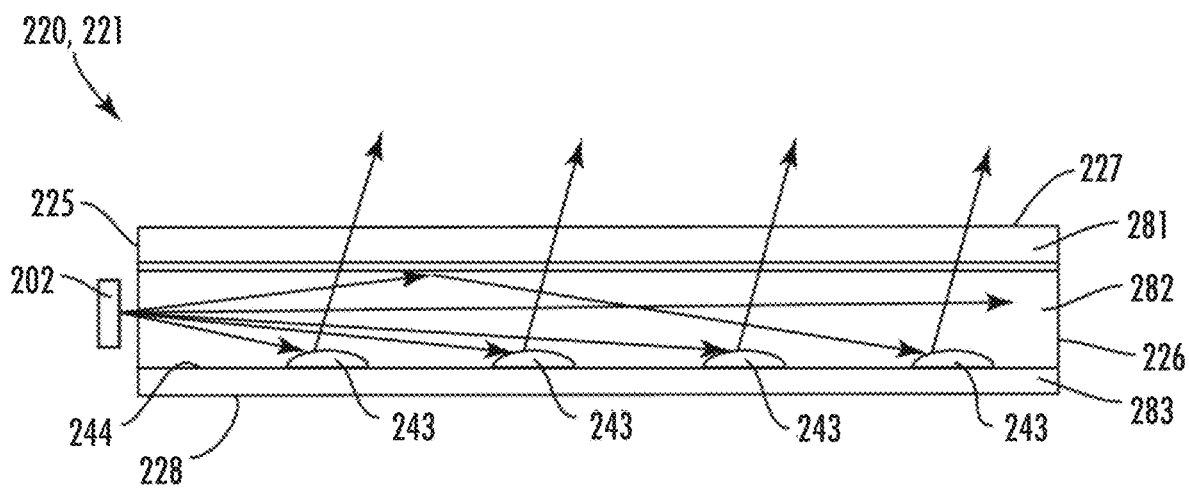
FIG. 17A is a schematic view of light rays reflecting within a light guide plate.

FIG. 17A illustrates light rays fan moving through a light guide plate 220, 221. Light rays from the light elements 233 of the LED assembly 202 enter into the plate 282. Some of the light rays hit the features 243 and then partially reflect to be emitted outward from the outer surface 227 or perimeter edges. Some of the light rays are refracted and guided inside the plate 282 until hitting another feature 243 and/or other spot on the light guide plate 220, 221. Some of the light rays hit directly against the top surface of the plate 282 and/or the diffuser 281 and are reflected and guided inside the plate 282 until hitting a feature 243 or surface. Some of the light rays propagate various distances through the plate 282 until hitting a feature 243 or perimeter edge. Some of the light rays hit the diffuse reflector 283 and are reflected into the plate 282.

Figure 17B:
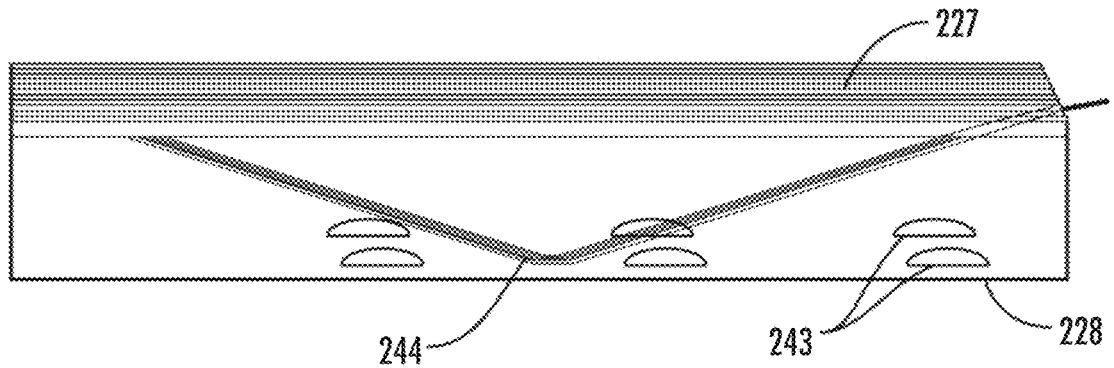
FIG. 17B is a schematic diagram of a light ray reflecting inside the plate from a planar surface of a light guide plate.
Figure 17C:
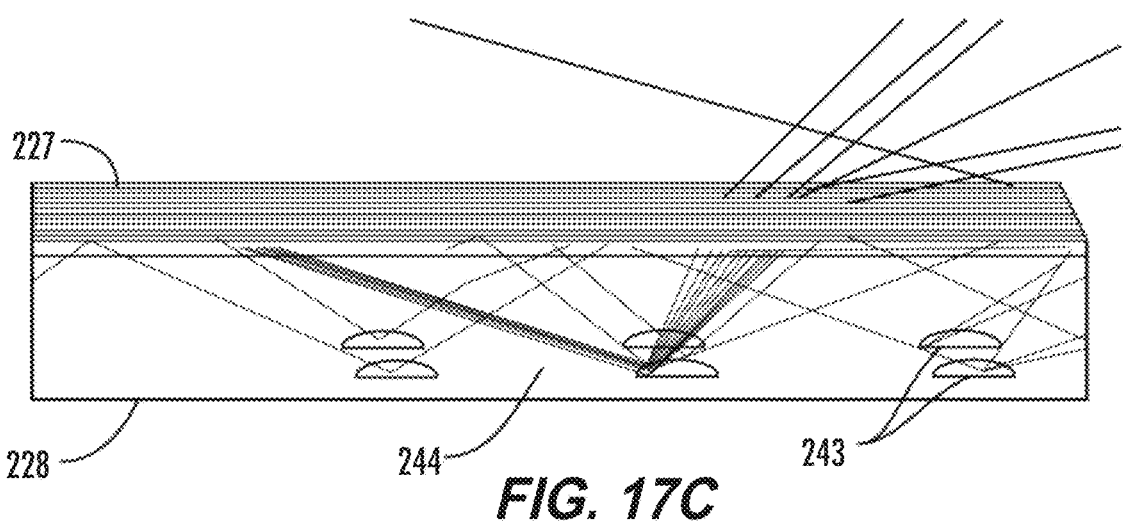
FIG. 17C is a schematic diagram of light rays reflecting inside the plate from a dip surface of a light guide plate.

FIG. 17B illustrates a light ray fan on the planar surface 244 that reflects by TIR in a normal manner. FIG. 17C illustrates light rays hitting the features 243. The light rays hitting the features 243 are TIR-reflected and go in varied directions. The varied surface curvatures of the features 243 scatter the light in different directions. In one example, the features 243 include ellipsoidal dips with the shape being elongated along the main LED light direction. This enables the light to propagate through the light guide plate 220, 221 smoothly to the opposing side 225, 226 while going in varied directions upon contact with a feature 243. The freeform surface of the ellipsoidal shape in the opposing plane assists to extract the light uniformly onto the outer surface 227 and also to pass through the light guide plate 220, 221.

An LED assembly 202 is mounted to each of the first and second light guide plates 220, 221. In one example as illustrated in FIGS. 10A and 10B the LED assemblies 202 are mounted to the side 226 of each of the light guide plates 220, 221. The LED assemblies 202 include LED elements 233 aligned in an elongated manner that extends along the light guide plates 225, 226.

Figure 18A:
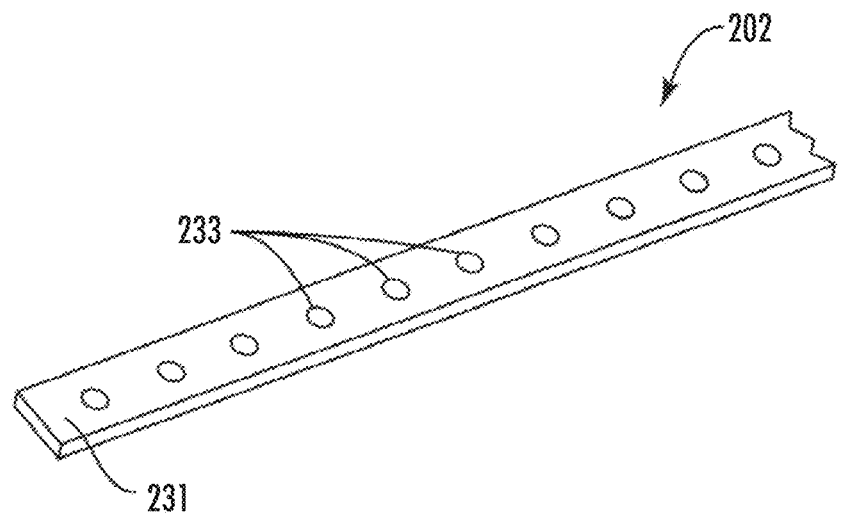
FIG. 18A is a schematic diagram of an LED assembly.
Figure 18B:
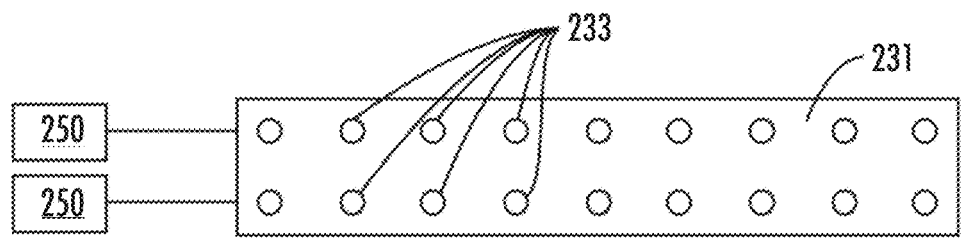
FIG. 18B is a schematic diagram of an LED assembly with a pair of driver circuits.

FIG. 18A illustrates an LED assembly 202 that includes the LED elements 233 and a substrate 231. The LED elements 233 can be arranged in a variety of different arrangements. In one example as illustrated in FIG. 18A, the LED elements 233 are aligned in a single row. In another example as illustrated in FIG. 18B, the LED elements 233 are aligned in two or more rows. The LED elements 233 can be arranged at various spacings. In one example, the LED elements 233 are equally spaced along the length of the light guide plates 220, 221. In another example, the LED elements 233 are arranged in clusters at different spacings along the light guide plates 220, 221. In one example, each LED element 233 has a size of about 1.0 mm in length and about 1.0 mm in width.

The LED assemblies 202 can include various LED elements 233. In the various examples, the LED assembly 202 can include the same or different LED elements 233. In one example, the multiple LED elements 233 are similarly colored (e.g., all warm white LED elements 233). In such an example all of the LED elements are intended to emit at a similar targeted wavelength; however, in practice there may be some variation in the emitted color of each of the LED elements 233 such that the LED elements 233 may be selected such that light emitted by the LED elements 233 is balanced such that the light fixture 200 emits light at the desired color point.

In one example, each LED element 233 is a single white or other color LED chip or other bare component. In another example, each LED element 233 includes multiple LEDs either mounted separately or together. In the various embodiments, the LED elements 233 can include, for example, at least one phosphor-coated LED either alone or in combination with at least one color LED, such as a green LED, a yellow LED, a red LED, etc.

In various examples, the LED elements 233 of similar and/or different colors may be selected to achieve a desired color point.

In one example, the LED assembly 202 includes different LED elements 233. Examples include blue-shifted-yellow LED elements ("BSY") and a single red LED elements ("R"). Once properly mixed the resultant output light will have a "warm white" appearance. Another example uses a series of clusters having three BSY LED elements 233 and a single red LED element 233. This scheme will also yield a warm white output when sufficiently mixed. Another example uses a series of clusters having two BSY LED elements 233 and two red LED elements 233. This scheme will also yield a warm white output when sufficiently mixed. In other examples, separate blue-shifted-yellow LED elements 233 and a green LED element 233 and/or blue-shifted-red LED element 233 and a green LED element 233 are used. Details of suitable arrangements of the LED elements 233 and electronics for use in the light fixture 200 are disclosed in U.S. Pat. No. 9,786,639, which is incorporated by reference herein in its entirety.

The substrate 231 supports and positions the LED elements 233. The substrate 231 can include various configurations, including but not limited to a printed circuit board and a flexible circuit board. The substrate 231 can include various shapes and sizes depending upon the number and arrangement of the LED elements 233.

Figure 19:
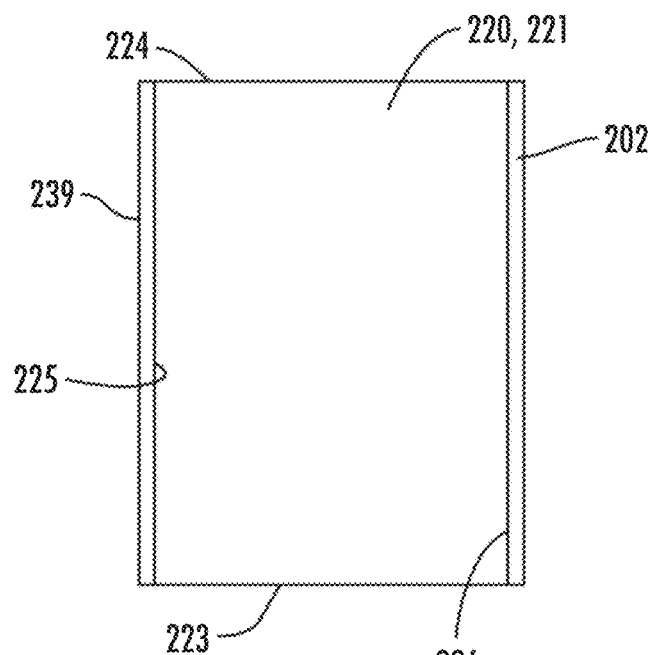
FIG. 19 is a schematic diagram of a light guide plate with an LED assembly attached to a first side and a reflector attached to an opposing side.

In one example, an LED assembly 202 is attached to light guide plates 220, 221 along one of the sides 225, 226, or ends 223, 224. In one example, the LED assembly 202 is connected to one of the sides 225, 226, such as side 226 as illustrated in FIG. 19. The LED assembly 202 extends the length of the light guide plate 220, 221.

A reflector 239 is attached to the opposing side 225, 226 (e.g., side 225 in FIG. 19). Various types of reflectors 229 can be used, such as but not limited to a WHITEOPTIC reflector from WhiteOptics, LLC, or a high reflecting film or material. In one example, the reflector 229 is configured to transmit about 50% of the light and to reflect about 50% of the light. In another example, the reflector 229 reflects 100% of the light. In another example, the opposing side 225, 226 does not include a reflector 229.

In one example, the LED assembly 202 and reflector 229 guide the light and the ends 223, 224 do not include optics. In one example, one or both ends 223, 224 can be flat and polished.

In one example as illustrated in FIG. 19, a single LED assembly 202 is attached to each light guide plate 220, 221. In another example, two or more LED assemblies 202 are attached to each light guide plate 220, 221. For example, LED assemblies 202 are attached to both of the sides 225, 226, to one of the sides 225, 226 and one of the ends 223, 224, or to both of the ends 223, 224.

In one example, the light guide plates 220, 221 are the same and each includes the same arrangement of one or more LED assemblies 202. This provides for uniform light distribution throughout the light fixture 200. In another example, the light guide plates 220, 221 are different and/or include different arrangements of the one or more LED assemblies 202.

Each LED element 233 receives power from an LED driver circuit or power supply of suitable type, such as a SEPIC-type power converter and/or other power conversion circuits. At the most basic level a driver circuit 250 may comprise an AC to DC converter, a DC to DC converter, or both. In one example, the driver circuit 250 comprises an AC to DC converter and a DC to DC converter. In another example, the AC to DC conversion is done remotely (i.e., outside the fixture), and the DC to DC conversion is done at the driver circuit 250 locally at the light fixture 200. In yet another example, only AC to DC conversion is done at the driver circuit 250 at the light fixture 200. Some of the electronic circuitry for powering the LED elements 233 such as the driver and power supply and other control circuitry may be contained as part of the LED assembly 202 or the lamp electronics may be supported separately from the LED assembly 202.

In one example, a single driver circuit 250 is operatively connected to each of the LED elements 233. In another example as illustrated in FIG. 18B, two or more driver circuits 250 are connected to the LED elements 233.

In one example, the LED assemblies 202 are each mounted on a heat sink that transfers away heat generated by the one or more LED elements 233. The heat sink provides a surface that contacts against and supports the substrate 231. The heat sink further includes one or more fins for dissipating the heat. The heat sink 232 cools the one or more LED elements 233 allowing for operation at desired temperature levels.

As illustrated in FIG. 11, a control box 290 is attached to the housing 201. In one example as illustrated in FIG. 11, the control box 290 is attached to the underside of the second wing 213. The control box 290 can also be positioned at other locations. The control box 290 extends around and forms an enclosed interior space configured to shield and isolate various electrical components. In one example, one or more driver circuits 250 are housed within the control box 290. Electronic components within the control box 290 may be shielded and isolated.

Examples of troffer light fixtures with a housing and LED assembly are disclosed in U.S. Pat. Nos. 10,508,794, 10,247, 372, and 10,203,088, each of which is hereby incorporated by reference in its entirety.

Illumination testing was performed on three separate lighting fixtures 200. Each light fixture 200 included the same housing 201 and with the same LED assembly 202 attached to the side 226 of each light guide plate 220, 221 as illustrated in FIGS. 10A and 10B. A first light fixture 200 included no reflector 229 on the opposing side 225. A second light fixture 200 included a reflector 229 attached to the side 225 with the reflector 229 configured to reflect 50% of the light and to transmit 50% of the light. A third light fixture 200 included a reflector 229 attached to the side 225 with the reflector 229 configured to reflect 100% of the light. FIGS. 20A, 20B, 20C, and 20D illustrate the first light fixture 200. FIGS. 21A, 21B, 21C, and 21D illustrate the second light fixture 200. FIGS. 22A, 22B, 22C, and 22D illustrate the third light fixture 200.

Figure 20A:
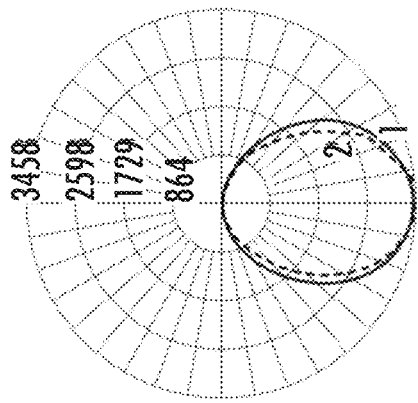
FIG. 20A is an exemplary representation of a simulated candela plot achieved with a first light fixture.
Figure 21A:
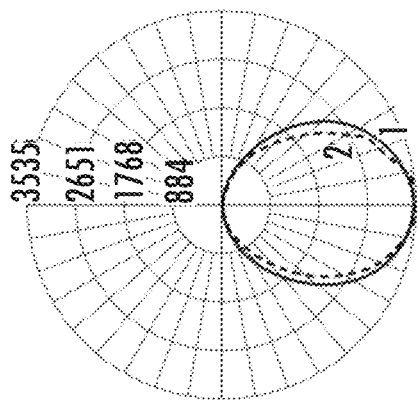
FIG. 21A is an exemplary representation of a simulated candela plot achieved with a second light fixture.
Figure 22A:
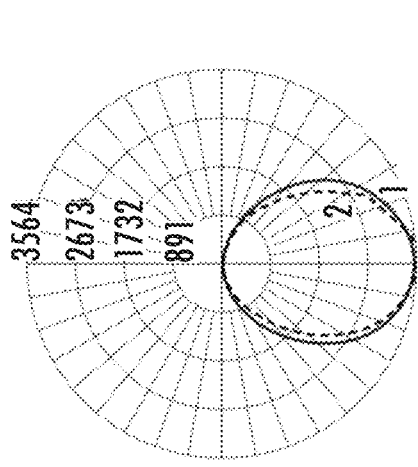
FIG. 22A is an exemplary representation of a simulated candela plot achieved with a third light fixture.

Each of FIGS. 20A, 21A, and 22A illustrate two separate plots. The first plot 1 illustrates the intensity curve over vertical angles on the plane perpendicular to the longitudinal axis A (see FIG. 9). The second plot 2 is the intensity curve on the vertical angles on the plane (parallel plane) along the longitudinal axis A.

A spacing criterion (SC) was also calculated for each light fixture 200. The SC shows how much light can be distributed widely to make uniform at a given mounting height (i.e., it is the ratio of luminaires spacing to mounting height). The SC was measured along each of the longitudinal axis, perpendicular axis, and in a diagonal direction. For the first light fixture 200 (with no reflecting optic), the SC in along the longitudinal axis was 1.12, the SC in the perpendicular axis was 1.20, and the SC in the diagonal direction was 1.26. For the second light fixture 200 (with the reflector 229 being 50% transmissive and 50% reflective), the SC along the longitudinal axis was 1.12, the SC in the perpendicular axis was 1.20, and the SC in the diagonal direction was 1.28. For the third light fixture 200 (with the reflector 229 being 100% reflective), the SC in along the longitudinal axis was 1.12, the SC in the perpendicular axis was 1.81, and the SC in the diagonal direction was 1.26.

Figure 20B:
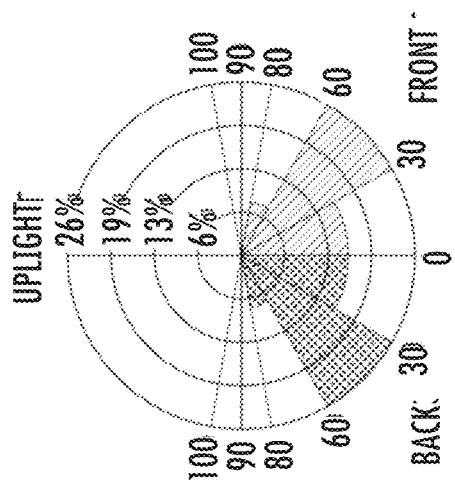
FIG. 20B illustrates luminous flux distribution patterns for a first light fixture.
Figure 21B:
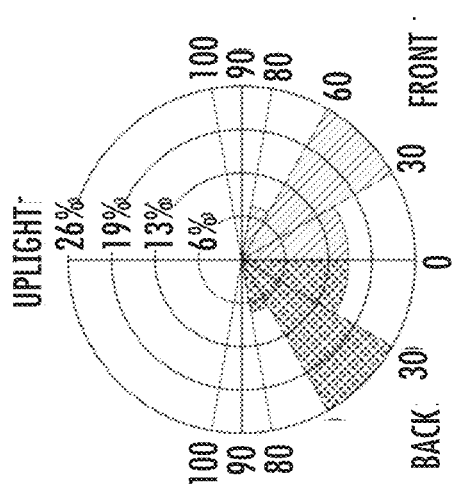
FIG. 21B illustrates luminous flux distribution patterns for a second light fixture.
Figure 22B:
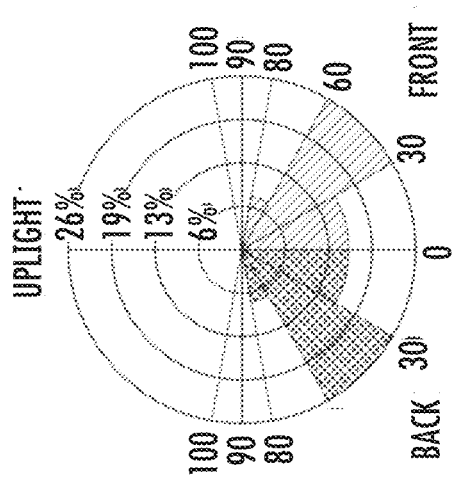
FIG. 22B illustrates luminous flux distribution patterns for a third light fixture.

FIGS. 20B, 21B, and 22B illustrate the Luminaire Classification System (LCS). The LCS illustrates lumens distribution over angles as % of total fixture lumens. Each of the light fixtures 200 was measured for FL is front low (angle), FM is front medium angle, FH is front high angle, FVH is front very high angle, BL is back low angle, BM is back medium angle, BH is back high angle, UL is uplight low angle, and UH is uplight high angle. For these measurement, low is between 0-30°, medium is between 30-60°, high is between 60-80°, and very high is between 80-90°, uplight low is between 90-100°, and uplight high is between 100-180°.

The first light fixture 200 without reflecting optics (FIG. 20B) includes the following: FL=15.8%; FM=25.8%; FH=7.9%; FVH=0.5%; BL=15.8%; BM=25.8%; BH=7.9%; BVH=0.5%; UL=0.0%; and UH=0.0%.

The second light fixture 200 with the reflector 229 that is 50% transmissive and 50% reflective includes the following: FL=15.7%; FM=25.8%; FH=7.9%; FVH=0.5%; BL=15.7%; BM=25.8%; BH=7.9%; BVH=0.5%; UL=0.0%; and UH=0.0%.

The third light fixture 200 with the reflector 229 that is 100% reflective includes the following: FL=15.9%; FM=25.8%; FH=7.8%; FVH=0.6%; BL=15.9%; BM=25.7%; BH=7.8%; BVH=0.6%; UL=0.0%; and UH=0.0%.

The optical efficiency of three light fixtures 200 can range from between about 75%-80%.

Figure 22C:
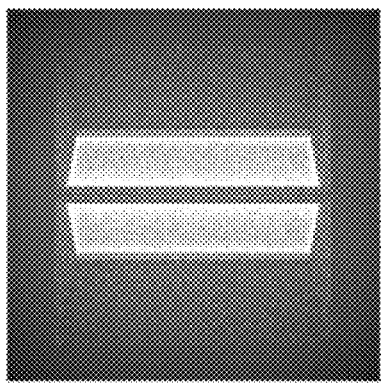
FIG. 22C are luminance appearance and luminance uniformity from the front view of the third light fixture.
Figure 21C:
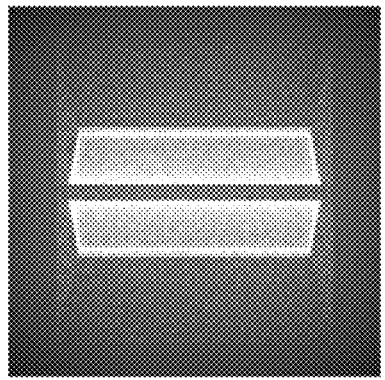
FIG. 21C are luminance appearance and luminance uniformity from the front view of the second light fixture.
Figure 20C:
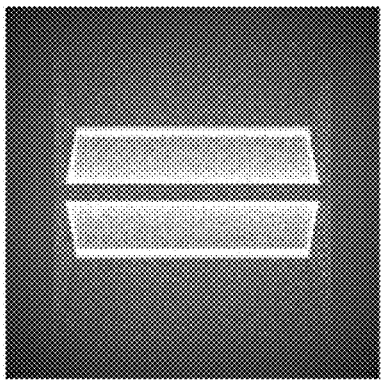
FIG. 20C are luminance appearance and luminance uniformity from the front view of the first light fixture.

FIGS. 20C, 21C, and 22C demonstrate the luminance appearance from a front view.

Figure 22D:
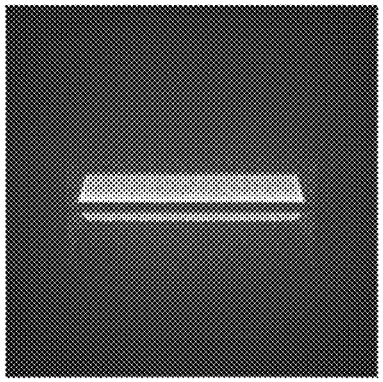
FIG. 22D are luminance appearance and luminance uniformity from a 65° angle relative to a centerline of the third light fixture.
Figure 21D:
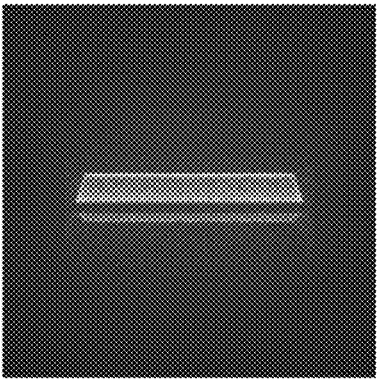
FIG. 21D are luminance appearance and luminance uniformity from a 65° angle relative to a centerline of the second light fixture.
Figure 20D:
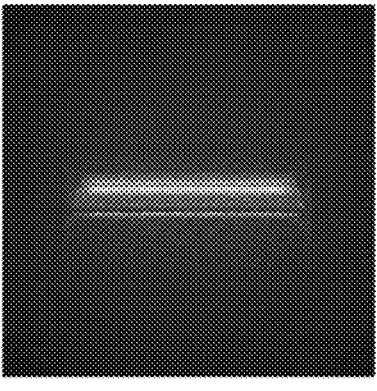
FIG. 20D are luminance appearance and luminance uniformity from a 65° angle relative to a centerline of the first light fixture.

FIGS. 20D, 21D, and 22D demonstrate the luminance appearance from an angle of 65 degrees relative to the centerline.

Figure 23A:
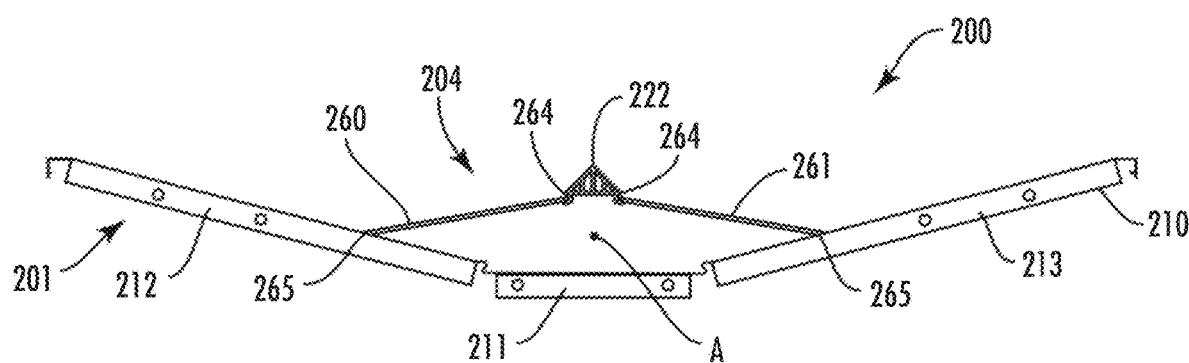
FIG. 23A is a side schematic view of a light fixture having a housing and a light panel assembly.
Figure 23B:
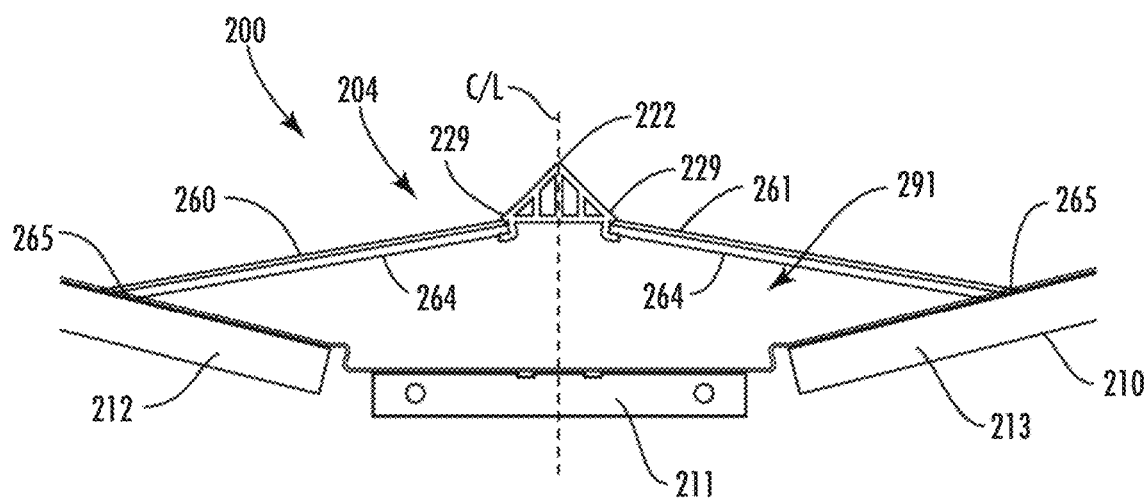
FIG. 23B is an enlarged view of the area marked in FIG. 23A.

FIGS. 23A and 23B disclose another light fixture 200 with a troffer design. The light fixture 200 includes a housing 201 as described above for light fixture 200. The light fixture 260 includes a longitudinal axis A that extends along the length. The light fixture 260 can have various shapes and sizes, including standard troffer fixture sizes, such as but not limited to 2 feet by 4 feet (2'×4'), 1 foot by 4 feet (1'×4'), or 2 feet by 2 feet (2'×2'). However, it is understood that the elements of the light fixture 200 may have different dimensions and can be customized to fit most any desired fixture dimension.

Figure 24A:
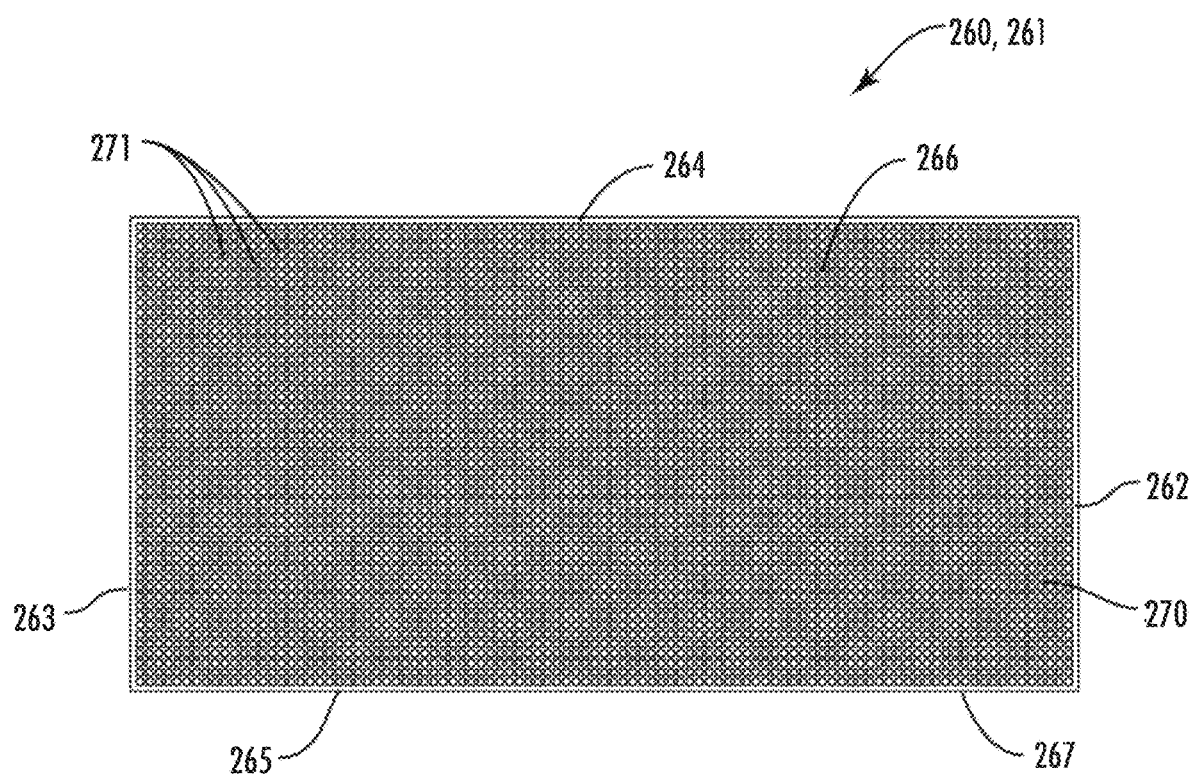
FIG. 24A is a top view of a light panel with an array of pixels.

A light panel assembly 204 extends over the central section of housing 201. The light panel assembly 204 includes first and second light panels 260, 261. As illustrated in FIG. 24A, the light panels 260, 261 have a substantially rectangular shape with opposing ends 262, 263, and opposing lateral sides 264, 265. In one example, the light panels 260, 261 extend the length of the back pan 210 with the ends 262, 263 contacting against each of the opposing end caps 215. In another example, one or both ends 262, 263 are spaced away from the end caps 215. The inner lateral sides 264 are connected to the connector 222 that is aligned along the centerline C/L. In one example, the connector 222 includes slots 229 that receive the lateral sides 264.

The outer lateral sides 265 are positioned towards the back pan 210. In one example, the lateral sides 265 contact against the back pan 210, with the lateral sides 265 contacting against the first wing 212 and the second wing 213, respectively. In one example, the lateral sides 265 are attached to the back pan 200, such as with one or more adhesives and mechanical fasteners.

The light panel assembly 204 extends across the central section of the housing 201. An enclosed interior space 291 is formed between the light panel assembly 204 and the housing 200. The ends of the interior space 291 can be enclosed by the end caps 215.

Figure 24B:
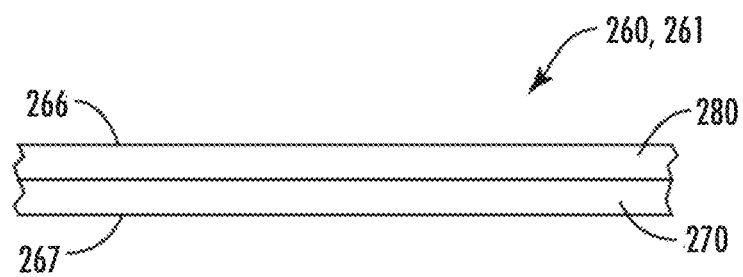
FIG. 24B is a partial schematic side view of a light panel.

As illustrated in FIG. 24B, the light panels 260, 261 include a light assembly 270 and a protective film 280. The light assembly 270 is positioned at an inner side 267 of the light panels 260, 261, and the film 280 is positioned at an outer side 266. The light panels 260, 261 comprise a relatively thin, flat shape.

Figure 24C:
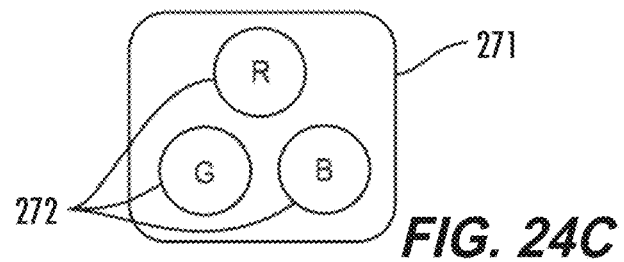
FIG. 24C is a schematic diagram of a pixel having multiple sub-pixels.

As illustrated in FIG. 24A, the light assembly 270 includes an array of pixels 271 that face outward away from the housing 201. The array can include various sizes and shapes. As illustrated in FIG. 24C, each pixel 271 includes multiple sub-pixels 272. In one design, each pixel 271 includes three sub-pixels 272: a red sub-pixel 272; a green sub-pixel 272; and a blue sub-pixel 272 (i.e., an RGB pixel). The sub-pixels 272 can be adjusted to different luminance values to cause the pixels 271 to have various colors.

In another example, each pixel 271 is a single pixel that provide a single uniform light. In one example, the single pixel gives uniform lighting with a single white color.

In one example, the sub-pixels 272 are microscopic LEDs that have a size of between about 1-10 μm. The pixels 271 and sub-pixels 272 can also include other lighting technologies, including liquid crystal display (LCD), organic LED (OLED), and quantum dots (QD).

The film 280 is positioned over the light assembly 270 (i.e., on the side of the light assembly 270 away from the assembly 201). The film 280 protects the light assembly 270 from environmental conditions such as humidity and from mechanical deformation.

Figure 25:
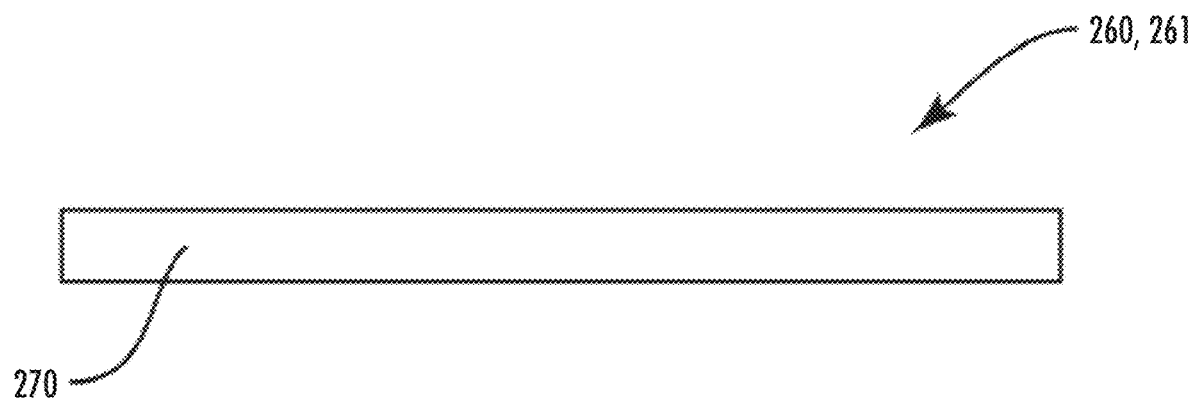
FIG. 25 is a schematic side view of a light panel.

In another example as illustrated in FIG. 25, the light panels 260, 261 include just a light assembly 270 without a film 280. In one example, a protecting member is integral formed within the light assembly 270. The light panels 260, 261 do not require extra diffusers because the array of pixels 271 is a diffused light source having uniform luminance.

In one example, the light assemblies 270 include a heat sink mounted on the inner side towards the housing 201.

Figure 26:
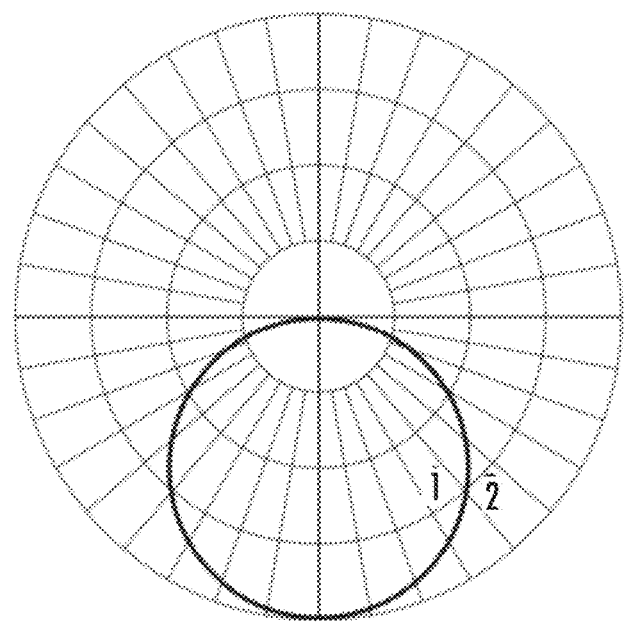
FIG. 26 is an exemplary representation of a simulated candela plot achieved with a light fixture.

FIG. 26 illustrates plots 1, 2 of the intensity curve of the light fixture 200. The first plot 1 illustrates the intensity curve over vertical angles on the plane perpendicular to the longitudinal axis A. The second plot 2 is the intensity curve on the v-angles on the plane perpendicular to the longitudinal axis A. The light fixture 200 further includes a Spacing Criterion along the longitudinal axis and perpendicular axis of 1.3, and along the diagonal of 1.42, along with good Lambertian distribution.

In the various examples, the light fixtures 200 can include one or more communication components forming a part of the light control circuitry, such as an RF antenna that senses RF energy. The communication components may be included, for example, to allow the light fixture 200 to communicate with other light fixtures 200 and/or with an external wireless controller. More generally, the control circuitry includes at least one of a network component, an RF component, a control component, and a sensor. The sensor, such as a knob-shaped sensor, may provide an indication of ambient lighting levels thereto and/or occupancy within the room or illuminated area. Such a sensor may be integrated into the light control circuitry. In various embodiments described herein various smart technologies may be incorporated in the lamps as described in the following United States patent applications "Solid State Lighting Switches and Fixtures Providing Selectively Linked Dimming and Color Control and Methods of Operating," application Ser. No. 13/295,609, filed Nov. 14, 2011, now U.S. Pat. No. 8,736,186, which is incorporated by reference herein in its entirety; "Master/Slave Arrangement for Lighting Fixture Modules," application Ser. No. 13/782,096, filed Mar. 1, 2013, now U.S. Pat. No. 9,572,226, which is incorporated by reference herein in its entirety; "Lighting Fixture for Automated Grouping," application Ser. No. 13/782,022, filed Mar. 1, 2013, now U.S. Pat. No. 9,155,165, which is incorporated by reference herein in its entirety; "Lighting Fixture for Distributed Control," application Ser. No. 13/782,040, filed Mar. 1, 2013, now U.S. Pat. No. 8,975,827, which is incorporated by reference herein in its entirety; "Efficient Routing Tables for Lighting Networks," application Ser. No. 13/782,053, filed Mar. 1, 2013, now U.S. Pat. No. 9,155,166, which is incorporated by reference herein in its entirety; "Handheld Device for Communicating with Lighting Fixtures," application Ser. No. 13/782,068, filed Mar. 1, 2013, now U.S. Pat. No. 9,433,061, which is incorporated by reference herein in its entirety; "Auto Commissioning Lighting Fixture," application Ser. No. 13/782,078, filed Mar. 1, 2013, now U.S. Pat. No. 8,829,821, which is incorporated by reference herein in its entirety; "Commissioning for a Lighting Network," application Ser. No. 13/782,131, filed Mar. 1, 2013, now U.S. Pat. No. 8,912,735, which is incorporated by reference herein in its entirety; "Ambient Light Monitoring in a Lighting Fixture," application Ser. No. 13/838,398, filed Mar. 15, 2013, now U.S. Pat. No. 10,161,612, which is incorporated by reference herein in its entirety; "System, Devices and Methods for Controlling One or More Lights," application Ser. No. 14/052,336, filed Oct. 11, 2013, now U.S. Pat. No. 9,622,321, which is incorporated by reference herein in its entirety; and "Enhanced Network Lighting," Application No. 61/932,058, filed Jan. 27, 2014, which is incorporated by reference herein in its entirety. Additionally, any of the light fixtures described herein can include the smart lighting control technologies disclosed in U.S. Provisional Application Ser. No. 62/292,528, titled "Distributed Lighting Network", filed on Feb. 8, 2016 and assigned to the same assignee as the present application, the entirety of this application being incorporated by reference herein.

In various examples described herein various Circadian-rhythm related technologies may be incorporated in the light fixtures as described in the following: U.S. Pat. Nos. 8,310,143, 10,278,250, 10,412,809, 10,529,900, 10,465,869, 10,451,229, 9,900,957, and 10,502,374, each of which is incorporated by reference herein in its entirety.

The present invention may be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein. Although steps of various processes or methods described herein may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention.

2. Troffer-Style with an Inner Lens

Figure 27A:
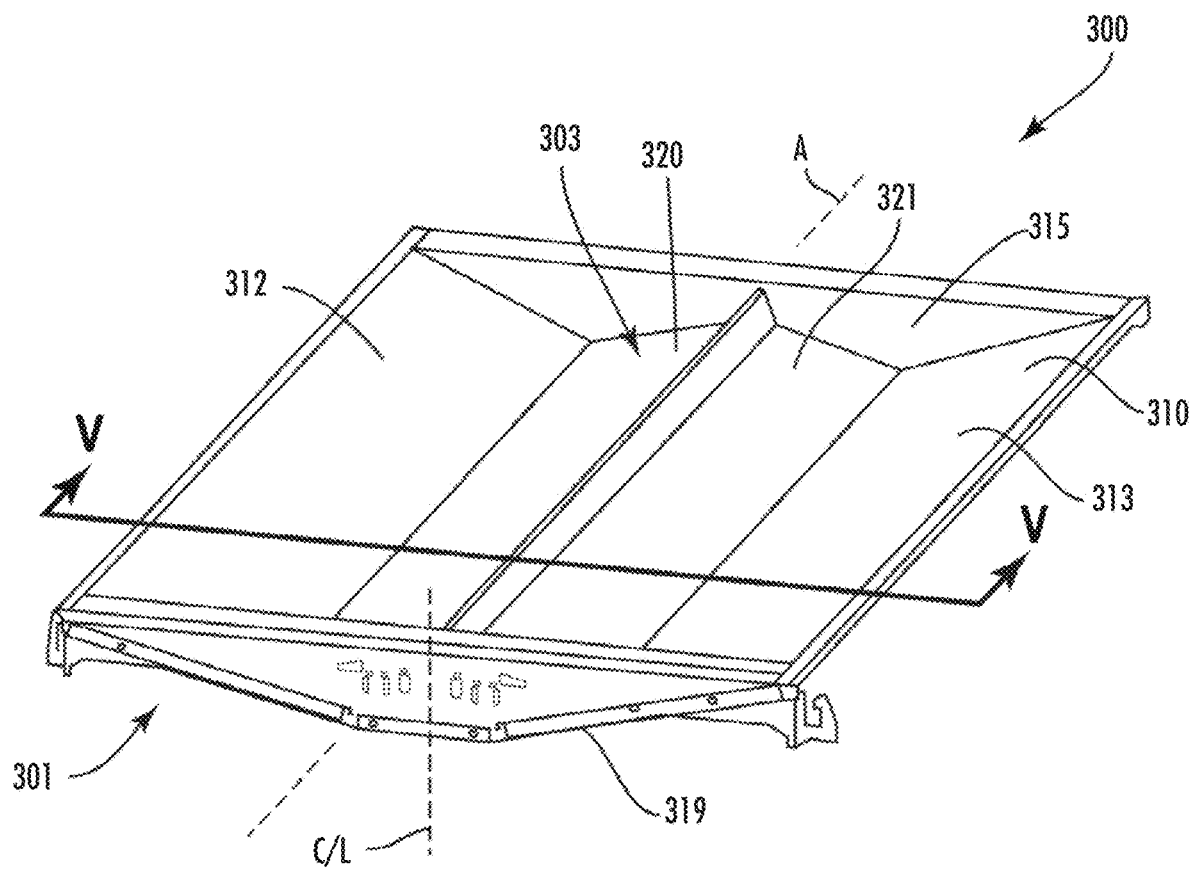
FIG. 27A is a perspective view of a light fixture.
Figure 27B:
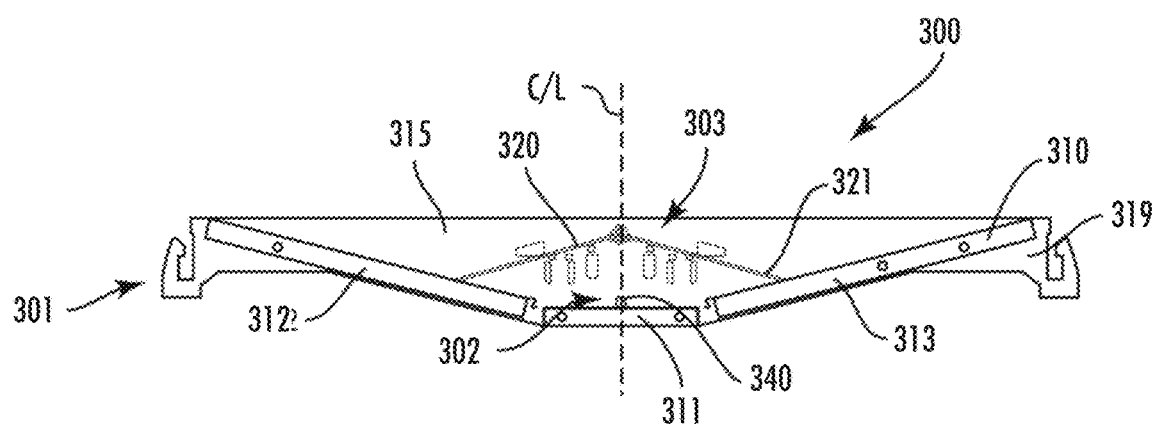
FIG. 27B is a schematic section view cut along line V-V of FIG. 27A.

FIGS. 27A and 27B illustrate a troffer light fixture 300 (hereinafter light fixture). The light fixture 300 generally includes a housing 301, an LED assembly 302, a lens assembly 303, and an inner lens 340.

The housing 301 extends around the exterior of the light fixture 300 and is configured to mount or otherwise be attached to a support. The light fixture 300 includes a longitudinal axis A that extends along the length. A width is measured perpendicular to the longitudinal axis A. As illustrated in FIG. 27B, when viewed from the end, a centerline C/L extends through the light fixture 300 and divides the light fixture 300 into first and second lateral sections. The light fixture 300 can have a variety of different sizes, including standard troffer fixture sizes, such as but not limited to 2 feet by 4 feet (2'×4'), 1 foot by 4 feet (1'×4'), or 2 feet by 2 feet (2'×2'). However, it is understood that the elements of the light fixture 300 may have different dimensions and can be customized to fit most any desired fixture dimension.

FIG. 27A illustrates the light fixture 300 in an inverted configuration. In some examples, the light fixture 300 is mounted on a ceiling or other elevated position to direct light vertically downward onto the target area. The light fixture 300 may be mounted within a T grid by being placed on the supports of the T grid. In other examples, additional attachments, such as tethers, may be included to stabilize the fixture in case of earthquakes or other disturbances. In other embodiments, the light fixture 300 may be suspended by cables, recessed into a ceiling or mounted on another support structure.

The housing 301 includes a back pan 310 with end caps 315 secured at each end. The back pan 310 and end caps 315 form a recessed pan style troffer housing defining an interior space for receiving the LED assembly 302. In one example, the back pan 310 includes three separate sections including a center section 311, a first wing 312, and a second wing 313. In one example, each of the center section 311, first wing 312, second wing 313, and end caps 315 are made of multiple sheet metal components secured together. In another example, the back pan 310 is made of a single piece of sheet material that is attached to the end caps 315. In another example, the back pan 310 and end caps 315 are made from a single piece of sheet metal formed into the desired shape. In examples with multiple pieces, the pieces are connected together in various manners, including but not limited to mechanical fasteners and welding.

Figure 28:
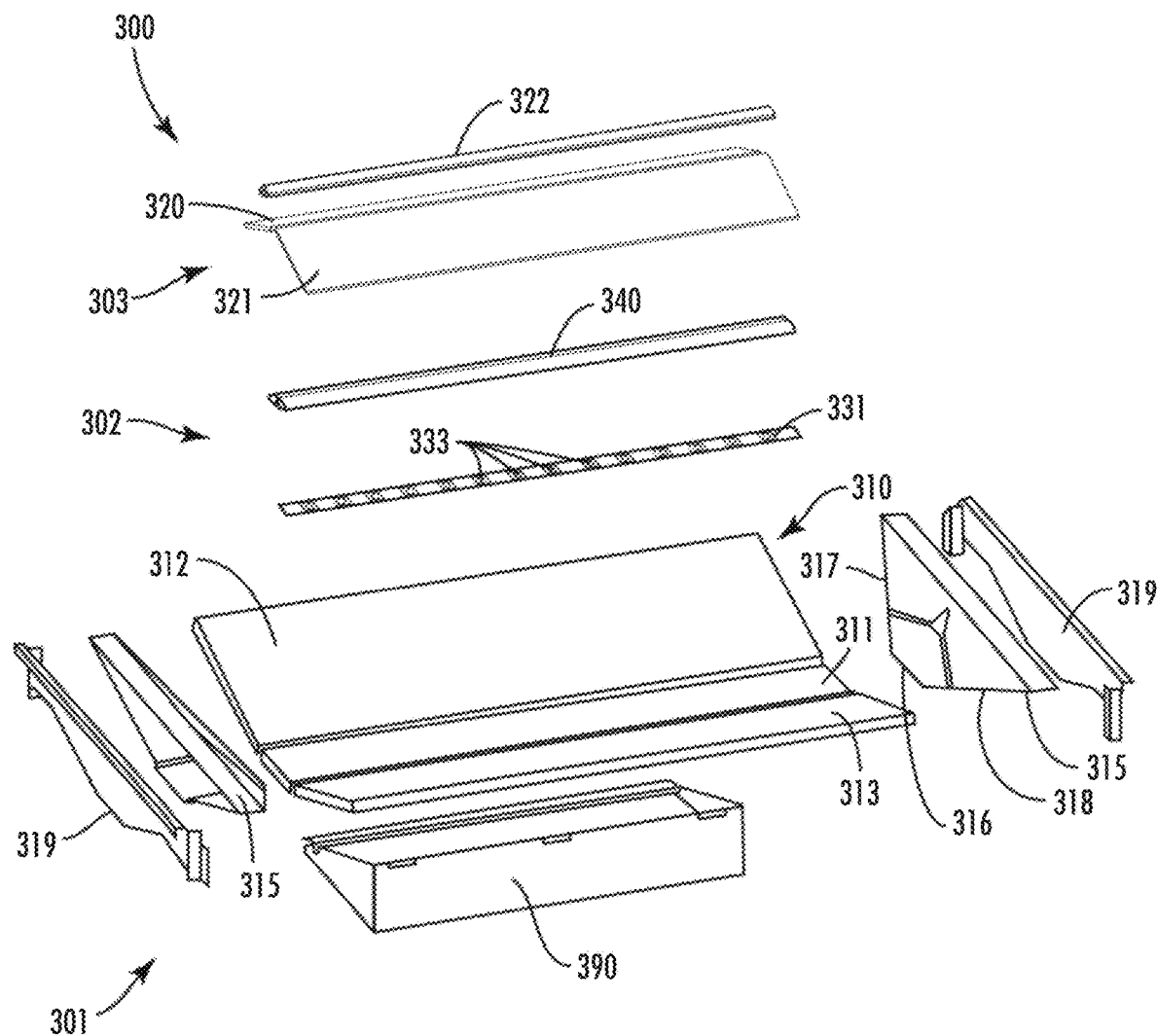
FIG. 28 is an exploded view of a light fixture.

As illustrated in FIG. 28, outer support members 319 can extend over and are connected to the outer sides of the end caps 315. In another example, the housing 301 includes the back pan 310, but does not include end caps 315.

The exposed surfaces of the back pan 310 and end caps 315 may be made of or coated with a reflective metal, plastic, or white material. One suitable metal material to be used for the reflective surfaces of the panels is aluminum (Al). The reflective surfaces may also include diffusing components if desired. For many lighting applications, it is desirable to present a uniform, soft light source without unpleasant glare, color striping, or hot spots. Thus, one or more sections of the housing 301 can be coated with a reflective material, such as a microcellular polyethylene terephthalate (MCPET) material or a DuPont/WhiteOptics material, for example. Other white diffuse reflective materials can also be used. One or more sections of the housing 301 may also include a diffuse white coating.

Figure 29A:
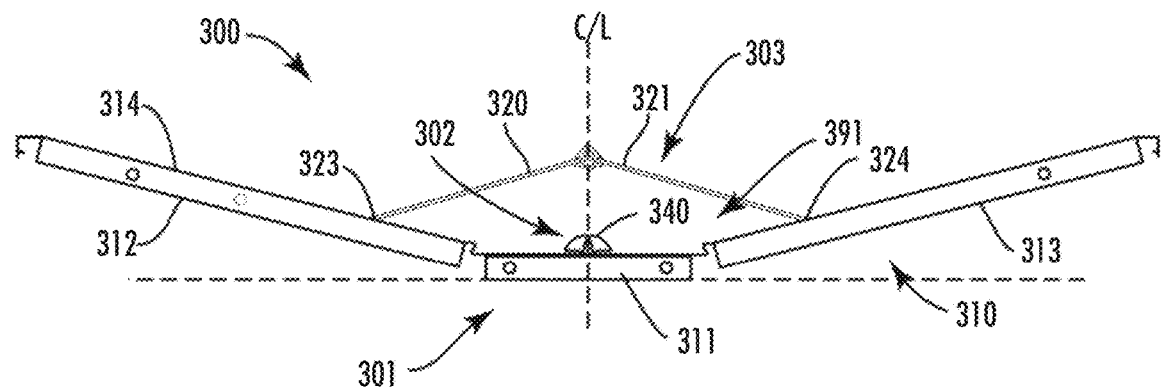
FIG. 29A is a side schematic view of a housing, LED assembly, inner lens, and lens assembly of a light fixture.
Figure 29B:
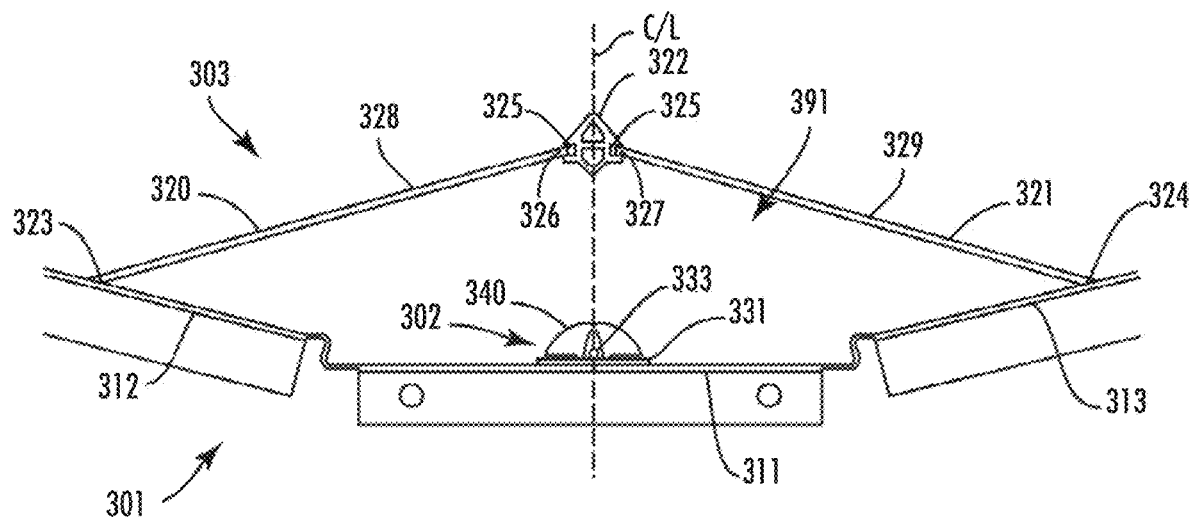
FIG. 29B is a partial side schematic view of a housing, LED assembly, inner lens, and lens assembly of a light fixture.

A lens assembly 303 is attached to the housing 301. The lens assembly 303 includes a pair of flat fixture lenses 320, 321. As illustrated in FIGS. 29A and 29B, an outer end 323 of lens 320 is positioned at the first wing 312 of the back pan 310 and an outer end 324 of lens 321 is positioned at the second wing 313. In one example, the outer ends 323, 324 abut against the respective wings 312, 313, and can be connected by one or more of mechanical fasteners and adhesives. In another example, the outer ends 323, 324 are spaced away from the respective wings 312, 313.

A connector 322 is positioned between and connects together the lenses 320, 321. The connector 322 includes slots 325 that receive the inner ends 326, 327 respectively of the lenses 320, 321. The connector 322 is positioned along the centerline C/L. In one example, the connector 322 is centered on the centerline C/L.

In one example, each lens 320, 321 is a single piece. In other examples, one or both lenses 320, 321 are constructed from two or more pieces. The lenses 320, 321 can be constructed from various materials, including but not limited to plastic, such as extruded plastic, and glass. In one example, the entire lenses 320, 321 are light transmissive and diffusive. In one example, one or more sections of the lenses 320, 321 are clear. The outer surfaces 328, 329 of the lenses 320, 321 may be uniform or may have different features and diffusion levels. In another example, one or more sections of one or more of the lenses 320, 321 is more diffuse than the remainder of the lens 320, 321.

In one example, each of the lenses 320, 321 are flat with a constant thickness across the length and width. In other examples, one or both the lenses 320, 321 include variable thicknesses. In one example, each of the lenses 320, 321 is identical thus allowing a single part to function as either section and reduce the number of separate components in the design of the light fixture 300.

The housing 301 and lens assembly 302 form an interior space 391 that houses the LED assembly 302 and inner lens 340. The interior space 391 may be sealed to protect the LED assembly 302 and inner lens 340 and prevent the ingress of water and/or debris.

The LED assembly 302 includes LED elements 333 aligned in an elongated manner that extends along the back pan 310. In one example, the LED assembly 302 extends the entire length of the back pan 310 between the end caps 315. In another example, the LED assembly 302 extends a lesser distance and is spaced away from one or both of the end caps 315. In one example, the LED assembly 302 is aligned with the longitudinal axis A (FIG. 27A) of the light fixture 300 and is mounted to the center section 311 of the back pan 310.

Figure 30A:
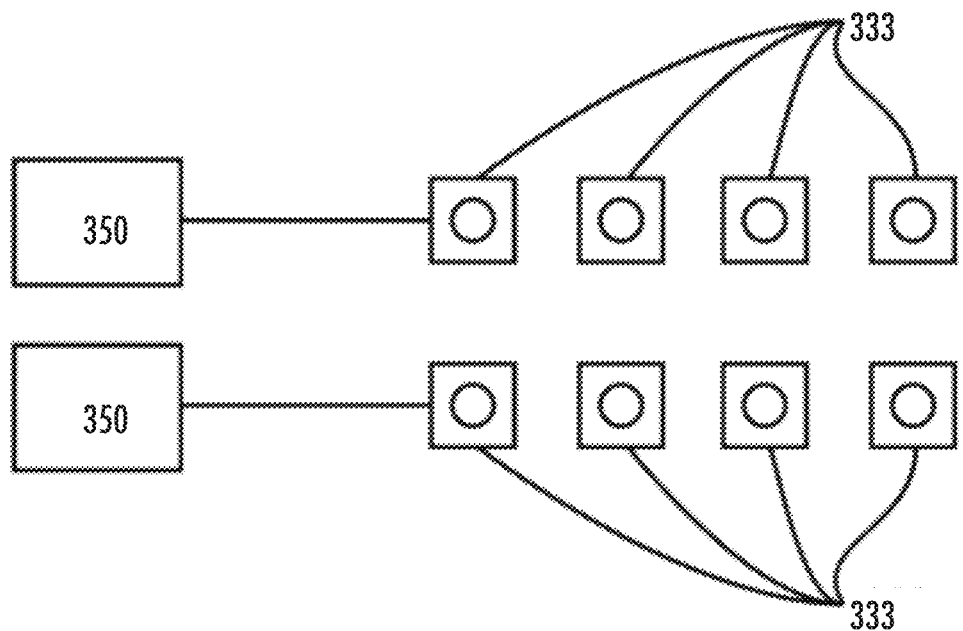
FIG. 30A is a schematic diagram of multiple driver circuits that operate LED elements.

The LED assembly 302 includes the LED elements 333 and a substrate 331. The LED elements 333 can be arranged in a variety of different arrangements. In one example as illustrated in FIG. 28, the LED elements 333 are aligned in a single row. In another example as illustrated in FIG. 30A, the LED elements 333 are aligned in two or more rows. The LED elements 333 can be arranged at various spacings. In one example, the LED elements 333 are equally spaced along the length of the back pan 310. In another example, the LED elements 333 are arranged in clusters at different spacings along the back pan 310.

The LED assembly 302 can include various LED elements 333. In the various examples, the LED assembly 302 can include the same or different LED elements 333. In one example, the multiple LED elements 333 are similarly colored (e.g., all warm white LED elements 333). In such an example all of the LED elements are intended to emit at a similar targeted wavelength; however, in practice there may be some variation in the emitted color of each of the LED elements 333 such that the LED elements 333 may be selected such that light emitted by the LED elements 333 is balanced such that the light fixture 300 emits light at the desired color point.

In one example, each LED element 333 is a single white or other color LED chip or other bare component. In another example, each LED element 333 includes multiple LEDs either mounted separately or together. In the various embodiments, the LED elements 333 can include, for example, at least one phosphor-coated LED either alone or in combination with at least one color LED, such as a green LED, a yellow LED, a red LED, etc.

In various examples, the LED elements 333 of similar and/or different colors may be selected to achieve a desired color point.

In one example, the LED assembly 302 includes different LED elements 333. Examples include blue-shifted-yellow LED elements ("BSY") and a single red LED elements ("R"). Once properly mixed the resultant output light will have a "warm white" appearance. Another example uses a series of clusters having three BSY LED elements 333 and a single red LED element 333. This scheme will also yield a warm white output when sufficiently mixed. Another example uses a series of clusters having two BSY LED elements 333 and two red LED elements 333. This scheme will also yield a warm white output when sufficiently mixed. In other examples, separate blue-shifted-yellow LED elements 333 and a green LED element 333 and/or blue-shifted-red LED element 333 and a green LED element 333 are used. Details of suitable arrangements of the LED elements 333 and electronics for use in the light fixture 300 are disclosed in U.S. Pat. No. 9,786,639, which is incorporated by reference herein in its entirety.

The LED assembly 302 includes a substrate 331 that supports and positions the LED elements 333. The substrate 331 can include various configurations, including but not limited to a printed circuit board and a flexible circuit board. The substrate 331 can include various shapes and sizes depending upon the number and arrangement of the LED elements 333.

As illustrated in FIG. 29B, the LED assembly 302 is centered along the centerline C/L of the light fixture 300. The connector 322 positioned between the lenses 320, 321 is also positioned along the centerline C/L. The centerline C/L also extends through the center of the back pan 310 which can include the center of the center section 311.

Each LED element 333 receives power from an LED driver circuit or power supply of suitable type, such as a SEPIC-type power converter and/or other power conversion circuits. At the most basic level a driver circuit 350 may comprise an AC to DC converter, a DC to DC converter, or both. In one example, the driver circuit 350 comprises an AC to DC converter and a DC to DC converter. In another example, the AC to DC conversion is done remotely (i.e., outside the fixture), and the DC to DC conversion is done at the driver circuit 350 locally at the light fixture 300. In yet another example, only AC to DC conversion is done at the driver circuit 350 at the light fixture 300. Some of the electronic circuitry for powering the LED elements 333 such as the driver and power supply and other control circuitry may be contained as part of the LED assembly 302 or the electronics may be supported separately from the LED assembly 330.

In one example, a single driver circuit 350 is operatively connected to the LED elements 333. In another example as illustrated in FIG. 30A, two or more driver circuits 350 are connected to the LED elements 333.

Figure 30B:
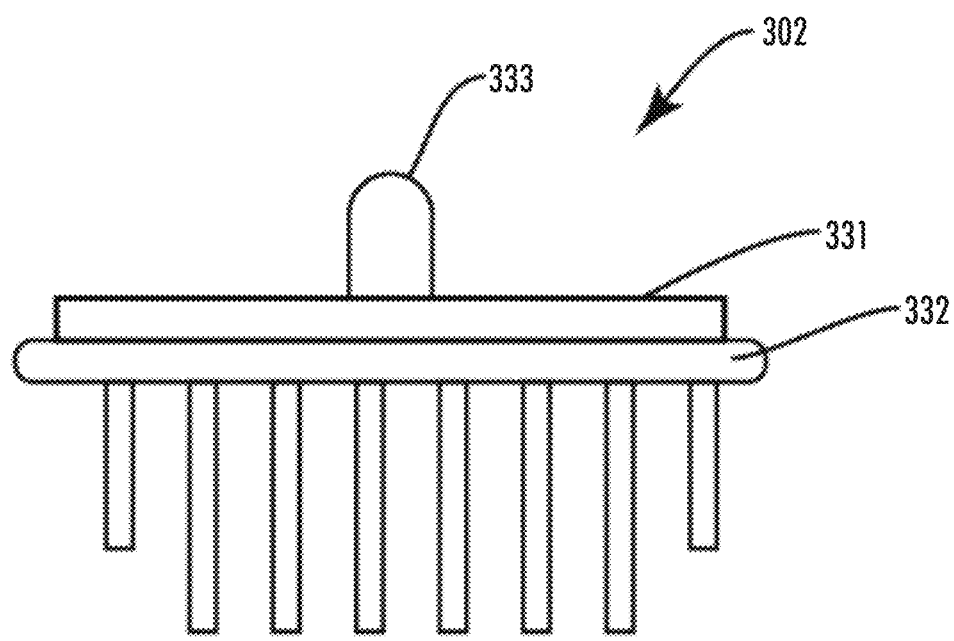
FIG. 30B is a side schematic diagram of an LED assembly mounted to a heat sink.

In one example as illustrated in FIG. 30B, the LED assembly 302 is mounted on a heat sink 332 that transfers away heat generated by the one or more LED elements 333. The heat sink 332 provides a surface that contacts against and supports the substrate 331. The heat sink 332 further includes one or more fins for dissipating the heat. The heat sink 332 cools the one or more LED elements 333 allowing for operation at desired temperature levels. It should be understood that FIG. 30B provides an example only of the heatsink 332 as many different heatsink structures could be used with an embodiment of the present invention.

In one example, the substrate 331 is attached directly to the housing 301. In one specific example, the substrate 331 is attached to the back pan 310. The substrate 331 can be attached to the center section 311, or to one of the first and second wings 312, 313. The attachment provides for the LED assembly 302 to be thermally coupled to the housing 301. The thermal coupling provides for heat produced by the LED elements 333 to be transferred to and dissipated through the housing 301.

As illustrated in FIG. 28, a control box 390 is attached to the housing 301. In one example, the control box 390 is attached to the underside of the second wing 313. The control box 390 can also be positioned at other locations. The control box 390 extends around and forms an enclosed interior space configured to shield and isolate various electrical components. In one example, one or more driver circuits 350 are housed within the control box 390. Electronic components within the control box 390 may be shielded and isolated.

Examples of troffer light fixtures with a housing 301 and LED assembly 302 are disclosed in: U.S. Pat. Nos. 10,508,794, 10,247,372, and 10,203,088 each of which is hereby incorporated by reference in their entirety.

An inner lens 340 is positioned in the interior space 391 and over the LED elements 333. In one example, the inner lens 340 extends the entirety of the back pan 310. In another example, the inner lens 340 is positioned inward from one or both ends of the back pan 310.

Figure 31:
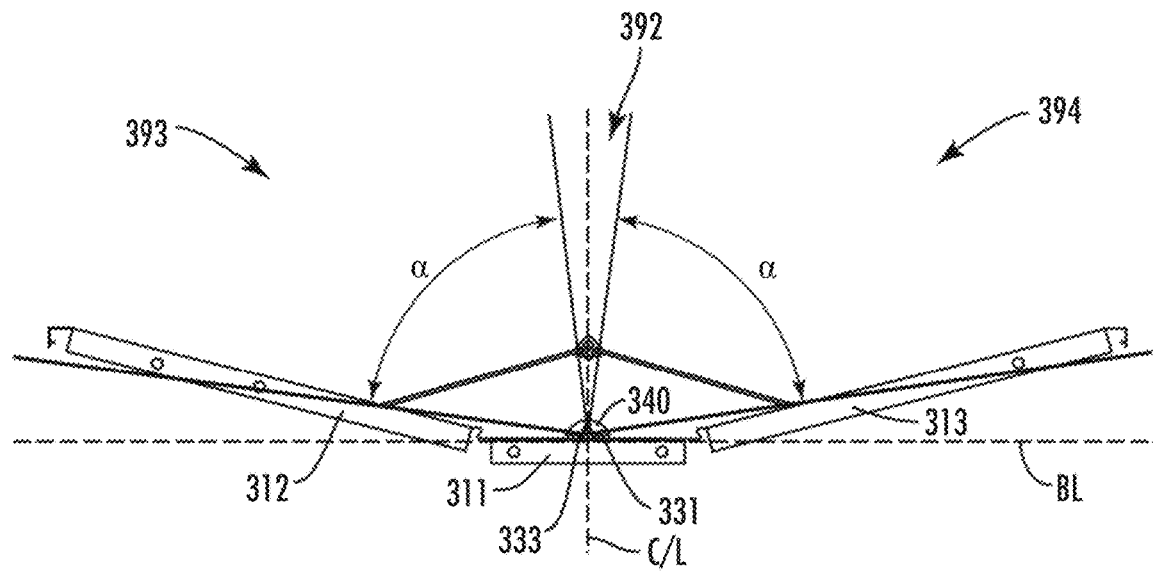
FIG. 31 is a schematic diagram of a light fixture that distributes light into lateral light zones and away from a center zone.

As illustrated in FIG. 31, the inner lens 340 directs the light from the LED elements 333 away from a center zone 392 along the centerline C/L and into lateral light zones 393, 394. The centerline C/L lies in a plane that bisects the light fixture 300 along the width and divides the light fixture 300 into first and second lateral sections. The centerline C/L extends through the connector 322 that connects together the inner ends 326, 327 of the fixture lenses 320, 321. The center zone 392 is centered on the centerline C/L. In one example, the center zone 392 extends 10° on each side of the centerline C/L (i.e., +/−10°). In another example, the center zone 392 is smaller (e.g., extends about 5° on each side of the centerline C/L). In another example, the center zone 392 is larger (e.g., extends about 15° on each side of the centerline C/L). In the various examples, the center zone 392 is centered on the centerline C/L and extends outward an equal amount on each lateral side.

The light zones 393, 394 are positioned on opposing lateral sides of the center zone 392. Light zone 393 extends between the center zone 392 and the first wing 312 of the back pan 310. Light zone 394 extends between the center zone 392 and the second wing 313 of the back pan 310. The light zones 393, 394 have equal sizes and are defined by the angle α formed between the respective edge of the center zone 392 and respective first and second wings 312, 313. In one example, the angle α is about 72°. Light zones 393, 394 can be larger or smaller depending upon the size of the center zone 392 and/or angular orientation of the first and second wings 312, 313.

A baseline BL lies in a plane that is perpendicular to the plane of the centerline C/L. In one example, the baseline BL extends along the surface of the substrate 331. In another example, the baseline BL is aligned along a bottom edge of the inner lens 40. In one example, the top surfaces of the first and second wings 312, 313 are each aligned at an angle of between about 5°-15° with the baseline BL. In one specific embodiment, the first and second wings 312, 313 are aligned at an angle of about 8° with the baseline BL.

The inner lens 340 provides for light rays to illuminate both light zones 393, 394 and provide for uniform luminance. The inner lens 340 provides for symmetrical lighting within both light zones 393, 394. In one example, the inners lens 340 provides for no light to be distributed into the center zone 392. In another example, a limited amount of light may be transmitted into the center zone 392.

Figure 32:
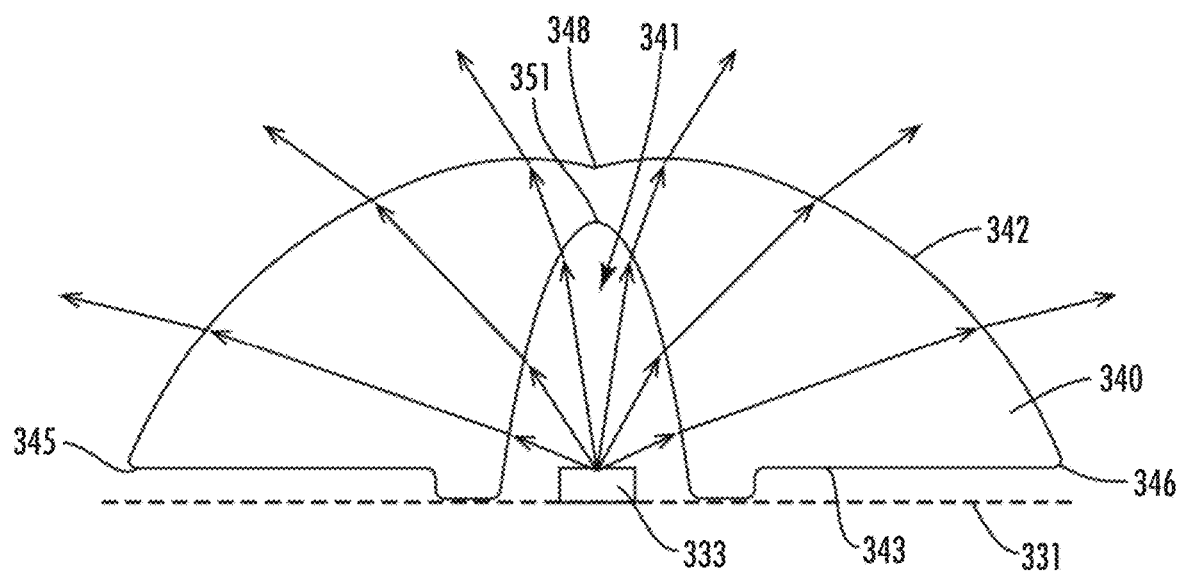
FIG. 32 is a schematic diagram of light rays distributed through an inner lens.

FIG. 32 illustrates an inner lens 340 that includes a cavity 341 that extends the length of the inner lens 340 and is positioned over the LED elements 333. The inner lens 340 also includes an outer surface 342 spaced on the opposing surface away from the cavity 341. A bottom edge 343 extends along the bottom of the inner lens 340. The bottom edge 343 can include various shapes that can be flat or uneven (as illustrated in FIG. 32).

The inner lens 340 includes an elongated shape along a first axis to extend along the back pan 310. The inner lens 340 is a diverging cylindrical lens. That is, the inner lens 340 is cylindrical lens along a first axis (e.g., along the length or y-axis) and a diverging lens (or negative lens) in a second axis (e.g., an x-axis) as illustrated in FIG. 32.

The inner lens 340 is a negative lens that diverges light along the axis that is perpendicular to the centerline C/L as the inner lens 340 is assembled. The light rays are refracted on the steep inner surface of the cavity 341 and then pass through the lens 340 and are further refracted for wide distribution. The inner lens 340 transfers the light rays outward in wide angles without overlap. This enables the light to have a smooth distribution without shadows or hotspots. The inner lens 340 is shaped with the lens thickness gradually and symmetrically increasing from the center (at a peak 351 of the cavity 341) to each lateral end 345, 346. The surfaces of the cavity 341 and outer surface 342 have slowly varying curvatures so that light can be uniformly distributed on the whole target surface. The slowly varying curvature may diminish shadows or hot spots which may be generated on the fixture lenses 320, 321.

In one example, the inner lens 340 has no total internal reflection portions on the whole outer surface 342. Instead, light rays are refracted smoothly and sequentially without shadows or hot spots.

The cavity 341 has a steep but smooth surface for light coupling so that light rays are refracted towards the inside of the inner lens 340 in wide angles to help in shaping the wide light distribution. The slowly varying surface enables smooth and sequential light refraction and wide distribution without interactions among light rays to form uniform luminance in the target area.

As illustrated in FIG. 32, the cavity 341 includes a peak 351. The peak 351 is located at the center of the cavity 341. The outer surface 342 can include a dimple 348. In one example, the peak 351 and the dimple 348 are both aligned with the centerline C/L. A straight line that extends through the peak 351 and the dimple 348 divides the inner lens 340 into two sections that have equal shapes and sizes. The inner lens 340 is symmetrical about the line. A thickness of the inner lens 340 is measured between the cavity 341 and the outer surface 342. The minimum thickness is located along the line.

Figure 33A:
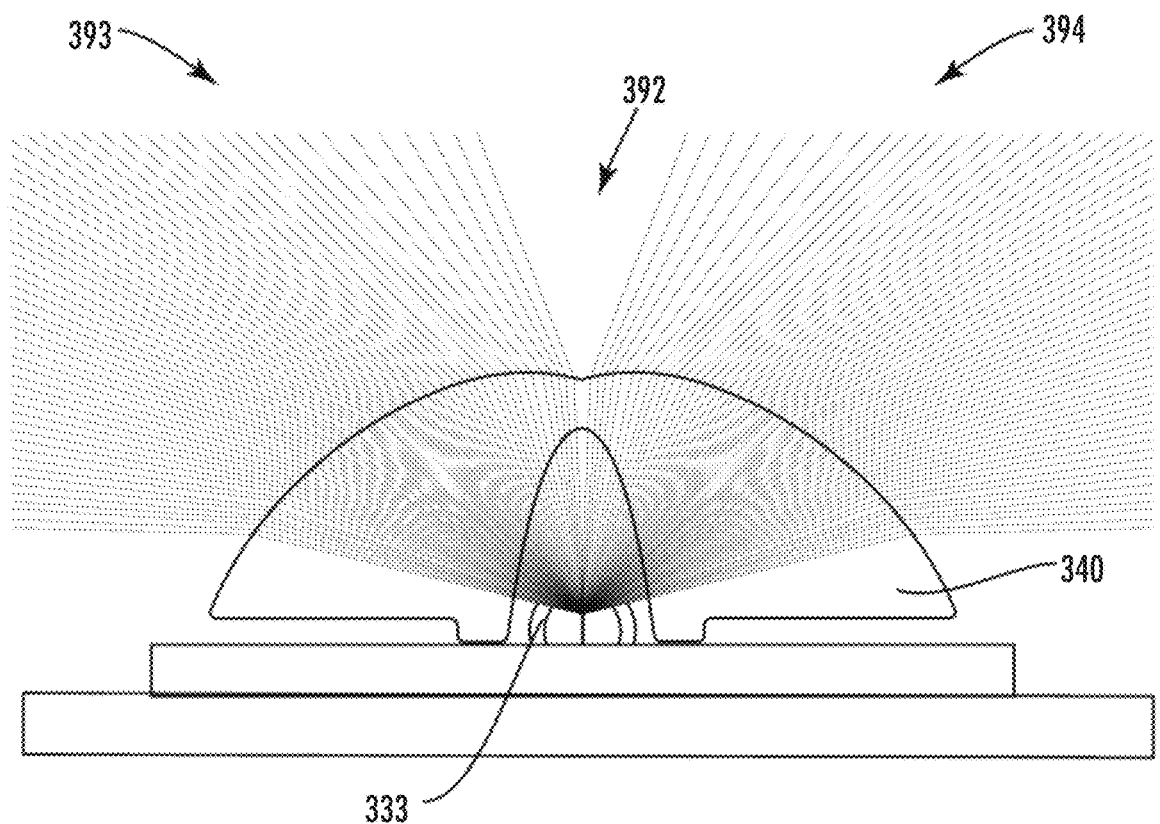
FIG. 33A is schematic diagram of a ray fan of light rays propagating through and from an inner lens.

FIG. 33A illustrates a ray fan of light rays propagating through and from the inner lens 340. The inner lens 340 smoothly distributes the light rays without interaction into the light zones 393, 394. The light rays distributed within the light zones 393, 394 are greater at wide angles towards the outer edges than at more narrow angles towards the edges at the center zone 392. In one example, the light rays are divided into increasing outgoing angular spacing sequentially from the lower to the upper side. The same light distribution is obtained in both light zones 393, 394 as the inner lens 340 provides for symmetrical light distribution within each of the light zones 393, 394. The ray fan illustrates that the light rays have equal incident angular spacing with the light rays divided symmetrically and sequentially. The center zone 392 includes no light rays as the inner lens 340 blocks light rays from entering this zone.

Figure 33B:
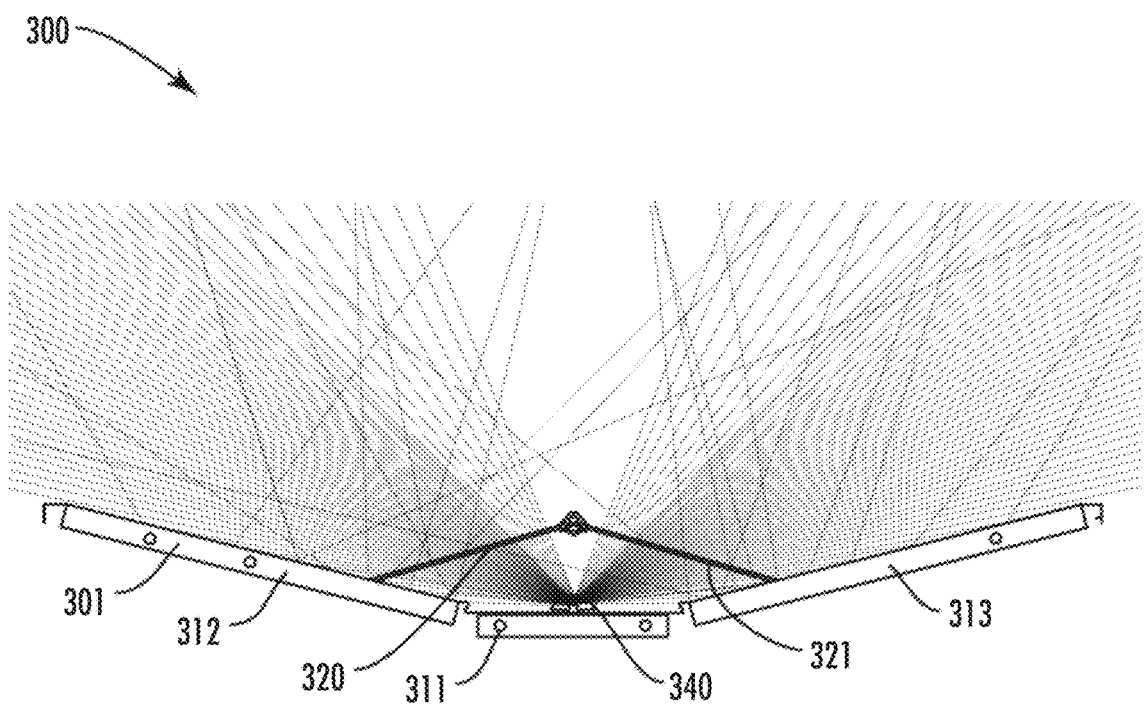
FIG. 33B is a schematic diagram of distribution of light rays from a light fixture.

FIG. 33B illustrates a distribution of light rays from the light fixture 300. A majority of the light is distributed outward from the inner lens 340 into the light zones 393, 394 without reflecting from the housing 301. Some portion of the light is reflected from the housing 301. The light from the inner lens 340 forms a wide luminance pattern that substantially fills each of the fixture lenses 320, 321. These fixture lenses 320, 321 are substantially illuminated across their widths. In one example, some light may enter the center zone 392 because individual LED elements 333 are extended sources and each has the strongest intensity in the center zone 392.

The light fixture 300 includes a single inner lens 340. The inner lens 340 can include various design features. In the various examples, the inner lens 340 is designed to diverge light (i.e., a negative lens) along one axis and to symmetrically distribute the light into two sides. The inner lens 340 can be constructed from a variety of materials, including but not limited to acrylic, transparent plastics, and glass. FIGS. 34A-37B illustrate different examples of an inner lens 340 that can be used in the light fixture 300. Each includes different aspects that affect the light distribution.

a. Inner Lens 1

FIGS. 34A and 34B illustrate a first inner lens 340. The inner cavity 341 includes a steep shape with a peak aligned along the centerline C/L. The outer surface 342 includes a continuous shape that extends between the lateral ends 345, 346. In one example, the radius of the outer surface 342 is about 11.85 mm. The bottom edge 343 includes a pair of projections 344 on opposing sides of the inner cavity 341. The sections 347 that extend between the projections 344 and lateral sections beyond the projections 344 to the ends 345, 346 are co-planar. In one example, the sections 347 are parallel with the baseline BL (and perpendicular to the centerline C/L). The inner lens 340 includes a width measured between the lateral ends 345, 346 of about 22.1 mm and a height at the cavity 341 measured along the centerline C/L of about 8.1 mm. The inner lens 340 is symmetrical about a straight line that extends between the peak 351 and the dimple 348.

b. Inner Lens 2

FIGS. 35A and 35B illustrate a second inner lens 340. The inner lens 340 is symmetrical about a straight line that extends between the peak 351 and the dimple 348. The inner cavity 341 includes a steep shape with a peak 351 aligned along the centerline C/L. The outer surface 342 includes the dimple 348 at the centerline C/L. The dimple 348 divides the outer surface 342 into first and second lateral sections 342a, 342b. The first lateral section 342a extends between the lateral end 345 and the dimple 348. The second lateral section 342b extends between the lateral end 346 and the dimple 348. In one example, the radius of each of the lateral sections 342a, 342b is about 11.85 mm from the respective lateral edge 345, 346 to a point prior to the start of the dimple 348. The bottom edge 343 includes a pair of projections 344 on opposing sides of the inner cavity 341. The sections 347 that extend between the projections 344 and lateral ends 345, 346 are co-planar. In one example, the sections 347 are parallel with the baseline BL (and perpendicular to the centerline C/L). The inner lens 340 includes a width measured between the lateral ends 345, 346 of about 22.1 mm and a height at the cavity 341 measured along the centerline C/L of about 8.0 mm.

c. Inner Lens 3

FIGS. 36A and 36B illustrate a third inner lens 340. The inner lens 340 is symmetrical about a straight line that extends between the peak 351 and the dimple 348. The inner cavity 341 includes a wider shape than the first and second inner lenses (i.e., FIGS. 34A, 34B, 35A, 35B). The peak 351 is positioned on the centerline C/L and is flatter than those of the first and second inner lenses. The outer surface 342 includes first and second sections 342a, 342b that meet at the dimple 348 that is positioned on the centerline C/L. The depth of the dimple 348 measured from the upper extent of the first and second sections 342a, 342b is deeper than the second inner lens. The bottom edge 343 includes a pair of projections 344 and sections 347 that extend outward to the lateral ends 345, 346. The sections 347 are positioned at an acute angle β relative to the baseline BL (that is perpendicular to the centerline C/L). The inner lens 340 includes a width measured between the lateral ends 345, 346 of about 22.7 mm and a height at the cavity 341 measured along the centerline C/L of about 8.8 mm.

d. Inner Lens 4

FIGS. 37A and 37B illustrate a fourth inner lens 340. The fourth inner lens 340 includes a cavity 341 with a steeper shape than the third inner lens. The inner lens 340 is symmetrical about a straight line that extends between the peak 351 and the dimple 348. In one example, the cavity 341 includes the same shape and size as the cavities 341 of the first and second inner lenses (i.e., FIGS. 34A, 34B, 35A, 35B). The outer surface 342 includes first and second sections 342a, 342b that meet at the dimple 348. The first and second sections 342a, 342b are wider than the corresponding first and second sections 342a, 342b of the third inner lens. The width of the inner lens 340 is about 23.7 mm measured between the lateral ends 345, 346. The height of the inner lens 340 measured at the centerline C/L is about 8.7 mm. The bottom edge 343 includes projections 344 and bottom sections 347. The bottom sections 347 are aligned in a plane that is parallel to the baseline BL (that is perpendicular to the centerline C/L).

The inner lenses 340 include three features. A first feature is the dimple 348 that is symmetrical about the centerline C/L. The dimple 348 divides the light into outer directions for distribution in the light zones 393, 394 and blocks light in the center zone 392. A second feature is the symmetrical surface of the cavity 341 about the centerline C/L. A third feature is the symmetrical surface of the outer surface 342 about the centerline C/L. The second and third features enable light rays to be refracted in further wide angles. The surfaces of the inner lens 340 provide for normal refraction without total internal reflection in which the incident angle is less than the critical angle (e.g., about 42° for acrylic).

Figure 38A:
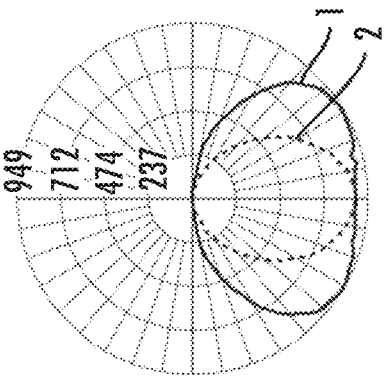
FIG. 38A is an exemplary representation of a simulated candela plot achieved with the first inner lens as in FIG. 34A with first and second plots with the first plot illustrating the intensity in a plane perpendicular to the longitudinal axis and the second plot in a plane along the longitudinal axis.
Figure 38B:
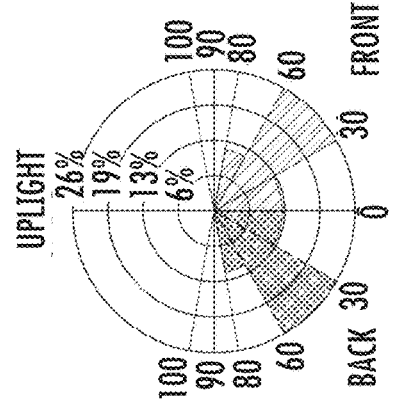
FIG. 38B illustrate luminous flux distribution patterns for a light fixture with a first inner lens as in FIG. 34A.
Figure 39A:
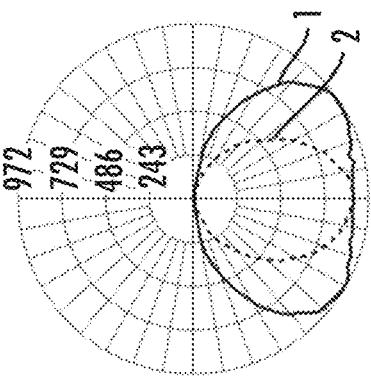
FIG. 39A is an exemplary representation of a simulated candela plot achieved with the second inner lens as in FIG. 35A with first and second plots with the first plot illustrating the intensity in a plane perpendicular to the longitudinal axis and the second plot in a plane along the longitudinal axis.
Figure 39B:
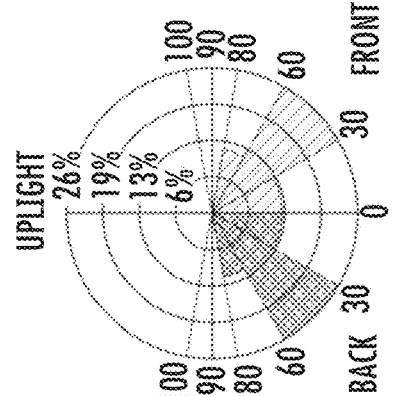
FIG. 39B illustrate luminous flux distribution patterns for a light fixture with a second inner lens as in FIG. 35A.
Figure 40A:
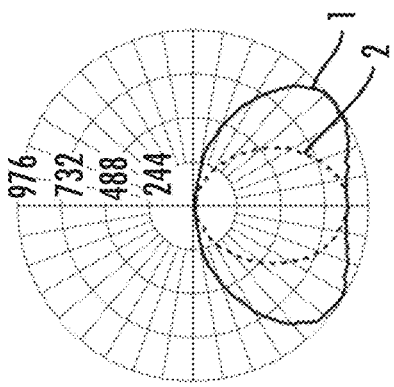
FIG. 40A is an exemplary representation of a simulated candela plot achieved with the third inner lens as in FIG. 36A with first and second plots with the first plot illustrating the intensity in a plane perpendicular to the longitudinal axis and the second plot in a plane along the longitudinal axis.
Figure 40B:
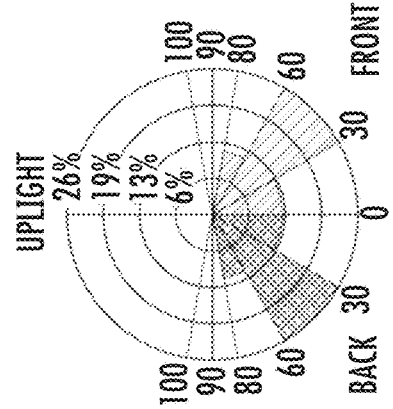
FIG. 40B illustrates luminous flux distribution patterns for a light fixture with a third inner lens as in FIG. 36A.
Figure 41A:
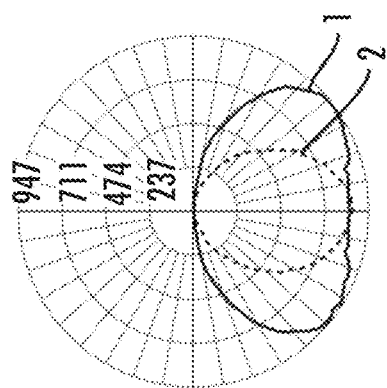
FIG. 41A is an exemplary representation of a simulated candela plot achieved with the fourth inner lens as in FIG. 37A with first and second plots with the first plot illustrating the intensity in a plane perpendicular to the longitudinal axis and the second plot in a plane along the longitudinal axis.
Figure 41B:
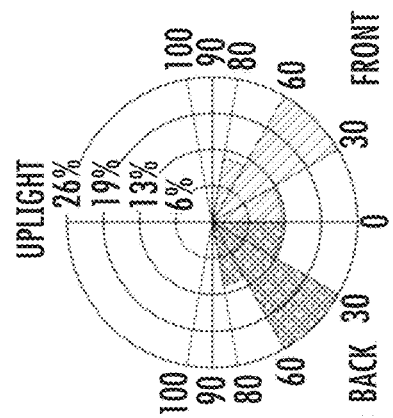
FIG. 41B illustrates luminous flux distribution patterns for a light fixture with a fourth inner lens as in FIG. 37A.

Intensity and luminous flux distribution patterns are illustrated in FIGS. 38A-41B for the four different options for the inner lens 340. FIGS. 38A and 38B include the light distribution for a light fixture 300 with the first inner lens 340 (see FIGS. 34A and 34B). FIGS. 39A and 39B include the light distribution for a light fixture 300 with the second inner lens 340 (see FIGS. 35A and 35B). FIGS. 40A and 40B include the light distribution for a light fixture 300 with the third inner lens 340 (see FIGS. 36A and 36B). FIGS. 41A and 41B include the light distribution for a light fixture 300 with the fourth inner lens 340 (see FIGS. 37A and 37B).

Each of FIGS. 38A, 39A, 40A, and 41A illustrate two separate plots. The first plot 1 illustrates the intensity curve over vertical angles on the plane perpendicular to the longitudinal axis A. The second plot 2 is the intensity curve on the v-angles on the plane (parallel plane) along the longitudinal axis A. The longitudinal axis A is the axis along lined LED elements 333, the perpendicular plane is crossed to the longitudinal axis A. The parallel plane is along the longitudinal axis A. In other words, the perpendicular plane is the vertical plane crossing the longitudinal axis, or 90°-270° and parallel plane is the one along the longitudinal axis, or 0°-180°.

FIG. 38A further includes a Spacing Criterion (SC) and an optical efficiency (OE). The SC shows how much light can be distributed widely to make uniform at a given mounting height (i.e., it is the ratio of luminaires spacing to mounting height). The SC along the y-axis is 1.12 and the SC along the x-axis if 1.60. The OE is 84%.

FIG. 39A includes an SC along the y-axis of 1.12 and along the x-axis of 1.64, and an OE of 86%.

FIG. 40A includes an SC along the y-axis of 1.14 and along the x-axis of 1.74. The OE is 85%.

FIG. 41A includes an SC along the y-axis of 1.16 and along the x-axis of 1.68. The OE is 85%.

FIGS. 38B, 39B, 40B, and 41B illustrate the Luminaire Classification System (LCS). The LCS illustrates lumens distribution over angles as % of total fixture lumens. Each of the inner lenses 340 were measured for FL is front low (angle), FM is front medium angle, FH is front high angle, FVH is front very high angle, BL is back low angle, BM is back medium angle, BH is back high angle, UL is uplight low angle, and UH is uplight high angle. For these measurement, low is between 0-30°, medium is between 30-60°, high is between 60-80°, and very high is between 80-90°, uplight low is between 90-100°, and uplight high is between 100-180°.

The first inner lens 340 (FIG. 38B) includes the following: FL=12.7%; FM=25.8%; FH=10.6%; FVH=1.0%; BL=12.7%; BM=25.8%; BH=10.6%; BVH=1.0%; UL=0.0%; and UH=0.0%.

The second inner lens 340 (FIG. 39B) includes the following: FL=12.5%; FM=25.9%; FH=10.6%; FVH=1.0%; BL=12.5%; BM=25.9%; BH=10.6%; BVH=1.0%; UL=0.0%; and UH=0.0%.

The third inner lens 340 (FIG. 40B) includes the following: FL=12.1%; FM=25.9%; FH=11.0%; FVH=1.0%; BL=12.2%; BM=25.9%; BH=11.0%; BVH=1.0%; UL=0.0%; and UH=0.0%.

The fourth inner lens 340 (FIG. 41B) includes the following: FL=12.2%; FM=25.8%; FH=11.1%; FVH=1.0%; BL=12.2%; BM=25.7%; BH=11.1%; BVH=1.0%; UL=0.0%; and UH=0.0%.

A linear array of LED elements 333 such as arranged in a troffer-style LED fixture emit a Gaussian type of light distribution with a sharp peak luminance in the center along the longitudinal axis A of the linear array. As a result, a linearly arranged LED array will typically create a bright spot along the longitudinal axis A of the light fixture 300 with dimmer lateral sides. The use of an inner lens 340 distributes the light laterally into the light zones 393, 394 and away from the center zone 392. The inner lens 340 further provides for symmetrical light distribution on opposing sides of the longitudinal axis A.

Figure 42A:
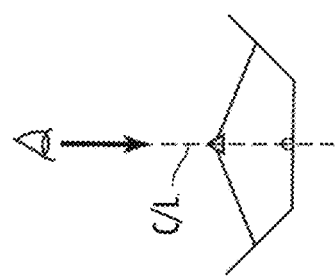
FIG. 42A is a schematic diagram of a front view viewing angle along the centerline C/L.
Figure 42B:
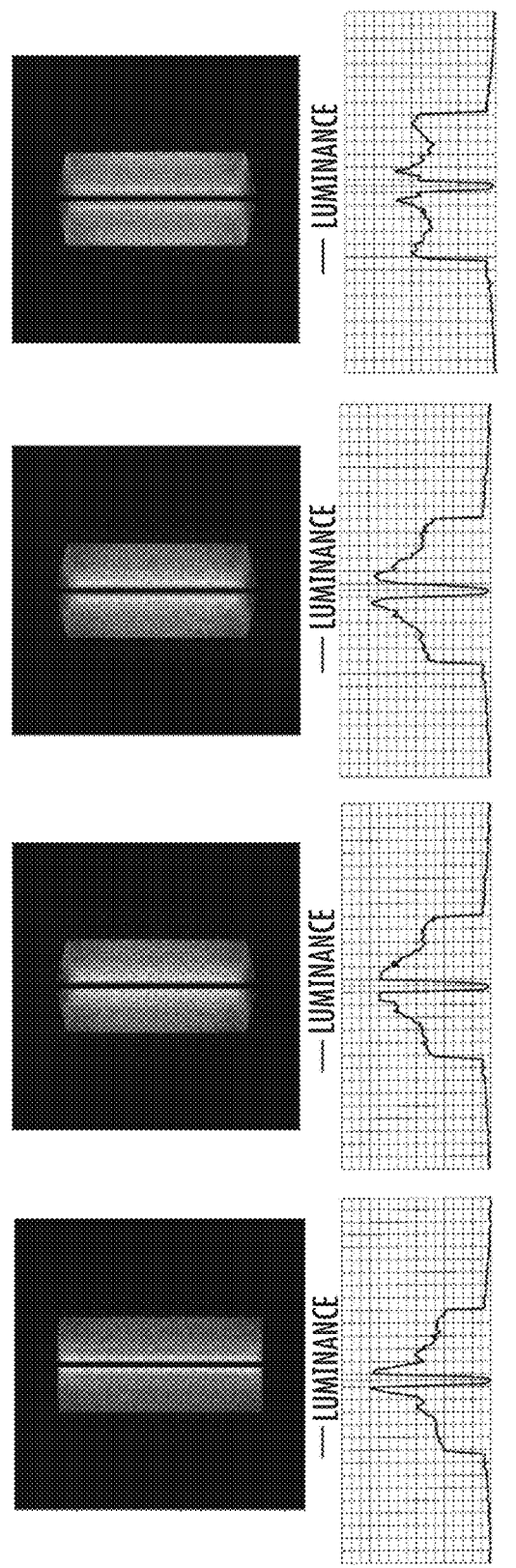
FIG. 42B are luminance appearance and luminance uniformity from the front view of the light fixtures with the first, second, third, and fourth inner lenses.

FIG. 42B illustrates the luminance uniformity from a front view of light fixtures 300 using the different inner lenses 340. As illustrated in FIG. 42A, the front view is taken along the centerline C/L of the light fixture 300. As evident, the large central peak is eliminated and light is distributed across the width.

Figure 43A:
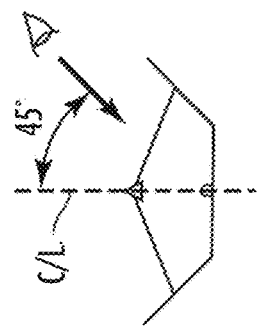
FIG. 43A is a schematic diagram of a 45° viewing angle relative to the centerline C/L.
Figure 43B:
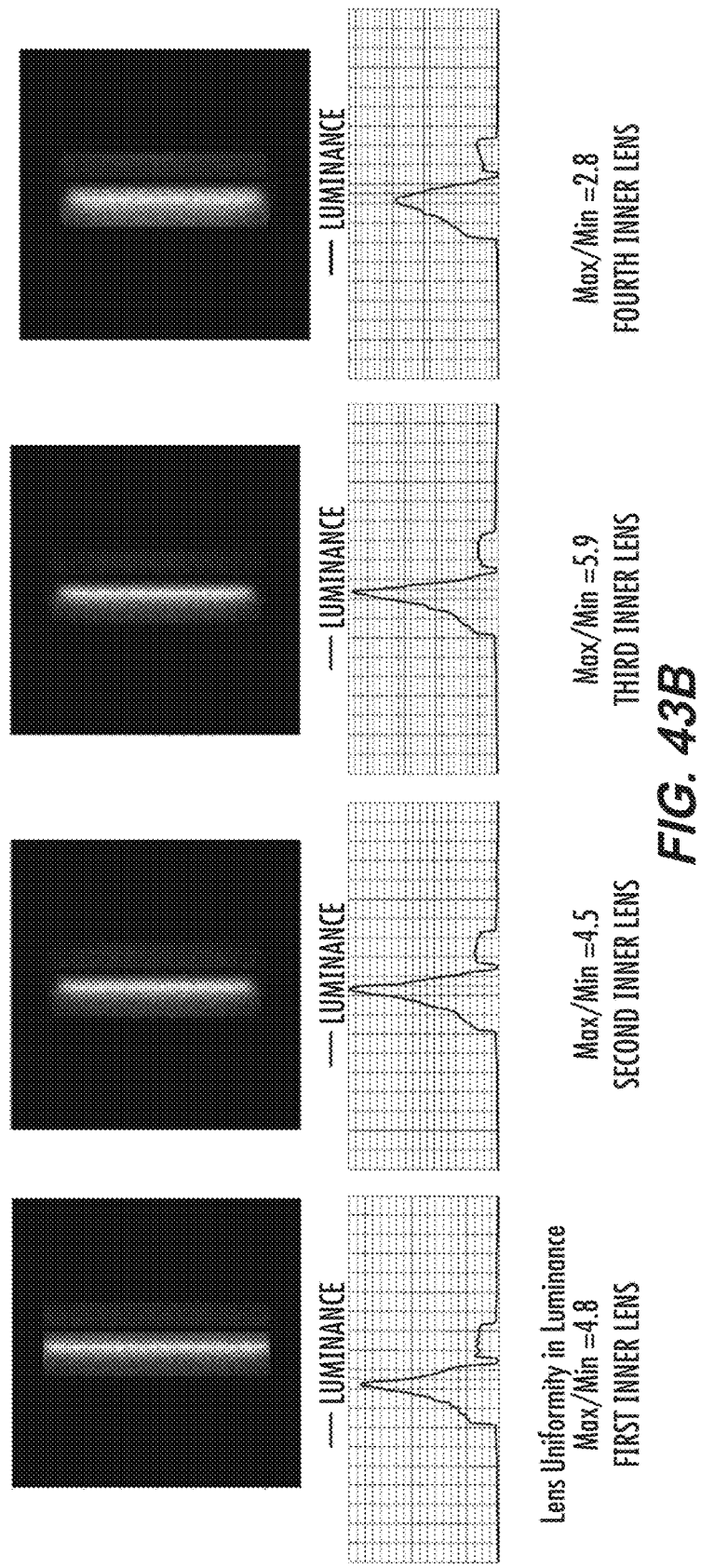
FIG. 43B are luminance appearance and luminance uniformity from the 45° viewing angle of the light fixtures with the first, second, third, and fourth inner lenses.

FIG. 43B illustrates the luminance uniformity from a 45° angle relative to the centerline C/L (see FIG. 43A).

As illustrated in FIG. 42B in the front view, each of the first, second, third, and fourth inner lenses provide a lens uniformity Max/Min between 1.6 and 2.6.

In one example, the light fixture 400 includes a lens uniformity of between about 1.5 and 2.0 in the front view. In another example, the light fixture 400 includes a lens uniformity of between about 2.0 and 4.0 in the front view.

In one example, the ratio of the maximum luminance uniformity to the minimum luminance uniformity is analyzed according to one or more IES standards, such as but not limited to RP-20 standards for outdoor use and RP-1-12 for office lighting. In one example, a maximum/minimum ratio of less than 3:1 is considered excellent. In one example, a maximum/minimum ratio of less than 5:1 is considered good.

Figure 44A:
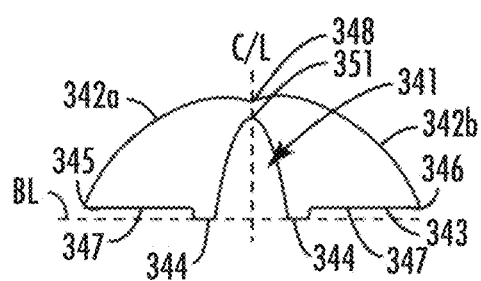
FIG. 44A is an end view of a fifth inner lens.

FIG. 44A illustrates a fifth inner lens 340. The fifth inner lens 340 includes the same outer surface as the second inner lens 340 (see FIGS. 35A and 35B) with a different inner cavity 341). The inner lens 340 is symmetrical about a straight line that extends between the peak 351 and the dimple 348. The inner cavity 341 includes a steep shape with a peak 351 aligned along the centerline C/L. The outer surface 342 includes the dimple 348 at the centerline C/L. The dimple 348 divides the outer surface 342 into first and second lateral sections 342a, 342b. The first lateral section 342a extends between the lateral end 345 and the dimple 348. The second lateral section 342b extends between the lateral end 346 and the dimple 348. The bottom edge 343 includes a pair of projections 344 on opposing sides of the inner cavity 341. The sections 347 that extend between the projections 344 and lateral ends 345, 346 are co-planar.

Figure 45A:
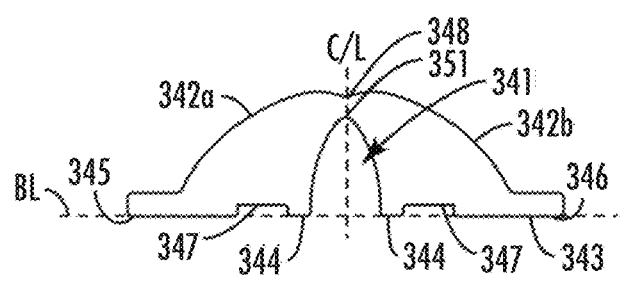
FIG. 45A is an end view of a sixth inner lens.

FIG. 45A illustrates a sixth inner lens 340. The sixth inner lens 340 is symmetrical about a straight line that extends between the peak 351 and the dimple 348. The inner cavity 341 includes a steep shape with a peak 351 aligned along the centerline C/L. A straight line that extends through the peak 351 and dimple 348 is collinear with the centerline C/L. The outer surface 342 includes the dimple 348 at the centerline C/L. The dimple 348 divides the outer surface 342 into first and second lateral sections 342a, 342b. The first lateral section 342a extends between a first point at a flange 290 and the dimple 348. The second lateral section 342b extends between the flange 290 and the dimple 348. The flange 290 extends along the bottom and extends laterally outward beyond each of the sections 342a, 342b respectively. Indents 291, 292 are formed in the bottom edge 293 of the flange along the sections 342a, 342b. In one example, the bottom edge 343 is perpendicular to the centerline C/L.

Figure 44B:
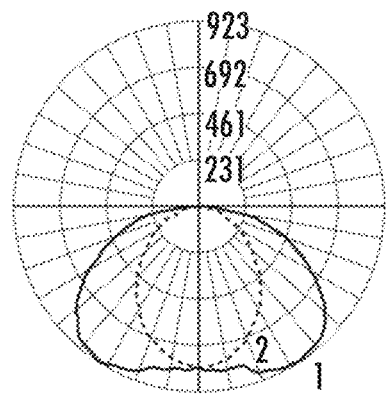
FIG. 44B is an exemplary representation of a simulated candela plot achieved with the fifth inner lens as in FIG. 44A with first and second plots with the first plot illustrating the intensity in a plane perpendicular to the longitudinal axis and the second plot in a plane along the longitudinal axis.
Figure 45B:
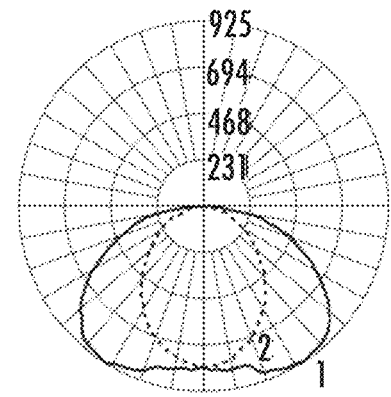
FIG. 45B is an exemplary representation of a simulated candela plot achieved with the sixth inner lens as in FIG. 45A with first and second plots with the first plot illustrating the intensity in a plane perpendicular to the longitudinal axis and the second plot in a plane along the longitudinal axis.

FIG. 44B illustrates a light distribution for a light fixture with the fifth inner lens 340. FIG. 45B illustrates the light distribution for a light fixture with the sixth inner lens 340. A first plot 1 of the intensity curve over vertical angles on the plane perpendicular to the longitudinal axis A. The second plot 2 is the intensity curve on the v-angles on the plane along the longitudinal axis A. The fifth inner lens 340 includes an SC of 1.72 and an OE is 81%. The sixth inner lens 340 includes an SC of 1.70 and an OE of 80%.

Figure 44C:
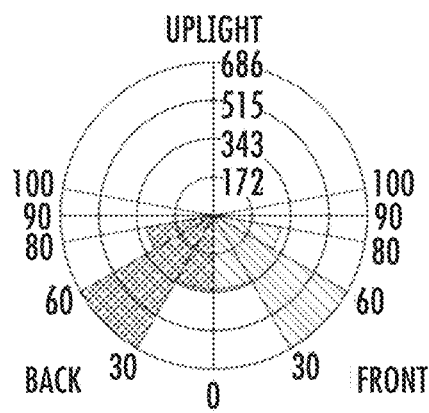
FIG. 44C illustrates luminous flux distribution patterns for a light fixture with a fifth inner lens as in FIG. 44A.

FIG. 44C illustrates the LCS for the fifth inner lens 340 that includes the following: FL=12.3%; FM=25.9%; FH=10.8%; FVH=1.0%; BL=12.3%; BM=25.9%; BH=10.8%; BVH=1.0%; UL=0.0%; and UH=0.0%.

Figure 45C:
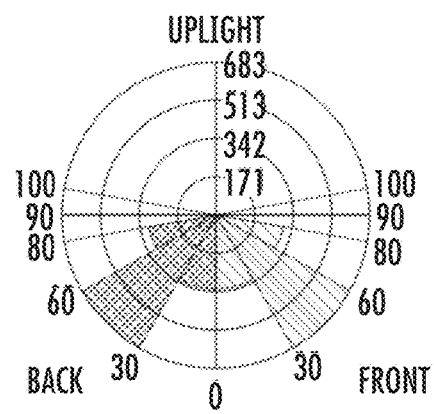
FIG. 45C illustrates luminous flux distribution patterns for a light fixture with a sixth inner lens as in FIG. 45A.

FIG. 45C illustrates the LCS for the sixth inner lens 340 that includes the following: FL=12.4%; FM=25.9%; FH=10.6%; FVH=1.0%; BL=12.4%; BM=25.9%; BH=10.6%; BVH=1.0%; UL=0.0%; and UH=0.0%.

FIGS. 46A and 46B illustrate the luminance uniformity from a front view of a light fixture 300 using the fifth inner lens 340 at a dimmed level. The front view is taken along the centerline C/L of the light fixture 300. In one example, the asymmetric lighting is a result of the environment in which the light fixture 300 is positioned and/or the housing 301 (e.g., polishing process of the housing 301). FIGS. 46C and 46D illustrate the luminance uniformity of a light fixture 300 with the fifth lens 340 at a dimmed level from a 45° angle relative to the centerline C/L.

Figure 47C:
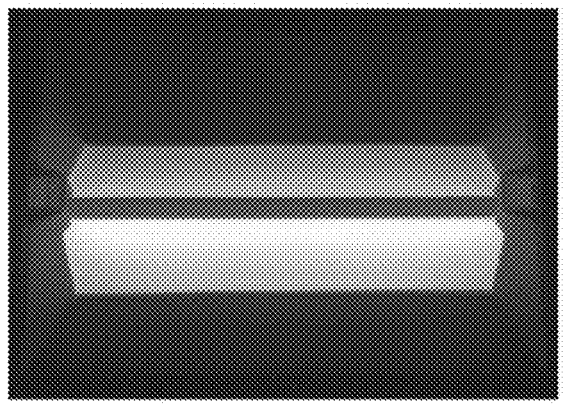
FIGS. 47C and 47D are luminance appearance and luminance uniformity from a 45° angle of a dimmed light fixture with the sixth inner lens.
Figure 47D:
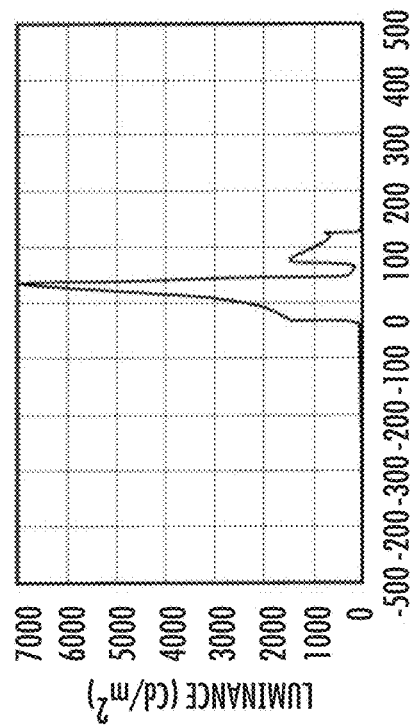
Figure 47A:
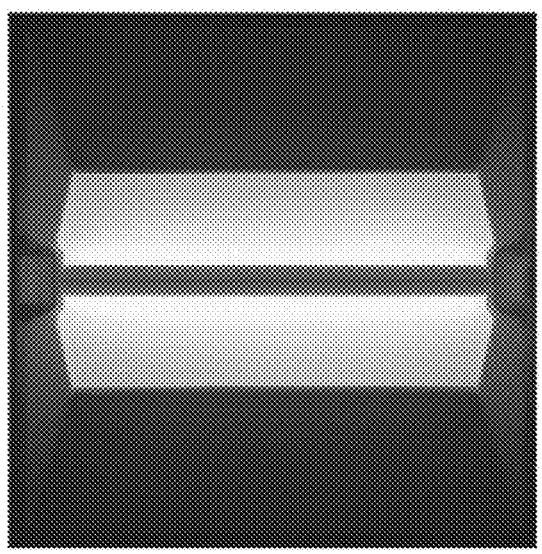
FIGS. 47A and 47B are luminance appearance and luminance uniformity from the front view of a dimmed light fixture with the sixth inner lens.
Figure 47B:
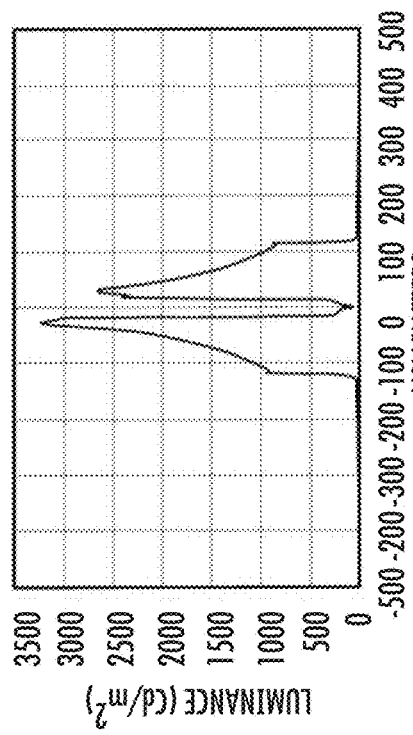

FIGS. 47A and 47B illustrate the luminance uniformity from a front view of a light fixture 300 using the sixth inner lens 340 at a dimmed level. The front view is taken along the centerline C/L of the light fixture 300. In one example, the asymmetric lighting is a result of the environment in which the light fixture 300 is positioned and/or the housing 301 (e.g., polishing process of the housing 301). FIGS. 47C and 47D illustrate the luminance uniformity of a light fixture 300 with the sixth lens 340 at a dimmed level from a 45° angle relative to the centerline C/L.

Figure 48C:
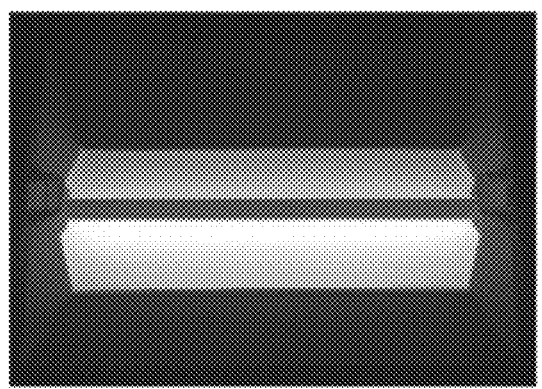
FIGS. 48C and 48D are luminance appearance and luminance uniformity from a 45° angle of a full level light fixture with the sixth inner lens.
Figure 48D:
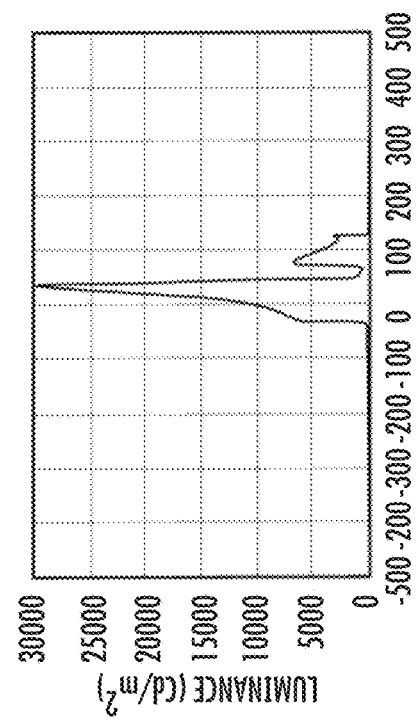
Figure 48A:
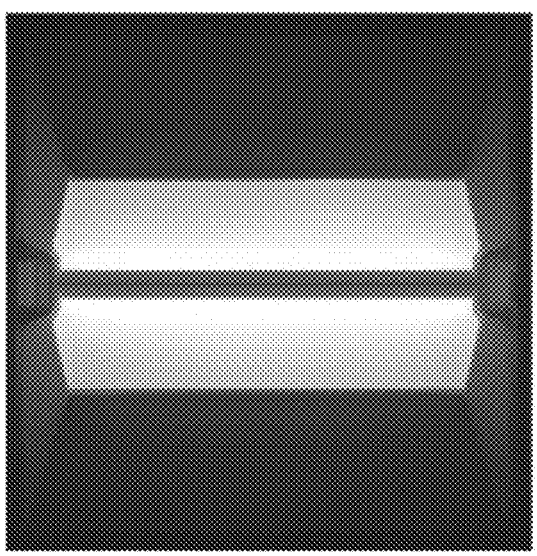
FIGS. 48A and 48B are luminance appearance and luminance uniformity from the front view of a full level light fixture with the sixth inner lens.
Figure 48B:
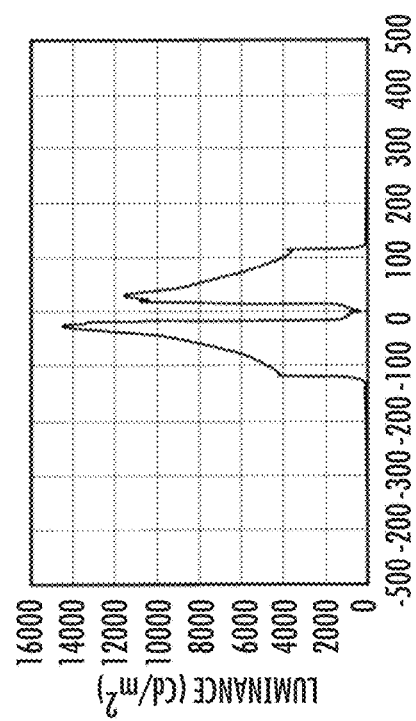

FIGS. 48A and 48B illustrate the luminance uniformity from a front view of a light fixture 300 using the sixth inner lens 340 at a full level. The front view is taken along the centerline C/L of the light fixture 300. In one example, the asymmetric lighting is a result of the environment in which the light fixture 300 is positioned and/or the housing 301 (e.g., polishing process of the housing 301). FIGS. 48C and 48D illustrate the luminance uniformity of a light fixture 300 with the sixth lens 340 at a full level from a 45° angle relative to the centerline C/L.

The light fixture 300 can be utilized for a circadian system that may be affected by lighting characteristics. Spectra and output lumens can be tuned or dynamically controllable according to a metric for proper circadian requirements (referred to as Circadian Stimulus). Factors for the circadian lighting are lumen level, spectrum (color), exposure timing, exposure duration, and distribution.

The light fixture 300 generates a wider distribution than a typical troffer-style light due to the inner lens 340. The wider distribution is desirable for the circadian system over time and duration.

The lighting fixture 300 can adjust the lumen levels using program instructions stored in control circuitry, such as remote circuitry or circuitry located within the control box 390. Color temperature of the light can vary between about 2700K to 6500K. The color temperature can be continuously tunable and dynamically controllable for proper CCTs. In one example, the LED elements 333 are tunable in CCT, such as those currently available from Nichia Corporation. In another example, the different LED elements 333 are assembled in a manner to make color variations.

Figure 49:
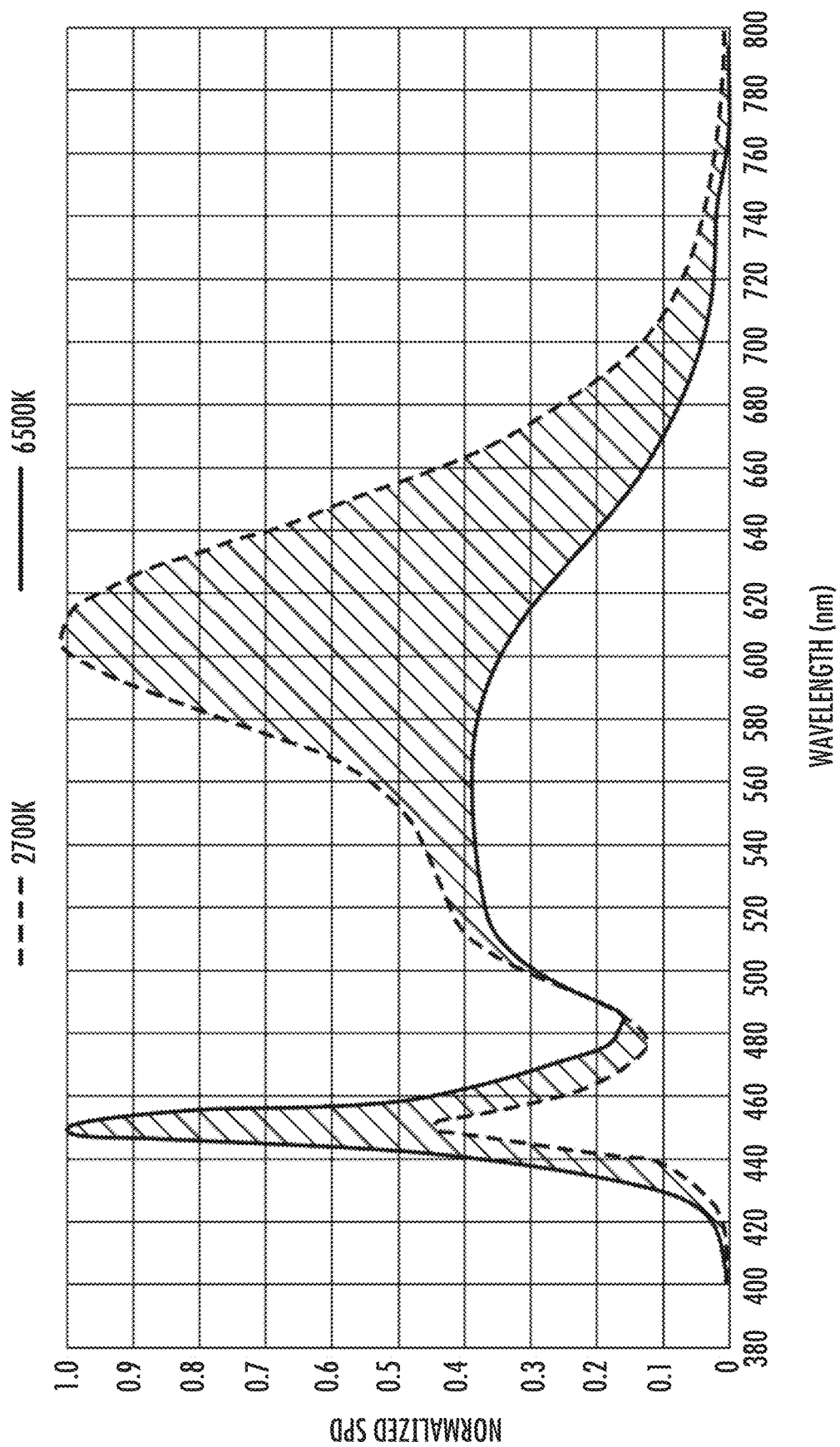
FIG. 49 is a graph of examples of spectra of tunable LED elements at 2700K and 6500K.

FIG. 49 illustrates examples of spectra of tunable LED elements 333 at two extreme CCTs, namely 2700K and 6500K. In one example, the spectrum is tuned continuously from 2700K to 6500K and operated dynamically depending on the condition of the circadian system. In another example, the spectrum is tuned between the two CCTs.

FIGS. 50A, 50B and 51A, 51B illustrate color rendering and distribution of a light fixture 300 at two extreme CCTs. In these examples, the light fixture 300 includes the fourth inner lens 340 (see FIGS. 37A, 37B).

Figure 50A:
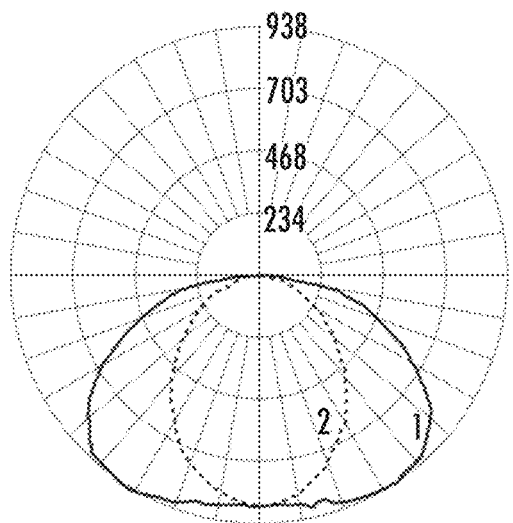
FIG. 50A is an exemplary representation of a simulated candela plot achieved with the fourth inner lens as in FIG. 37A over the spectrum at CCT 2700K with first and second plots with the first plot illustrating the intensity in a plane perpendicular to the longitudinal axis and the second plot in a plane along the longitudinal axis.
Figure 50B:
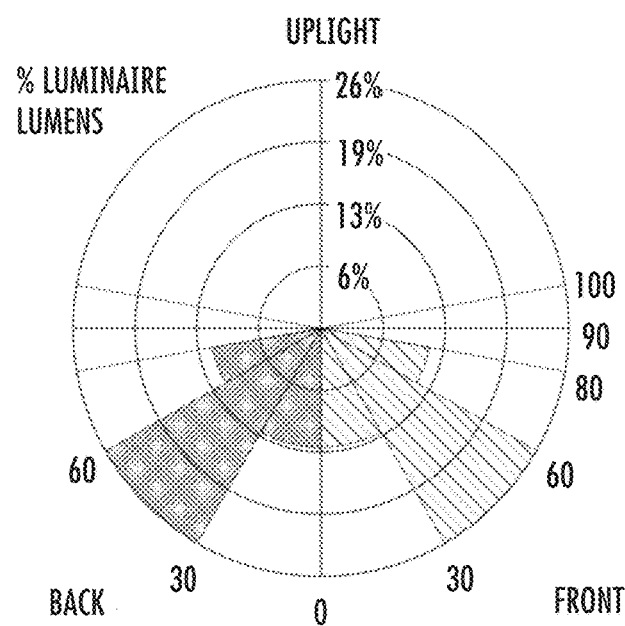
FIG. 50B illustrates luminous flux distribution patterns for a light fixture with a fourth inner lens as in FIG. 37A over the spectrum at CCT 2700K.

FIGS. 50A and 50B illustrate the light fixture 300 with a CCT at 2700K and 3000 Lm. The circadian distribution is wide. FIG. 50A illustrates the first plot 1 at 90° and the second plot 2 at 0°. FIG. 50B illustrates the luminous flux distribution with the following characteristics: FL=12.3%; FM=25.7%; FH=11.0%; FVH=0.9%; BL=12.3%; BM=25.7%; BH=11.0%; BVH=0.9%; UL=0.0%; and UH=0.0%.

Figure 51A:
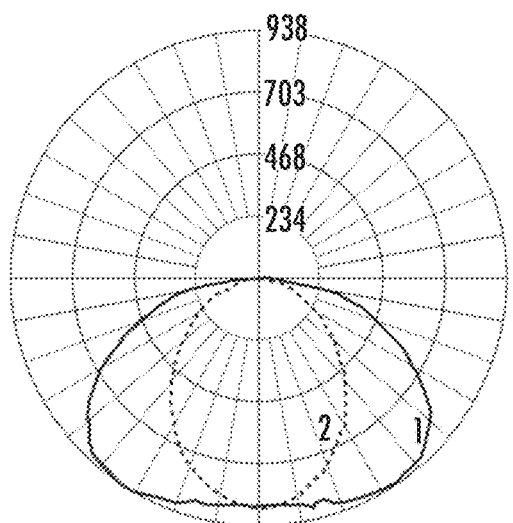
FIG. 51A is an exemplary representation of a simulated candela plot achieved with the fourth inner lens as in FIG. 37A over the spectrum at 6500K with first and second plots with the first plot illustrating the intensity in a plane perpendicular to the longitudinal axis and the second plot in a plane along the longitudinal axis.
Figure 50B:
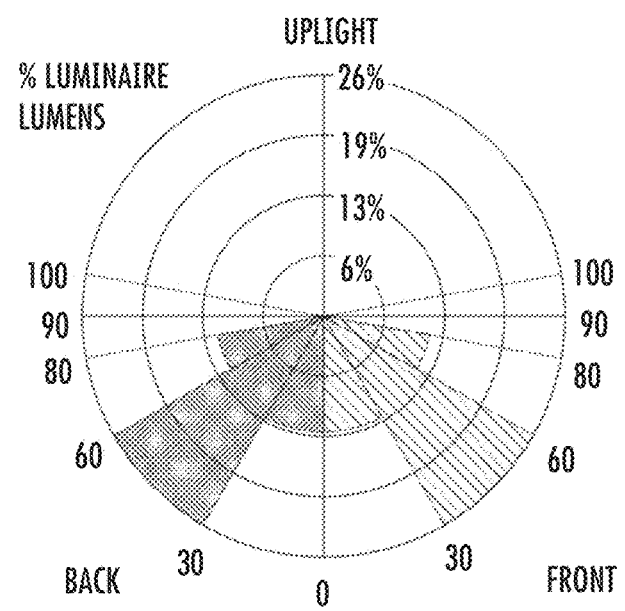

FIGS. 51A and 51B illustrate the light fixture 300 with a CCT at 6500K and 3000 Lm. The circadian distribution is wide. FIG. 51A illustrates the first plot 1 at 90° and the second plot 2 at 0°. FIG. 51B illustrates the luminous flux distribution with the following characteristics: FL=12.3%; FM=25.7%; FH=11.0%; FVH=0.9%; BL=12.3%; BM=25.7%; BH=11.0%; BVH=0.9%; UL=0.0%; and UH=0.0%.

Figures 52A, 52B:
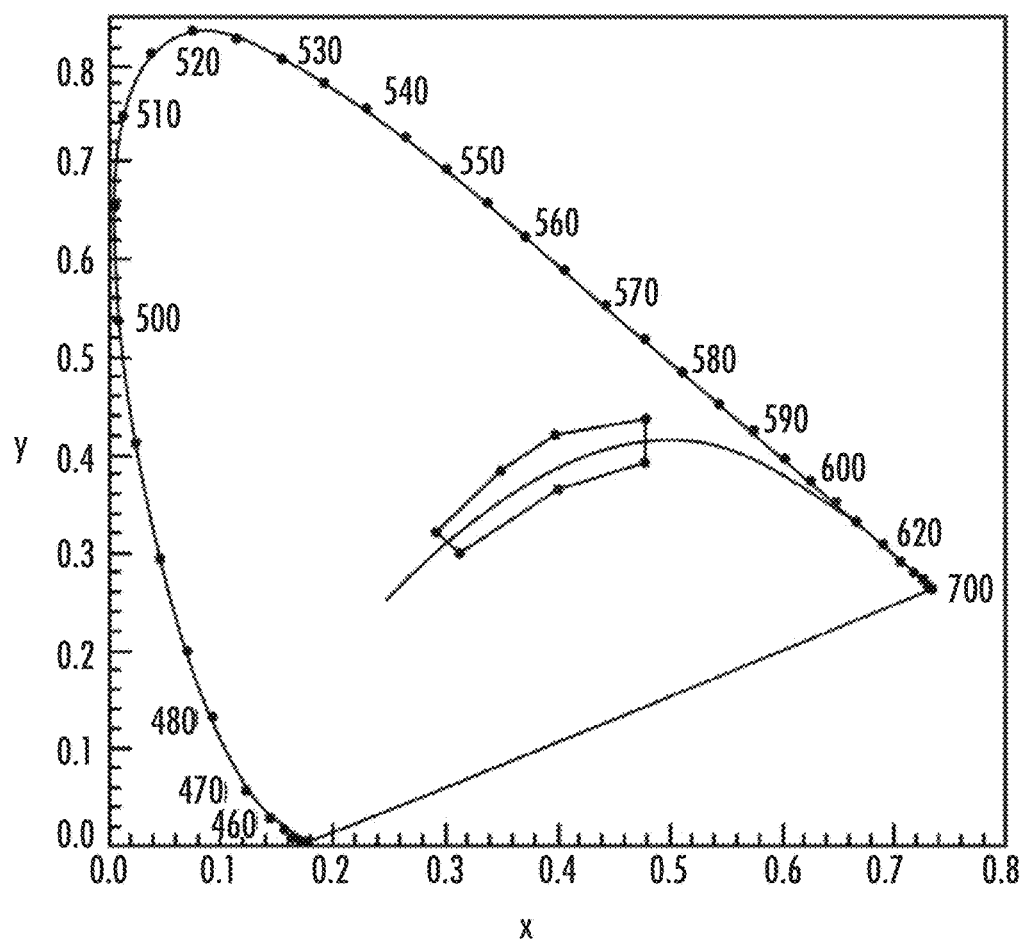
FIG. 52A is a diagram of the color space of a light fixture.
FIG. 52B are the data points for the color space of FIG. 52A.

As shown in FIG. 52A and listed in the table of FIG. 52B, the color space is defined by the following x, y coordinates on the 1931 CIE Chromaticity Diagram: (0.29, 0.32), (0.35, 0.38), (0.40, 0.42), (0.48, 0.44), (0.48, 0.39), (0.40, 0.36), (0.32, 0.30), (0.29, 0.32). The light fixture 300 can be operated at one or more color points within the color space depending on the requirement of the circadian system over time. In one example, lumen levels and duration may be dynamically operated to get circadian conditions in lighting.

The color of visible light emitted by a light source, and/or the color of a mixture visible light emitted by a plurality of light sources can be represented on either the 1931 CIE (Commission International de l'Eclairage) Chromaticity Diagram or the 1976 CIE Chromaticity Diagram. Persons of skill in the art are familiar with these diagrams, and these diagrams are readily available.

The CIE Chromaticity Diagrams map out the human color perception in terms of two CIE parameters, namely, x (or ccx) and y (or ccy) (in the case of the 1931 diagram) or u' and v' (in the case of the 1976 diagram). Each color point on the respective diagrams corresponds to a particular hue. For a technical description of CIE chromaticity diagrams, see, for example, "Encyclopedia of Physical Science and Technology", vol. 7, 230-231 (Robert A Meyers ed., 1987). The spectral colors are distributed around the boundary of the outlined space, which includes all of the hues perceived by the human eye. The boundary represents maximum saturation for the spectral colors.

The 1931 CIE Chromaticity Diagram can be used to define colors as weighted sums of different hues. The 1976 CIE Chromaticity Diagram is similar to the 1931 Diagram, except that similar distances on the 1976 Diagram represent similar perceived differences in color.

The expression "hue", as used herein, means light that has a color shade and saturation that correspond to a specific point on a CIE Chromaticity Diagram, i.e., a color point that can be characterized with x, y coordinates on the 1931 CIE Chromaticity Diagram or with u', v' coordinates on the 1976 CIE Chromaticity Diagram.

In the 1931 CIE Chromaticity Diagram, deviation from a color point on the diagram can be expressed either in terms of the x, y coordinates or, alternatively, in order to give an indication as to the extent of the perceived difference in color, in terms of MacAdam ellipses (or plural-step MacAdam ellipses). For example, a locus of color points defined as being ten MacAdam ellipses (also known as "a ten-step MacAdam ellipse) from a specified hue defined by a particular set of coordinates on the 1931 CIE Chromaticity Diagram consists of hues that would each be perceived as differing from the specified hue to a common extent (and likewise for loci of points defined as being spaced from a particular hue by other quantities of MacAdam ellipses).

A typical human eye is able to differentiate between hues that are spaced from each other by more than seven MacAdam ellipses (and is not able to differentiate between hues that are spaced from each other by seven or fewer MacAdam ellipses).

Since similar distances on the 1976 Diagram represent similar perceived differences in color, deviation from a point on the 1976 Diagram can be expressed in terms of the coordinates, u' and v', e.g., distance from the point=$(\Delta u'2 + \Delta v'2)\frac{1}{2}$. This formula gives a value, in the scale of the u' v' coordinates, corresponding to the distance between points. The hues defined by a locus of points that are each a common distance from a specified color point consist of hues that would each be perceived as differing from the specified hue to a common extent.

A series of points that is commonly represented on the CIE Diagrams is referred to as the blackbody locus. The chromaticity coordinates (i.e., color points) that lie along the blackbody locus correspond to spectral power distributions that obey Planck's equation: $E(\lambda)=a/\lambda^{\wedge}(B/(\lambda \cdot T))-1)$, where E is the emission intensity, A is the emission wavelength, T is the temperature of the blackbody and A and B are constants. The 1976 CIE Diagram includes temperature listings along the blackbody locus. These temperature listings show the color path of a blackbody radiator that is caused to increase to such temperatures. As a heated object becomes incandescent, it first glows reddish, then yellowish, then white, and finally bluish. This occurs because the wavelength associated with the peak radiation of the blackbody radiator becomes progressively shorter with increased temperature, consistent with the Wien Displacement Law. Illuminants that produce light that is on or near the blackbody locus can thus be described in terms of their color temperature.

In one example, the light fixture 300 is designed to be a direct view troffer style with a large luminous source, a shallow depth, and color changing capability. In one example, the light fixture 300 can also include optical control. The direct view troffer style with the LED elements 333 on the back of housing 301 and aimed directly at the inner lens 340 provides for a more economical design that uses the housing 301 as a heat sink and overall includes fewer parts. The large luminous source provides for an increase in optic source size which for constant Lumen output and optical distribution yields a reduction in luminous intensity or glare reduction. Color changing provides for CCT and circadian control.

In light fixture design, it has been determined that the shorter the optical path length and the larger the source size, the harder it is to color mix the LEDs as well as limiting lens luminance uniformity. The more diffusion provides for color mixing and improved uniformity, but with lower optical efficiency. As disclosed in the tested data above in the luminance images, polar candela plots, and zonal distribution, the light fixtures 300 provide for good uniformity, optical control, and glare control while working with the constraints of troffer style designs listed above.

Figure 53A:
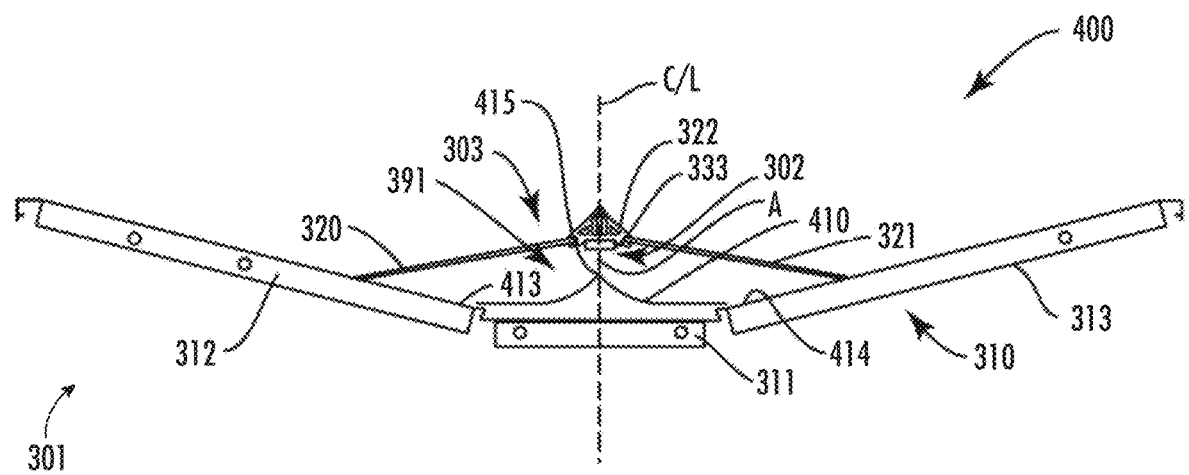
FIG. 53A is a side schematic view of a housing, LED assembly, reflector, and lens assembly of a light fixture.

FIG. 53A includes a light fixture 400 with an indirect troffer configuration. The light fixture 400 comprises a housing 301, LED assembly 302, and lens assembly 303 as disclosed above. The light fixture 400 further includes a reflector 410 positioned over the LED elements 333 to reflect the light. The light fixture 400 does not include an inner lens 340.

The light fixture 400 includes a longitudinal axis A and a centerline C/L. The light fixture 400 may be provided in many sizes, including standard troffer fixture sizes. However, it is understood that the elements of the light fixture 400 may have different dimensions and can be customized to fit most any desired fixture dimension.

The housing 301 and lens assembly 303 form an interior space 391 that houses the LED assembly 302 and the reflector 410. The LED assembly 302 includes various examples of LED elements 333 in an elongated manner that extends along the back pan 310. The LED assembly 302 is mounted to the connector 322 with the connector 322 also acting as a heatsink. The LED elements 333 face towards and illuminate the reflector 410. The light from the LED elements 333 is reflected from the reflector 410 to the fixture lens 320, 321 through which it is emitted into the environment. This arrangement is referred to as an "indirect troffer" design. The reflector 410 is configured with a hybrid configuration that provides for specular reflection in a central portion of the reflector 410 and diffuse reflection in the lateral portions of the reflector 410. This configuration provides for improved uniformity luminance. In one example, the LED assembly 302 is aligned with the longitudinal axis A of the light fixture 300.

Figure 53B:
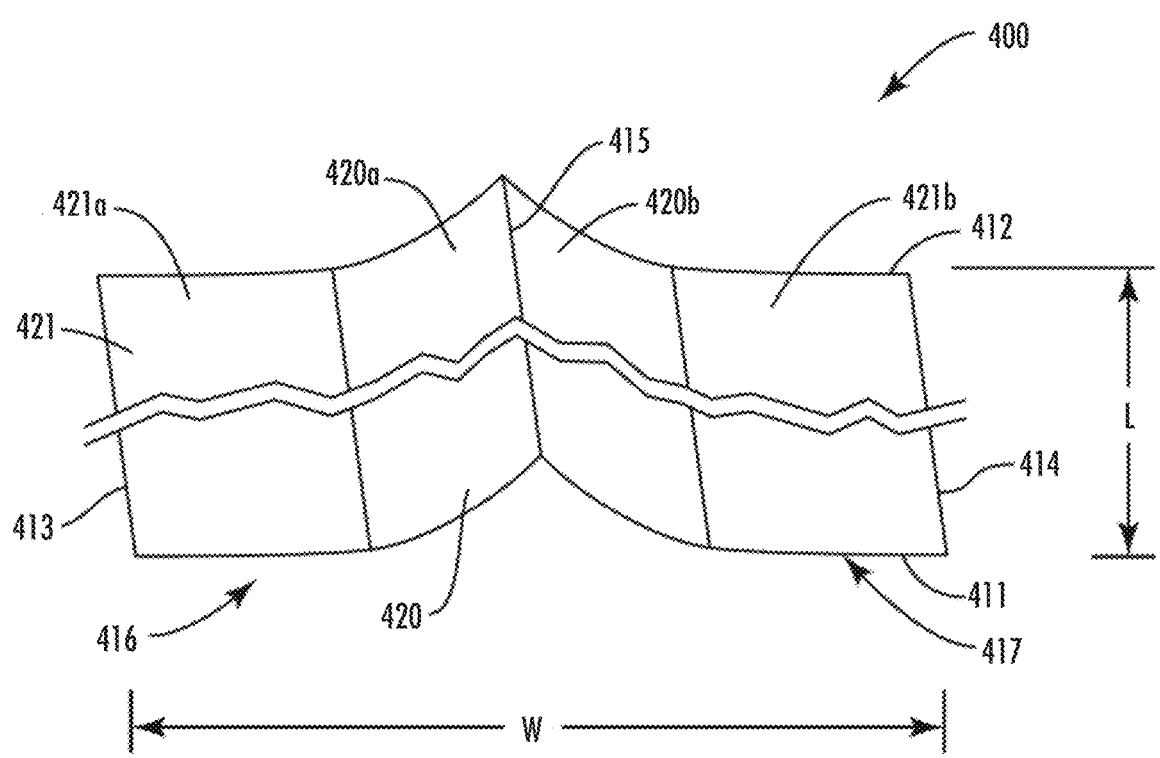
FIG. 53B is a schematic perspective view of a reflector.

The reflector 410 is positioned in the interior space 391 and faces towards the LED assembly 302 that is mounted on the connector 322. As illustrated in FIG. 53B, the reflector 410 includes opposing ends 411, 412 that define a length L and opposing sides 413, 414 that define the width W. The length L is sized to extend along the length of the back pan 310. In one example, the ends 411, 412 abut against the end caps 315 of the housing 301. In another example, one or both ends 411, 412 are spaced away from the respective end caps 315. The width W is sized for the sides 413, 414 to contact against the back pan 310. As illustrated in FIG. 53A, side 413 contacts against the first wing 312 and side 414 contacts against the second wing 313. The sides 413, 414 can be attached to the respective wings 312, 313, such as by one or more mechanical fasteners and adhesives.

The reflector 410 includes a peak 415 that extends the length L. The reflector 410 is aligned within the interior space 391 with the peak 415 positioned along the centerline C/L. The first lateral section 416 extends along the first side of the centerline C/L and the second lateral section 417 extends along the second side of the centerline C/L.

The reflector 410 includes a specular reflection section 420 along a central section and that extend the length L. The specular reflection section 420 includes sections 420a, 420b on opposing sides of the peak 415. The specular reflection sections 420a, 420b are positioned along the mid-portion of the reflector 410. The reflector 410 also includes a diffuse reflection section 421. The diffuse reflection section 421 includes diffuse sections 421a, 421b located along the outer lateral sections. Diffuse reflection section 421a extends between the specular reflection section 420a and the side 413, and diffuse reflection section 421b extends between the specular reflection section 420b and the side 414.

In one example, in the boundary zones between the specular reflection section 420 and the diffuse reflection sections 421 can provide for a transition. For example, the boundary zones can include partially specular reflection section, e.g., 50/50 or 30/70 (specular/diffuse) so the lighting can be smoothly varying and give improved uniformity in luminance.

The reflector 410 illuminates both light zones 393, 394 symmetrically and provides for uniform luminance in both zones 393, 394. The mid-portion of the reflector 410 defined by the specular section 420 divides the light into two directions. The outer sections of the reflector 410 defined by the diffuse reflection sections 421a, 421b provides for diffuse reflection. Light from the specular reflection section 420 and directly from the LED assembly 302 is reflected diffusely to provide for uniform luminance.

The reflector 410 includes a symmetrical shape about the peak 415 with each of the lateral sections 416, 417 having the same shape and size. Further, the specular reflection sections 420a, 420b include the same shape and size, and the diffuse reflection sections 421a, 421b include the same shape and size.

In one example, the reflector 410 has a folded configuration. The fold line is formed at the peak 415. Each of the sections that extend between the peak 415 and the respective lateral side 413, 414 includes the same shape and size.

Figure 54A:
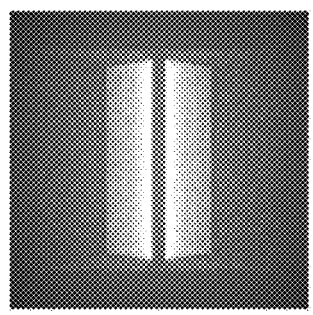
FIG. 54A is a front view along a centerline of a light fixture with a reflector illustrating luminance at the light fixture with a reflector that provides for entirely diffuse reflection.
Figure 54B:
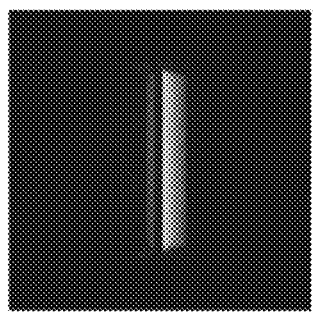
FIG. 54B is the light fixture of FIG. 54A at a 65° viewing angle.

FIGS. 54A, 54B, 54C, and 54D discloses an example of the light fixture 400 with a reflector 410 in which the entirety provides for diffuse reflection (i.e., the entire reflector 410 is a single diffuse reflection section 421). FIG. 54A illustrates the light fixture 400 view from the front along the centerline C/L (i.e., a 0° viewing angle). FIG. 54B illustrates the light fixture 400 at a 65° viewing angle). A light fixture with just a diffuse reflector 410 gives a hot luminance around the mid zone at the centerline C/L as the LED elements 333 give a strong intensity around the center zone 392.

Figure 54C:
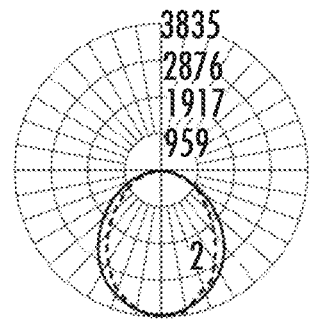
FIG. 54C is an exemplary representation of a simulated candela plot achieved with the light fixture of FIG. 54A with first and second plots with the first plot illustrating the intensity in a plane perpendicular to the longitudinal axis and the second plot in a plane along the longitudinal axis.
Figure 54D:
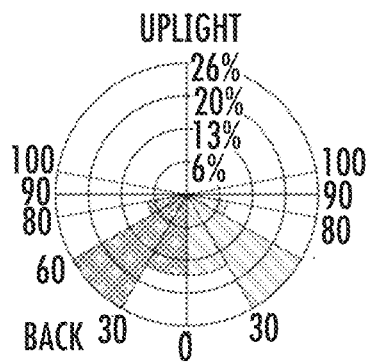
FIG. 54D illustrates luminous flux distribution patterns for the light fixture of FIG. 54A.

FIG. 54C illustrates intensity distribution with a Spacing Criterion (SC) of how much light can be distributed widely to make uniform at a given mounting height (i.e., it is the ratio of luminaires spacing to mounting height). The SC along the y-axis is 1.10, along the x-axis if 1.22, and along the diagonal is 1.28. FIG. 54D includes the following luminous flux distribution: FL=15.4%; FM=25.7%; FH=8.2%; FVH=0.6%; BL=15.4%; BM=25.8%; BH=8.3%; BVH=0.6%; UL=0.0%; and UH=0.0%.

Figure 55A:
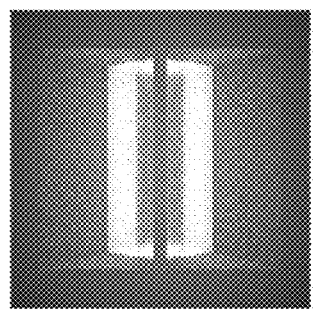
FIG. 55A is a front view along a centerline of a light fixture with a reflector illustrating luminance at the light fixture with a reflector that provides for entirely specular reflection.
Figure 55B:
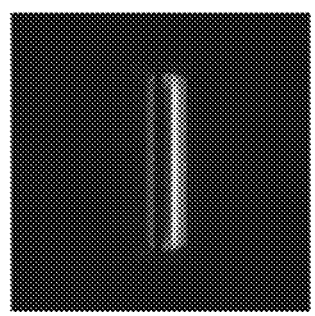
FIG. 55B is the light fixture of FIG. 55A at a 65° viewing angle.

FIGS. 55A, 55B, 55C, and 55D disclose an example of the light fixture 400 with a reflector 410 in which the entirety provides for specular reflection (i.e., the entire reflector 410 is a single specular reflection section 420). FIG. 55A illustrates the light fixture 400 view from the front along the centerline C/L (i.e., a 0° viewing angle). FIG. 55B illustrates the light fixture 400 at a 65° viewing angle). This light fixture 400 with just a specular reflector 410 gives a dim luminance around the mid zone at the centerline C/L as light is reflected towards both lateral sides strongly by the steep angle of the reflector 410 in proximity to the peak 415.

Figure 55C:
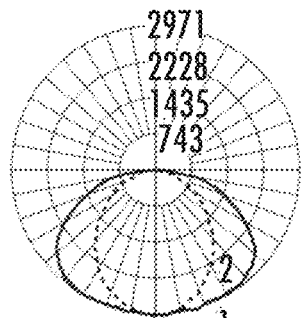
FIG. 55C is an exemplary representation of a simulated candela plot achieved with the light fixture of FIG. 55A with first and second plots with the first plot illustrating the intensity in a plane perpendicular to the longitudinal axis and the second plot in a plane along the longitudinal axis.
Figure 55D:
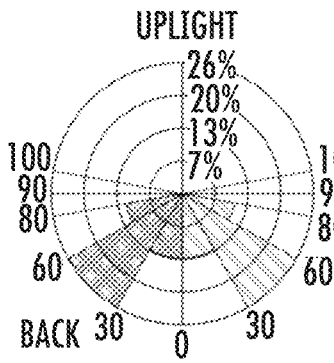
FIG. 55D illustrates luminous flux distribution patterns for the light fixture of FIG. 55A.

FIG. 55C illustrates intensity distribution with a SC along the y-axis is 1.16, along the x-axis if 1.54, and along the diagonal is 1.46. FIG. 55D includes the following luminous flux distribution: FL=12.5%; FM=26.0%; FH=10.6%; FVH=0.7%; BL=12.6%; BM=26.1%; BH=10.8%; BVH=0.7%; UL=0.0%; and UH=0.0%.

FIGS. 56A, 56B, 56C, 56D disclose a light fixture 410 with a hybrid reflector 410 as illustrated in FIG. 53B with both specular and diffuse reflection sections 420, 421. The combination of specular and diffuse reflection sections 420, 421 gives balanced luminance and good uniformity. Near the boundary where the specular and diffuse reflection sections 420, 421 meet, both reflection sections 420, 421 include some hot spots with higher luminance values than adjacent areas. In one example to reduce and/or eliminate the hot spots, the two reflection sections 420, 421 are mixed, such as by lightly diffusing the specular reflection section 421.

Figure 56A:
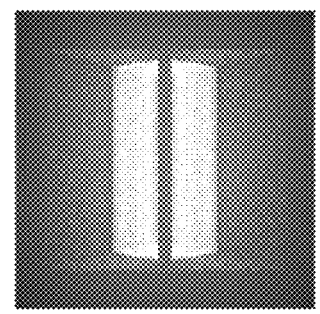
FIG. 56A is a front view along a centerline of a light fixture with a reflector illustrating luminance at the light fixture with a hybrid reflector with both specular and diffuse reflection sections.
Figure 56B:
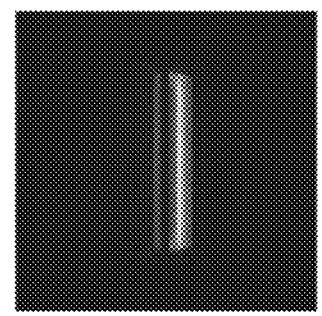
FIG. 56B is the light fixture of FIG. 56A at a 65° viewing angle.
Figure 56C:
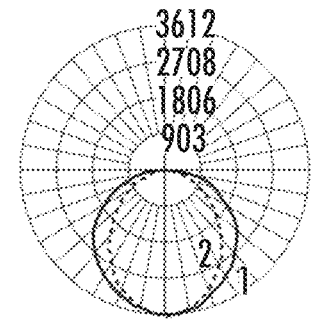
FIG. 56C is an exemplary representation of a simulated candela plot achieved with the light fixture of FIG. 56A with first and second plots with the first plot illustrating the intensity in a plane perpendicular to the longitudinal axis and the second plot in a plane along the longitudinal axis.
Figure 56D:
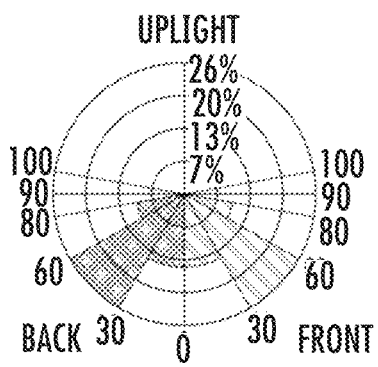
FIG. 56D illustrates luminous flux distribution patterns for the light fixture of FIG. 56A.

FIG. 56A illustrates the light fixture 400 view from the front along the centerline C/L (i.e., a 0° viewing angle). FIG. 56B illustrates the light fixture 400 at a 65° viewing angle). FIG. 56C illustrates intensity distribution with a SC along the y-axis is 1.12, along the x-axis if 1.28, and along the diagonal is 1.32. FIG. 56D includes the following luminous flux distribution: FL=14.4%; FM=25.6%; FH=9.3%; FVH=0.6%; BL=14.4%; BM=25.7%; BH=9.4%; BVH=0.6%; UL=0.0%; and UH=0.0%.

In the various examples, the light fixtures 300, 400 can include one or more communication components forming a part of the light control circuitry, such as an RF antenna that senses RF energy. The communication components may be included, for example, to allow the light fixture 300 to communicate with other light fixtures 300 and/or with an external wireless controller. More generally, the control circuitry includes at least one of a network component, an RF component, a control component, and a sensor. The sensor, such as a knob-shaped sensor, may provide an indication of ambient lighting levels thereto and/or occupancy within the room or illuminated area. Such a sensor may be integrated into the light control circuitry. In various embodiments described herein various smart technologies may be incorporated in the lamps as described in the following United States patent applications "Solid State Lighting Switches and Fixtures Providing Selectively Linked Dimming and Color Control and Methods of Operating," application Ser. No. 13/295,609, filed Nov. 14, 2011, now U.S. Pat. No. 8,736,186, which is incorporated by reference herein in its entirety; "Master/Slave Arrangement for Lighting Fixture Modules," application Ser. No. 13/782, 096, filed Mar. 1, 2013, now U.S. Pat. No. 9,572,226, which is incorporated by reference herein in its entirety; "Lighting Fixture for Automated Grouping," application Ser. No. 13/782,022, filed Mar. 1, 2013, now U.S. Pat. No. 9,155,165, which is incorporated by reference herein in its entirety; "Lighting Fixture for Distributed Control," application Ser. No. 13/782,040, filed Mar. 1, 2013, now U.S. Pat. No. 8,975,827, which is incorporated by reference herein in its entirety; "Efficient Routing Tables for Lighting Networks," application Ser. No. 13/782,053, filed Mar. 1, 2013, now U.S. Pat. No. 9,155,166, which is incorporated by reference herein in its entirety; "Handheld Device for Communicating with Lighting Fixtures," application Ser. No. 13/782,068, filed Mar. 1, 2013, now U.S. Pat. No. 9,433,061, which is incorporated by reference herein in its entirety; "Auto Commissioning Lighting Fixture," application Ser. No. 13/782, 078, filed Mar. 1, 2013, now U.S. Pat. No. 8,829,821, which is incorporated by reference herein in its entirety; "Commissioning for a Lighting Network," application Ser. No. 13/782,131, filed Mar. 1, 2013, now U.S. Pat. No. 8,912,735, which is incorporated by reference herein in its entirety;

"Ambient Light Monitoring in a Lighting Fixture," application Ser. No. 13/838,398, filed Mar. 15, 2013, now U.S. Pat. No. 10,161,612, which is incorporated by reference herein in its entirety; "System, Devices and Methods for Controlling One or More Lights," application Ser. No. 14/052,336, filed Oct. 11, 2013, now U.S. Pat. No. 9,622,321, which is incorporated by reference herein in its entirety; and "Enhanced Network Lighting," Application No. 61/932,058, filed Jan. 27, 2014, which is incorporated by reference herein in its entirety. Additionally, any of the light fixtures described herein can include the smart lighting control technologies disclosed in U.S. Provisional Application Ser. No. 62/292,528, titled "Distributed Lighting Network", filed on Feb. 8, 2016 and assigned to the same assignee as the present application, the entirety of this application being incorporated by reference herein.

In various examples described herein various Circadian-rhythm related technologies may be incorporated in the light fixtures as described in the following: U.S. Pat. Nos. 8,310,143, 10,278,250, 10,412,809, 10,529,900, 10,465,869, 10,451,229, 9,900,957, and 10,502,374, each of which is incorporated by reference herein in its entirety.

The present invention may be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein. Although steps of various processes or methods described herein may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention.

II. Additional Optical Light Guides for Lighting Fixtures/Luminaires

Each disclosed luminaire provides an aesthetically pleasing, sturdy, cost effective luminaire for use in general lighting. The lighting is accomplished with reduced glare as compared to conventional lighting systems.

The extraction features disclosed herein efficiently extract light out of the waveguide. At least some of the luminaires disclosed herein (perhaps with modifications as necessary or desirable) are particularly adapted for use in installations, such as, replacement or retrofit lamps, indoor products, (e.g., downlights, troffers, a lay-in or drop-in application, a surface mount application onto a wall or ceiling, etc.), and outdoor products. Further, the luminaires disclosed herein preferably develop light at a color temperature of between about 2500 degrees Kelvin and about 6200 degrees Kelvin, and more preferably between about 2500 degrees Kelvin and about 5000 degrees Kelvin, and most preferably between about 3000 degrees Kelvin and about 5000 degrees Kelvin. Also, at least some of the luminaires disclosed herein preferably exhibit an efficacy of at least about 60 lumens per watt, and more preferably at least about 75 lumens per watt. Further, at least some of the optical coupling members and waveguides disclosed herein preferably exhibit an overall efficiency (i.e., light extracted out of the waveguide divided by light injected into the waveguide) of at least about 90 percent. A color rendition index (CRI) of at least about 70 is preferably attained by at least some of the luminaires disclosed herein, with a CRI of at least about 580 being more preferable. Any desired particular output light distribution could be developed.

When one uses a relatively small light source which emits into a broad (e.g., Lambertian) angular distribution (common for LED-based light sources), the conservation of etendue, as generally understood in the art, requires an optical system having a large emission area to achieve a narrow (collimated) angular light distribution. In the case of parabolic reflectors, a large optic is thus generally required to achieve high levels of collimation. In order to achieve a large emission area in a more compact design, the prior art has relied on the use of Fresnel lenses, which utilize refractive optical surfaces to direct and collimate the light. Fresnel lenses, however, are generally planar in nature, and are therefore not well suited to re-directing high-angle light emitted by the source, leading to a loss in optical efficiency. In contrast, in the present embodiments, light is coupled into the optical stages, where primarily TIR is used for re-direction and collimation. This coupling allows the full range of angular emission from the source, including high-angle light, to be re-directed and collimated, resulting in higher optical efficiency in a more compact form factor.

Embodiments disclosed herein are capable of complying with improved operational standards as compared to the prior art as follows:

|  | State of the art standards | Improved Standards Achievable by Present Embodiments |
| --- | --- | --- |
| Input coupling efficiency (coupling + waveguide) | 90% | About 95% plus improvements through color mixing, source mixing, and control within the waveguide |
| Output efficiency (extraction) | 90% | About 95%: improved through extraction efficiency plus controlled distribution of light from the waveguide |
| Total system | ~70% | About 80%: great control, many choices of output distribution |

In at least some of the present embodiments the distribution and direction of light within the waveguide is better known, and hence, light is controlled and extracted in a more controlled fashion. In standard optical waveguides, light bounces back and forth through the waveguide. In the present embodiments, light is extracted as much as possible over one pass through each of the waveguide stages to minimize losses.

In some embodiments, one may wish to control the light rays such that at least some of the rays are collimated, but in the same or other embodiments, one may also wish to control other or all of the light rays to increase the angular dispersion thereof so that such light is not collimated. In some embodiments, one might wish to collimate to narrow ranges, while in other cases, one might wish to undertake the opposite.

As in the present embodiments, a waveguide may include various combinations of optical features, such as coupling and/or extraction features, to produce a desired light distribution. A lighting system may be designed without constraint due to color mixing requirements, the need for uniformity of color and brightness, and other limits that might otherwise result from the use of a specific light source. Further, the light transport aspect of a waveguide allows for the use of various form factors, sizes, materials, and other design choices. The design options for a lighting system utilizing a waveguide as described herein are not limited to any specific application and/or a specific light source.

The embodiments disclosed herein break light up into different portions that are controlled by separate stages that are axially stacked or offset, with or without an air gap therebetween, to develop a desired illumination distribution. While the embodiments disclosed herein do not utilize a light diverter in a coupling cavity to spread such light into the waveguide, and hence, the illumination distribution is limited by the size of the light source, one could use a light diverter to obtain a different illumination distribution, if desired.

In general, the curvature and/or other shape of a waveguide body and/or the shape, size, and/or spacing of extraction features determine the particular light extraction distribution. All of these options affect the visual uniformity from one end of the waveguide to another. For example, a waveguide body having smooth surfaces may emit light at curved portions thereof. The sharper the curve is, the more light is extracted. The extraction of light along a curve also depends on the thickness of the waveguide body. Light can travel through tight curves of a thin waveguide body without reaching the critical angle, whereas light that travels through a thick waveguide body is more likely to strike the surface at an angle greater than the critical angle and escape.

Tapering a waveguide body causes light to reflect internally along the length of the waveguide body while increasing the angle of incidence. Eventually, this light strikes one side at an angle that is acute enough to escape. The opposite example, i.e., a gradually thickening waveguide body over the length thereof, causes light to collimate along the length with fewer and fewer interactions with the waveguide body walls. These reactions can be used to extract and control light within the waveguide. When combined with dedicated extraction features, tapering allows one to change the incident angular distribution across an array of features. This, in turn, controls how much, and in what direction light is extracted. Thus, a select combination of curves, tapered surfaces, and extraction features can achieve a desired illumination and appearance.

Still further, the waveguide bodies contemplated herein are made of any suitable optically transmissive material, such as an acrylic material, a silicone, a polycarbonate, a glass material, or other suitable material(s) to achieve a desired effect and/or appearance.

As shown in FIGS. 57A-58B, a first embodiment of a waveguide 550 comprises a coupling optic 552 attached to a main waveguide body 554. At least one light source 556, such as one or more LEDs, is disposed adjacent to the coupling optic 552. The light source 556 may be a white LED or may comprise multiple LEDs including a phosphor-coated LED either alone or in combination with a color LED, such as a green LED, etc. In those cases where a soft white illumination is to be produced, the light source 556 typically includes a blue shifted yellow LED and a red LED. Different color temperatures and appearances could be produced using other LED combinations, as is known in the art. In one embodiment, the light source 556 comprises any LED, for example, an MT-G LED incorporating True-White® LED technology as developed and manufactured by Cree, Inc., the assignee of the present application.

The waveguide body 554 has a curved, tapered shape formed by a first surface 558 and a second surface 560. Light emitted from the light source 556 exits an output surface 562 of the coupling optic 552 and enters an input surface 564 at a first end 566 of the waveguide body 554. Light is emitted through the first surface 558 and reflected internally along the second surface 560 throughout the length of the waveguide body 554. The waveguide body 554 is designed to emit all or substantially all of the light from the first surface 558 as the light travels through the waveguide body 554. Any remaining light may exit the waveguide 554 at an end surface 570 located at a second end 568 opposite the first end 566. Alternatively, the end surface 570 may be coated with a reflective material, such as a white or silvered material to reflect any remaining light back into the waveguide body 554, if desired.

The curvature of the first surface 558 of the waveguide body 554 allows light to escape, whereas the curvature of the second surface 560 of the waveguide body 554 prevents the escape of light through total internal reflection. Specifically, total internal reflection refers to the internal reflection of light within the waveguide body that occurs when the angle of incidence of the light ray at the surface is less than a threshold referred to as the critical angle. The critical angle depends on the indices of refraction (N) of the material of which the waveguide body is composed and of the material adjacent to the waveguide body. For example, if the waveguide body is an acrylic material having an index of refraction of approximately 1.5 and is surrounded by air, the critical angle, $\theta c$, is as follows:

$$\theta c = \arcsin(N_{acrylic}/N_{air}) = \arcsin(1.5/1) = 41.8°$$

In the first embodiment, light is emitted through the first surface 558 of the waveguide body 554 in part due to the curvature thereof.

Figure 57A:
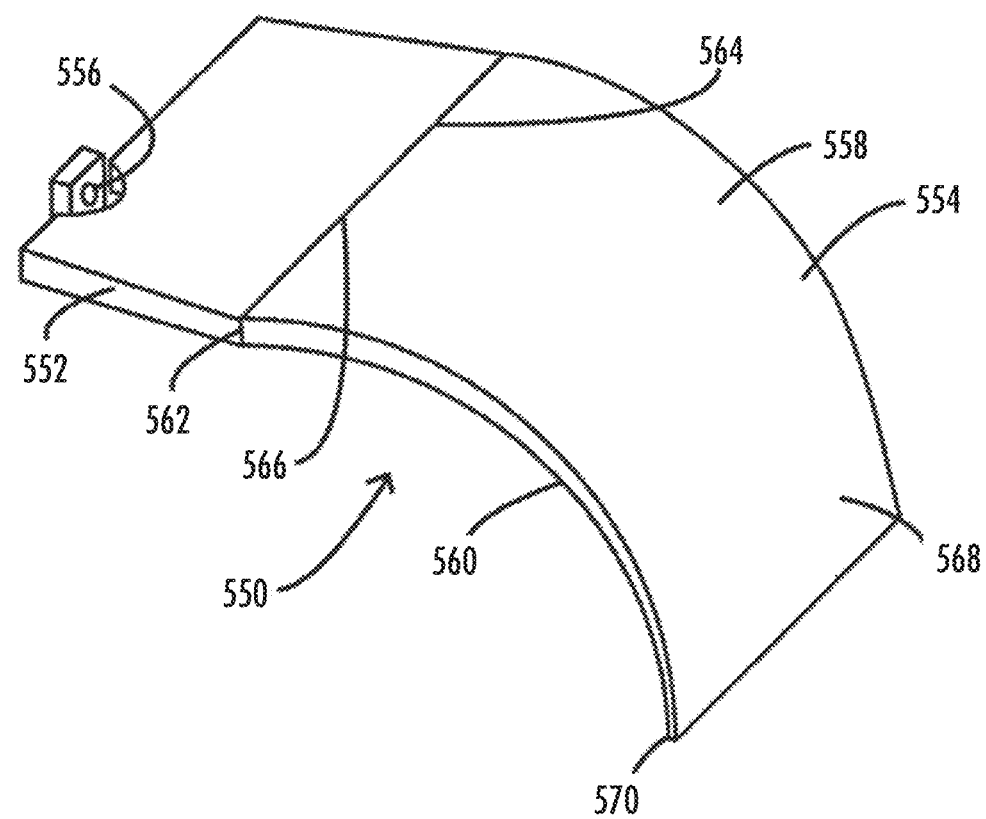
FIG. 57A is an isometric view of a first embodiment of a waveguide.
Figure 57B:
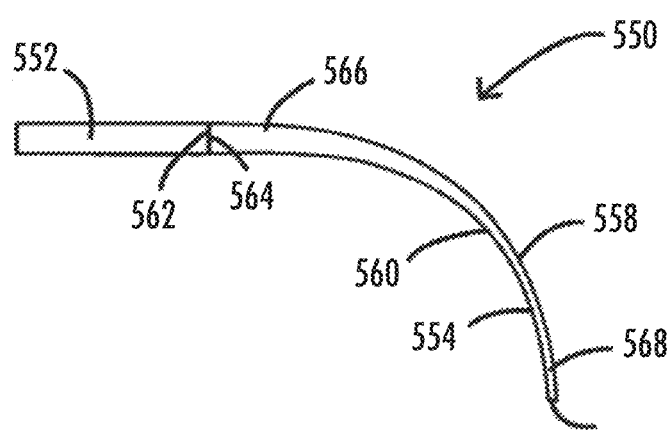
FIG. 57B is a side elevational view of the first embodiment of the waveguide.

As shown in FIGS. 57A and 57B, the taper of the waveguide body 554 is linear between the input surface 564 and the end surface 570. According to one embodiment, a first thickness at the input surface 564 is 6 mm and a second thickness of the end surface is 2 mm. The radius of curvature of the first surface 558 is approximately 200 mm and the radius of the curvature of the second surface 560 is approximately 200 mm.

Figure 58A:
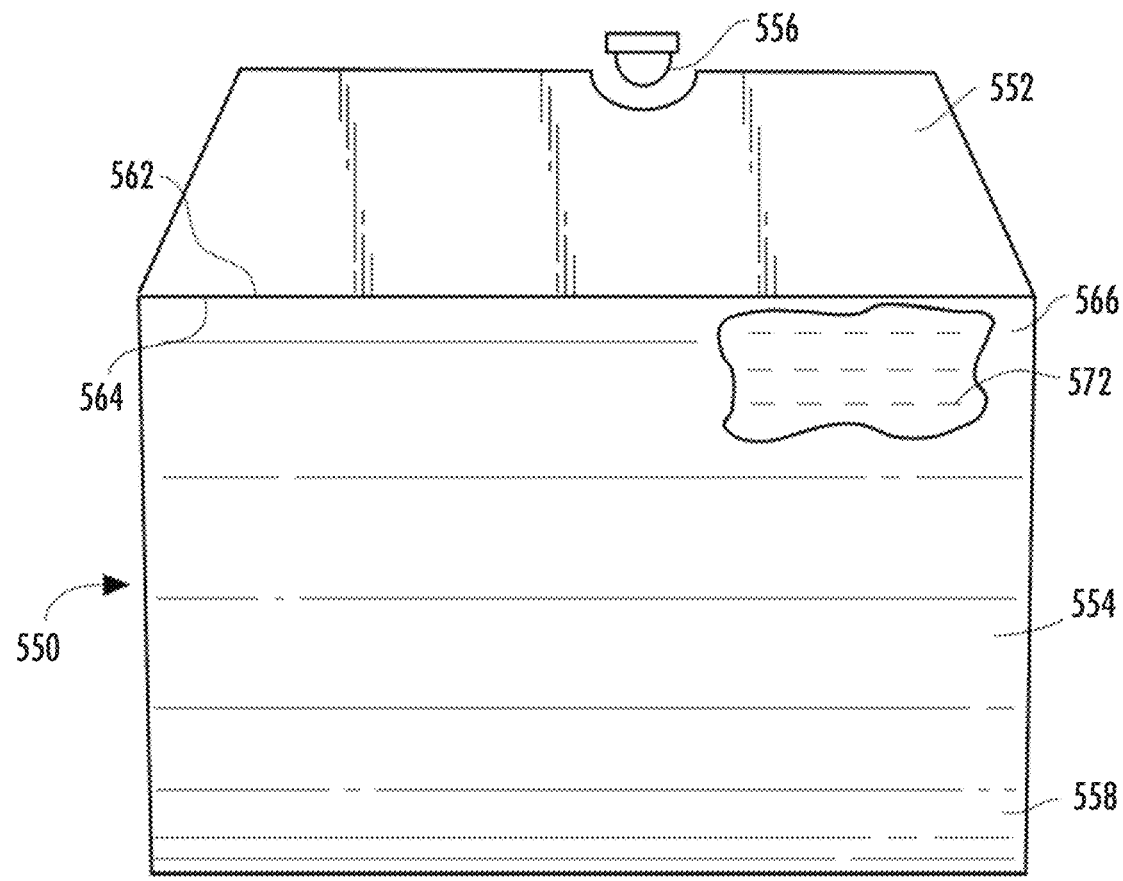
FIG. 58A is a plan view of the waveguide of FIG. 57A.
Figure 58B:
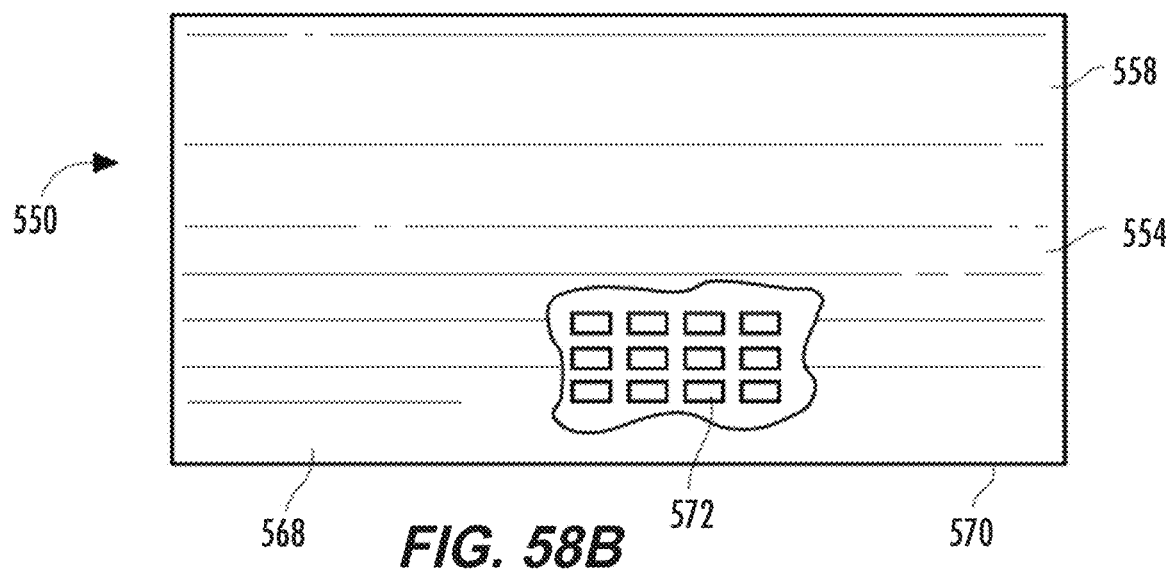
FIG. 58B is a front elevational view of the waveguide of FIG. 57A.
Figure 60A:
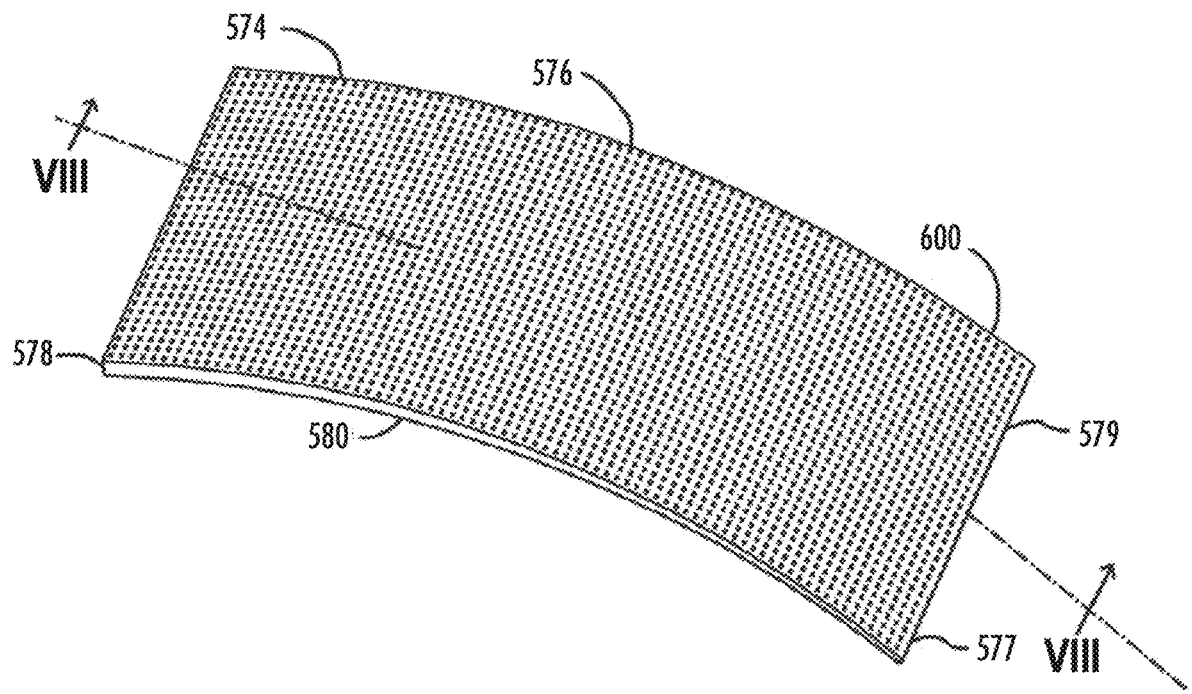
FIG. 60A is a side isometric view of a second embodiment of a waveguide body having a regular array of extraction features.
Figure 60B:
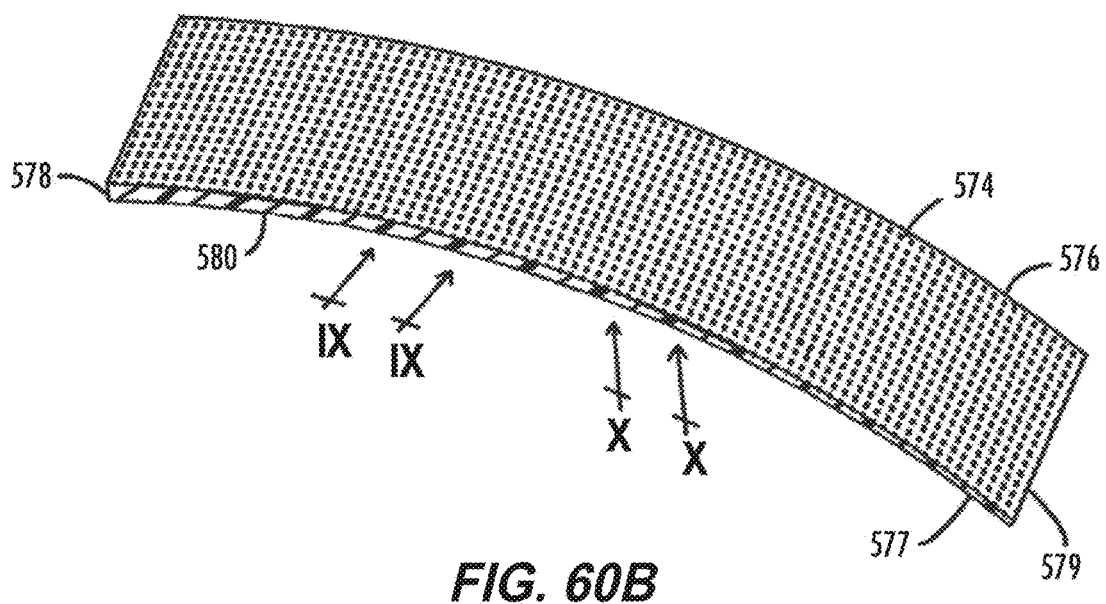
FIG. 60B is a sectional view taken generally along the lines VIII-VIII of FIG. 60A.

Further, the number, geometry, and spatial array of optional extraction features across a waveguide body affects the uniformity and distribution of emitted light. As shown in the first embodiment of the waveguide body 554 in FIGS. 58A, 58B and 59A-59C, an array of discrete extraction features 572 having a variable extraction feature size is utilized to obtain a uniform or nearly uniform distribution of light. Specifically, the extraction features 572 are arranged in rows and columns wherein the features in each row extend left to right and the features in each column extend top to bottom as seen in FIGS. 58A and 58B. The extraction features 572 closest to the light source may be generally smaller and/or more widely spaced apart so that in the length dimension of the waveguide body 554 the majority of light travels past such features to be extracted at subsequent parts of the waveguide body 554. This results in a gradual extraction of light over the length of the waveguide body 554. The center to center spacing of extraction features 572 in each row are preferably constant, although such spacing may be variable, if desired. The extraction features 572 contemplated herein may be formed by injection molding, embossing, laser cutting, calendar rolling, or the extraction features may added to the waveguide body 554 by a film.

Referring to FIGS. 58A and 58B, extraction features 572 on the first surface 558 of the waveguide body 554 permit the light rays to exit the waveguide body 554 because the angles of incidence of light rays at the surface of the extraction features 572 are greater than the critical angle. The change in size (and, optionally, spacing) of the extraction features 572 over the length of the waveguide body 554 results in a uniform or nearly uniform distribution of light emitted from the waveguide body 554 over the length and width thereof. Preferably, as seen in FIGS. 59A and 59B, the extraction features 572 nearest the light source 556 are approximately 0.5 mm in width by 0.5 mm in length and 0.5 mm in depth. Also preferably, the extraction features at such location have a center to center spacing of about 2 mm. Still further, as seen in FIGS. 59A and 59C, the extraction features 572 farthest from the light source 556 are preferably approximately 1.4 mm (width) by 1.4 mm (length) by 1.4 mm (depth). In addition, the extraction features 572 at such location are also spaced apart about 2 mm (measured center-to-center). While the extraction features 572 are illustrated as having a constant spacing along the waveguide body 554, the features may instead have variable spacing as noted above. Thus, for example, the spacing between the features may decrease with distance from the light source 556. The increased size (and, possibly, density) of extraction features 572 as seen in FIG. 59C allows for the same amount of light to be emitted as the smaller extraction features 572 seen in FIG. 59B. While a uniform distribution of light is desired in the first embodiment, other distributions of light may be contemplated and obtained using different arrays of extraction features.

Referring next to FIGS. 60A-61C, a further embodiment of a waveguide body 574 is illustrated. The waveguide body 574 is identical to the waveguide body 554, with the exception that the sizes and densities of extraction features 576 are constant along an outer surface 577. The waveguide body 574 further includes an input surface 578, an end surface 579 opposite the input surface 578, and an inner surface 580 and is adapted to be used in conjunction with any coupling optic and one or more light sources, such as the coupling optics disclosed herein and the LED 556 of the previous embodiment. The dimensions and shape of the waveguide body 574 are identical to those of the previous embodiment.

Figure 61A:
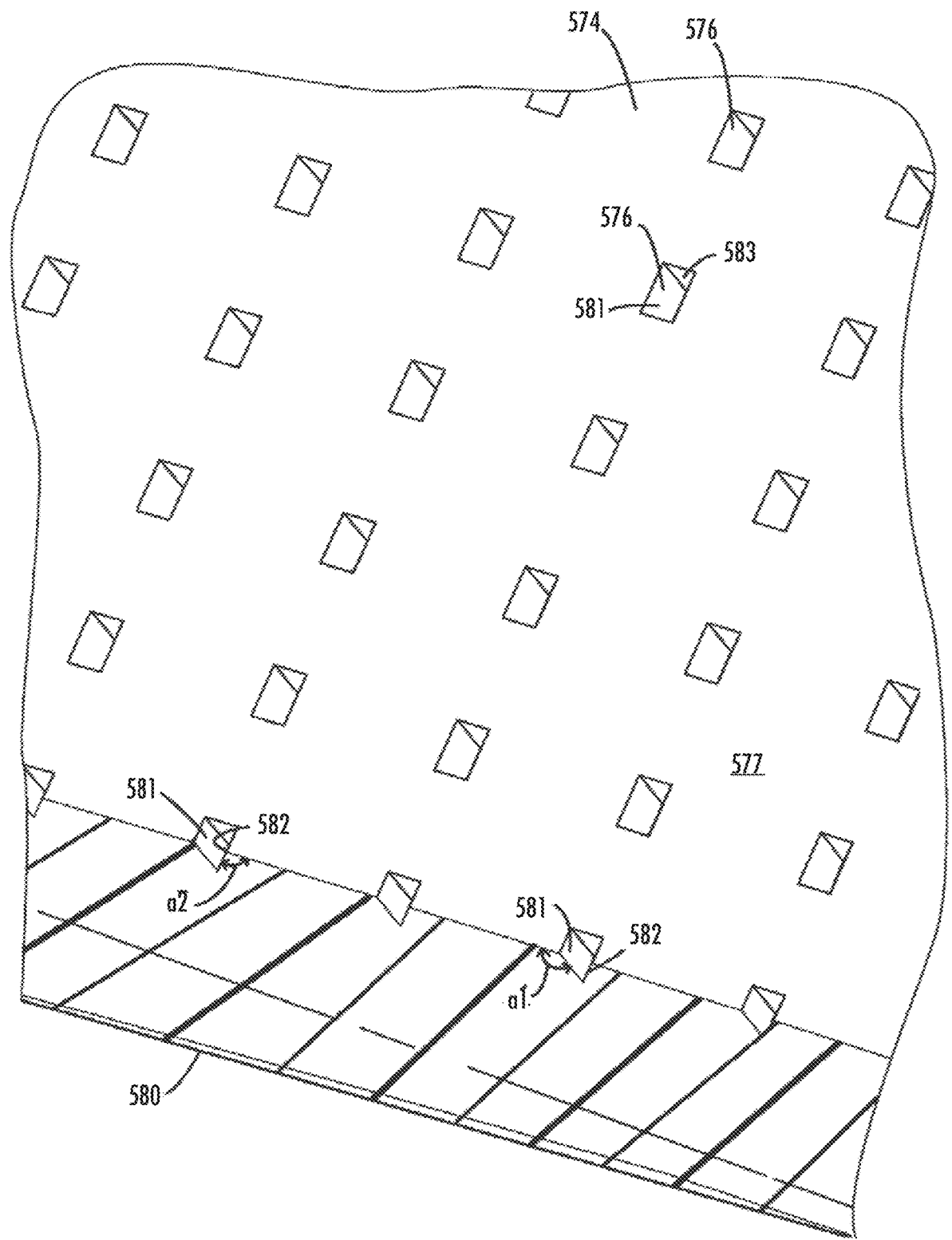
FIG. 61A is an enlarged, sectional, fragmentary, and isometric view taken along the lines of IX-IX in FIG. 60B.
Figure 61B:
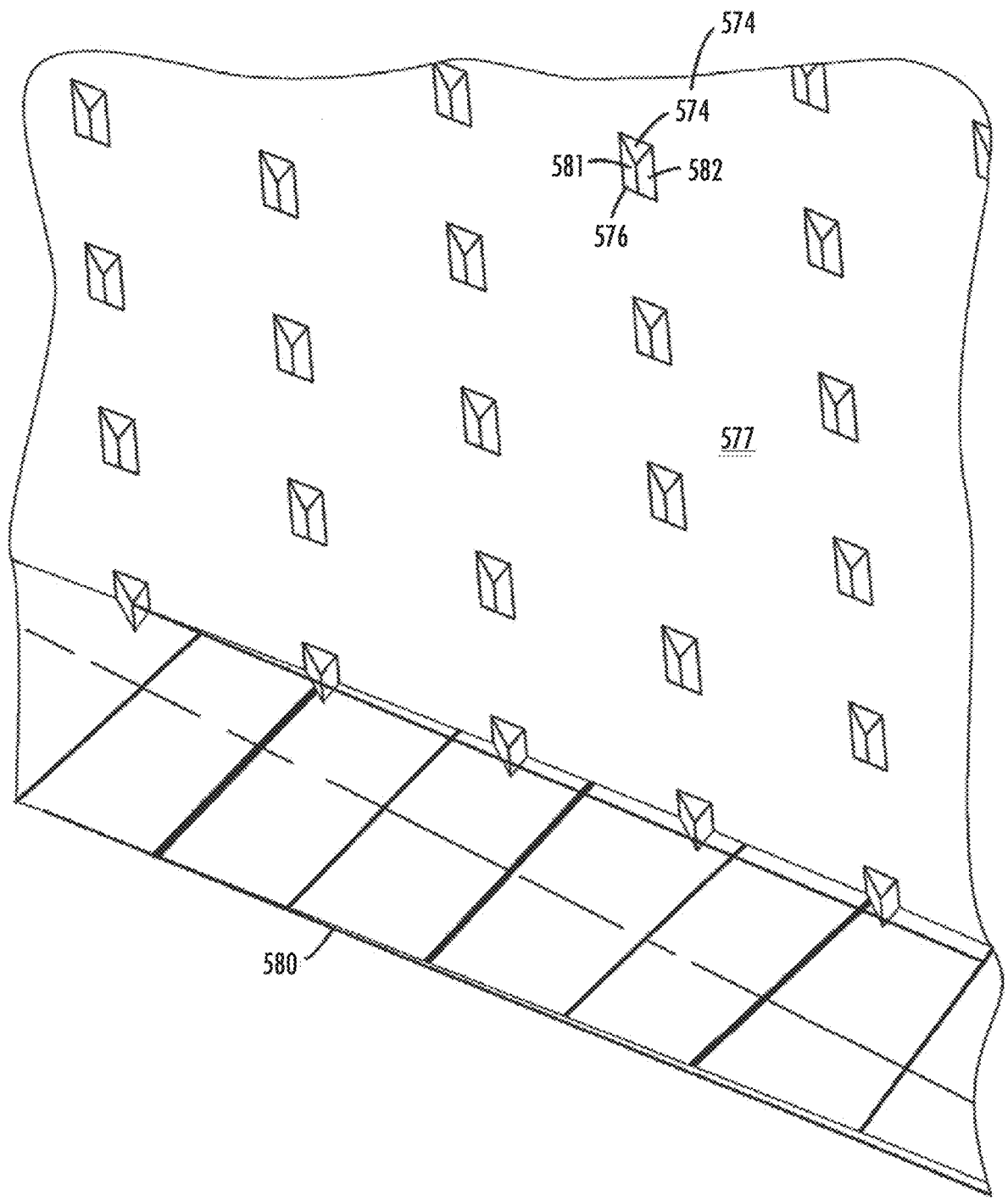
FIG. 61B is an enlarged, sectional, fragmentary, and isometric view taken generally along the lines of X-X of FIG. 60B.
Figure 61C:
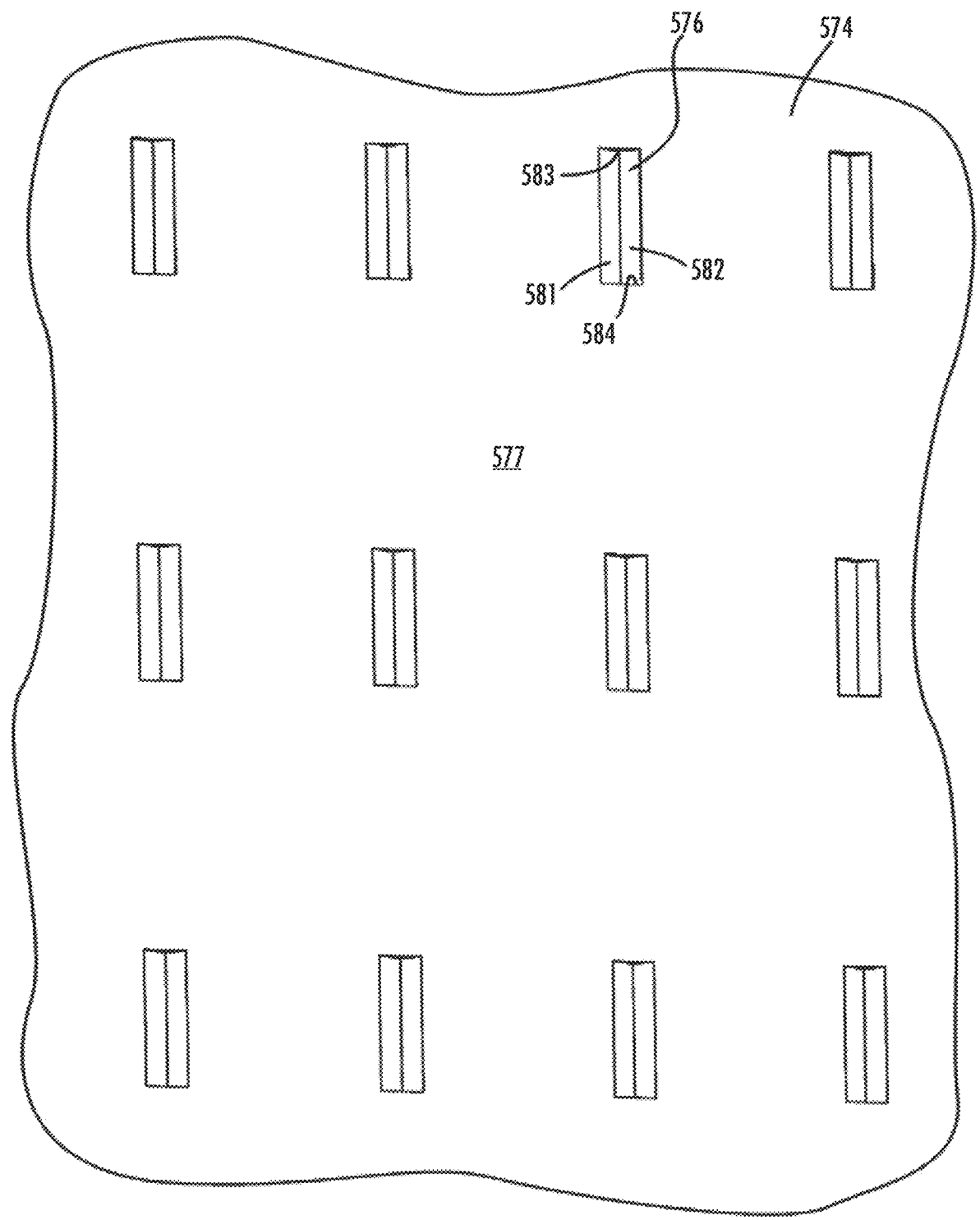
FIG. 61C is an enlarged, fragmentary plan view of several of the extraction features of FIG. 60B.

As seen in FIGS. 61A-61C, each extraction feature 576 comprises a V-shaped notch formed by flat surfaces 581, 582. End surfaces 583, 584 are disposed at opposing ends of the surfaces 581, 582. The end surfaces 583, 584 are preferably, although not necessarily, substantially normal to the surface 577. In one embodiment, as seen in FIG. 61A, the surface 581 is disposed at an angle a1 with respect to the surface 577 whereas the surface 582 is disposed at an angle a2 with respect to the surface 577. While the angles a1 and a2 are shown as being equal or substantially equal to one another in FIGS. 61A-61C, the objective in a preferred embodiment is to extract all or substantially all light during a single pass through the waveguide body from the input surface 578 to the end surface 579. Therefore, light strikes only the surfaces 581, and little to no light strikes the surfaces 582. In such an embodiment the surfaces 581, 582 are be disposed at different angles with respect to the surface 577, such that a1 is about equal to 140 degrees and a2 is about equal to 95 degrees, as seen in FIG. 66A.

The extraction features 576 shown in FIGS. 61A-61C may be used as the extraction features 572 of the first embodiment, it being understood that the size and spacing of the extraction features may vary over the surface 558, as noted previously. The same or different extraction features could be used in any of the embodiments disclosed herein as noted in greater detail hereinafter, either alone or in combination.

Referring to FIGS. 62A-63B, a third embodiment of a waveguide body 590 utilizes extraction features 592 in the form of a plurality of discrete steps 594 on a surface 598 of the waveguide body 590. The waveguide body 590 has an input surface 591 and an end surface 593. The steps 594 extend from side to side of the waveguide body 590 whereby the input surface 591 has a thickness greater than the thickness of the end surface 593. Any coupling optic, such as any of the coupling optics disclosed herein, may be used with the waveguide body 590. Light either refracts or internally reflects via total internal reflection at each of the steps 594. The waveguide body 590 may be flat (i.e., substantially planar) or curved in any shape, smooth or textured, and/or have a secondary optically refractive or reflective coating applied thereon. Each step 594 may also be angled, for example, as shown by the tapered surfaces 596 in FIG. 63A, although the surfaces 596 can be normal to adjacent surfaces 598, if desired.

Figure 63A:
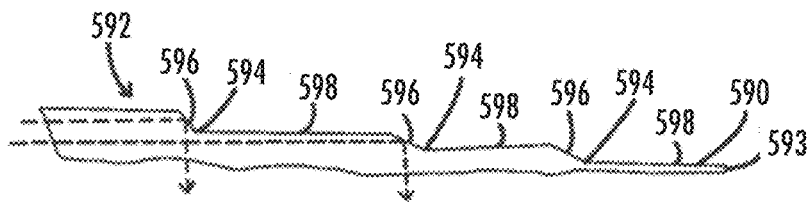
FIG. 63A is a fragmentary, enlarged sectional view illustrating the waveguide body of FIGS. 62A-62C in greater detail.
Figure 63B:
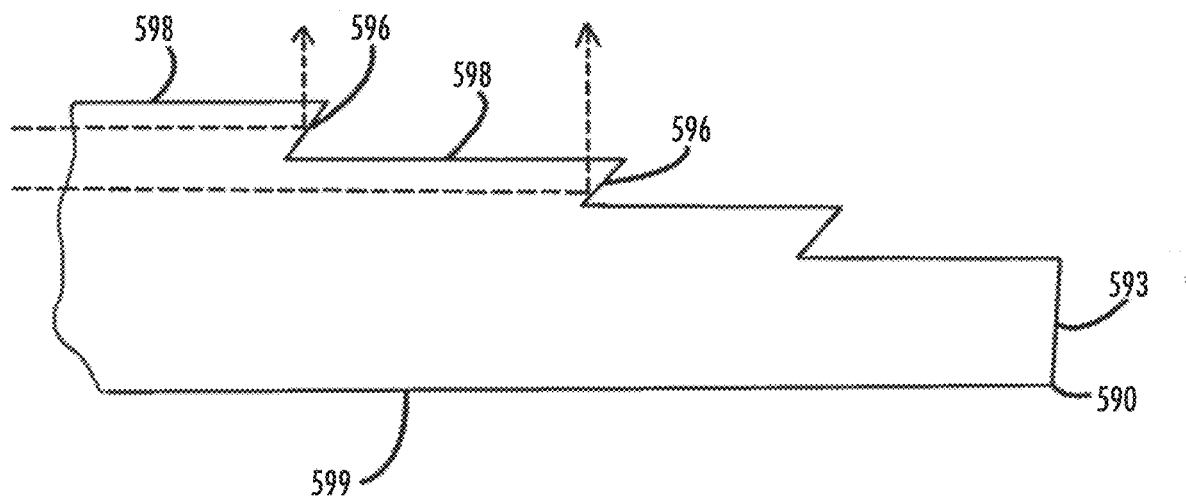
FIG. 63B is a view similar to FIG. 63A illustrating an alternative waveguide body.

FIG. 63B illustrates an embodiment wherein extraction features 592 include surfaces 596 that form an acute angle with respect to adjacent surfaces 598, contrary to the embodiment of FIG. 63A. In this embodiment, the light rays traveling from left to right as seen in FIG. 63B are extracted out of the surface including the surfaces 596, 598 as seen in FIG. 63A, as opposed to the lower surface 599 (seen in FIGS. 62C and 63B).

Figure 64A:
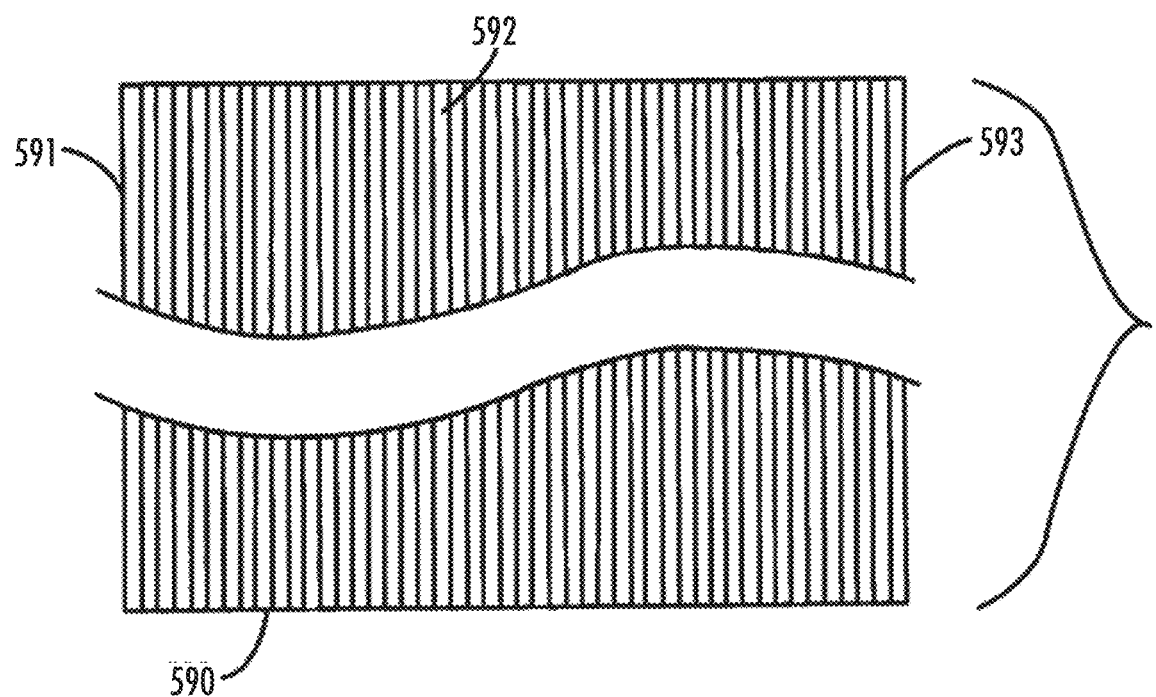
FIGS. 64A and 64B are plan and side views, respectively, of another waveguide body.
Figure 64B:
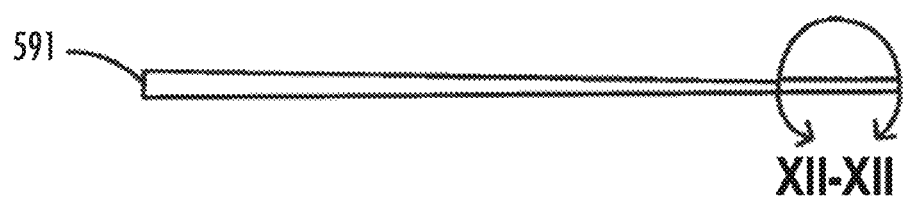
Figure 64C:
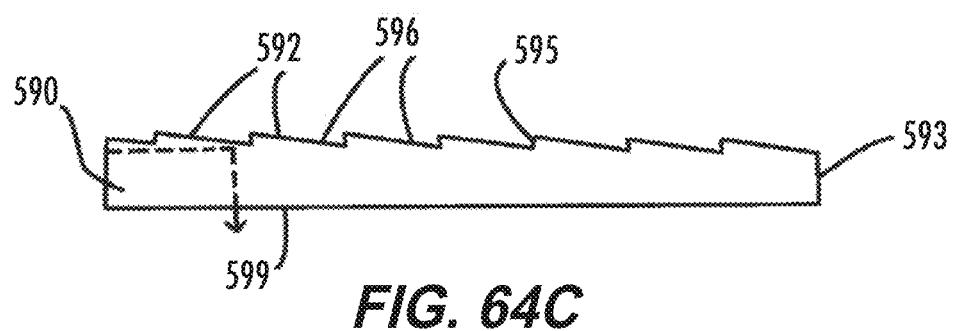
FIG. 64C is an enlarged fragmentary view of a portion of the waveguide body of FIG. 64B illustrated by the line XII-XII.

Yet another modification of the embodiment of FIGS. 62A-63B is seen in FIGS. 64A-64C wherein the tapered waveguide body 590 includes extraction features 592 having surfaces 596 separated from one another by intermediate step surfaces 595. The waveguide body 590 tapers from a first thickness at the input surface 591 to a second, lesser thickness at the end surface 593. Light is directed out of the lower surface 599.

Further, the steps 594 may be used in conjunction with extraction features 576 that are disposed in the surfaces 598 or even in each step 594. This combination allows for an array of equally spaced extraction features 572 to effect a uniform distribution of light. The changes in thickness allows for a distribution of emitted light without affecting the surface appearance of the waveguide.

Extraction features may also be used to internally reflect and prevent the uncontrolled escape of light. For example, as seen in FIG. 66A, a portion of light that contacts a surface 581 of a typical extraction feature 576 escapes uncontrolled. FIG. 65A illustrates a waveguide body 608 having a slotted extraction feature 610 that redirects at least a portion of light that would normally escape back into the waveguide body 608. The slotted extraction feature 610 comprises a parallel-sided slot having a first side surface 611 and a second side surface 612. A portion of the light strikes the slotted extraction feature 610 at a sufficiently high angle of incidence that the light escapes through the first side surface 611. However, most of the escaped light reenters the waveguide body 608 through the second side surface 612. The light thereafter reflects off the outer surface of the waveguide body 608 and remains inside the body 608. The surface finish and geometry of the slotted extraction feature 610 affect the amount of light that is redirected back into the waveguide body 608. If desired, a slotted extraction feature 610 may be provided in upper and lower surfaces of the waveguide body 608. Also, while a flat slot is illustrated in FIG. 65A, curved or segmented slots are also possible. For example, FIG. 65B illustrates a curved and segmented slot comprising slot portions 614a, 614b. Parallel slotted extraction features may be formed within the waveguide as well as at the surface thereof, for example, as seen at 613 in FIG. 65A. Any of the extraction features disclosed herein may be used in or on any of the waveguide bodies disclosed herein. The extraction features may be equally or unequally sized, shaped, and/or spaced in and/or on the waveguide body.

In addition to the extraction features 572, 576, 594, 610, 613, and/or 614, light may be controlled through the use of discrete specular reflection. An extraction feature intended to reflect light via total internal reflection is limited in that any light that strikes the surface at an angle greater than the critical angle will escape uncontrolled rather than be reflected internally. Specular reflection is not so limited, although specular reflection can lead to losses due to absorption. The interaction of light rays and extraction features 602 with and without a specular reflective surface is shown in FIGS. 66A-66C. FIG. 66A shows the typical extraction feature 576 with no reflective surface. FIG. 66B shows a typical extraction feature 576 with a discrete reflective surface 615 formed directly thereon. The discrete reflective surface 615 formed on each extraction feature 576 directs any light that would normally escape through the extraction feature 576 back into the waveguide body 574. FIG. 66C shows an extraction feature 576 with a discrete reflective surface 616 having an air gap 617 therebetween. In this embodiment, light either reflects off the surface 581 back into the waveguide body 574 or refracts out of the surface 581. The light that does refract is redirected back into the waveguide body 574 by the reflective surface 616 after traveling through the air gap 617. The use of non-continuous reflective surfaces localized at points of extraction reduces the cost of the reflective material, and therefore, the overall cost of the waveguide. Specular reflective surfaces can be manufactured by deposition, bonding, co-extrusion with extraction features, insert molding, vacuum metallization, or the like.

Figure 67B:
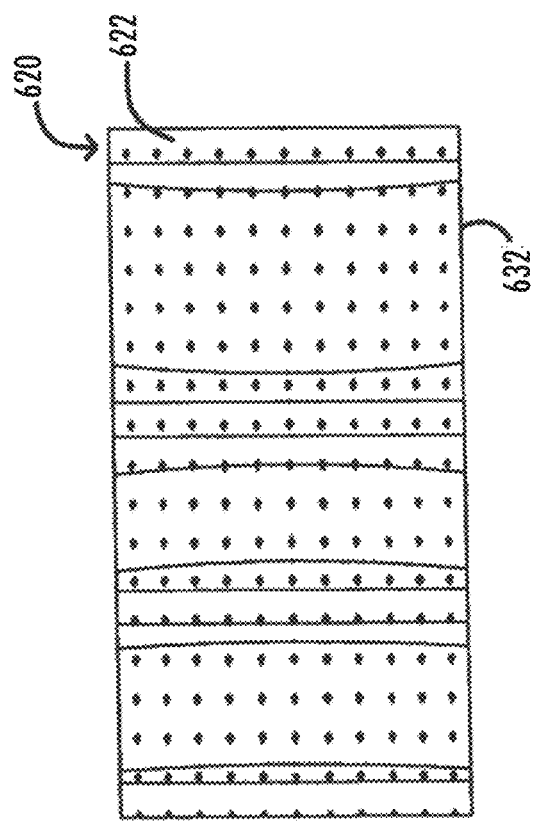
FIG. 67B is plan view of the waveguide body of FIG. 67A.
Figure 67C:
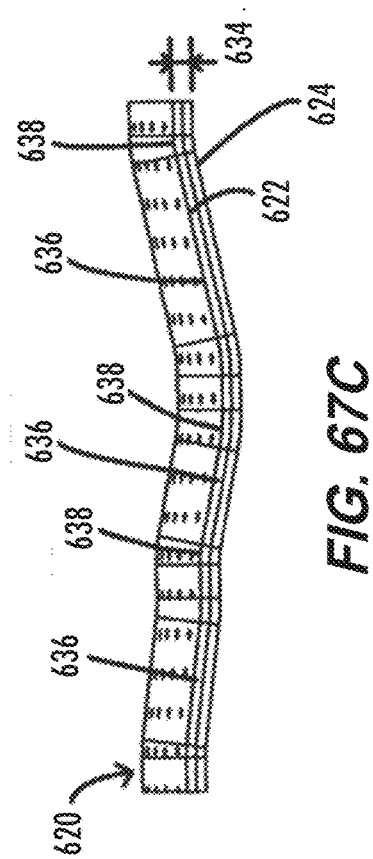
FIG. 67C is a side elevational view of the waveguide body of FIG. 67A.
Figure 67A:
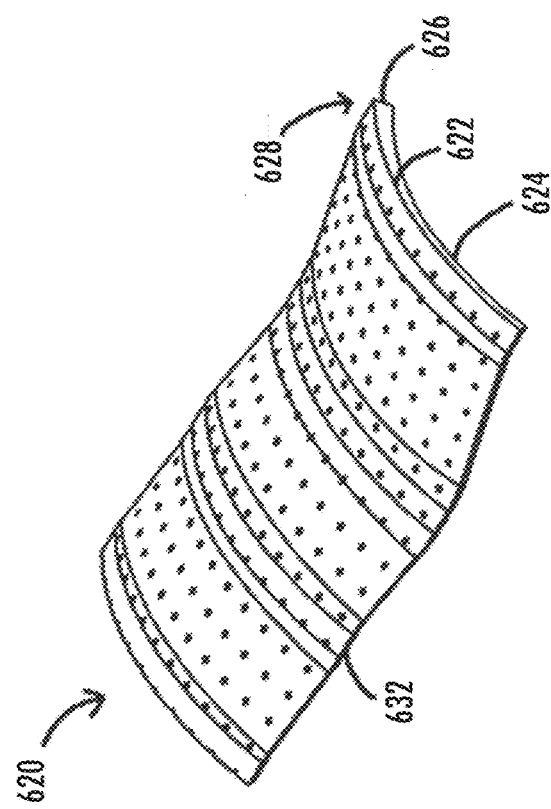
FIG. 67A is an isometric view of a further embodiment of a waveguide body.

Referring to FIGS. 67A-67C, a further embodiment of a waveguide body 620 includes a curved, tapered shape formed by a first surface 622 and a second surface 624. Similar to the first embodiment of the waveguide 554, light enters an input surface 626 at a first end 628 of the waveguide 620. Light is emitted through the first surface 622 and reflected internally along the second surface 624 throughout the length of the waveguide body 620. The waveguide body 620 is designed to emit all or substantially all of the light from the first surface 622 as the light travels through the waveguide body 620. Thus, little or no light is emitted out an end face 632 opposite the first end 628.

FIG. 67C shows a side elevational view of the waveguide 620 body. The distance 634 between the first and second surfaces 622, 624 is constant along the width. The first and second surfaces 622, 624 have a varied contour that comprises linear portions 636 and curved portions 638. The waveguide body 620 has a plurality of extraction features 640 that are equally or unequally spaced on the surface 622 and/or which are of the same or different size(s) and/or shape(s), as desired. As noted in greater detail hereinafter, the embodiment of FIGS. 67A-67C has multiple inflection regions that extend transverse to the general path of light through the input surface 626. Further, as in all the embodiments disclosed herein, that waveguide body is made of an acrylic material, a silicone, a polycarbonate, a glass material, or the like.

Figure 68A:
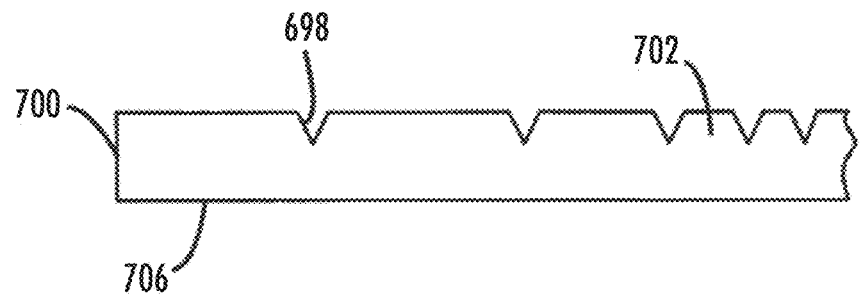
FIG. 68A is a side elevational view of another waveguide body.
Figure 68B:
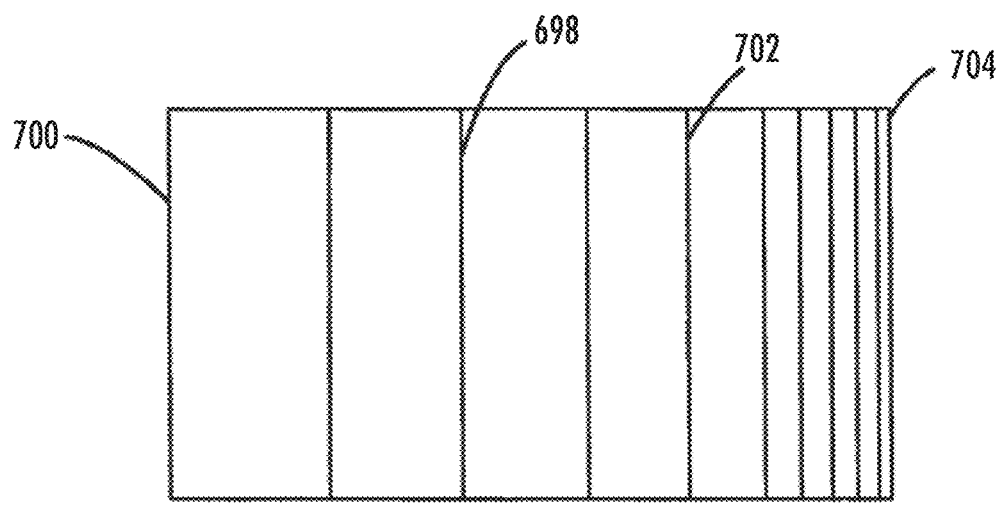
FIG. 68B is a plan view of the waveguide body of FIG. 68A.

FIGS. 68A and 68B illustrate yet another embodiment wherein a series of parallel, equally-sized linear extraction features 698 are disposed in a surface 699 at varying distances between an input surface 700 of a waveguide body 702. Each of the extraction features 698 may be V-shaped and elongate such that extraction features 698 extend from side to side of the waveguide body 702. The spacing between the extraction features 698 decreases with distance from the input surface 700 such that the extraction features are closest together adjacent an end surface 704. The light is extracted out of a surface 706 opposite the surface 699.

Figure 69:
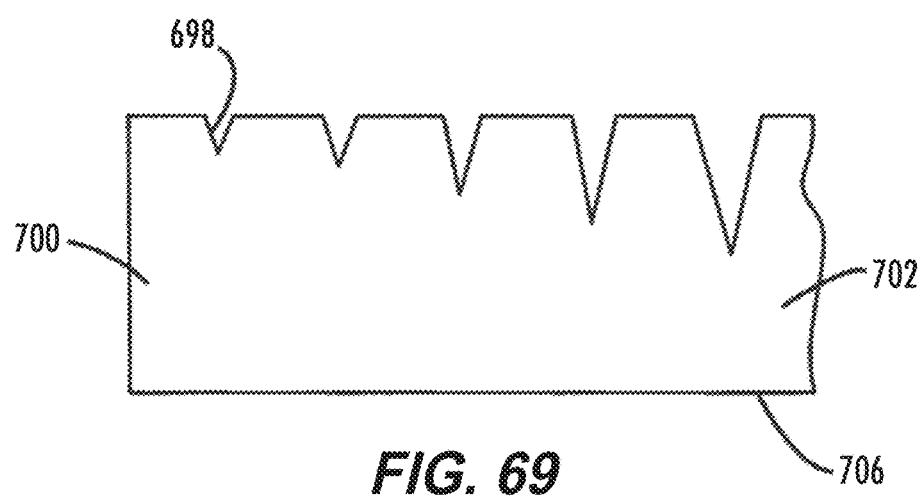
FIG. 69 is a side elevational view of yet another waveguide body.
Figure 70A:
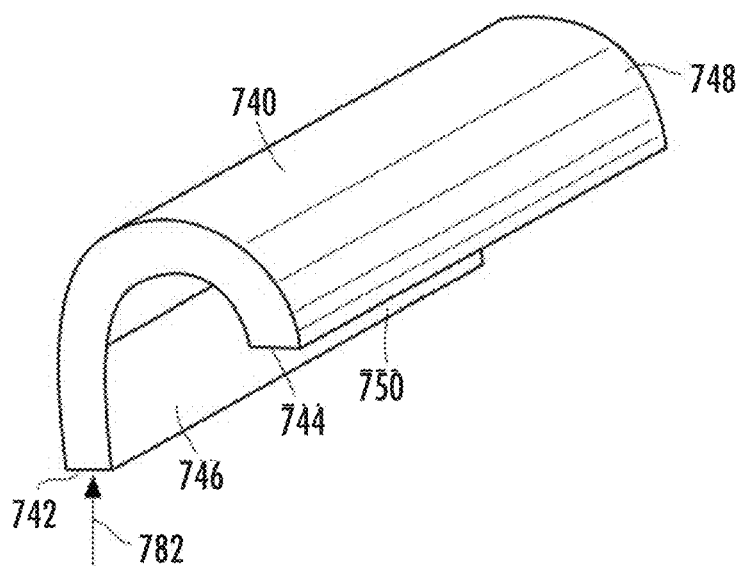
FIGS. 70A-70D are upper isometric, lower isometric, side elevational, and rear elevational views, respectively, of a still further waveguide body.
Figure 70B:
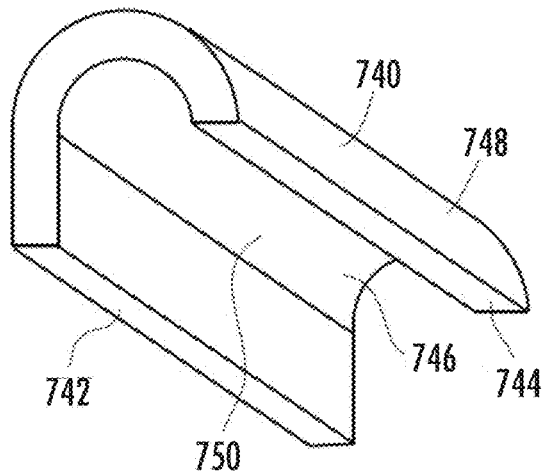
Figure 70C:
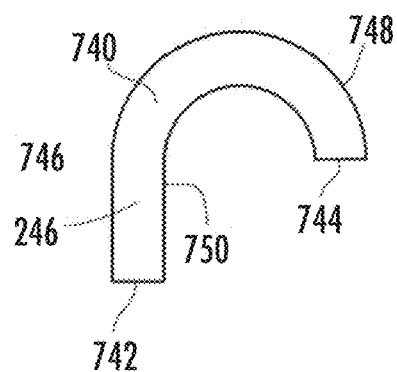
Figure 70D:
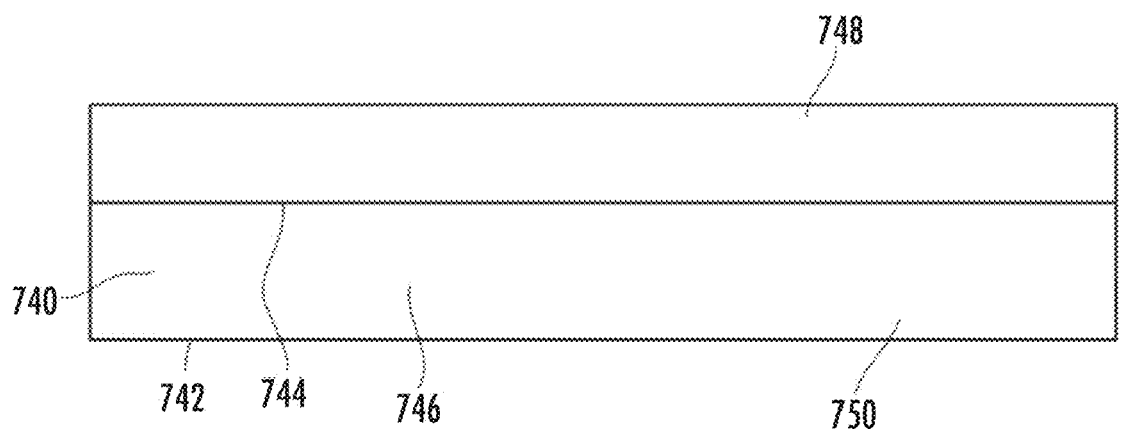

FIG. 69 illustrates an embodiment identical to FIGS. 68A and 68B, with the exception that the waveguide features 698 are equally spaced and become larger with distance from the input face 700. If desired, the extraction features 698 may be unequally spaced between the input and end surfaces 700, 704, if desired. As in the embodiment of FIGS. 68A and 68B, light is extracted out of the surface 706.

FIGS. 70A-70D illustrate yet another embodiment of a waveguide body 740 having an input surface 742, an end surface 744, and a J-shaped body 746 disposed between the surfaces 742, 744. The waveguide body 740 may be of constant thickness as seen in FIGS. 70A-70D, or may have a tapering thickness such that the input surface 742 is thicker than the end surface 744. Further, the embodiment of FIGS. 70A-70D is preferably of constant thickness across the width of the body 740, although the thickness could vary along the width, if desired. One or more extraction features may be provided on an outer surface 748 and or an inner surface 750, if desired, although it should be noted that light injected into the waveguide body 740 escapes the body 740 through the surface 748 due to the curvature thereof.

Figure 71A:
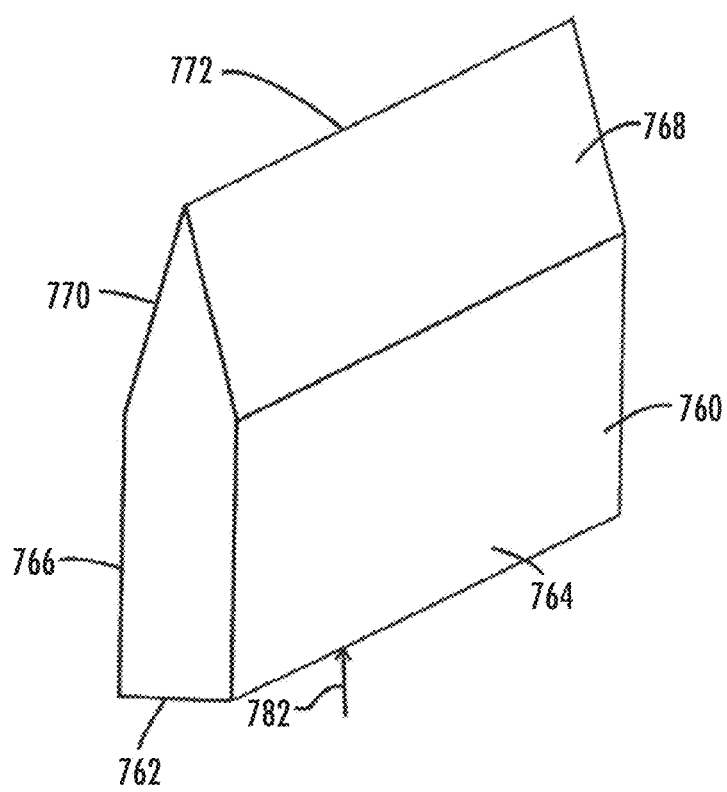
FIGS. 71A-71C are isometric, side elevational, and front elevational views of another waveguide body.
Figure 71B:
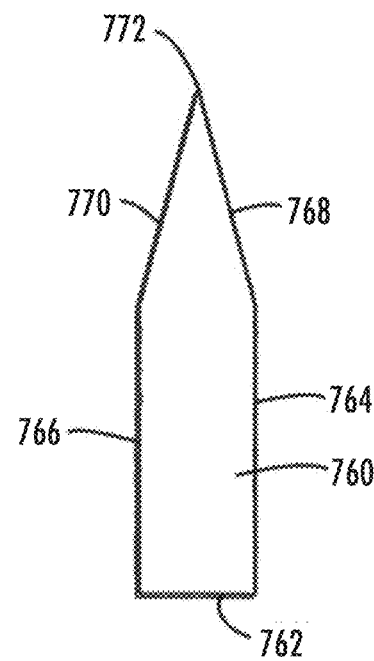
Figure 71C:
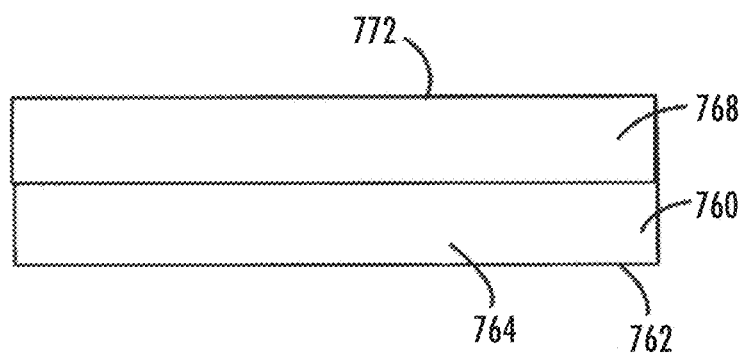

FIGS. 71A-71C illustrate a still further embodiment of a waveguide 760 including an input surface 762. The waveguide body 760 further includes first and second parallel surfaces 764, 766 and beveled surfaces 768, 770 that meet at a line 772. Light entering the input surface 762 escapes through the surfaces 768, 770.

Figure 72:
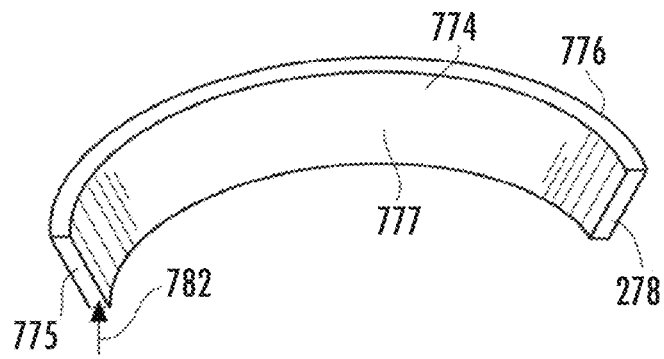
Figure 73:
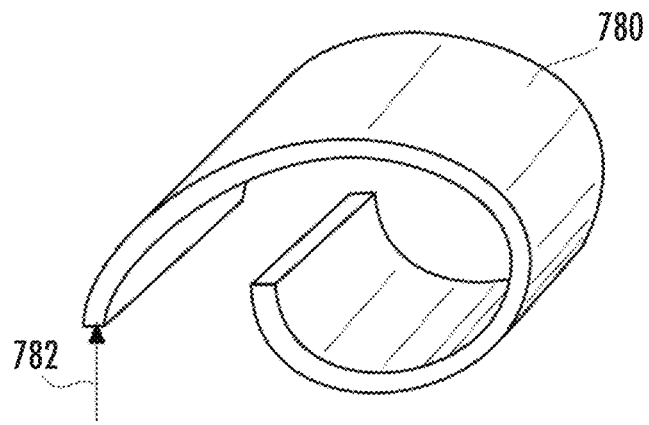

A further embodiment comprises the curved waveguide body 774 of FIG. 72. Light entering an input surface 775 travels through the waveguide body 774 and is directed out an outer surface 776 that is opposite an inner surface 777. As in any of the embodiments disclosed herein, the surfaces 776, 777 may be completely smooth, and/or may include one or more extraction features as disclosed herein. Further, the waveguide body may have a constant thickness (i.e., the dimension between the faces 776, 777) throughout, or may have a tapered thickness between the input surface 775 and an end surface 778, as desired. As should be evident from an inspection of FIG. 72, the waveguide body 774 is not only curved in one plane, but also is tapered inwardly from top to bottom (i.e., transverse to the plane of the curve of the body 774) as seen in the Figure.

Figure 74:
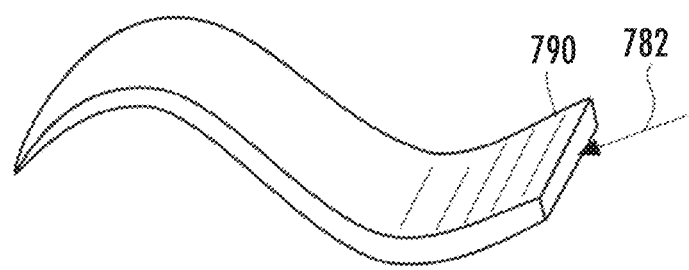
Figure 75:
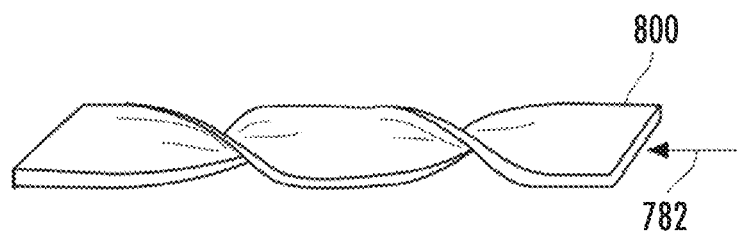

In the case of an arc of constant radius, a large portion of light is extracted at the beginning of the arc, while the remaining light skips along the outside surface. If the bend becomes sharper with distance along the waveguide body, a portion of light is extracted as light skips along the outside surface. By constantly spiraling the arc inwards, light can be extracted out of the outer face of the arc evenly along the curve. Such an embodiment is shown by the spiral-shaped waveguide body 780 of FIG. 73 (an arrow 782 illustrates the general direction of light entering the waveguide body 780 and the embodiments shown in the other Figures). These same principles apply to S-bends and arcs that curve in two directions, like a corkscrew. For example, an S-shaped waveguide body 790 is shown in FIG. 74 and a corkscrew-shaped waveguide body 800 is shown in FIG. 75. Either or both of the waveguide bodies is of constant cross sectional thickness from an input surface to an end surface or is tapered between such surfaces. The surfaces may be smooth and/or may include extraction features as disclosed herein. The benefit of these shapes is that they produce new geometry to work with, new ways to create a light distribution, and new ways to affect the interaction between the waveguide shape and any extraction features.

Figure 76:
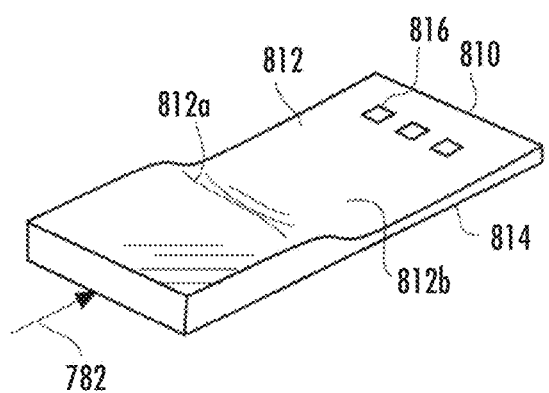
Figure 77:
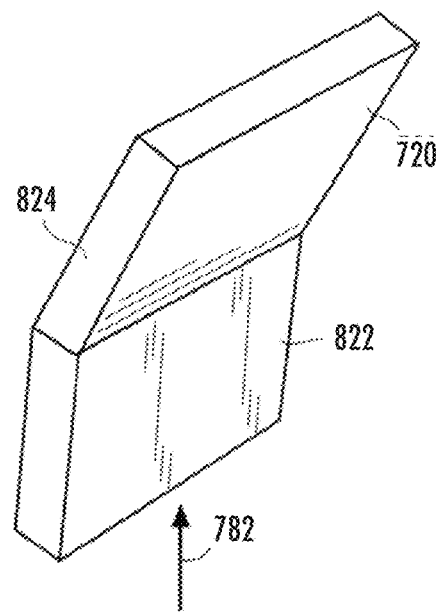
Figure 78:
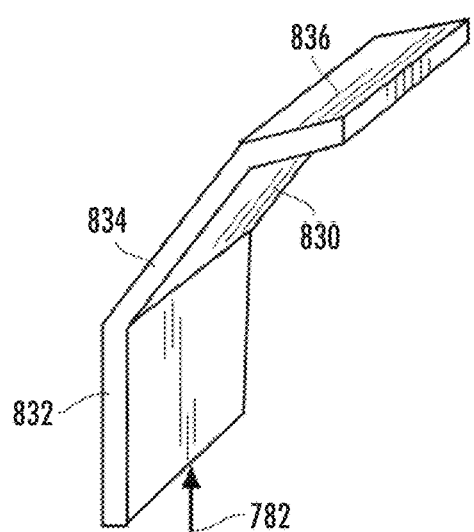
Figure 79:
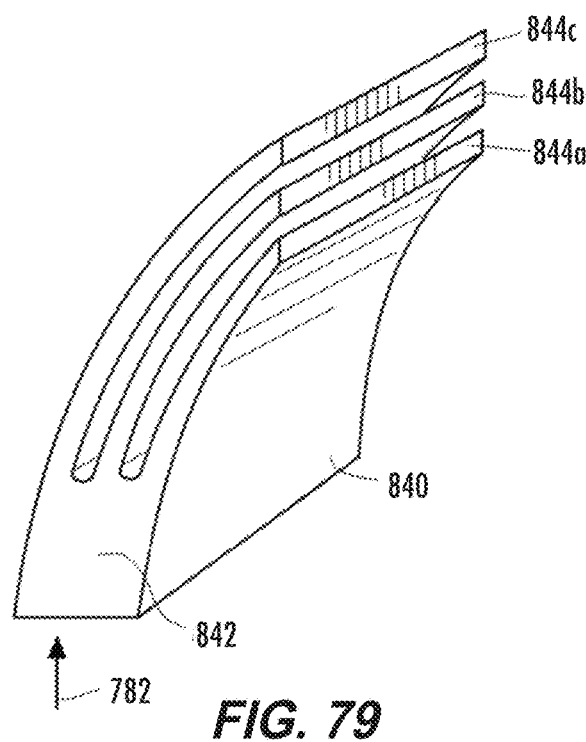

FIGS. 76-46 illustrate further embodiments of waveguide bodies 810, 820, 830, 840, 850, 860, 870, 880, 890, 900, and 910, respectively, wherein curvature, changes in profile and/or cross sectional shape and thickness are altered to create a number of effects. The waveguide body 810 is preferably, although not necessarily, rectangular in cross sectional shape and has a curved surface 812 opposite a flat surface 814. The curved surface 812 has multiple inflection regions defining a convex surface 812a and a convex surface 812b. Both of the surfaces 812, 814 may be smooth and/or may have extraction features 816 disposed therein (as may all of the surfaces of the embodiments disclosed herein.) Referring to FIGS. 77 and 78, the waveguide bodies 820, 830 preferably, although not necessarily, have a rectangular cross sectional shape, and may include two sections 822, 824 (FIG. 77) or three or more sections 832, 834, 836 (FIG. 78) that are disposed at angles with respect to one another. FIG. 79 illustrates the waveguide body 840 having a base portion 842 and three curved sections 844a-844c extending away from the base portion 842. The cross sections of the base portion 842 and the curved portions 844 are preferably, although not necessarily, rectangular in shape.

FIGS. 80 and 81 illustrate waveguide bodies 850 and 860 that include base portions 852, 862, respectively. The waveguide body 850 of FIG. 80 includes diverging sections 854a, 854b having outer surfaces 856a, 856b extending away from the base portion 852 that curve outwardly in convex fashion. The waveguide body 860 of FIG. 81 includes diverging sections 864a, 864b having outer surfaces 866a, 866b that curve outwardly in convex and concave fashion.

The waveguide bodies 870, 880, and 890 of FIGS. 82-84 all have circular or elliptical cross sectional shapes. The waveguide bodies 870, 880 have two sections 872, 874 (FIG. 82) or three or more sections 882, 884, 886 (FIG. 83). The waveguide body 890 of FIG. 84 preferably, although not necessarily, has a circular or elliptical cross sectional shape and, like any of the waveguide bodies disclosed herein (or any section or portion of any of the waveguide bodies disclosed herein) tapers from an input surface 892 to an output surface 894.

The waveguide body 900 of FIGS. 85A and 85B is substantially mushroom-shaped in cross section comprising a base section 902 that may be circular in cross section and a circular cap section 904. Extraction features 906 may be provided in the cap section 904. Light may be emitted from a cap surface 908.

FIGS. 86A and 87 illustrate that the cross sectional shape may be further varied, as desired. Thus, for example, the cross sectional shape may be triangular as illustrated by the waveguide body 910 or any other shape. If desired, any of the waveguide bodies may be hollow, as illustrated by the waveguide body 912 seen in FIG. 86B, which is identical to the waveguide body 910 of FIG. 86A except that a triangular recess 914 extends fully therethrough. FIG. 87 illustrates substantially sinusoidal outer surfaces 922, 924 defining a complex cross sectional shape.

FIG. 88A illustrates a waveguide body 940 that is preferably, although not necessarily, planar and of constant thickness throughout. Light is directed into opposing input surfaces 942a, 942b and transversely through the body 940 by first and second light sources 556a, 556b, each comprising, for example, one or more LEDs, and coupling optics 552a, 552b, respectively, which together form a waveguide. Extraction features 944, which may be similar or identical to the extraction features 576 or any of the other extraction features disclosed herein, are disposed in a surface 946. As seen in FIG. 88B light developed by the light sources 556a, 556b is directed out a surface 948 opposite the surface 946. As seen in FIG. 88A, the density and/or sizes of the extraction features 944 are relatively low at areas near the input surfaces 942a, 942b and the density and/or sizes are relatively great at an intermediate area 950. Alternatively, or in addition, the shapes of the extraction features may vary over the surface 946. A desired light distribution, such as a uniform light distribution, is thus obtained.

As in other embodiments, extraction features may be disposed at other locations, such as in the surface 948, as desired.

FIG. 89 illustrates a waveguide body 960 that is curved in two dimensions. Specifically, the body 960 is curved not only along the length between an input surface 962 and an end surface 964, but also along the width between side surfaces 966, 968. Preferably, although not necessarily, the waveguide body is also tapered between the input surface 962 and the end surface 964, and is illustrated as having smooth surfaces, although one or more extraction features may be provided on either or both of opposed surfaces 970, 972.

FIGS. 90A-90C illustrate a waveguide body 990 that is also curved in multiple dimensions. An input surface 992 is disposed at a first end and light is transmitted into first and second (or more) sections 993, 994. Each section 993, 994 is tapered and is curved along the length and width thereof. Light is directed out of the waveguide body 990 downwardly as seen in FIG. 90A.

FIG. 91A illustrates various alternative extraction feature shapes. Specifically, extraction features 1050, 1052 comprise convex and concave rounded features, respectively. Extraction features 1054, 1056 comprise outwardly extending and inwardly extending triangular shapes, respectively (the extraction feature 1056 is similar or identical to the extraction feature 576 described above). Extraction features 1058, 1060 comprise outwardly extending and inwardly extending inverted triangular shapes, respectively. FIG. 91B shows a waveguide body 1070 including any or all of the extraction features 1050-1060. The sizes and/or density of the features may be constant or variable, as desired.

Alternatively or in addition, the extraction features may have any of the shapes of co-owned U.S. Pat. No. 10,436, 969, entitled "Optical Waveguide and Luminaire Incorporating Same", the disclosure of which is expressly incorporated by reference herein.

If desired, one or more extraction features may extend fully through any of the waveguide bodies described herein, for example, as seen in FIG. 66D. Specifically, the extraction feature 576 may have a limited lateral extent (so that the physical integrity of the waveguide body is not impaired) and further may extend fully through the waveguide body 574. Such an extraction feature may be particularly useful at or near an end surface of any of the waveguide bodies disclosed herein.

Referring next to FIGS. 92A and 92B, a further embodiment comprises a waveguide body 1080 and a plurality of light sources that may comprise LEDs 1082a-1082d. While four LEDs are shown, any number of LEDs may be used instead. The LEDs 1082 direct light radially into the waveguide body 1080. In the illustrated embodiment, the waveguide body 1080 is circular, but the body 1080 could be any other shape, for example as described herein, such as square, rectangular, curved, etc. As seen in FIG. 92B, and as in previous embodiments, the waveguide body 1080 includes one or more extraction features 1083 arranged in concentric and coaxial sections 1083a-1083d about the LEDs to assist in light extraction. The extraction features are similar or identical to the extraction features of co-owned U.S. Pat. No. 10,436,969, entitled "Optical Waveguide and Luminaire Incorporating Same", incorporated by reference herein. Light extraction can occur out of one or both of opposed surfaces 1084, 1086. Still further, the surface 1086 could be tapered and the surface 1084 could be flat, or both surfaces 1084, 1086 may be tapered or have another shape, as desired.

FIGS. 93A and 93B illustrate yet another waveguide body 1090 and a plurality of light sources that may comprise LEDs 1092a-1092d. While four LEDs 1092 are shown, any number of LEDs may be used instead. In the illustrated embodiment, the waveguide body 1090 is circular in shape, but may be any other shape, including the shapes disclosed herein. The light developed by the LEDs is directed axially downward as seen in FIG. 93B. The downwardly directed light is diverted by a beveled surface 1094 of the waveguide body 1090 radially inwardly by total internal reflection. The waveguide body 1090 includes one or more extraction features 1095 similar or identical to the extraction features of FIGS. 92A and 92B arranged in concentric and coaxial sections 1095a-1095d relative to the LEDs 1092a-1092d, also as in the embodiment of FIGS. 93A and 93B. Light is directed by the extraction features 1095 out one or both opposed surfaces 1096, 1098. If desired, the surface 1098 may be tapered along with the surface 1096 and/or the surface 1096 may be flat, as desired.

A still further embodiment of a waveguide body 1100 is shown in FIGS. 94A and 94B. The body 1100 has a base portion 1102 and an outwardly flared main light emitting portion 1104. The base portion may have an optional interior coupling cavity 1106 comprising a blind bore within which is disposed one or more light sources in the form of one or more LEDs 1110 (FIG. 94B). If desired, the interior coupling cavity 1106 may be omitted and light developed by the LEDs 1110 may be directed through an air gap into a planar or otherwise shaped input surface 1114. The waveguide body 1100 is made of any suitable optically transmissive material, as in the preceding embodiments. Light developed by the LED's travels through the main light emitting portion 1104 and out an inner curved surface 1116.

FIG. 94C illustrates an embodiment identical to FIGS. 94A and 94B except that the interior coupling cavity comprises a bore 1117 that extends fully through the base portion 1102 and the one or more light sources comprising one or more LEDs 1110 extend into the bore 1117 from an inner end as opposed to the outside end shown in FIGS. 94A and 94B. In addition, a light diverter comprising a highly reflective conical plug member 1118 is disposed in the outside end of the bore 1117. The plug member 1118 may include a base flange 1119 that is secured by any suitable means, such as an adhesive, to an outer surface of the waveguide body 1100 such that a conical portion 1120 extends into the bore 1117. If desired, the base flange 1119 may be omitted and the outer diameter of the plug member 1118 may be slightly greater than the diameter of the bore 1117 whereupon the plug member 1118 may be press fitted or friction fitted into the bore 1117 and/or secured by adhesive or other means. Still further, if desired, the conical plug member 1118 may be integral with the waveguide body 1100 rather than being separate therefrom. Further, the one or more LEDs 1110 may be integral with the waveguide body 1100, if desired. In the illustrated embodiment, the plug member 1118 may be made of white polycarbonate or any other suitable material, such as acrylic, molded silicone, polytetrafluoroethylene (PTFE), or Delrin® acetyl resin. The material may be coated with reflective silver or other metal or material using any suitable application methodology, such as a vapor deposition process.

Light developed by the one or more LEDs is incident on the conical portion 1120 and is diverted transversely through the base portion 1102. The light then travels through the main light emitting portion 1104 and out the inner curved surface 1116. Additional detail regarding light transmission and extraction is provided in co-owned U.S. Pat. No. 10,436,969, entitled "Optical Waveguide and Luminaire incorporating Same", incorporated by reference herein.

In either of the embodiments shown in FIGS. 94A-94C additional extraction features as disclosed herein may be disposed on any or all of the surfaces of the waveguide body 1100.

Other shapes of waveguide bodies and extraction features are possible. Combining these shapes stacks their effects and changes the waveguide body light distribution further. In general, the waveguide body shapes disclosed herein may include one or multiple inflection points or regions where a radius of curvature of a surface changes either abruptly or gradually. In the case of a waveguide body having multiple inflection regions, the inflection regions may be transverse to the path of light through the waveguide body (e.g., as seen in FIGS. 67A-67C), along the path of light through the waveguide body (e.g., shown in FIG. 74), or both (e.g., as shown by the waveguide body 1140 of FIGS. 95A-95C or by combining waveguide bodies having both inflection regions). Also, successive inflection regions may reverse between positive and negative directions (e.g., there may be a transition between convex and concave surfaces). Single inflection regions and various combinations of multiple inflection regions, where the inflection regions are along or transverse to the path of light through the waveguide body or multiple waveguide bodies are contemplated by the present invention.

Referring again to FIGS. 57A and 57C, light developed by the one or more LEDs 556 is transmitted through the coupling optic 552. If desired, an air gap is disposed between the LED(s) 556 and the coupling optic 552. Any suitable apparatus may be provided to mount the light source 556 in desired relationship to the coupling optic 552. The coupling optic 552 mixes the light as close to the light source 556 as possible to increase efficiency, and controls the light distribution from the light source 556 into the waveguide body. When using a curved waveguide body as described above, the coupling optic 552 can control the angle at which the light rays strike the curved surface(s), which results in controlled internal reflection or extraction at the curved surface(s).

If desired, light may be alternatively or additionally transmitted into the coupling optic 552 by a specular reflector at least partially or completely surrounding each or all of the LEDs.

As seen in FIGS. 96A and 96B, a further embodiment of a coupling optic 1100 having a coupling optic body 1101 is shown. The coupling optic is adapted for use with at least one, and preferably a plurality of LEDs of any suitable type. The coupling optic body 1101 includes a plurality of input cavities 1102a, 1102b, . . . , 1102N each associated with and receiving light from a plurality of LEDs (not shown in FIGS. 96A and 96B, but which are identical or similar to the LED 556 of FIG. 57A). The input cavities 1102 are identical to one another and are disposed in a line adjacent one another across a width of the coupling optic 1100. As seen in FIG. 96B, each input cavity 1102, for example, the input cavity 1102b, includes an approximately racetrack-shaped wall 1106 surrounded by arcuate upper and lower marginal surfaces 1108a, 1108b, respectively. A curved surface 1110 tapers between the upper marginal surface 1108a and a planar upper surface 1112 of the coupling optic 1100. A further curved surface identical to the curved surface 1110 tapers between the lower marginal surface 1108b and a planar lower surface of the coupling optic 1100.

A central projection 1114 is disposed in a recess 1116 defined by the wall 1106. The central projection 1114 is, in turn, defined by curved wall sections 1117a-1117d. A further approximately racetrack-shaped wall 1118 is disposed in a central portion of the projection 1114 and terminates at a base surface 1120 to form a further recess 1122. The LED associated with the input cavity 1102b in mounted by any suitable means relative to the input cavity 1102b so that the LED extends into the further recess 1122 with an air gap between the LED and the base surface 1120. The LED is arranged such that light emitted by the LED is directed into the coupling optic 1100. If desired, a reflector (not shown) may be disposed behind and/or around the LED to increase coupling efficiency. Further, any of the surfaces may be coated or otherwise formed with a reflective surface, as desired.

In embodiments such as that shown in FIGS. 96A and 96B where more than one LED is connected to a waveguide body, the coupling optic 1100 may reduce the dead zones between the light cones of the LEDs. The coupling optic 1100 may also control how the light cones overlap, which is particularly important when using different colored LEDs. Light mixing is advantageously accomplished so that the appearance of point sources is minimized.

As shown in FIGS. 57A and 62A, the coupling optic guide 552 introduces light emitted from the light source 556 to the waveguide 554. The light source 556 is disposed adjacent to a coupling optic 582 that has a cone shape to direct the light through the coupling optic guide 552. The coupling optic 582 is positioned within the coupling optic guide 552 against a curved indentation 584 formed on a front face 586 opposite the output face 562 of the coupling optic guide 552. The light source 556 is positioned outside of the coupling optic guide 552 within the curved indentation 584. An air gap 585 between the light source 556 and the indentation 584 allows for mixing of the light before the light enters the coupling optic 582. Two angled side surfaces 588, the front face 586, and the output face 562 may be made of a plastic material and are coated with a reflective material. The coupling optic guide 552 is hollow and filled with air.

Other embodiments of the disclosure including all of the possible different and various combinations of the individual features of each of the foregoing embodiments and examples are specifically included herein.

The waveguide components described herein may be used singly or in combination. Specifically, a flat, curved, or otherwise-shaped waveguide body with or without discrete extraction features could be combined with any of the coupling optics and light sources described herein. In any case, one may obtain a desired light output distribution.

Numerous modifications to the present disclosure will be apparent to those skilled in the art in view of the foregoing description. Accordingly, this description is to be construed as illustrative only and is presented for the purposes of enabling those skilled in the art to make and use the present disclosure and to teach the best mode of carrying out the same.

All references, including publications, patent applications, and patents, cited herein are hereby incorporated by reference to the same extent as if each reference were individually and specifically indicated to be incorporated by reference and were set forth in its entirety herein.

What is claimed is:

1. An optical waveguide, comprising:
a first waveguide stage comprising:
a first light coupling surface configured to receive light from a light source;
a first light transmission portion; and
a first light extraction portion; and
a second waveguide stage adjacent to and separate from the first waveguide stage, the second waveguide stage comprising:
a second light coupling surface at least partially aligned with the first light coupling surface;
a second light transmission portion; and
a second light extraction portion;
wherein the first and second waveguide stages are configured to provide beam angles in a range of between 10 degrees and 60 degrees.

2. The optical waveguide, of claim 1, wherein the first light extraction portion of the first waveguide stage comprises a first major surface with light direction features.

3. The optical waveguide, of claim 2, wherein the light direction features comprise two light extraction features and a light redirection feature.

4. The optical waveguide of claim 1, wherein the first waveguide stage receives light from the light source and the second waveguide stage receives light directed out of the first light extraction portion of the first waveguide stage.

5. The optical waveguide of claim 1, wherein the first waveguide stage comprises at least one protrusion and the second waveguide stage comprises at least one cavity that receives the at least one protrusion to create an air gap.

6. The optical waveguide of claim 1, wherein the first and second waveguide stages are configured to provide beam angles in a range between 15 degrees and 40 degrees.

7. The optical waveguide of claim 1, disposed in a luminaire comprising an LED.

8. The optical waveguide of claim 1, wherein an inner cavity of the second waveguide stage is defined by a tapered surface and a planar base surface.

9. The optical waveguide of claim 1, wherein the second light extraction portion of the second waveguide stage comprises a plurality of light extraction surfaces with light extraction features.

10. The optical waveguide of claim 9, wherein at least one of the plurality of light extraction surfaces is textured.

11. The optical waveguide of claim 10, wherein at least one of the plurality of light extraction surfaces is polished.

12. The optical waveguide of claim 1, wherein a light emitting interior cavity is disposed in the second light extraction portion of the second waveguide stage.

13. The optical waveguide of claim 12, wherein the light emitting interior cavity is defined by a tapered surface and a planar base surface.

14. A luminaire comprising:
a housing;
an optical waveguide disposed in the housing, wherein the optical waveguide comprises:
a first waveguide stage comprising a first light coupling portion in a first surface and a light emitting second surface; and
a second waveguide stage comprising a second light coupling portion in a third surface and a light emitting fourth surface, wherein the light emitting fourth surface of the second waveguide stage is textured; and a light source disposed in the housing and configured to provide light that is directly incident on the light coupling portions of the first waveguide stage and the second waveguide stage.

15. The luminaire of claim 14, wherein a light extraction portion of the first waveguide stage comprises two light extraction features and a light redirection feature.

16. The luminaire of claim 14, wherein the light emitting second surface of the first waveguide stage is polished.

17. The luminaire of claim 14, wherein one of the first waveguide stage and the second waveguide stage comprises at least one protrusion and the other of the first waveguide stage and the second waveguide stage comprises at least one cavity that receives the at least one protrusion to create an air gap between the first waveguide stage and the second waveguide stage.

18. The luminaire of claim 14, wherein the light source comprises at least one LED.

\* \* \* \* \*